US008531963B2

(12) United States Patent
Inoue et al.

(10) Patent No.: US 8,531,963 B2
(45) Date of Patent: Sep. 10, 2013

(54) SEMICONDUCTOR INTEGRATED CIRCUIT AND FILTER CONTROL METHOD

(75) Inventors: Hiroaki Inoue, Tokyo (JP); Masamichi Takagi, Tokyo (JP); Masaki Uekubo, Tokyo (JP); Sunao Torii, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 241 days.

(21) Appl. No.: 12/663,474

(22) PCT Filed: May 30, 2008

(86) PCT No.: PCT/JP2008/059974
§ 371 (c)(1),
(2), (4) Date: Dec. 7, 2009

(87) PCT Pub. No.: WO2008/149783
PCT Pub. Date: Dec. 11, 2008

(65) Prior Publication Data

US 2010/0183015 A1 Jul. 22, 2010

(30) Foreign Application Priority Data

Jun. 8, 2007 (JP) ................................ 2007-152795

(51) Int. Cl.
*H04J 3/14* (2006.01)

(52) U.S. Cl.
USPC .......................................................... 370/236

(58) Field of Classification Search
None
See application file for complete search history.

(56) References Cited

U.S. PATENT DOCUMENTS

| | | | | |
|---|---|---|---|---|
| 6,335,939 | B1 * | 1/2002 | Hanna et al. | 370/501 |
| 7,218,605 | B2 | 5/2007 | Ochiai et al. | |
| 7,877,796 | B2 | 1/2011 | Smith | |
| 2003/0174843 | A1 * | 9/2003 | Odell et al. | 380/277 |
| 2004/0158738 | A1 | 8/2004 | Tanaka | |
| 2006/0203825 | A1 | 9/2006 | Beigne et al. | |
| 2008/0005794 | A1 | 1/2008 | Inoue et al. | |
| 2010/0183015 | A1 * | 7/2010 | Inoue et al. | 370/395.42 |

FOREIGN PATENT DOCUMENTS

| | | | |
|---|---|---|---|
| JP | 9-152990 | A | 6/1997 |
| JP | 9-231187 | A | 9/1997 |
| JP | 2003-18199 | A | 1/2003 |
| JP | 2003-204328 | A | 7/2003 |

(Continued)

OTHER PUBLICATIONS

USPTO Office Action, U.S. Appl. No. 12/663,447, Mar. 23, 2012. 18 pages.

(Continued)

*Primary Examiner* — Andrew Lai
*Assistant Examiner* — Leon Andrews
(74) *Attorney, Agent, or Firm* — Foley & Lardner LLP

(57) ABSTRACT

A semiconductor integrated circuit of the invention comprises a plurality of cores, and an interconnecting network including adaptors connected to each of the cores and a plurality of routers connecting the adaptors to communicate therebetween. Transmission side adaptors store first delivery information, and control delivery of the request signal to be received from the first core in accordance with the first delivery information. Reception side adaptors store second delivery information, and control delivery of the request signal to be received through the interconnecting network to the second core in accordance with the second delivery information. The first delivery information and the second delivery information are hierarchically set.

18 Claims, 114 Drawing Sheets

(56) References Cited

FOREIGN PATENT DOCUMENTS

| | | | |
|---|---|---|---|
| JP | 2004-234378 | A | 8/2004 |
| JP | 2005-354410 | A | 12/2005 |
| JP | 2006-254450 | | 9/2006 |
| JP | 2006-302295 | A | 11/2006 |
| WO | WO 2006/022161 | A1 | 3/2006 |

OTHER PUBLICATIONS

USPTO Office Action, U.S. Appl. No. 12/663,477, Aug. 29, 2012, 10 pages.

USPTO Notice of Allowance, U.S. Appl. No. 12/663,477, Dec. 6, 2012, 10 pages.

* cited by examiner (a)

(b)

3321

| reception source | starting point | ending point | permission bit | temporary stopping bit |
|---|---|---|---|---|
| router node #0 | 0x00000000 | 0x20000000 | R·W | No |
| router node #1 | 0x00000000 | 0x20000000 | R | No |
| router node #2 | 0x00000000 | 0x10000000 | R | No |
| | 0x10000000 | 0x20000000 | R·W | No |
| router node #3 | 0x00000000 | 0x10000000 | R | Yes |
| | 0x10000000 | 0x20000000 | R·W | No |
| ... | | | | |

| starting point | ending point | permission bit | temporary stopping bit |
|---|---|---|---|
| 0x000000000 | 0x100000000 | R | No |
| 0x100000000 | 0x200000000 | R·W | No |
| | ... | | |

| destination | permission bit | temporary stop bit |
|---|---|---|
| router node#0 | A・B | No |
| router node#1 | A | No |
| router node#2 | C・D | No |
| router node#3 | E | Yes |
| ・・・ | | |

| destination | transmission source | starting point | ending point | permission bit | temporary stopping bit |
|---|---|---|---|---|---|
| router node#4 | router node#0 | no relation | no relation | C•D | No |
| router node#5 | router node#1 | no relation | no relation | A | No |
| own router node | router node#0 | 0x00000000 | 0x20000000 | R | No |
| | router node#1 | 0x00000000 | 0x10000000 | R | Yes |
| | | 0x10000000 | 0x20000000 | R•W | No |
| ... | | | | | |

Fig.103

| transmission source adaptor number | range | permis-sion |
|---|---|---|
| S1 | 0x000-0x100 | × |
| S2 | option | × |

3321R1

| transmission source adaptor number | range | permis-sion |
|---|---|---|
| S1 | option | × |
| S2 | 0x100-0x200 | × |

| destination adaptor number | permis-sion |
|---|---|
| R2 | × |

3111S1

| destination adaptor number | permis-sion |
|---|---|
| R1 | × |

3111S2

| transmission source adaptor number | range | permis-sion |
|---|---|---|
| S1 | 0x000-0x100 | × |

3321R1

| transmission source adaptor number | range | permis-sion |
|---|---|---|
| S2 | 0x100-0x200 | × |

| transmission source adaptor number | range | permission |
|---|---|---|
| S1 | 0x000-0x100 | × |
| S2 | 0x000-0x100 | × |
| S3 | 0x000-0x100 | × |
| | 0x500-0x600 | × |
| S4 | 0x000-0x100 | × |
| | 0x700-0x800 | × |
| S5 | option | × |
| S6 | option | × |

3321R12

| transmission source adaptor number | range | permission |
|---|---|---|
| S1 | 0x000-0x100 | × |
| | 0x500-0x600 | × |
| S2 | 0x000-0x100 | × |
| | 0x700-0x800 | × |
| S3 | 0x000-0x100 | × |
| S4 | 0x000-0x100 | × |
| S5 | option | × |
| S6 | option | × |

3321R34

| transmission source adaptor number | range | permission |
|---|---|---|
| S1 | option | × |
| S2 | option | × |
| S3 | option | × |
| S4 | option | × |
| S5 | 0x300-0x400 | × |
| | 0x500-0x600 | × |
| S6 | 0x300-0x400 | × |
| | 0x500-0x700 | × |

| destination adaptor number | permission |
|---|---|
| R5 | × |
| R6 | × |

3321R12

| transmission source adaptor number | range | permission |
|---|---|---|
| S1 | 0x000-0x100 | × |
| S2 | 0x000-0x100 | × |
| S3 | 0x000-0x100 | × |
| | 0x500-0x600 | × |
| S4 | 0x000-0x100 | × |
| | 0x700-0x800 | × |

3111S34

| destination adaptor number | permission |
|---|---|
| R5 | × |
| R6 | × |

3321R34

| transmission source adaptor number | range | permission |
|---|---|---|
| S1 | 0x000-0x100 | × |
| | 0x500-0x600 | × |
| S2 | 0x000-0x100 | × |
| | 0x700-0x800 | × |
| S3 | 0x000-0x100 | × |
| S4 | 0x000-0x100 | × |

3111S56

| destination adaptor number | permission |
|---|---|
| R1 | × |
| R2 | × |
| R3 | × |
| R4 | × |

3321R56

| transmission source adaptor number | range | permission |
|---|---|---|
| S5 | 0x300-0x400 | × |
| | 0x500-0x600 | × |
| S6 | 0x300-0x400 | × |
| | 0x500-0x700 | × |

| destination adaptor number | permission |
|---|---|
| RG3 | × |

3111S34

| destination adaptor number | permission |
|---|---|
| RG3 | × |

3111S56

| destination adaptor number | permission |
|---|---|
| RG1 | × |
| RG2 | × |

| transmission source adaptor number | range | permission |
|---|---|---|
| SG1 | 0x000-0x100 | × |
| SG2 | 0x000-0x100 | × |
| S3 | 0x500-0x600 | × |
| S4 | 0x700-0x800 | × |

3321R12

| transmission source adaptor number | range | permission |
|---|---|---|
| S1 | 0x500-0x600 | × |
| S2 | 0x700-0x800 | × |
| SG1 | 0x000-0x100 | × |
| SG2 | 0x000-0x100 | × |

3321R34

| transmission source adaptor number | range | permission |
|---|---|---|
| SG3 | 0x300-0x400 | × |
| | 0x500-0x600 | × |
| S6 | 0x600-0x700 | × |

| destination adaptor number | permis-sion |
|---|---|
| RG3 | × |

3111S34

| destination adaptor number | permis-sion |
|---|---|
| RG3 | × |

3111S56

| destination adaptor number | permis-sion |
|---|---|
| RG1 | × |
| RG2 | × |

2141L

| destination adaptor number | transmission source adaptor number | range | permis-sion |
|---|---|---|---|
| RG1 | SG1 | 0x000-0x100 | × |
| | SG2 | 0x000-0x100 | × |
| RG2 | SG1 | 0x000-0x100 | × |
| | SG2 | 0x000-0x100 | × |

2141R

| destination adaptor number | transmission source adaptor number | range | permis-sion |
|---|---|---|---|
| RG3 | SG3 | 0x300-0x400 | × |
| | | 0x500-0x600 | × |

3321R12

| transmission source adaptor number | range | permis-sion |
|---|---|---|
| S3 | 0x500-0x600 | × |
| S4 | 0x700-0x800 | × |

3321R34

| transmission source adaptor number | range | permis-sion |
|---|---|---|
| S1 | 0x500-0x600 | × |
| S2 | 0x700-0x800 | × |

3321R56

| transmission source adaptor number | range | permis-sion |
|---|---|---|
| S6 | 0x600-0x700 | × |

| destination adaptor number | permis-sion |
|---|---|
| RG3 | × |

3111S34

| destination adaptor number | permis-sion |
|---|---|
| RG3 | × |

3111S56

| destination adaptor number | permis-sion |
|---|---|
| RG1 | × |
| RG2 | × |

2141L

| transmission source adaptor number | range | permis-sion |
|---|---|---|
| SG1 | 0x000-0x100 | × |
| SG2 | 0x000-0x100 | × |

2141R

| transmission source adaptor number | range | permis-sion |
|---|---|---|
| SG3 | 0x300-0x400 | × |
| | 0x500-0x600 | × |

3321R12

| transmission source adaptor number | range | permis-sion |
|---|---|---|
| S3 | 0x500-0x600 | × |
| S4 | 0x700-0x800 | × |

3321R34

| transmission source adaptor number | range | permis-sion |
|---|---|---|
| S1 | 0x500-0x600 | × |
| S2 | 0x700-0x800 | × |

3321R56

| transmission source adaptor number | range | permis-sion |
|---|---|---|
| S6 | 0x600-0x700 | × |

SEMICONDUCTOR INTEGRATED CIRCUIT AND FILTER CONTROL METHOD

TECHNICAL FIELD

The present invention relates to a semiconductor integrated circuit having a plurality of processors and a filter control method.

BACKGROUND ART

In an information communication terminal apparatus such as mobile phone, a program of a basic process to embody basic functions of the terminal apparatus is typically installed together with an operating system in advance. The basic process is a process by a function such as call processing function, browser function for Internet access, electronic mail function and screen control function. In the meantime, a program to execute a further process different from the basic process is downloaded to the terminal apparatus from the outside through a network, a recording medium and the like and then installed into the terminal apparatus by a user's operation and the like. However, if a computer virus is introduced when the program for the further process is downloaded to the terminal apparatus, the operating system or basic process may be attacked by the computer virus when the terminal apparatus executes the further process.

A structure of the information communication terminal apparatus will be described. FIG. 1A is a block diagram showing an example of a structure of a related information communication terminal apparatus. In FIG. 1A, a structure of a well known typical apparatus is schematically shown. To the information communication terminal apparatus has been downloaded a program for a further process. In the followings, it is assumed that a further process is an application program or device driver (which is a software to execute an access request to a device and an interrupt process from the device and is also referred to as "I/O driver") provided with native codes (which are binary codes compiled or assembled by a provider).

The information communication terminal apparatus shown in FIG. 1A is an information processing apparatus of a multi-CPU structure having a plurality of CPUs (Central Processing Units). The information communication terminal apparatus has a semiconductor integrated circuit, memory 31 and input/output apparatus (I/O) 51. The semiconductor integrated circuit has a plurality of CPUs 10010A and 10010B, a group including a program of a basic process and OS 10021A, a group including a program of a further process and OS 10021B and access control means 10030.

One or more CPUs 10010A are connected to memory 31 and I/O 51, respectively. One or more CPUs 10010B are connected to memory 31 and I/O 51 through access control means 10030.

In the information communication terminal apparatus shown in FIG. 1A, the CPUs are divided into a plurality of groups in accordance with reliability of a program or process to be executed. In the followings, the group is called as a domain. Here, the CPUs are divided into domain 10020A including the program of the basic process and OS 10021A and domain 10020B including the program of the further process and OS 10021B. In addition, security of domain 10020A is set to be higher than that of domain 10020B. The CPU of the low security/domain side, which has a separate hardware structure from the high security/domain, executes the program of the further process to secure the stability of the high security/domain.

The process having high reliability is to execute a process for data in which there is a low possibility that a computer virus will be included therein. The data having a low possibility that a computer virus will be included therein is data for a basic process that is installed in a computer main body in advance and also comprises data having security maintained by authentication as long as it is downloaded through the network.

As described above, one or more CPUs correspond to each domain. When accessing memory 31 and I/O 51 to execute the high security process of domain 10020A, CPU 10010B to execute the low security process of domain 10020B transmits an access request from CPU 10010B to access control means 10030. When access control means 10030 receives the access request from CPU 10010B, it determines permission/non-permission of the access. Then, only the access permitted by access control means 10030 is executed. By doing so, it is possible to establish a security system having very high reliability, based on the hardware control.

The international publication No. WO2006/022161 (Patent Document 1) discloses an information processing apparatus using a technology similar to the above. Patent Document 1 discloses a structure same as the access control means shown in FIG. 1A. In Patent Document 1, access permission data indicating whether or not to permit an access request from a CPU is stored in the access control means. When the access control means receives the access request from the CPU, it refers to the access permission data to perform filter control. The access permission data is a table in which an entry is provided for each CPU to execute the further process, the entry having a set of a range of a memory to be accessible and a type of a permissible access request.

Next, an example of a method of setting filter control for a router in a firewall of the network will be described. FIG. 1B is a view for illustrating an example of a method of setting filter control for a router in a system having a host and a router. As shown in FIG. 1B, host 10100 and router 10200 adjacent thereto are connected to each other.

In the structure shown in FIG. 1B, host 10100 instructs router 10200 to discard a packet unnecessary for its own apparatus. Thereby, router 10200 can discard the unnecessary packet even when a destination of the packet is host 10100, and thus host 10100 can prevent the unnecessary packet from being received.

A Japanese Patent Laid-open Publication No. 2005-354410 (Patent Document 2) discloses a method using a technology similar to the above. In Patent Document 2, a method of controlling the setting information of a host for a router is disclosed, as the method described in FIG. 1B.

Next, another setting method of the filter control in a firewall of the network will be described. FIG. 1C is a block diagram schematically showing an example of a structure of a firewall apparatus.

As shown in FIG. 1C, firewall apparatus 20000 comprises access request monitor unit 20100 that monitors an access from an external network, access source analysis unit 20200 that analyzes a transmission source of the access, access destination analysis unit 20300 that analyzes a transmission destination of the access and access filter unit 20400. Access filter unit 20400 calculates reliability of an access source and an apparatus density of an access destination from the access source information and the access destination information, and executes control whether or not to permit an access based on the calculation.

Firewall apparatus 20000 can perform packet filtering by using the access source information and the access destination information. As a result, it is not necessary to distribute most of the unnecessary packets to an internal network.

A Japanese Unexamined Patent Publication No. 2006-302295 (Patent Document 3) discloses an information processing apparatus using a technology similar to the above. Patent Document 3 discloses a method that is the same as the firewall control method shown in FIG. 1C.

DISCLOSURE OF INVENTION

However, the method shown in FIG. 1A has the following problems.

The greater the number of CPUs, the larger the number of entries of the table to be referred to when controlling the access. When it is intended to perform all the filter control with one access control means, a large quantity of entries is concentrated on the table of the one access control means, so that the time consumed for the reference when controlling the filter is prolonged.

Further, in the method shown in FIG. 1B, in order to perform filter control for the packets from the entire network, a great many entries are required with respect to the packets. In addition, many filter entries are concentrated on one router.

In addition, the method shown in FIG. 1C has the following problems. Although the reliability of the access source and the apparatus density of the access destination are calculated, a great many lists are required for the calculations. In other words, although the information of the access source and the access destination is used, there is a concern that the hosts of the access source and the access destination cannot trust each other in the Internet, so that a relation therebetween cannot be formed. As a result, independent lists are required, respectively. In addition, many filter entries are concentrated on the firewall.

As described above, when each CPU separately executes the basic and further processes, the larger the number of CPUs to be provided in the semiconductor integrated circuit, the larger is the number of entries that are described in the table for filter control. Furthermore, when it is intended to intensively perform the control at one location, the size of hardware for the control is enlarged.

An object of the invention is to provide a semiconductor integrated circuit and a filter control method where entries of control information referred to when controlling transmission/reception of a signal between a plurality of cores is prevented from being concentrated and the number of entries is suppressed.

A semiconductor integrated circuit of the invention comprises a plurality of cores and an interconnecting network including adaptors connected to each of the cores and a plurality of routers connecting the adaptors to communicate therebetween. Transmission side adaptors of the adaptors connected to each of the cores store first delivery information that indicates a delivery condition of a request signal to be received from a first core connected to the adaptors themselves, and control delivery of the request signal to be received from the first core in accordance with the first delivery information. Reception side adaptors of the adaptors connected to each of the cores store second delivery information that indicates a delivery condition of the request signal to be transmitted to a second core connected to the adaptors themselves, and control delivery of the request signal to be received through the interconnecting network to the second core in accordance with the second delivery information. The first delivery information and the second delivery information are hierarchically set.

BRIEF DESCRIPTION OF DRAWINGS

FIG. 55 is a view showing an example of a structure of transmission filter data.

FIG. 72 is a view showing an example of a structure of packet transmission filter data.

FIG. 85 is a view illustrating an example of a structure of router filter data.

FIG. 103 is a view showing an example of filter data that is used for filter control in the semiconductor integrated circuit shown in FIG. 102.

FIG. 104 is a view showing another example of filter data that is used for filter control in the semiconductor integrated circuit shown in FIG. 102.

FIG. 107 is a view illustrating an example of filter data that is used for filter control in the semiconductor integrated circuit shown in FIG. 106.

FIG. 108 is a view showing another example of filter data that is used for filter control in the semiconductor integrated circuit shown in FIG. 106.

FIG. 109 is a view showing another example of filter data that is used for filter control in the semiconductor integrated circuit shown in FIG. 106.

FIG. 111 is a view showing an example of filter data that is used for filter control in the semiconductor integrated circuit shown in FIG. 110.

FIG. 112 is a view showing another example of filter data that is used for filter control in the semiconductor integrated circuit shown in FIG. 110.

DESCRIPTIONS OF REFERENCE NUMERALS

99, 99P00~99P33 core
100 semiconductor integrated circuit
1000 interconnecting network
2000, 2000P00~2000P33 router node
2101 routing control means having a filter
2141 router filter data
3000, 3000P00~3000P33 adaptor
3110 packet transmission filter means
3111 packet transmission filter data
3300 adaptor filter control means
3310 transmission filter means
3311 transmission filter data
3320 reception filter means
3321 reception filter data

BEST MODE FOR CARRYING OUT THE INVENTION

The embodiments of a semiconductor integrated circuit of the invention will be described. First to fifth exemplary embodiments form bases of sixth to eighth exemplary embodiments.

First Exemplary Embodiment

Figure 1A:
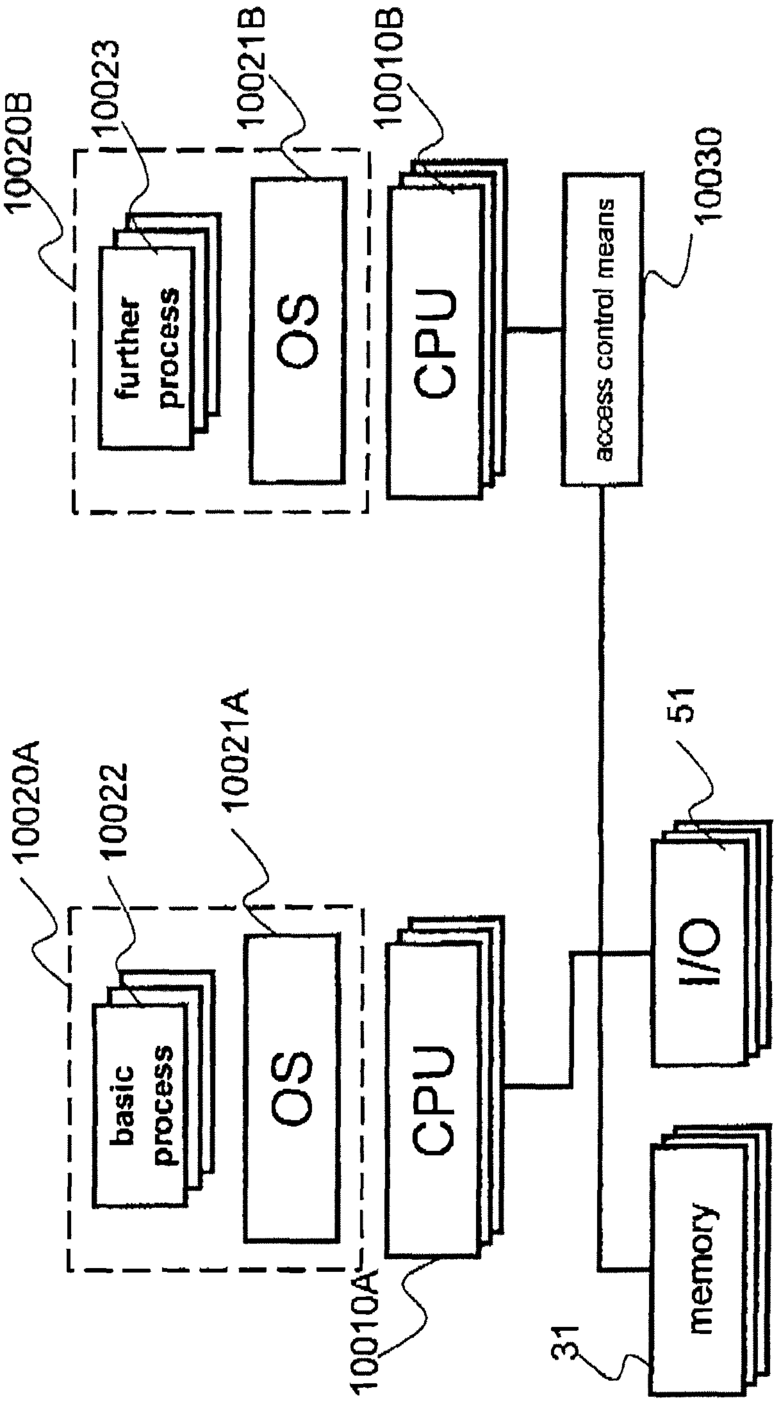
FIG. 1A is a block diagram showing an example of a structure of a related information communication terminal apparatus.
Figure 1B:
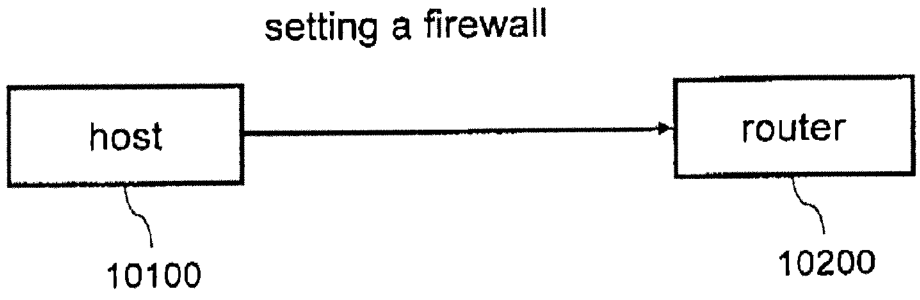
FIG. 1B is a view illustrating an example of a method of setting filter control to a router in a system having a host and a router.
Figure 1C:
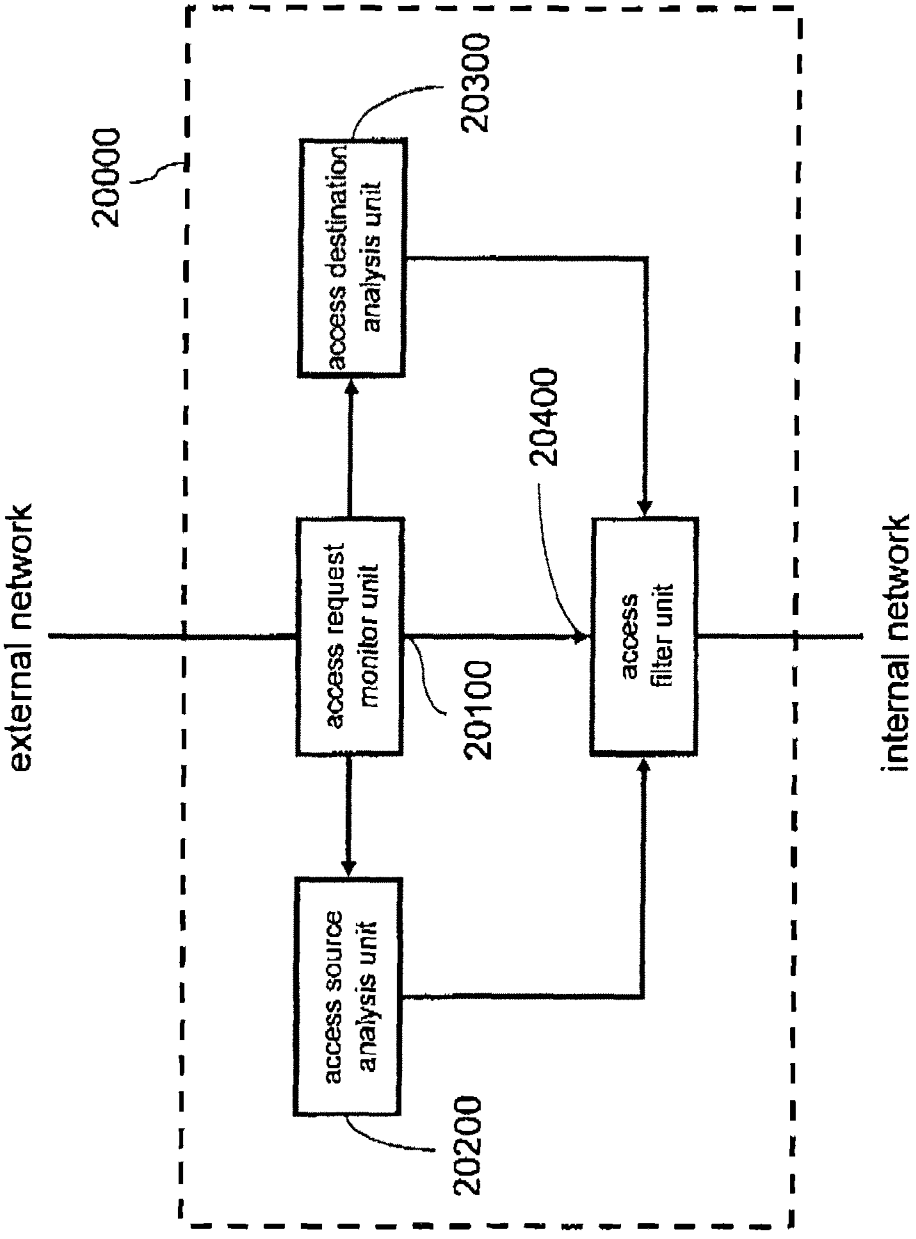
FIG. 1C is a block diagram schematically showing an example of a structure of a firewall apparatus.
Figure 2:
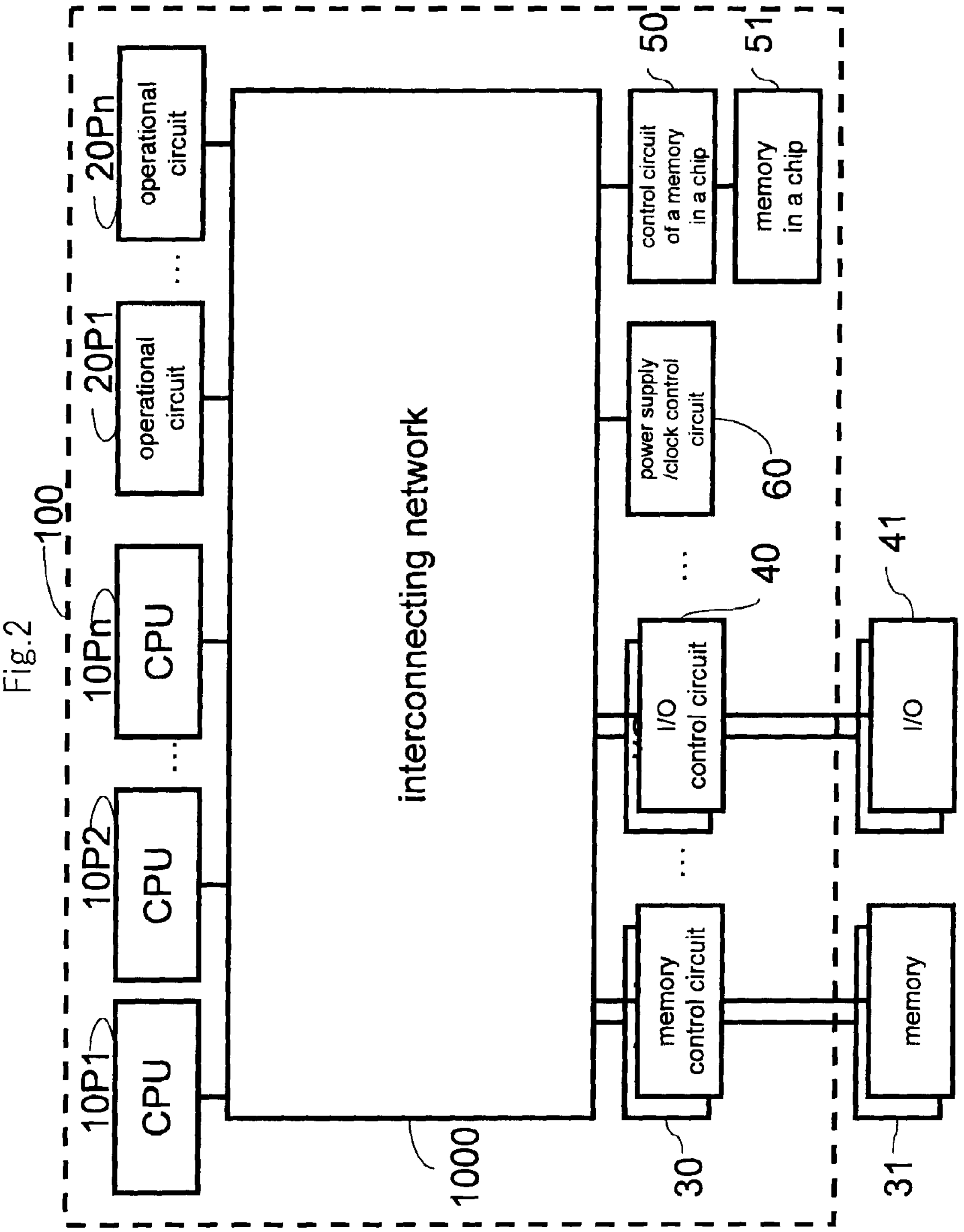
FIG. 2 is a view showing an overall structure of a semiconductor integrated circuit according to a first exemplary embodiment.

FIG. 2 is a view showing an overall structure of semiconductor integrated circuit 100 of this exemplary embodiment. As shown in FIG. 2, semiconductor integrated circuit 100 has CPUs 10P1~10Pn, operational circuits 20P1~20Pn such as accelerator and the like, memory control circuit 30 connected to external memory 31, I/O control circuit 40 connected to external I/O 41, memory 51 in a chip, memory control circuit 50 in a chip, which is connected to memory 51 in a chip, and interconnecting network 1000. Here, n is a natural number of 2 or more.

Interconnecting network 1000 interconnects CPUs 10P1~10Pn, operational circuits 20P1~20Pn, memory control circuit 30, I/O control circuit 40 and memory control circuit 50 in a chip through a structure that will be described below, and can perform filter control of CPU separation while maintaining consistency.

In this exemplary embodiment, CPUs 10P1~10Pn, operational circuits 20P1~20Pn, memory control circuit 30, memory 31, I/O control circuit 40, I/O 41, memory control circuit 50 in a chip, memory 51 in a chip, power supply/clock control circuit 60 and interconnecting network 1000 are mounted on a single chip. However, they may be mounted on a separate package, respectively. In addition, they may be a circuit structure which is provided in a SoC (System on a Chip), and may be mounted on a SiP (System in Package) or a three-dimensional LSI by a separate chip, respectively. Furthermore, semiconductor integrated circuit 100 of this exemplary embodiment may be structured by a combination of the chips or circuits thereof.

Each of CPUs 10P1~10Pn is an operational apparatus in which a program can operate, such as signal processing processor, VLIW (Very Long Instruction Word) or configurable processor.

Each of operational circuits 20P1~20Pn is an operational apparatus that is mainly suitable for data processing, such as accelerator, dynamic configurable circuit and the like.

Power supply/clock control circuit 60 controls power and clock to be supplied to the individual circuit. In addition, a common control device to control interrupt and temperature may be also provided.

Figure 3:
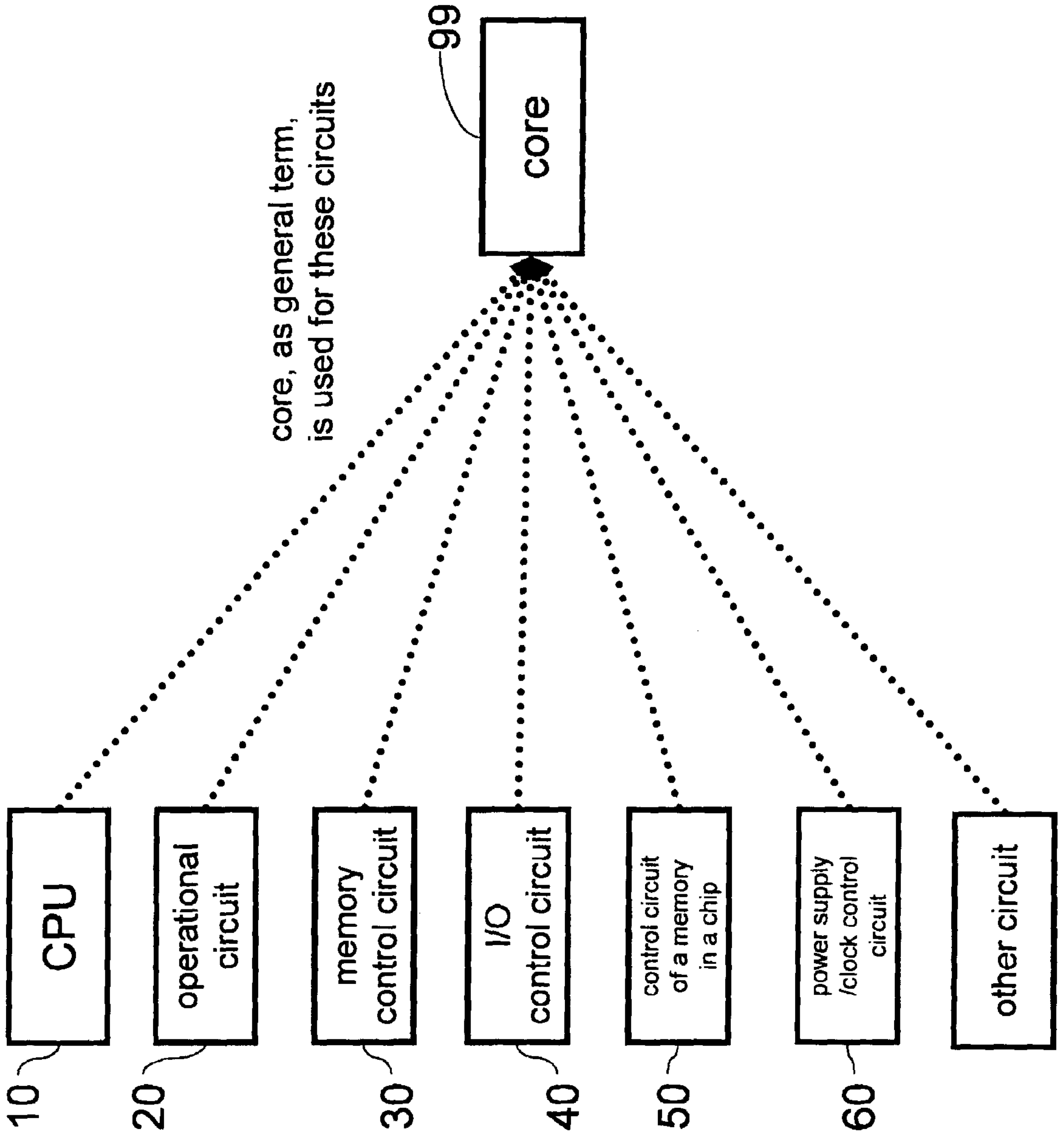
FIG. 3 is a view showing a general term of an individual circuit in a semiconductor integrated circuit according to a first exemplary embodiment.

FIG. 3 is a view showing a general term of an individual circuit in a semiconductor integrated circuit according to a first exemplary embodiment. As shown in FIG. 3, a general term, i.e., core 99 is used for a circuit comprising CPU 10 representing CPU 10P1~10Pn, operational circuit 20 representing operational circuits 20P1~20Pn, memory control circuit 30, I/O control circuit 40, memory control circuit 50 in a chip and power supply/clock control circuit 60. In other words, a circuit labeled as core, means that it does not depend on a type of a specific circuit.

Figure 4:
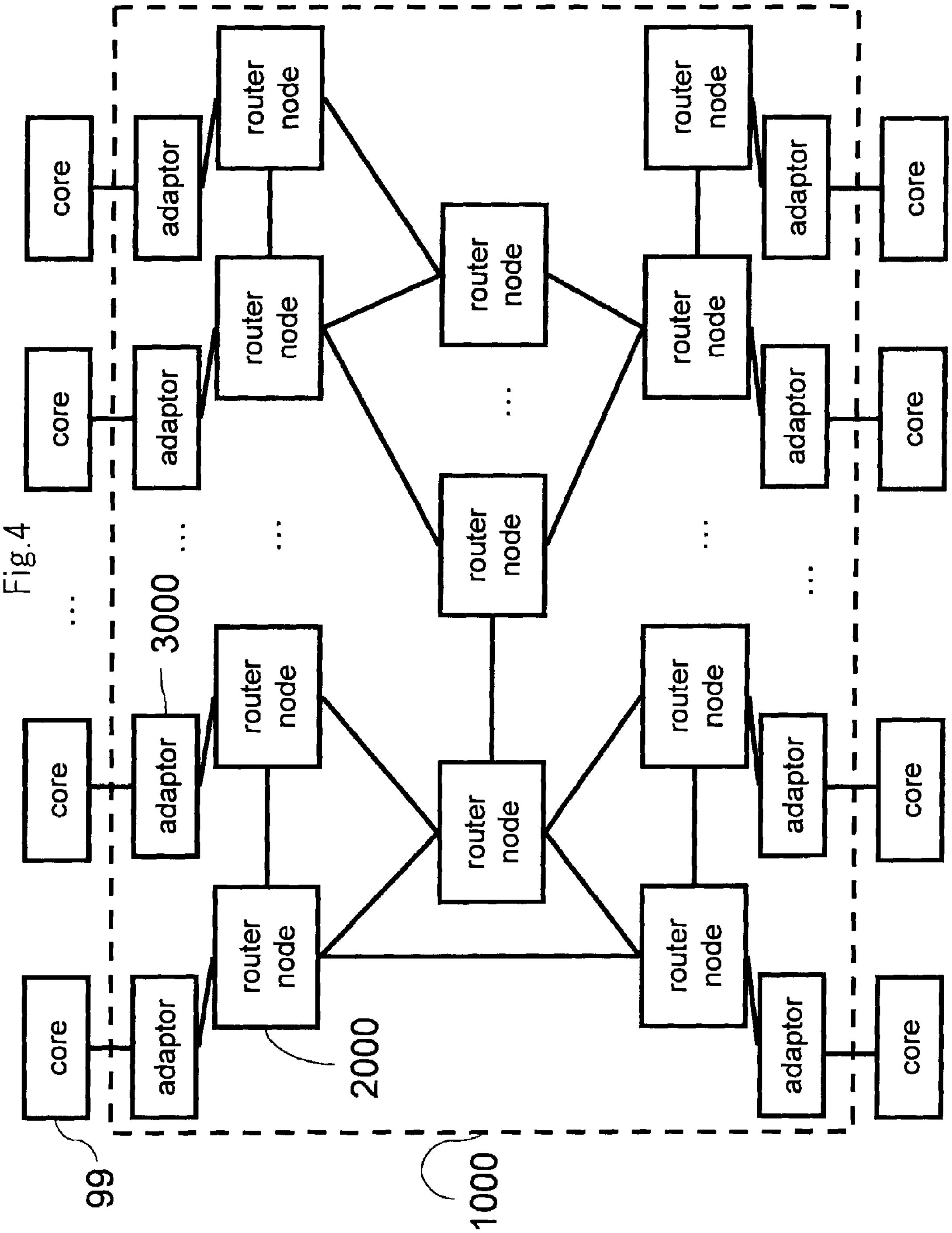
FIG. 4 is a view showing an overall structure of an interconnecting network of a first exemplary embodiment.

FIG. 4 is a view showing an overall structure of interconnecting network 1000 of this exemplary embodiment. Referring to FIG. 4, interconnecting network 1000 connecting a plurality of cores 99 comprises router nodes 200, each of which is a router formed with a chip or circuit, adaptors 300 each of which is a connection interface between core 99 and router node 2000. Each of adaptors 3000 is also formed with a chip or circuit. A plurality of router nodes 2000 and adaptors 300 are provided, respectively.

Core 99 transmits a request signal that requests reading or writing of data to another core. When another core is a memory, an access request signal that requests either reading (read access) or writing (write access) is transmitted. Data transmission between the router nodes in interconnecting network 1000 is performed in the format of a packet that is a unit obtained by dividing data to be transmitted into a size of a predetermined capacity. A structure of the packet will be specifically described below. Meantime, hereinafter, an access request signal for a request memory from one core to another core is briefly referred to as “access request.” In addition, a signal that responds to the access request signal is briefly referred to as “access response.”

Adaptor 3000 converts the access request received from core 99 into a packet and the packet received from router node 2000 into an access request to core 99. Router node 200 distributes the received packet to an adjacent router node in accordance with set path information.

Here, adaptor 3000 is independent means of router node 2000 or core 99. However, the adaptor may be embedded in router node 2000 or core 99 as long as it is a circuit performing the access/packet conversion function.

Figure 5:
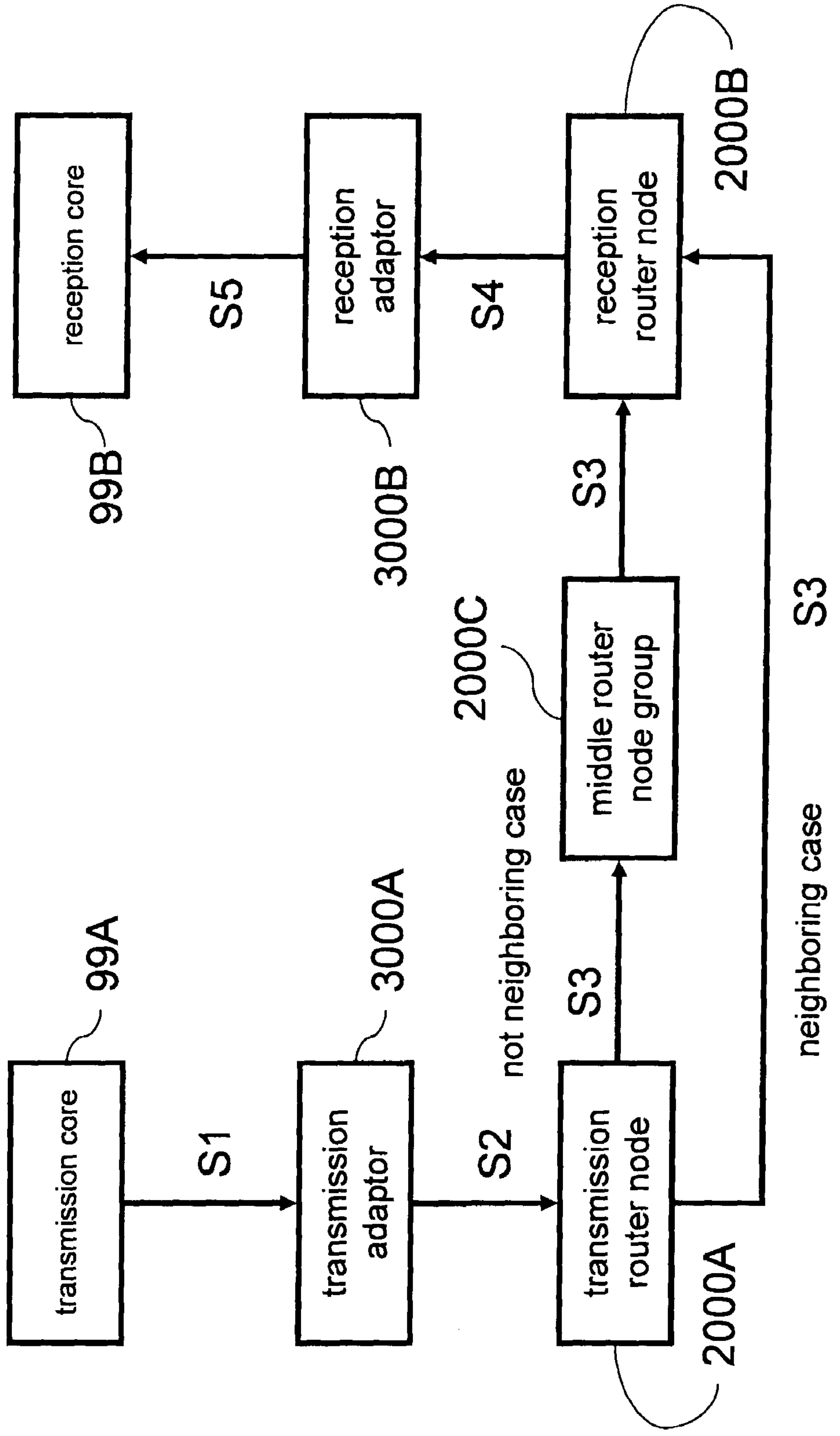
FIG. 5 is a view illustrating an example of operations of router nodes and adaptors shown in FIG. 4.

FIG. 5 is a view illustrating an example of operations of router nodes 2000 and adaptors 3000 shown in FIG. 4. In FIG. 5, an arrow indicates a signal transmission direction and a symbol consisting of S and number beside the arrow indicates a step number. This is also the same in other drawings for illustrating the operations.

With reference to FIG. 5, a method of distributing data from transmission core 99A to reception core 99B via transmission adaptor 3000A, transmission router node 2000A, reception router node 2000B and reception adaptor 3000B will be described.

Step 1 (S1): Transmission core 99A transmits an access request to transmission adaptor 3000A. Step 2 (S2): Transmission adaptor 3000A converts the access request received from transmission core 99A into a packet corresponding to a delivery format on the interconnecting network. After conversion, the transmission adaptor delivers the packet to transmission router node 2000A.

Step 3 (S3): When transmission router node 2000A receives the packet from transmission adaptor 3000A, it distributes the packet to another router node in accordance with destination information of the received packet. The packet reaches reception router node 2000B via various nodes in middle router node group 2000C as long as reception router node 2000B and transmission router node 2000A of reception core 99B side are not adjacent and connected to each other.

Step 4 (S4): When reception router node 2000B receives the packet from the node in middle router node group 2000C, it reads out the destination information of the packet. When the read destination information indicates reception core 99B, the reception router node determines that the packet is a packet to be processed by the core connected to the reception router node itself. Then, the reception router node delivers the packet to reception adaptor 3000B.

Step 5 (S5): Reception adaptor 3000B analyzes and develops the packet delivered from reception router node 2000B, converts the packet into an access request to reception core 99B and delivers the access request to reception core 99.

Here, the structure of the packet will be described.

Figure 6:
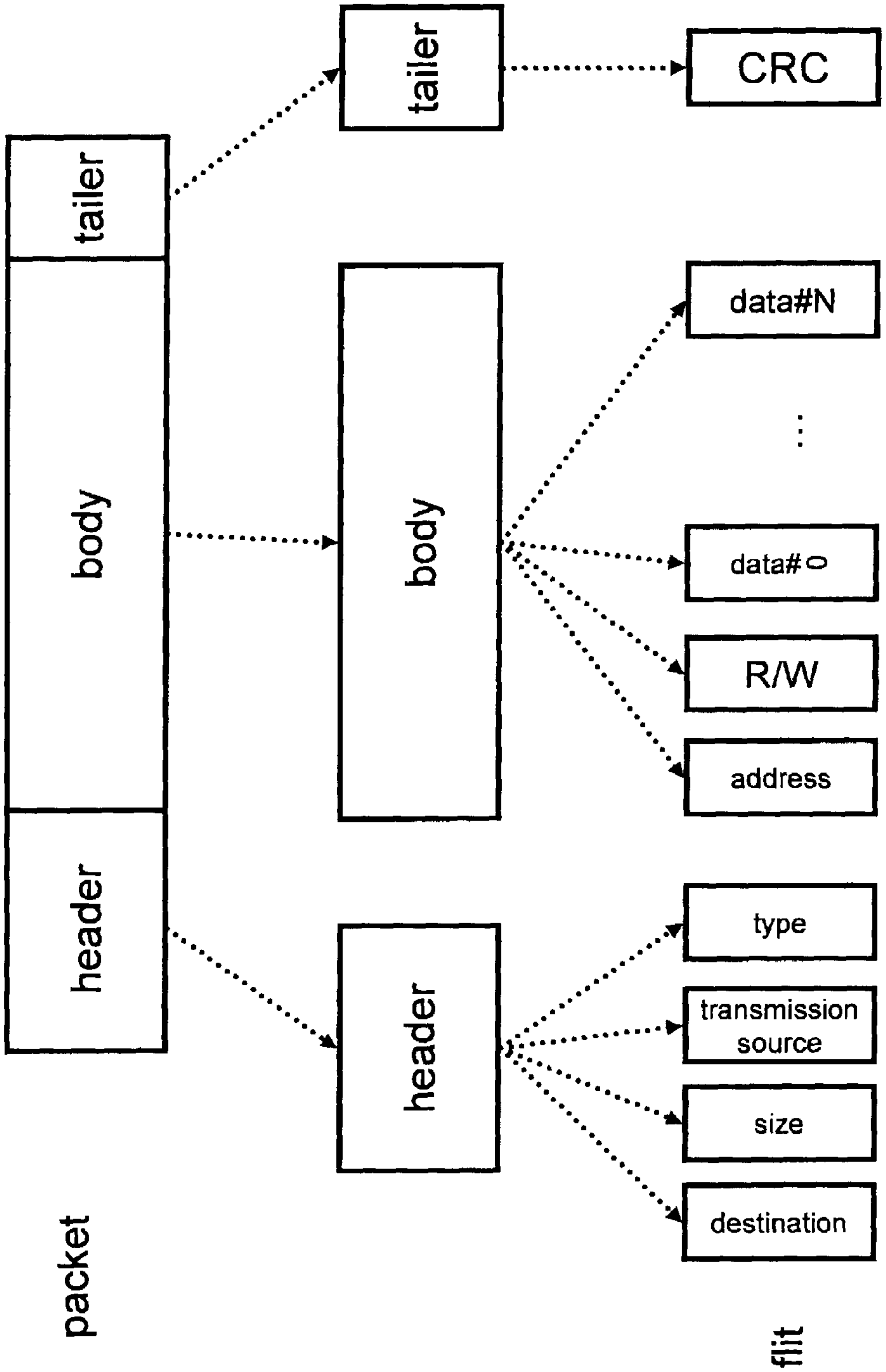
FIG. 6 is a view showing an example of a structure of a packet to be distributed in an interconnecting network.

FIG. 6 is a view showing an example of a structure of a packet to be distributed in interconnecting network 100. Referring to FIG. 6, a packet consists of three sections, i.e., a “header” that is control information in a router node such as information of transmission source and destination of the packet, a “body” that is a data main body of a transmission object and “tailer” that guarantees validity of the packet. Each of the sections is divided into finer units called as flit when the packet is distributed between the router nodes.

For example, the header is divided into flits consisting of a destination node, a packet size, a transmission source node and a type of a packet. In addition, when a core of a transmission destination is a memory, the body is divided into flits consisting of an address for the memory core, a type of an access request such as read/write and data when writing. Furthermore, a tailer is divided into flits consisting of CRC (Cyclic Redundancy Check) codes of an entire packet.

In the meantime, the above structure of the packet or flit is just an example. In other words, any structure may be possible as long as it complies with the specification of router nodes organizing the interconnecting network.

Figure 7:
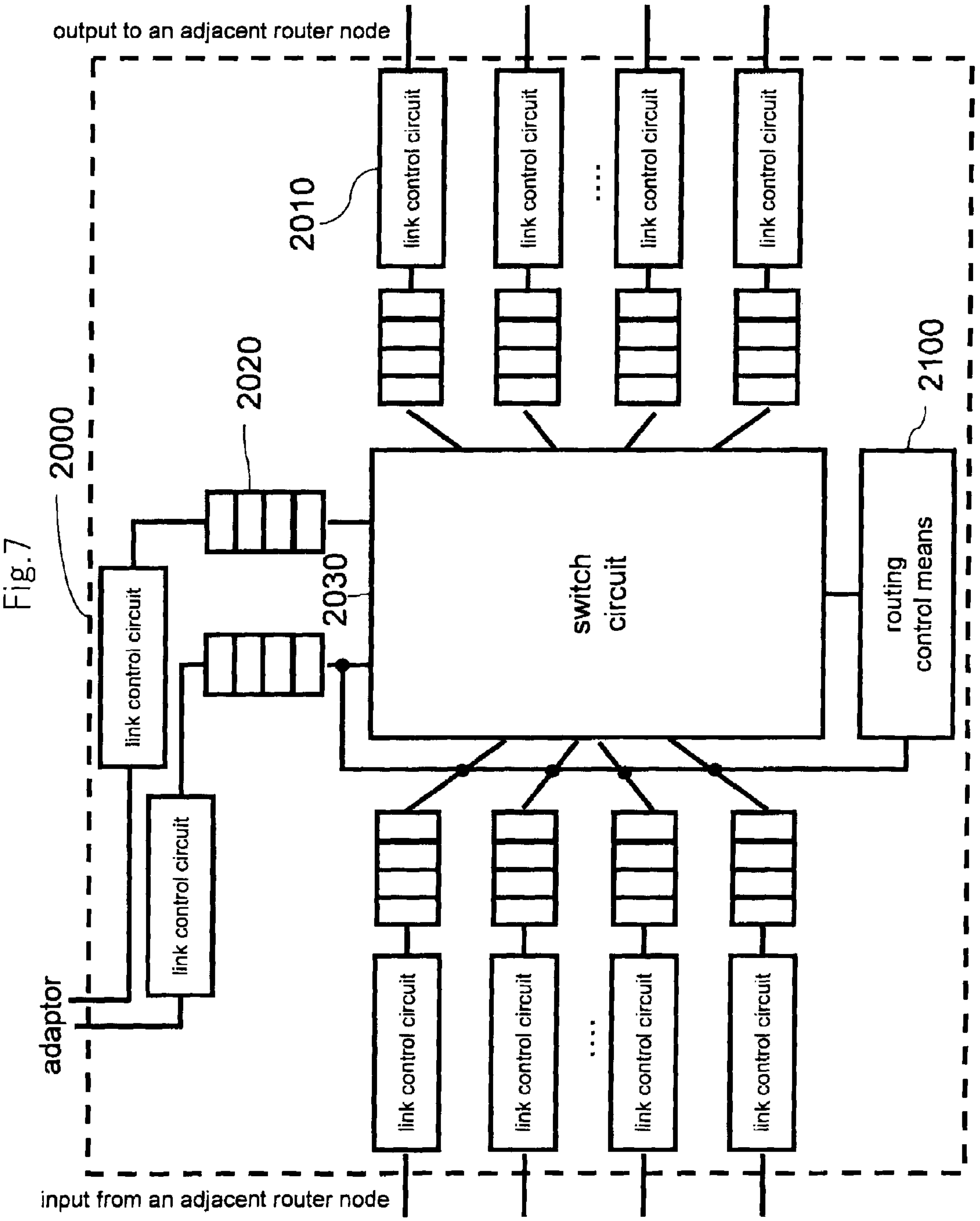
FIG. 7 is a block diagram showing an example of a structure of a router node in an interconnecting network.

Next, the structure of router node 2000 will be described. FIG. 7 is a block diagram showing an example of a structure of router node 2000 in interconnecting network 1000.

Referring to FIG. 7, router node 2000 comprises a plurality of channels each of which transmits/receives a packet to/from another connected apparatus, switch circuit 2030 that connects the channels and routing control means 2100 that notifies connection switching information to switch circuit 2030 in accordance with the received packet.

Each of the channels consists of link control circuit 2010 that performs flow control of a connection link and the like and buffer 2020 that stores a packet. A plurality of channels is allotted for input from an adjacent router node, a plurality of channels is allotted for output to an adjacent router node and one channel is allotted for connection with an adaptor. Here, although one channel is allotted for connection with an adaptor, a plurality of channels may be allotted. In this case, a plurality of channels can be realized by expanding the number of connection channels to the switch circuit.

Link control circuit 2010 manages transmission/reception of a data signal of link-to-link (between adjacent router nodes), not end-to-end. Thereby, for example, when data using a hand shake signal is distributed or when a buffer of a transmission destination is full, the transmission is stopped.

Switch circuit 2030 connects an appointed input channel and an appointed output channel, based on the notified information from routing control means 2100. For example, a multi-stage connection network such as crossbar connection or omega network, or a connection network connected by the network may be adopted.

Routing control means 2100 refers to the destination information included in the header of the packet of the input channel of the adjacent router node and adaptor, and notifies switch circuit 2030 of whether to connect which input channel to which output channel in accordance with the destination of the packet. At this time, routing control means 2100 may be provided with functions for preventing starvation or deadlock in the channel.

Figure 8:
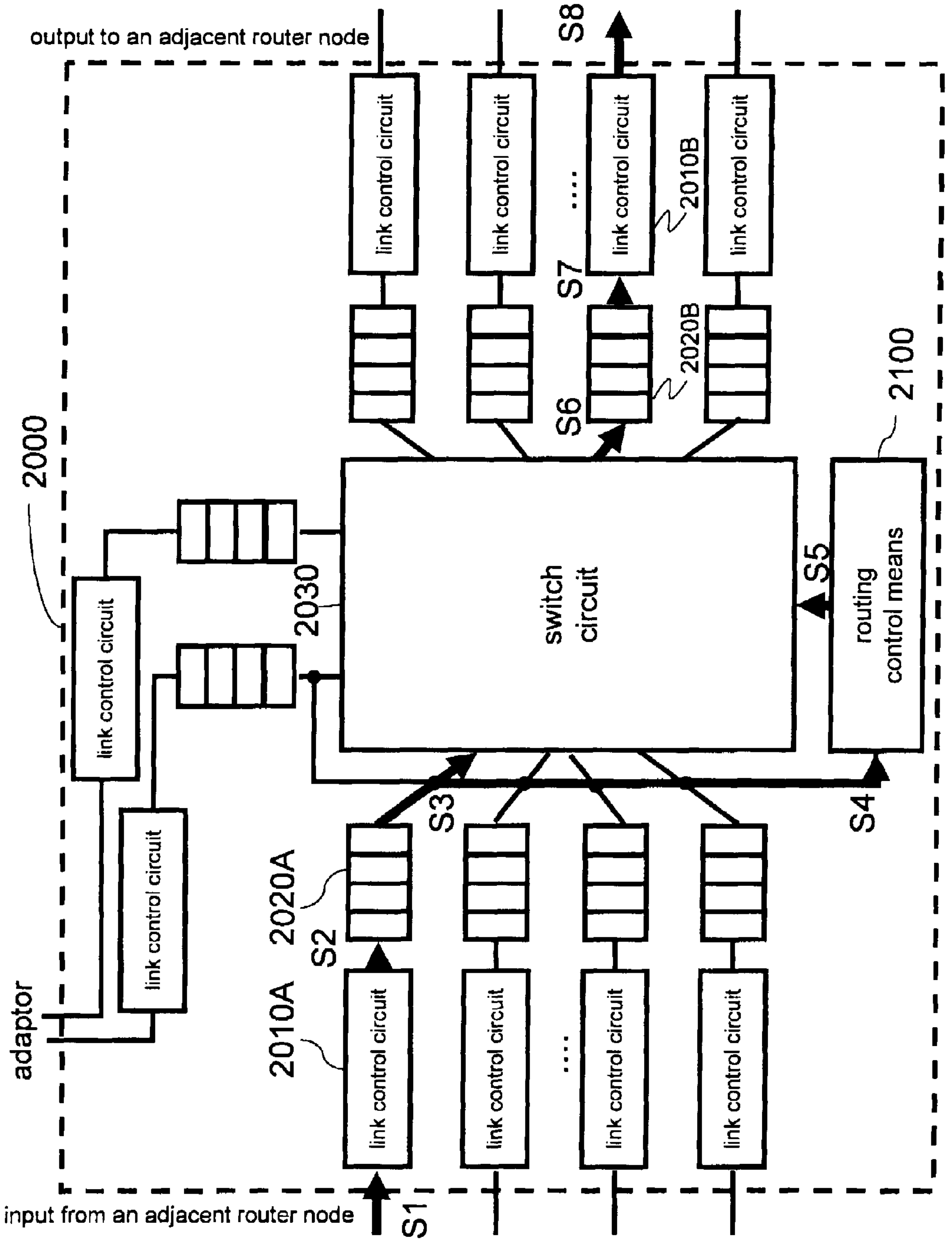
FIG. 8 is a view illustrating an example of an operation of a router node shown in FIG. 7.

Next, an operation in which router node 2000 receives a packet from an adjacent router node through the input channel and transmits the received packet to adjacent another router node will be described. FIG. 8 is a view illustrating an example of an operation of router node 2000 shown in FIG. 7.

Step 1 (S1): Link control circuit 2010A receives a packet from an adjacent router node. Step 2 (S2): Link control circuit 2010A stores the packet in buffer 2020A. Step 3 (S3): Buffer 2020A is connected to an input of switch circuit 2030 and enables the packet in the buffer to be transmitted to switch circuit 2030.

Step 4 (S4): When routing control means 2100 receives the packet in the buffer, it determines output buffer 2020B that is a connection destination of input buffer 2020A, based on the header information of the packet. Step 5 (S5): Routing control means 2100 notifies switch circuit 2030 of the information determined in step 4.

Step 6 (S6): Switch circuit 2030 connects input buffer 2020A and output buffer 2020B.

Step 7 (S7): Link control circuit 2010B reads out the packet in output buffer 2020B and is ready for packet delivery to an adjacent router node. Step 8 (S8): Link control circuit 2010B transmits the packet to the adjacent router node.

Figure 9:
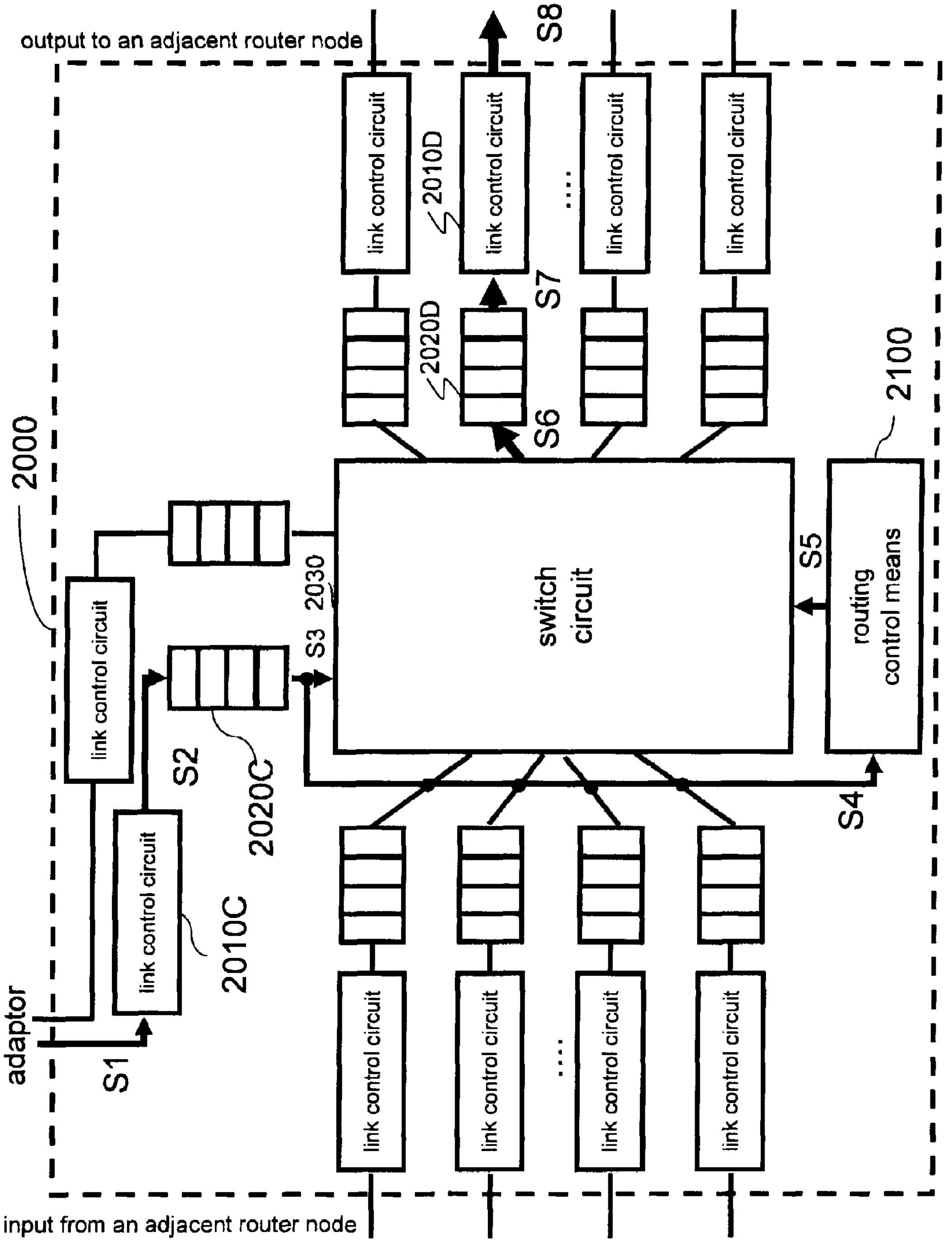
FIG. 9 is a view illustrating an example of an operation of a router node shown in FIG. 7.

Next, an operation in which router node 2000 receives a packet from an adaptor through the input channel and transmits the received packet to an adjacent router node will be described. FIG. 9 is a view illustrating an example of an operation of router node 2000 shown in FIG. 7.

Step 1 (S1): Link control circuit 2010C receives a packet from an adaptor. Step 2 (S2): Link control circuit 2010C stores the packet in buffer 2020C. Step 3 (S3): Buffer 2020C is connected to an input of switch circuit 2030 and enables the packet in the buffer to be transmitted to switch circuit 2030.

Step 4 (S4): Routing control means 2100 determines output buffer 2020D that is a connection destination of input buffer 2020C, based on the header information of the packet in the buffer. Step 5 (S5): Routing control means 2100 notifies switch circuit 2030 of the information determined in step 4.

Step 6 (S6): Switch circuit 2030 connects input buffer 2020C and output buffer 2020C.

Step 7 (S7): Link control circuit 2010D reads out the packet in output buffer 2020D and is ready for packet delivery to an adjacent router node. Step 8 (S8): Link control circuit 2010D transmits the packet to the adjacent router node.

Figure 10:
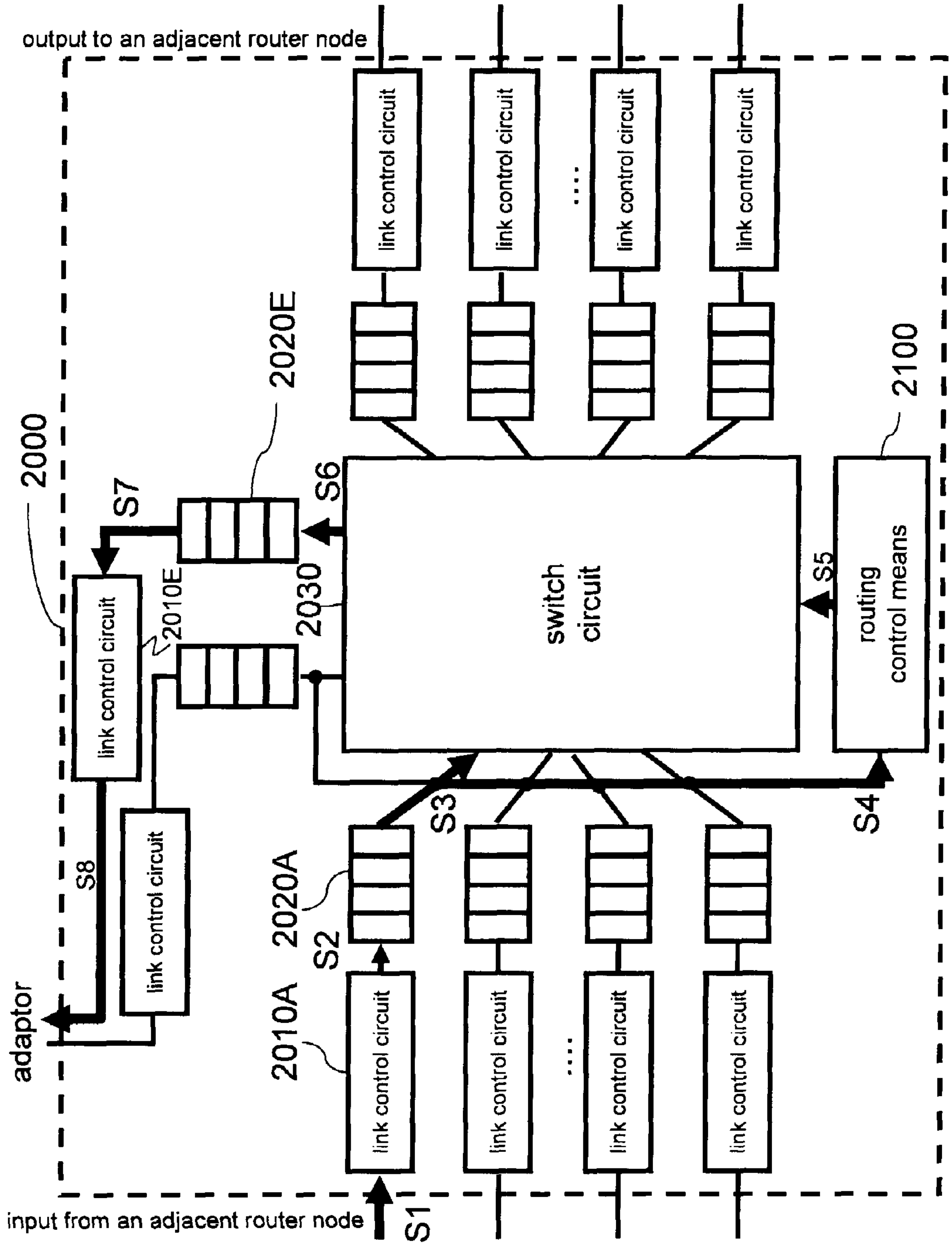
FIG. 10 is a view illustrating an example of an operation of a router node shown in FIG. 7.

Next, an operation in which router node 2000 receives a packet from an adjacent router node through the input channel and transmits the received packet to an adaptor will be described. FIG. 10 is a view illustrating an example of an operation of router node 2000 shown in FIG. 7.

Step 1 (S1): Link control circuit 2010A receives a packet from an adjacent router node. Step 2 (S2): Link control circuit 2010A stores the packet in buffer 2020A. Step 3 (S3): Buffer 2020A is connected to an input of switch circuit 2030 and enables the packet in the buffer to be transmitted to switch circuit 2030.

Step 4 (S4): Routing control means 2100 makes a determination based on the header information of the packet in the buffer, and determines output buffer 2020E as a connection destination of input buffer 2020A when it recognizes that transmission to an adaptor is required. Step 5 (S5): Routing control means 2100 notifies switch circuit 2030 of the information determined in step 4.

Step 6 (S6): Switch circuit 2030 connects input buffer 2020A and output buffer 2020E.

Step 7 (S7): Link control circuit 2010E reads out the packet in output buffer 2020E and is ready for packet delivery to an adaptor. Step 8 (S8): Link control circuit 2010E transmits the packet to the adaptor.

Figure 11:
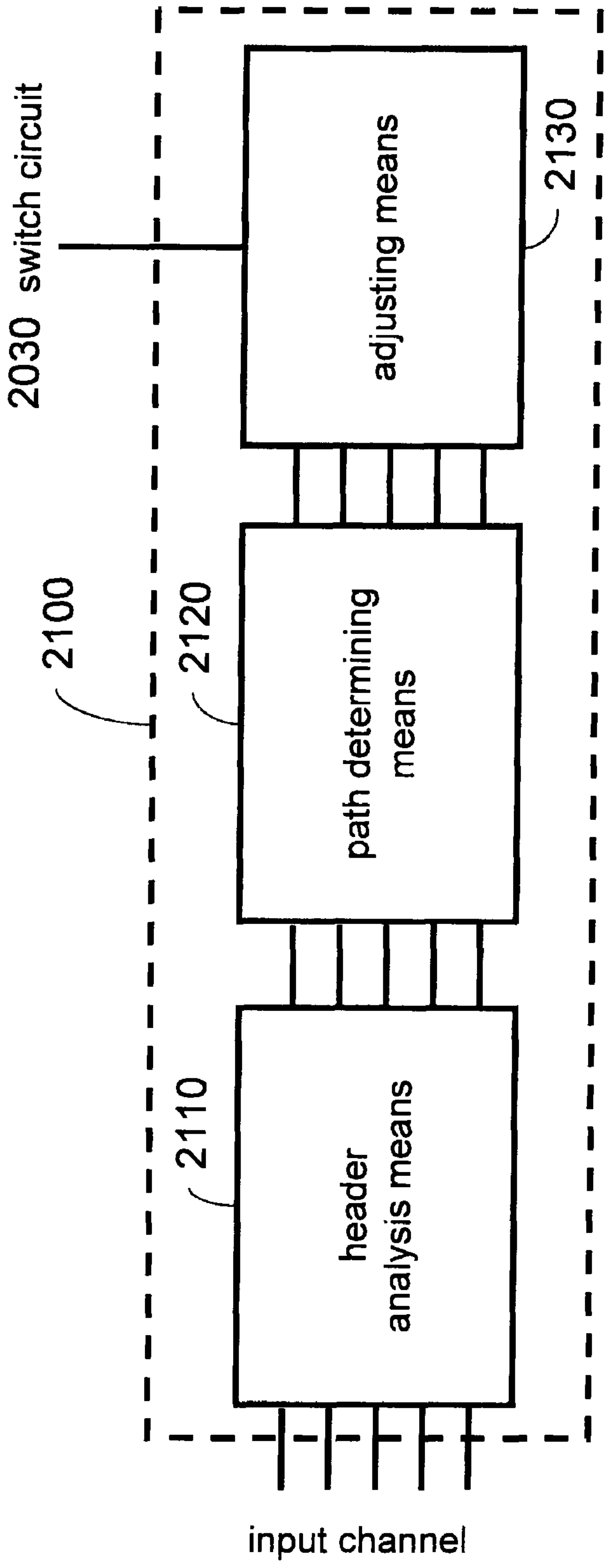
FIG. 11 is a block diagram showing an example of a structure of routing path means.

Next, a structure of routing path means 2100 in router node 2000 will be described. FIG. 11 is a block diagram showing an example of a structure of routing path means 2100.

Referring to FIG. 11, routing path means 2100 comprises header analysis means 2110 that analyzes information from the input channel, path determining means 2120 that determines an output channel by the information from header analysis means 2110, and adjusting means 2130 that prevents competition between the output channels determined path determining means 2120 and notifies switch circuit 2030 of the corresponding information.

Header analysis means 2110 refers to all the header information of the packets in the input channel and notifies path determining means 2120 of the packet information of each packet.

When path determining means 2120 receives the destination information of the packet from header analysis means 2110, it notifies adjusting means 2130 of whether each packet is transmitted to which output channel on the basis of the destination information. In determining the output channel, it is possible to use a variety of routing algorithms that are currently known, such as determinative algorithm or adaptive algorithm.

Adjusting means 2130 receives output channel information, which indicates the connection destination of each input channel, from path determining means 2120, and prevents competition of the output channels when there is a redundancy in the output channel information received, under considering the fairness. When there are two competing input channels, two methods for preventing the competition are considered. First, there is a method of connecting one of two input channels to the output channel and then the other input channel to the output channel. Second, there is a method of connecting the two input channels to the different output channels with the same timing, respectively, although it is not the shortest path. The method of preventing the competition is not limited to the two exemplary methods.

Meantime, as the delivery method of the packet/flit, the conventional methods may be used, such as wormhole routing, virtual cut-through routing, store and forward routing and the like.

Figure 12:
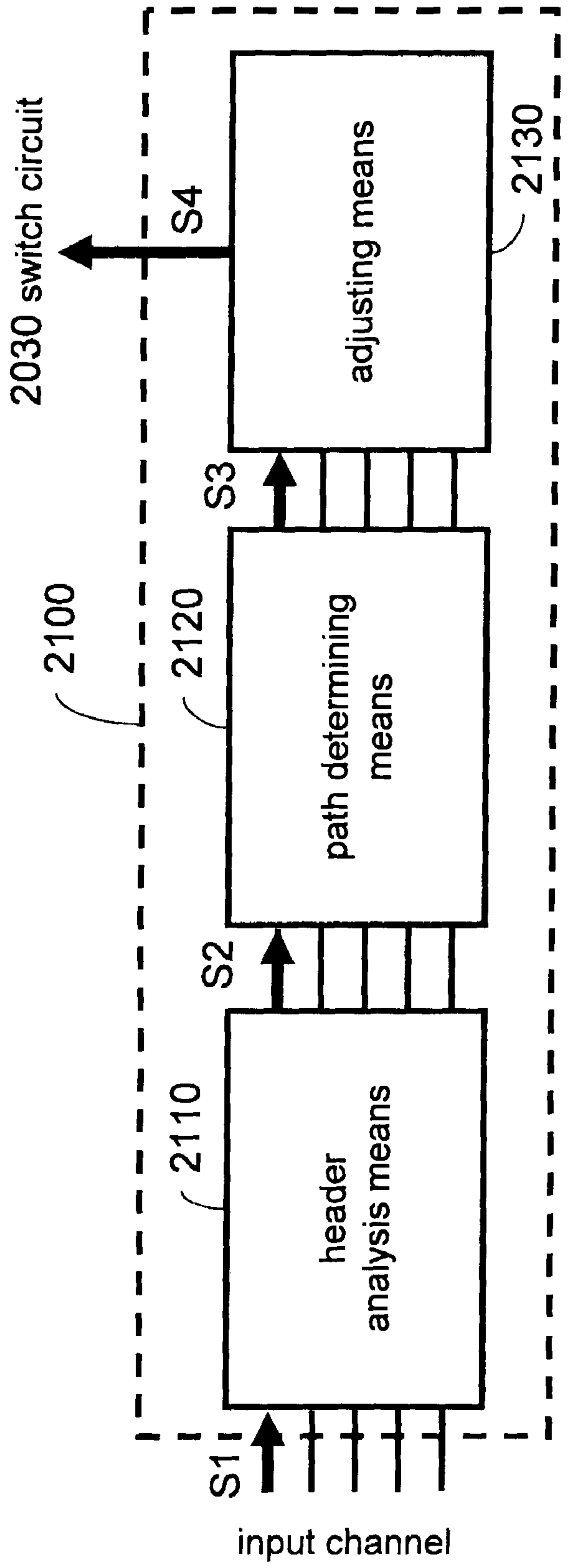
FIG. 12 is a view illustrating an example of an operation of the routing control means shown in FIG. 11.

Next, an operation will be described when routing control means 2100 receives a packet by any single input channel. FIG. 12 is a view illustrating an example of an operation of routing control means 2100 shown in FIG. 11.

Step 1 (S1): Header analysis means 2110 receives the header information of a packet from any input channel. Step 2 (S2): Header analysis means 2110 specifies from the header information a router node of a destination to which the packet of the input channel should be transmitted and notifies path determining means 2120 of destination router node information that indicates a router node of the destination.

Step 3 (S3): Path determining means 2120 specifies an output channel suitable for the output destination, based on the destination router node information received, and notifies adjusting means 2130 of output channel information that indicates the specified output channel. Step 4 (S4): When adjusting means 2130 receives the output channel information, it recognizes that there is no competition of the input channels to be connected to the output channel, and delivers output node information, which indicates a router node that is a connection destination of the corresponding input channel, to switch circuit 2030.

Figure 13:
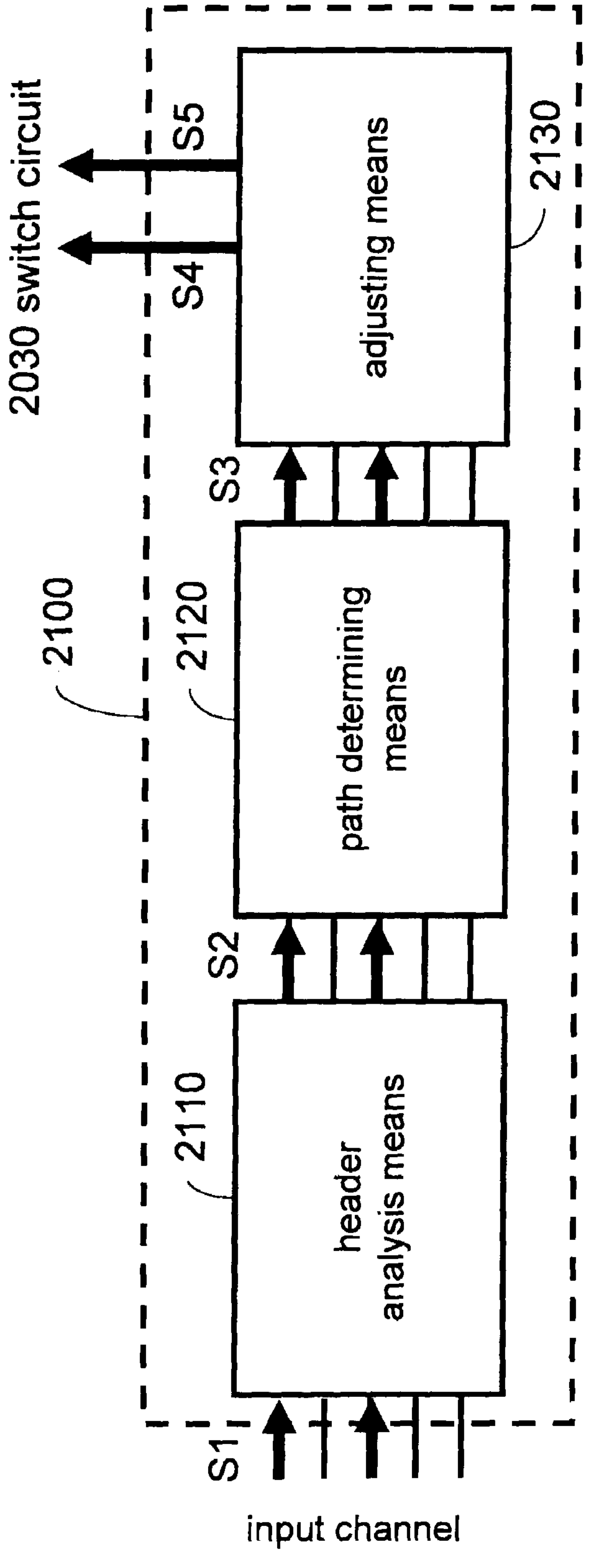
FIG. 13 is a view illustrating an example of an operation of the routing control means shown in FIG. 11.

Next, an operation will be described when routing control means 2100 receives packets through a plurality of input channels. Here, it is assumed that the packets are received through two input channels, respectively. FIG. 13 is a view illustrating an example of an operation of routing control means 2100 shown in FIG. 11.

Step 1 (S1): Header analysis means 2110 receives the header information of packets from input channels. Step 2 (S2): Header analysis means 2110 notifies path determining means 2120 of destination router node information that indicates destination router nodes to which the packets of the respective input channels should be transmitted, from the received header information.

Step 3 (S3): Path determining means 2120 notifies adjusting means 2130 of output channel information including information of the output channels suitable for the output destinations of the packets on the respective input channels, based on the received destination router node information.

Step 4 (S4): Adjusting means 2130 recognizes that there is competition of the input channels to be connected to the output channels, based on the received output channel information. Continuously, it adjusts to give priority to one of the two competing input channels and determines one input channel to be first connected to the output channel. Then, it delivers first connection information, which indicates information of the input channel to be connected first, to switch circuit 2030. Step 5 (S5): Adjusting means 2130 delivers second connection information, which indicates information that the other input channel in competition is connected to the output channel, to switch circuit 2030.

Figure 14:
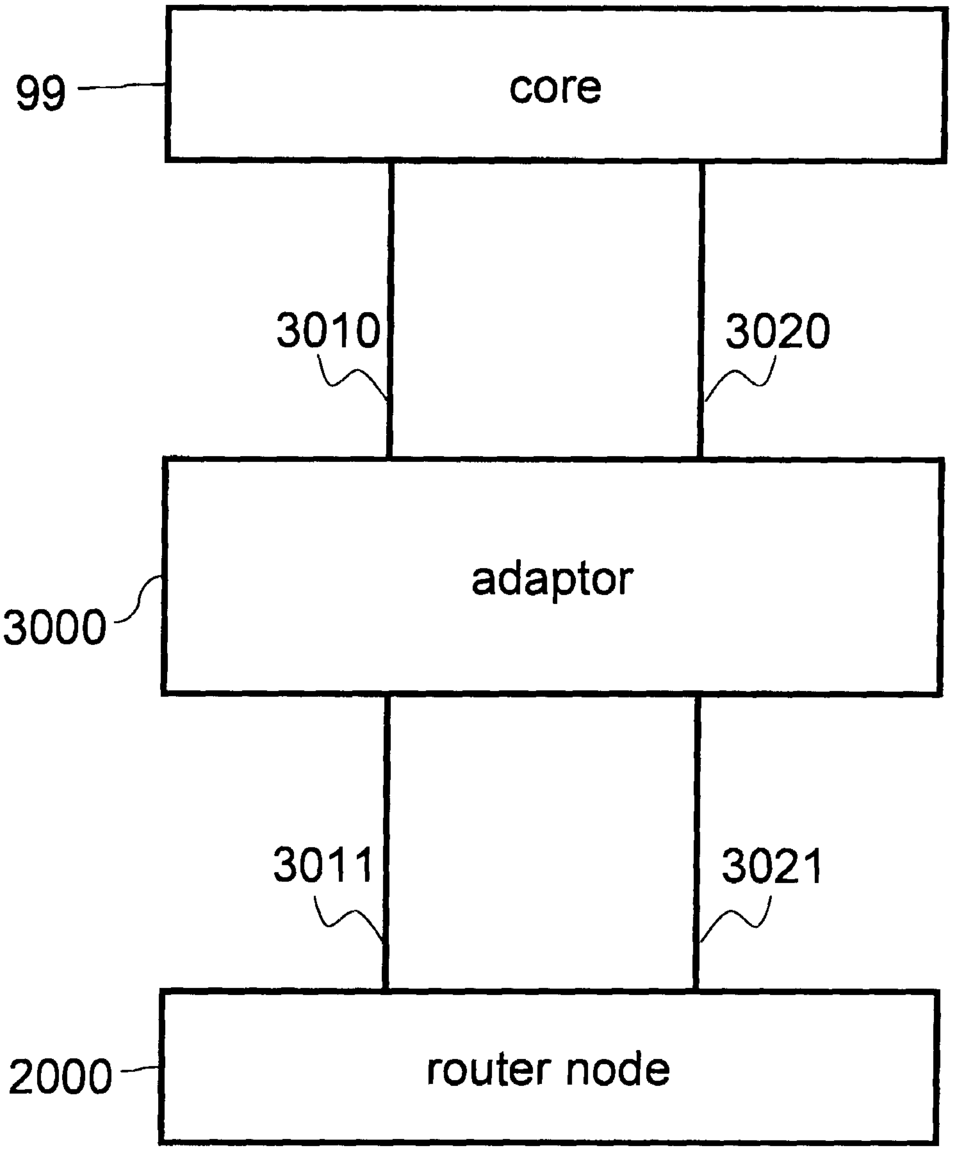
FIG. 14 is a block diagram showing a part of an interconnecting network including an adaptor.

Next, adaptor 3000 will be described. FIG. 14 is a block diagram showing a part of interconnecting network 1000 including adaptor 3000.

Referring to FIG. 14, adaptor 3000 is connected to core 99 through transmission signal line 3010, which is a wiring through which the core transmits a signal to an adaptor, and reception signal line 3020, which is a wiring through which the core receives a signal from the adaptor. In addition, adaptor 3000 is connected to router node 2000 through reception signal line 3011, which is a wiring through which the router node receives a signal from an adaptor, and transmission signal line 3021, which is a wiring through which the router node transmits a signal to the adaptor.

The signal that is transmitted by transmission signal line 3010 includes an access request from a core and reception signal line 3020 includes an access response that is a response to the access request. In the meantime, a packet is transmitted and received by reception signal line 3011 and transmission signal line 3021.

Figure 15:
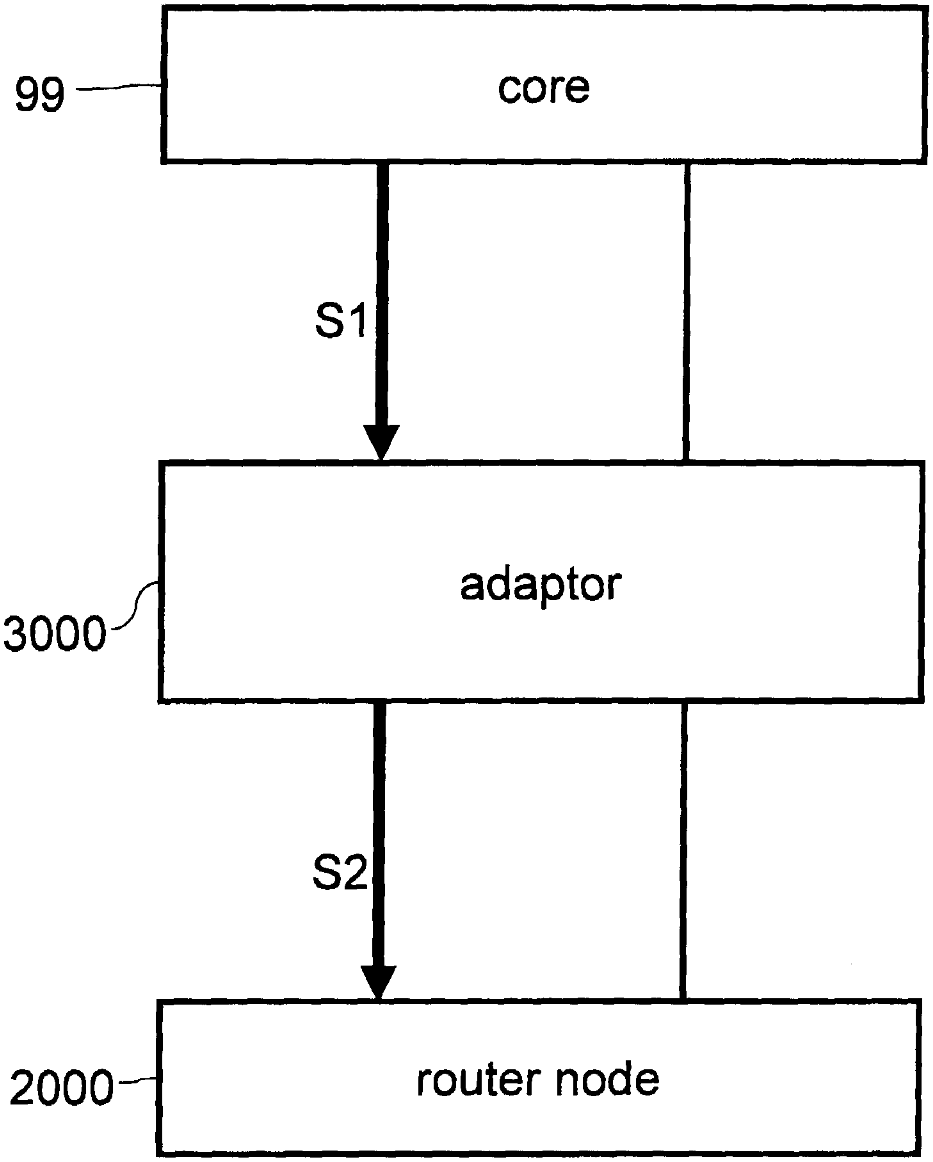
FIG. 15 is a view illustrating an example of an operation of the adaptor shown in FIG. 14.

Next, an operation will be described when adaptor 3000 receives an access request from a core. FIG. 15 is a view illustrating an example of an operation of adaptor 3000 shown in FIG. 14.

Step 1 (S1): Adaptor 3000 receives an access request from core 99. Step 2 (S2): Adaptor 3000 converts the access request into a packet and transmits the packet to router node 2000.

Figure 16:
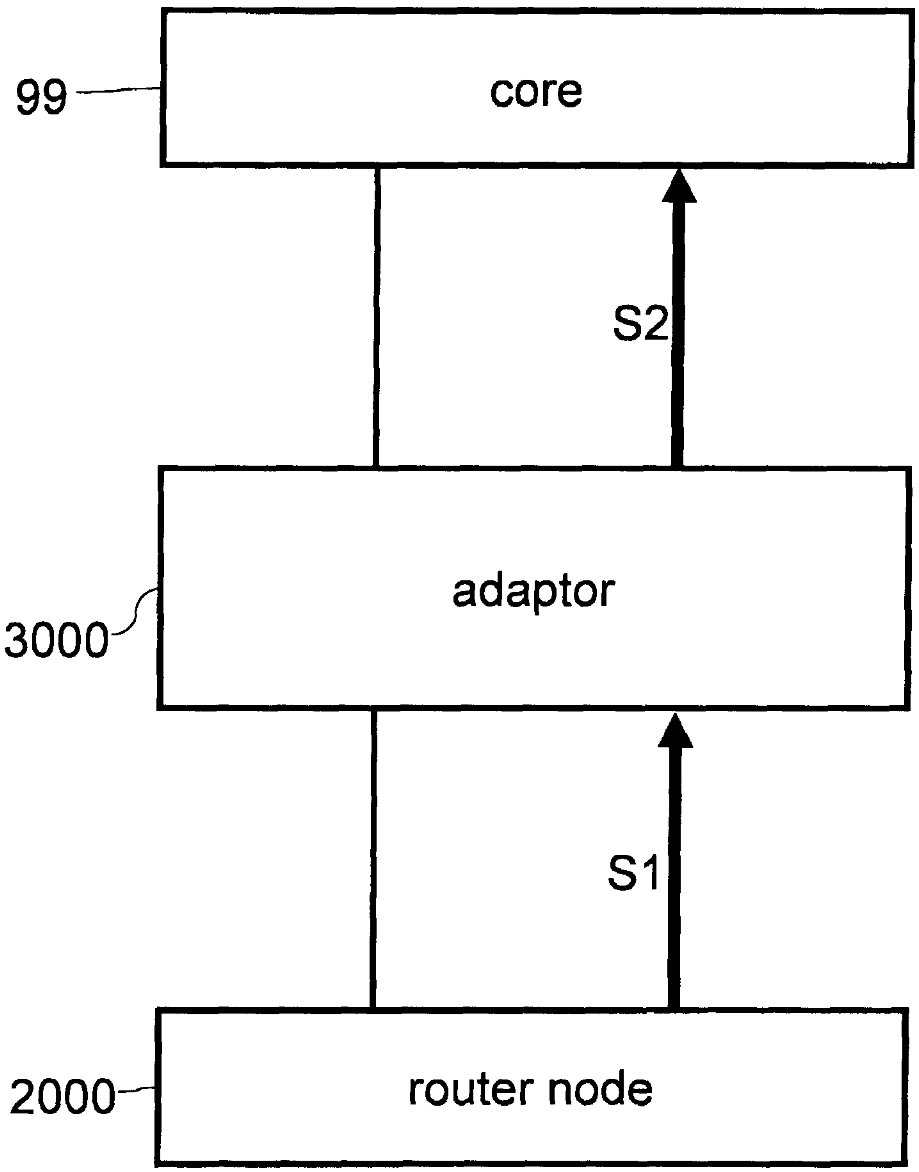
FIG. 16 is a view illustrating an example of an operation of the adaptor shown in FIG. 14.

Next, an operation will be described when adaptor 3000 responds to the access request from the core. FIG. 16 is a view illustrating an example of an operation of adaptor 3000 shown in FIG. 14.

Step 1 (S1): Adaptor 3000 receives the packet from router node 2000. Step 2 (S2): When adaptor 3000 recognizes that the packet is a response to the access request for core 99, it converts the packet into an access response for the core and transmits the access response to core 99.

Figure 17:
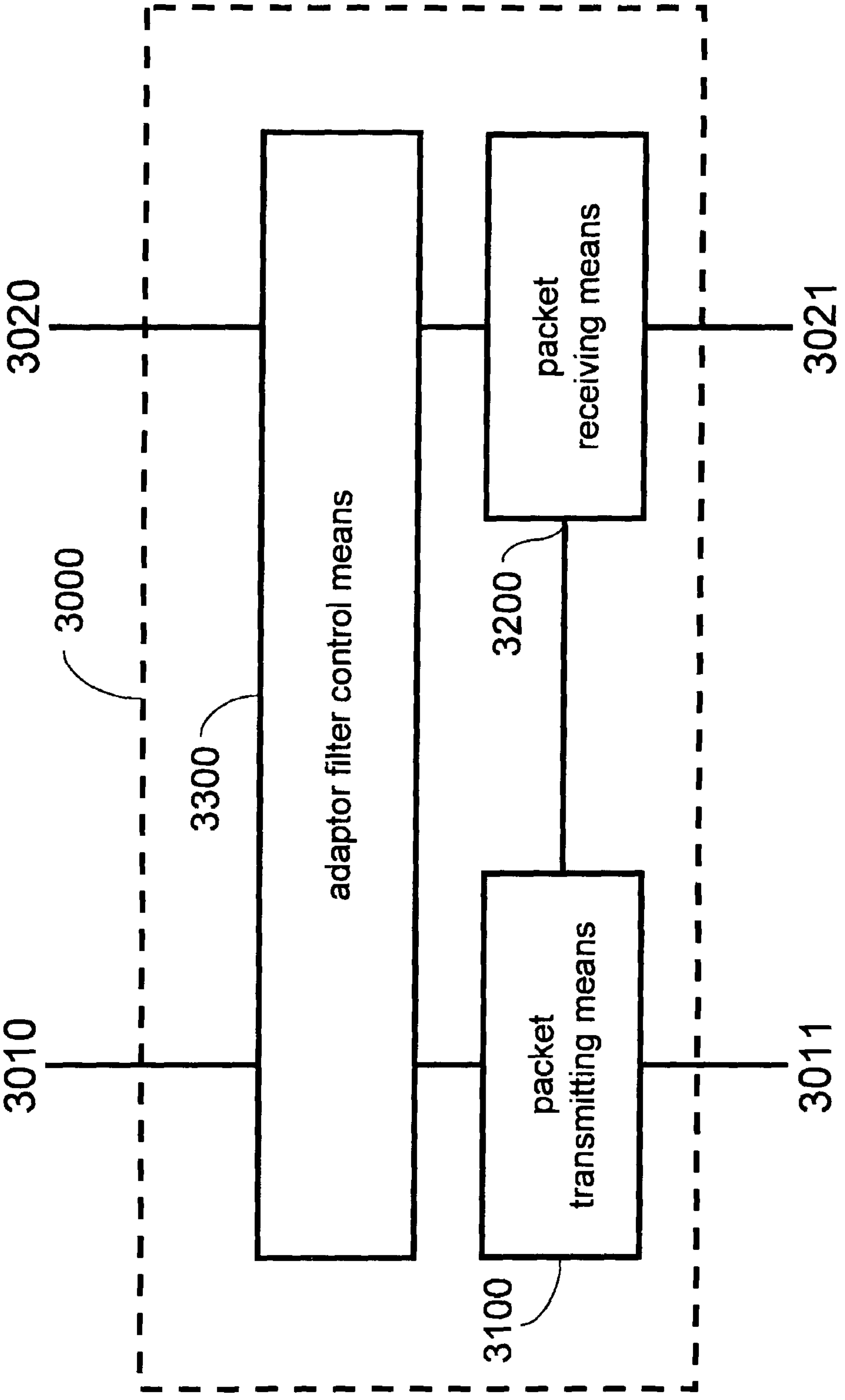
FIG. 17 is a block diagram showing an example of a structure of an adaptor.

Next, a structure of adaptor 3000 will be described. FIG. 17 is a block diagram showing an example of a structure of adaptor 3000.

Referring to FIG. 17, adaptor 3000 comprises packet transmitting means 3100 that transmits a packet to the router node, packet receiving means 3200 that receives the packet from the router node, and adaptor filter control means 3300 that controls an access request to be received from the core.

When packet transmitting means 3100 receives an access request or access response from a core through adaptor filter control means 3300, the packet transmitting means converts it into a packet to be transmitted and received between the router nodes and then transmits the packet to the outside.

Packet receiving means 3200 converts the packet received from the router node into an access request or access response to the core and delivers it to adaptor filter control means 3300. Here, packet receiving means 3200 may be provided therein with a buffer that stores a plurality of packets.

Regarding the access request from one core to the other core, adaptor filter control means 3300 determines whether or not to execute processing of the access request. When the access request is not processed, the adaptor filter control means notifies core 99 including the transmission source core or packet receiving means 3200 that the access request is not processed. When the access request is processed, the adaptor filter control means delivers the access request to core 99. The information of the determination basis of whether or not to receive the access request may be set through the core or may be set in advance.

In this exemplary embodiment, adaptor filter control means 3300 is provided with the functions of determining whether or not to receive the access request and determining whether or not to temporarily stop the processing of the access request. Thereby, adaptor filter control means 3300 stores the setting information corresponding to the security policy in advance, with respect to the determination of whether or not to execute the processing of the access request. When the setting information is changed, the processing of the access request is temporarily stopped, and is resumed after updating the setting information. Thereby, it is possible to perform a consistent update setting process over the entire interconnecting network.

Figure 18:
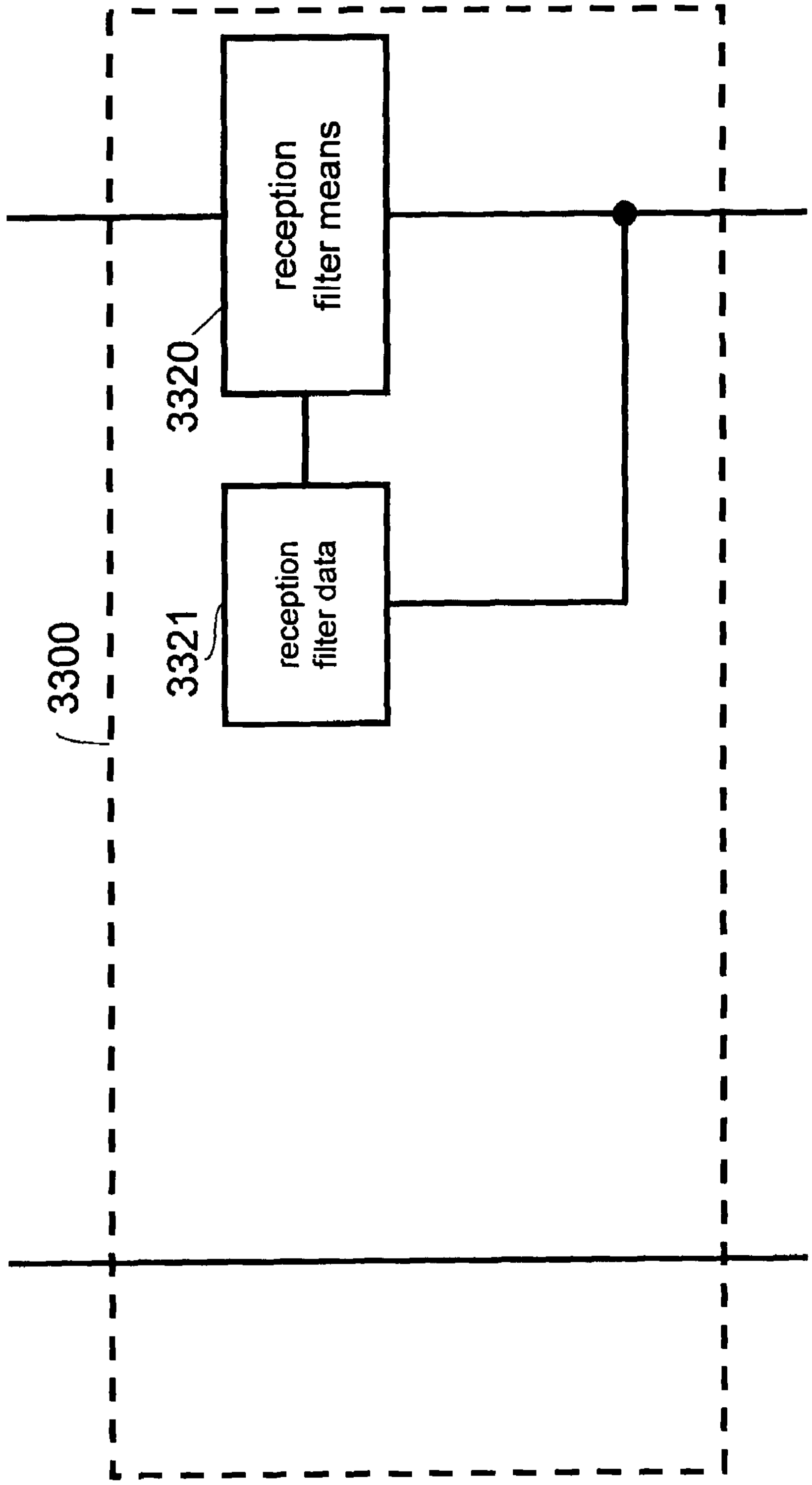
FIG. 18 is a block diagram showing an example of a structure of adaptor filter control means.

Next, a structure of adaptor filter control means 3300 will be described. FIG. 18 is a block diagram showing an example of a structure of adaptor filter control means 3300.

Referring to FIG. 18, adaptor filter control means 3300 comprises reception filter means 3320 that determines whether or not to execute processing of an access request from the outside to the core connected to the reception filter means and determines whether or not to temporarily stop the processing, and reception filter data 3321 that is information to be used for the determination. Reception filter data 3321 is stored in storage means (not shown).

Reception filter means 3320 determines whether or not to execute processing of an access request and whether or not to temporarily stop the processing. As a result, when an access request is not processed or when processing of the access request is temporarily stopped, the reception filter means notifies packet receiving means 3200 of it.

Figure 19:
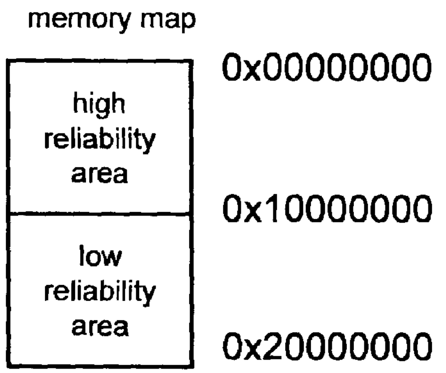
FIG. 19 is a view illustrating an example of a structure of reception filter data.

Next, reception filter data 3321 will be described. FIG. 19 is a view illustrating an example of a structure of reception filter data 3321. Here, the core is a memory and reception filter data 3321 is information indicating which range of an access request to the memory is permitted to the transmission source. FIG. 19(*a*) shows a memory map and FIG. 19(*b*) shows an example of reception filter data for the memory.

As shown in the memory map of FIG. 19(*a*), the inside of the memory is divided into a high security area and a low security area. A high reliability area that is the high security area has an address of 0x00000000~0x10000000 and a low reliability area that is the low security area has an address of 0x10000000~0x20000000. The shown division of the memory area is just an example.

In reception filter data 3321 shown in FIG. 19(*b*), an item of the router node that is a transmission source of an access request to the memory is given in the leftmost column and the rows corresponding to the number of the router nodes are provided. Corresponding to each of the router nodes, an entry is provided which is a set of an identifier of a router node, a memory area capable of accepting an access request, a "permission bit" indicating a type of an access request and a "temporary stop bit" indicating whether or not to temporarily stop an access request. The information of the transmission source, the memory area and the type of the access request corresponds to the delivery information that indicates a condition to be executed processing.

In the followings, a case will be described where the transmission source of an access request is router node #0, with reference to FIG. 19(*b*). The memory area in which an access request having the transmission source of router node #0 is permitted is not limited. Since the permission bit has "R" and "W," both reading and writing are permitted over all the areas in the memory. Since the temporary stop bit is "No," when there is an access request from router node #0, it is not necessary to temporarily stop the corresponding processing.

Continuously, a case will be described where the transmission source of an access request is a router node #3. Regarding the type of the access request having the transmission source of the router node #3, both reading and writing are permitted in the low reliability area. However, only reading is permitted in the high reliability area. This is because the permission bit in the low reliability area is "R" and "W" but the permission bit in the high reliability area is "R" only. In addition, since the temporary stop bit in the high reliability area is "Yes," when there is an access request of reading to the high reliability area, the corresponding processing is temporarily stopped.

In the invention, when updating the information in reception filter data 3321, the processing of an access request is temporarily stopped, so that it is possible to clearly distinguish the processing of the access request before and after updating the information in reception filter data 3321.

Meanwhile, updating of the information in reception filter data 3321 is performed by rewriting new data, which is generated by application software to be executed in the core in the high reliability area, or data that is read out from a file in which setting changing information has been described in advance. A specific example of the updating of reception filter data 3321 will be described later. The updating is performed when it is necessary to change a range of the high reliability area, in accordance with conditions or situations of the entire semiconductor integrated circuit, for example when the high reliability area of the semiconductor integrated circuit and the memory accompanied with it, are insufficient or, to the contrary, when the high reliability area is excessive, and the like.

In addition, reception filter data 3321 is not limited to the table type as shown in FIG. 19(*b*). In other words, any type may be possible as long as reception filter means 3320 can read it out and control the access in accordance with the read information. Furthermore, although the accessible area of the memory, the type of the access request and the like are set corresponding to the router node in the table shown in FIG. 19(*b*), the core may also be possible instead of the router node.

Here, the rewriting of the reception filter data seen from the core means rewrite an area of the reception filter data on the memory map. However, the reception filter data may be incorporated into the high reliability area or a storage area of data having high reliability (data protected by security), rather than an exclusive area of the reception filter data itself. In addition, a memory map only for the reception filter data may be separately provided.

Figure 20:
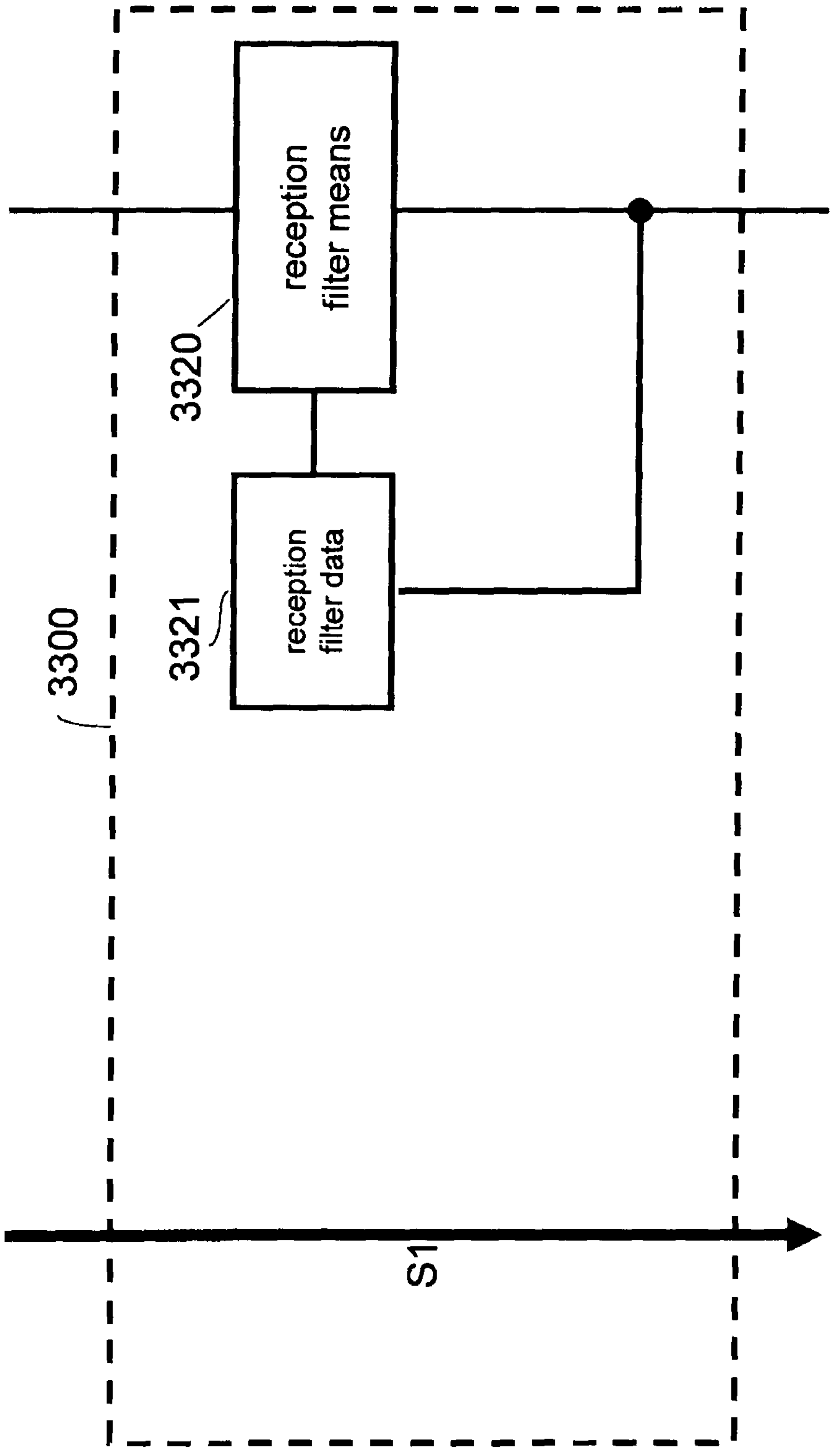
FIG. 20 is a view illustrating an example of an operation of the adaptor filter control means shown in FIG. 18.

Next, an operation of adaptor filter control means 3300 will be described when there is an access request from a core. FIG. 20 is a view illustrating an example of an operation of adaptor filter control means 3300 shown in FIG. 18.

Step 1 (S1): When adaptor filter control means 3300 receives an access request from a core, it delivers the access request to packet transmitting means 3100.

Figure 21:
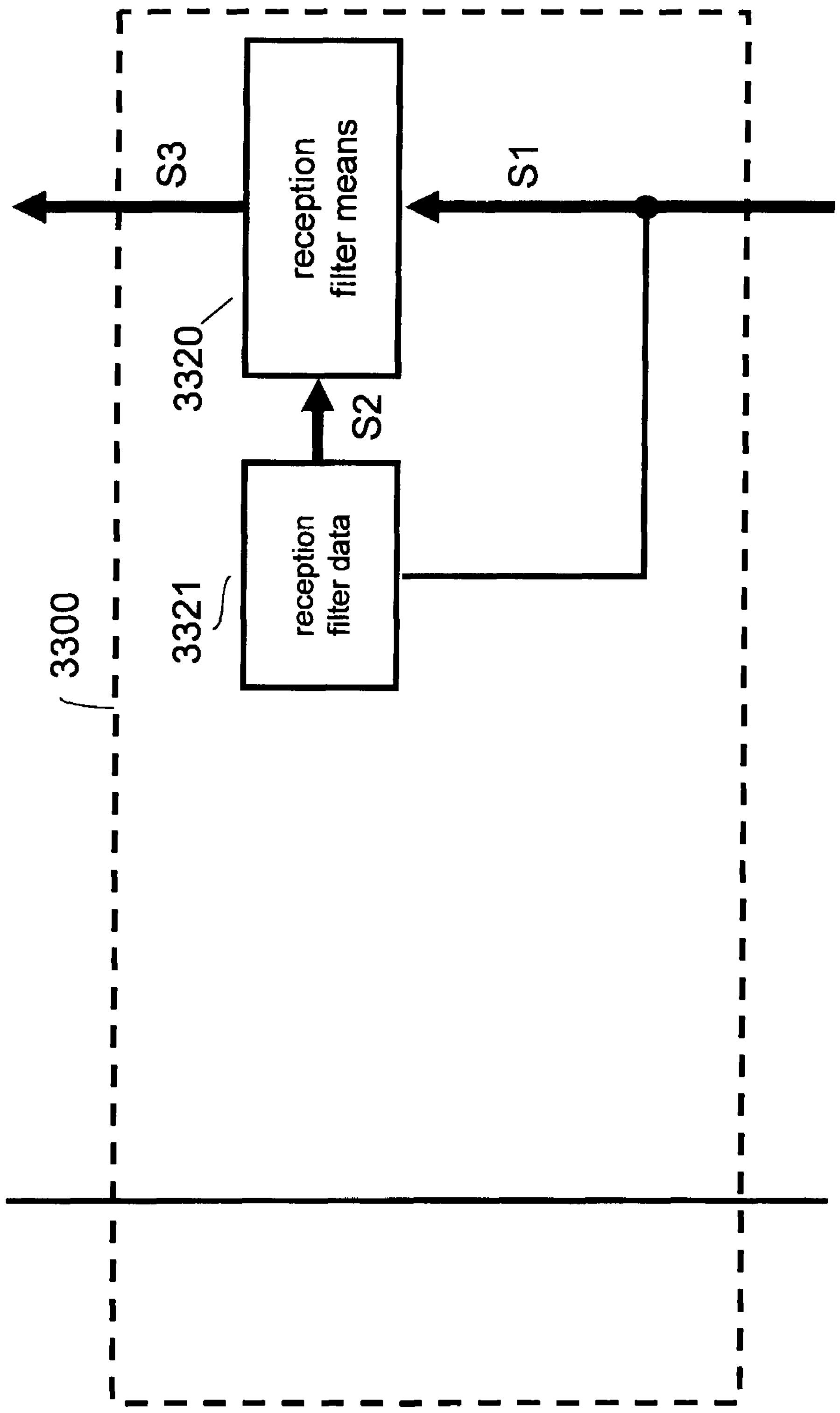
FIG. 21 is a view illustrating an example of an operation of the adaptor filter control means shown in FIG. 18.

Next, an operation will be described when adaptor filter control means 3300 receives an access request and permits the access request. FIG. 21 is a view illustrating an example of an operation of adaptor filter control means 3300 shown in FIG. 18.

Step 1 (S1): Reception filter means 3320 receives an access request from packet receiving means 3200. Step 2 (S2): Reception filter means 3320 reads out reception filter data 3321 and determines whether the access request can be processed, based on the information read out. As a result, it recognizes that processing of the access request is not required to be temporarily stopped and can be processed. Step 3 (S3): Reception filter means 3320 delivers the access request to core 99.

Figure 22:
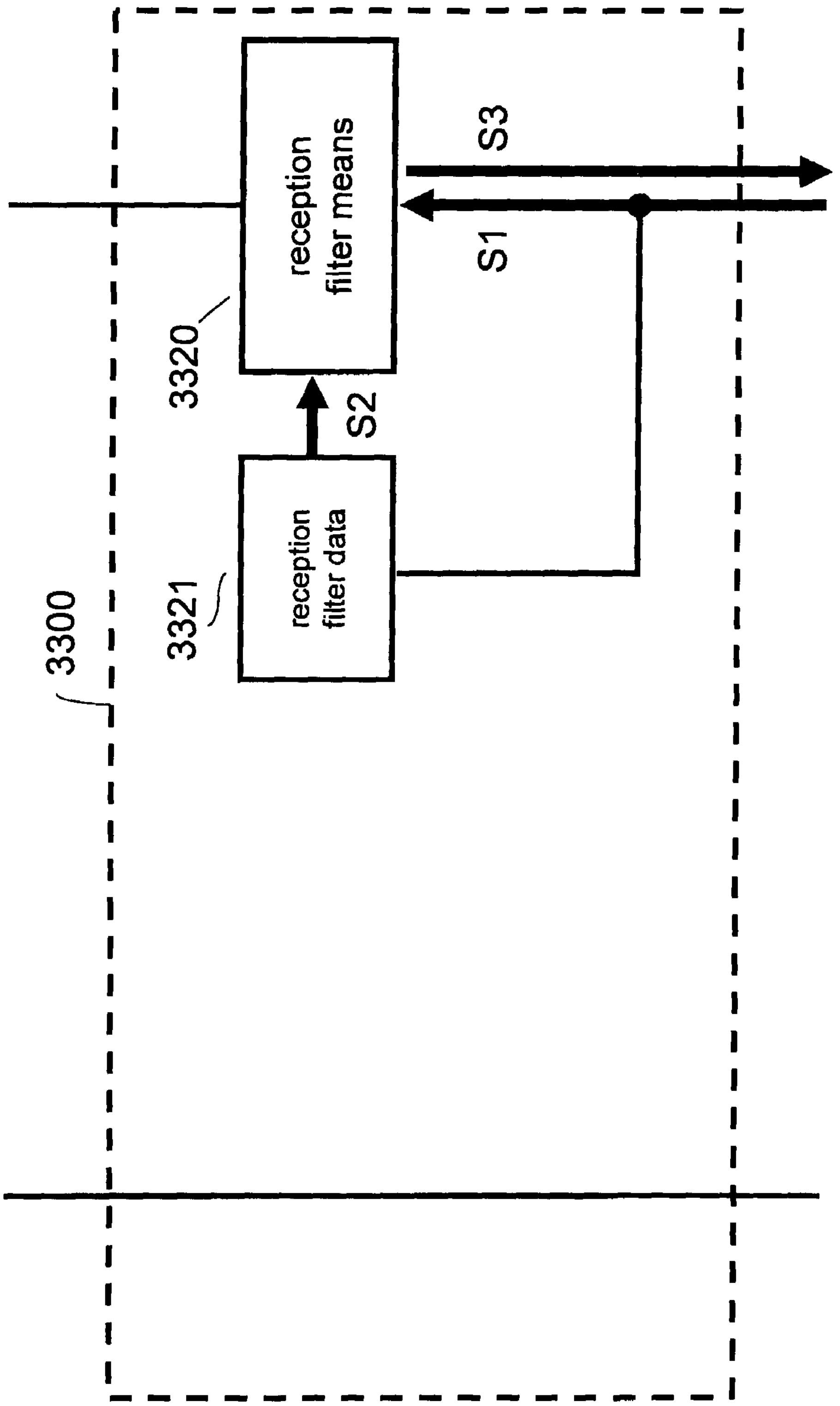
FIG. 22 is a view illustrating an example of an operation of the adaptor filter control means shown in FIG. 18.

Next, an operation will be described when adaptor filter control means 3300 receives and denies an access request. FIG. 22 is a view illustrating an example of an operation of adaptor filter control means shown 3300 in FIG. 18.

Step 1 (S1): Reception filter means 3320 receives an access request from packet receiving means 3200. Step 2 (S2): Reception filter means 3320 reads out reception filter data 3321 and determines whether the access request can be processed, based on the information read out. As a result, it recognizes that the access request cannot be processed. Step 3 (S3): Reception filter means 3320 notifies packet receiving means 3200 that the access request cannot be processed.

Figure 23:
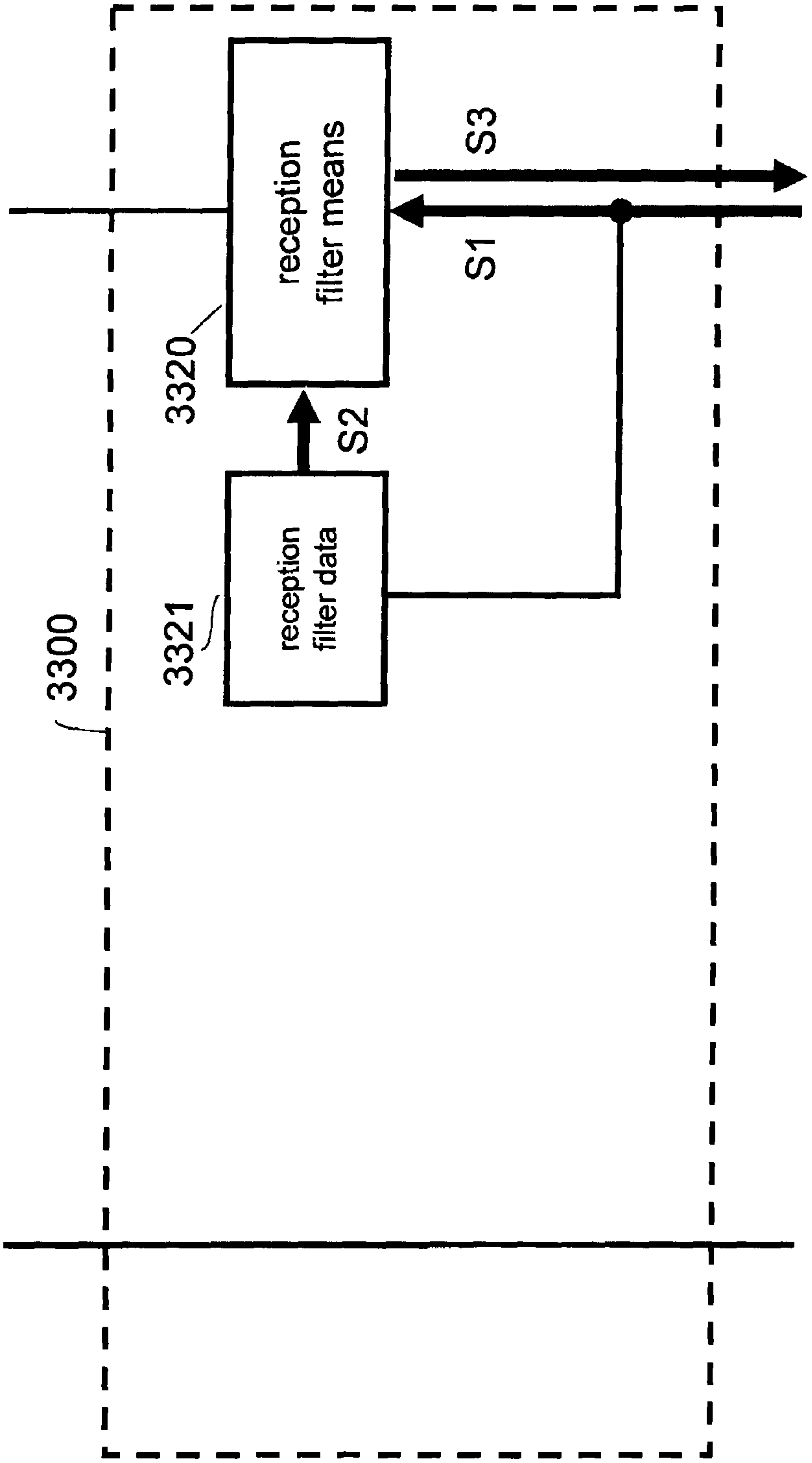
FIG. 23 is a view illustrating an example of an operation of the adaptor filter control means shown in FIG. 18.

Next, an operation will be described when adaptor filter control means 3300 receives an access request and temporarily stops a processing the access request. FIG. 23 is a view illustrating an example of an operation of adaptor filter control means 3300 shown in FIG. 18.

Step 1 (S1): Reception filter means 3320 receives an access request from packet receiving means 3200. Step 2 (S2): Reception filter means 3320 reads out reception filter data 3321 and determines whether the access request can be processed, based on the information read out. As a result, it recognizes that it is necessary to temporarily stop processing of the access request.

Step 3 (S3): Reception filter means 3320 notifies packet receiving means 3200 that it is necessary to temporarily stop processing of the access request.

Figure 24:
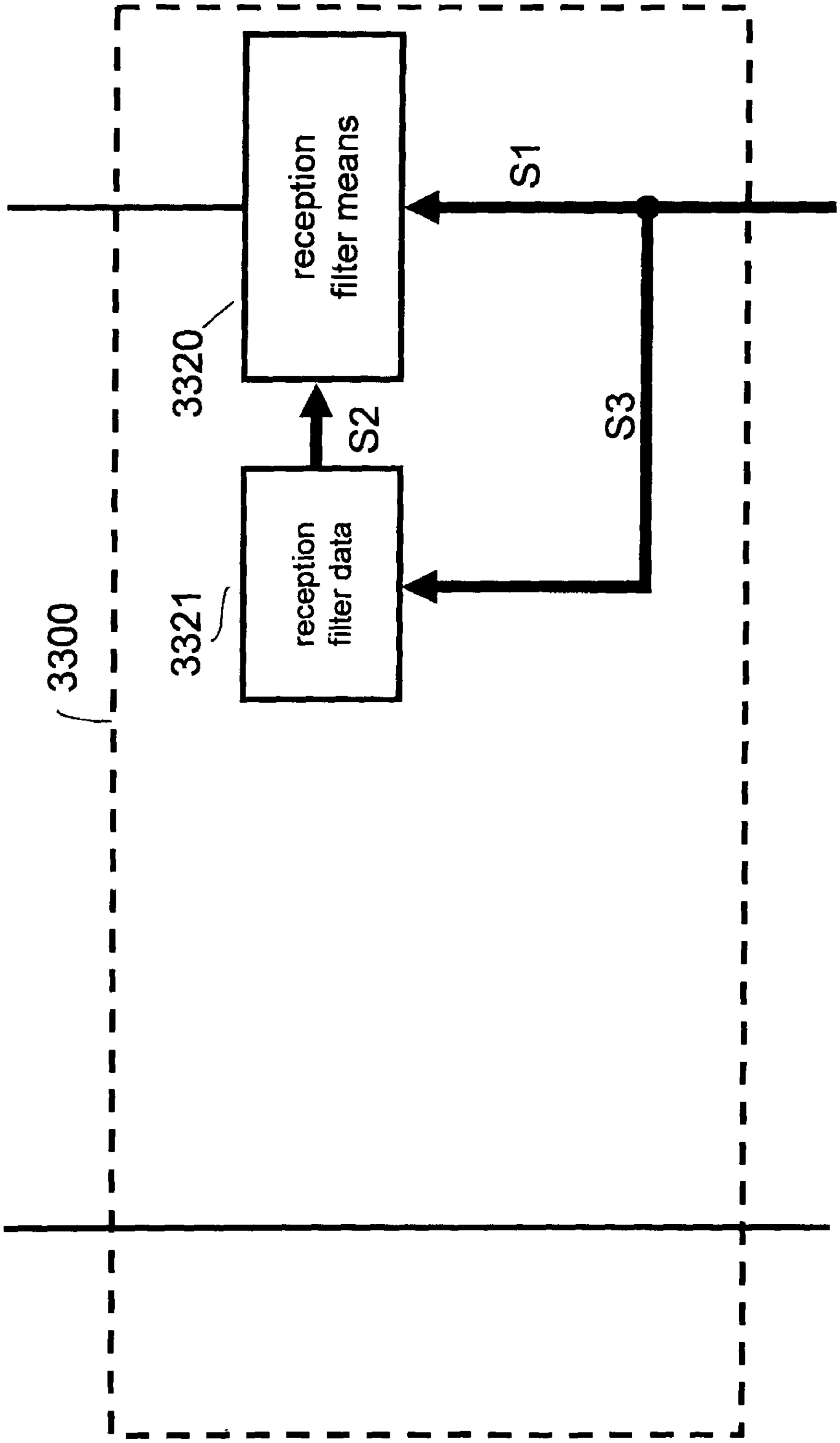
FIG. 24 is a view illustrating an example of an operation of the adaptor filter control means shown in FIG. 18.

Next, an operation will be described when adaptor filter control means 3300 updates reception filter data 3321. FIG. 24 is a view illustrating an example of an operation of adaptor filter control means 3300 shown in FIG. 18. New data for updating reception filter data 3321 is inputted from router node 2000. A specific example of inputting the new data will be described later.

Step 1 (S1): Reception filter means 3320 receives from packet receiving means 3200 an access request for writing new data to reception filter data 3321. Step 2 (S2): Reception filter means 3320 reads out reception filter data 3321 and determines whether the access request can be processed, based on the information read out. When the reception filter means recognizes that the received access request is to update the reception filter data, it processes the access request without temporarily stopping processing of the access request. Step 3 (S3): Reception filter control means 3320 writes new data to reception filter data 3321. By doing so, reception filter data 3321 is updated.

Figure 25:
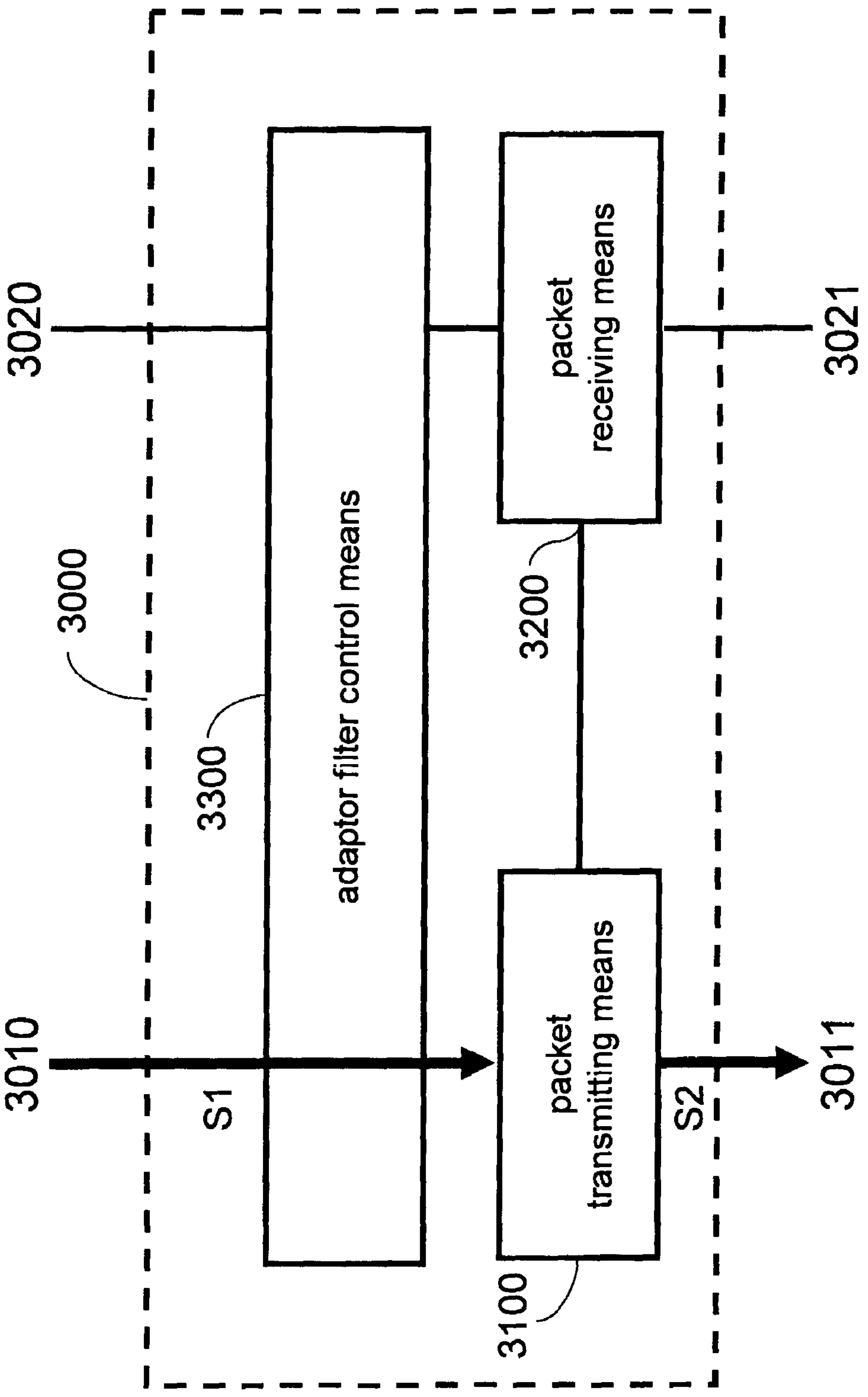
FIG. 25 is a view illustrating an example of an internal operation of the adaptor shown in FIG. 17.

Next, an internal operation of adaptor 3000 will be described when there is an access request from a core. FIG. 25 is a view illustrating an example of an internal operation of adaptor 3000 shown in FIG. 17.

Step 1 (S1): Adaptor filter control means 3300 delivers an access request, which is received from core 99, to packet transmitting means 3100 as it is. Step 2 (S2): Packet transmitting means 3100 converts the access request into a packet and transmits the packet to router node 2000.

Figure 26:
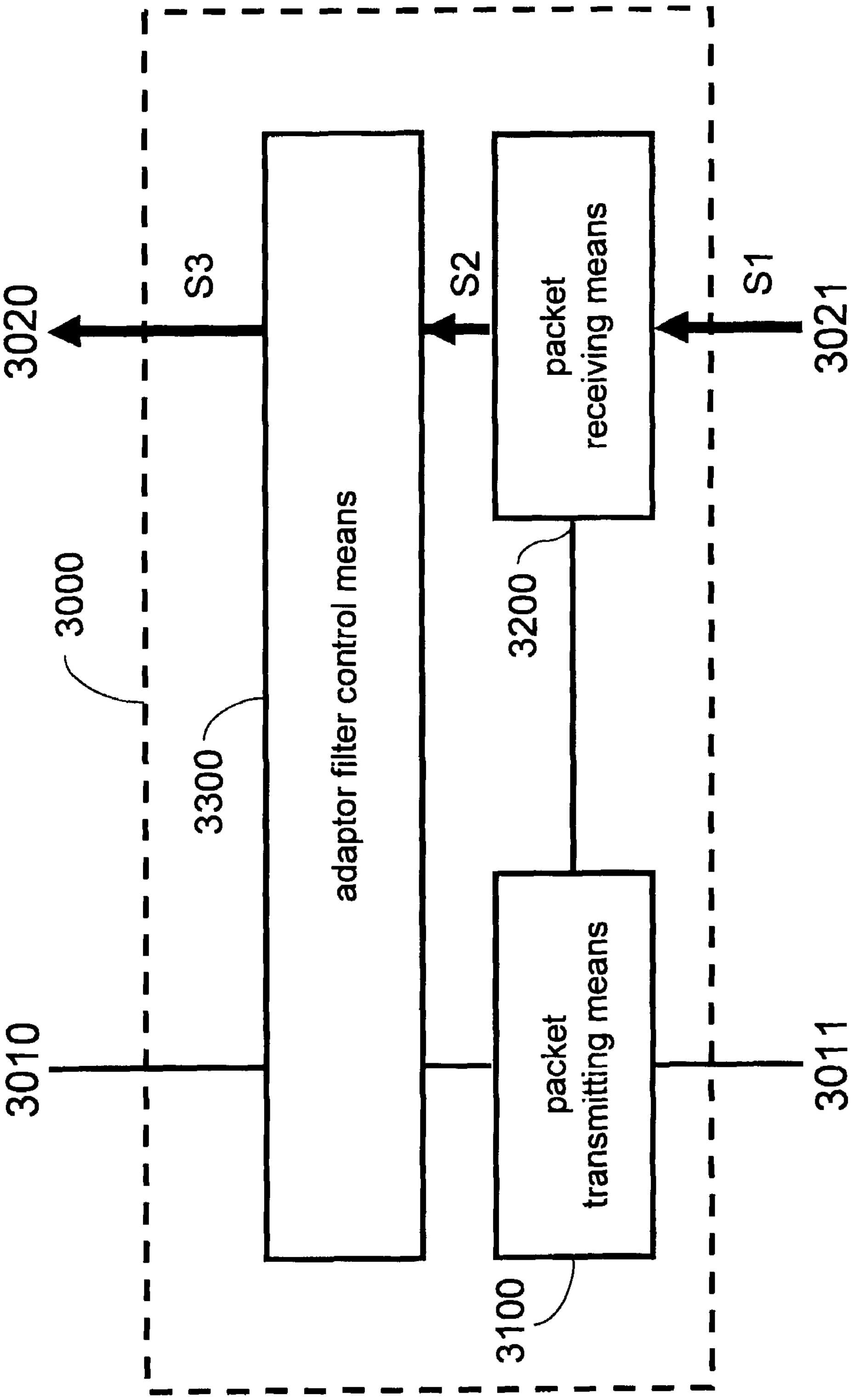
FIG. 26 is a view illustrating an example of an internal operation of the adaptor shown in FIG. 17.

Next, an internal operation of adaptor 3000 will be described when a packet is received from a router node and an access request by the received packet is permitted. FIG. 26 is a view illustrating an example of an internal operation of adaptor 3000 shown in FIG. 17.

Step 1 (S1): Packet receiving means 3200 receives a packet from router node 2000. Step 2 (S2): Packet receiving means 3200 converts the packet into an access request to a core of a connection destination and delivers it to adaptor filter control means 3300. Step 3 (S3): Adaptor filter control means 3300 determines whether the access request can be processed and whether it is necessary to temporarily stop processing of the access request. When it is determined that the access request can be processed and it is not necessary to temporarily stop processing thereof, the adaptor filter control means delivers the access request to core 99.

Figure 27:
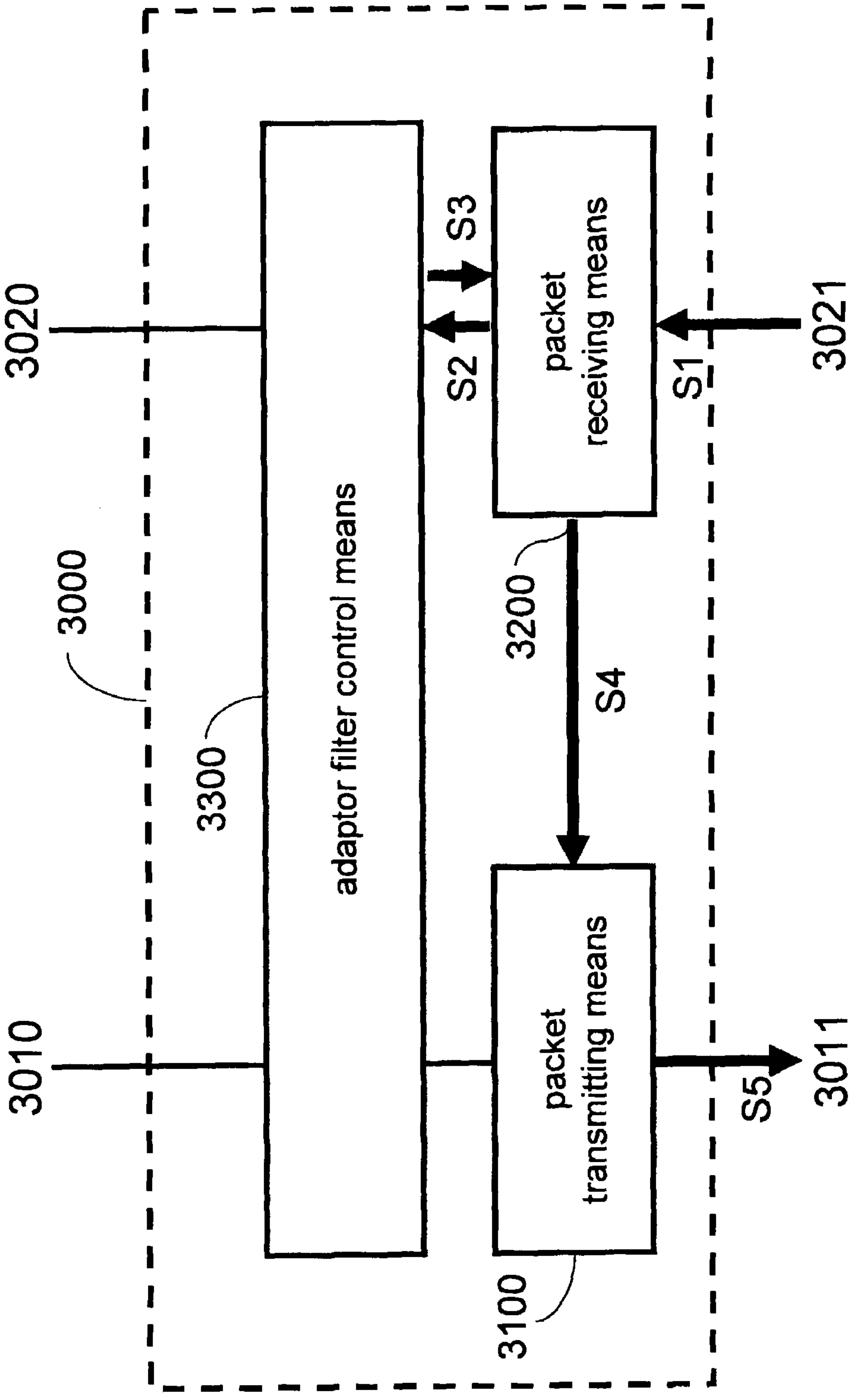
FIG. 27 is a view illustrating an example of an internal operation of the adaptor shown in FIG. 17.

Next, an internal operation of adaptor 3000 will be described when a packet is received from a router node and an access request by the received packet is denied. FIG. 27 is a view illustrating an example of an internal operation of adaptor 3000 shown in FIG. 17.

Step 1 (S1): Packet receiving means 3200 receives a packet from router node 2000. Step 2 (S2): Packet receiving means 3200 converts the packet into an access request to a core of a connection destination and delivers it to adaptor filter control means 3300. Step 3 (S3): Adaptor filter control means 3300 determines whether the access request can be processed and whether it is necessary to temporarily stop processing of the access request. When it is determined that it is necessary to deny the access request, the adaptor filter control means notifies packet receiving means 3200 that the access request is denied.

Step 4 (S4): When packet receiving means 3200 receives the denial notification of the access request, it generates a response packet that is a packet for notifying the denial of the access request and delivers the response packet to packet transmitting means 3100. Step 5 (S5): When packet transmitting means 3100 receives the response packet from packet receiving means 3200, it preferentially delivers the response packet to router node 2000 over the access request from the core. Meantime, when it can be ascertained that there will be no deadlock, there will be no requirement to give priority to the response packet over the access request from the core.

Figure 28:
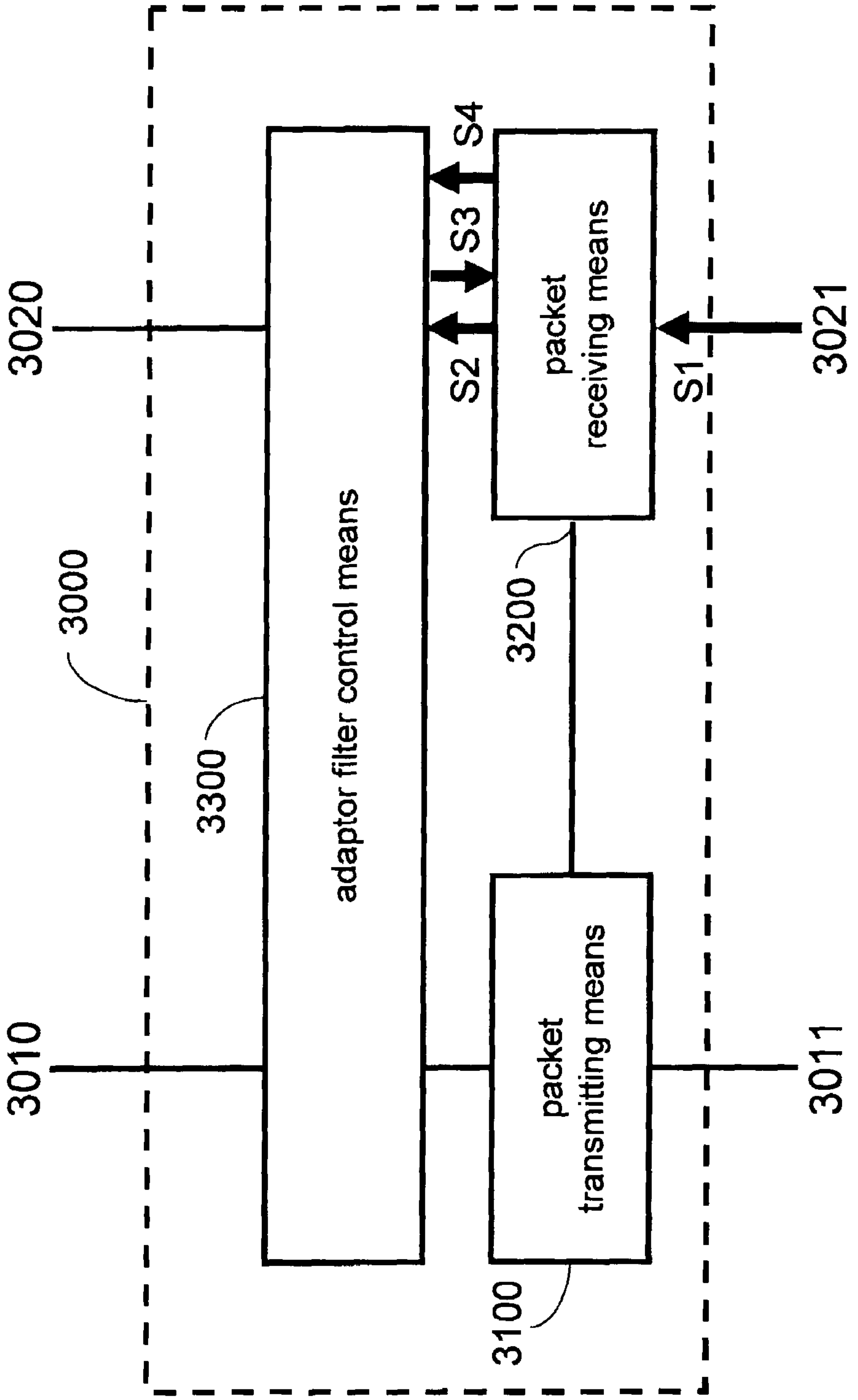
FIG. 28 is a view illustrating an example of an internal operation of the adaptor shown in FIG. 17.

Next, an internal operation of adaptor 3000 will be described when a packet is received from a router node and processing of an access request by the received packet is temporarily stopped. FIG. 28 is a view illustrating an example of an internal operation of adaptor 3000 shown in FIG. 17.

Step 1 (S1): Packet receiving means 3200 receives a packet from router node 2000. Step 2 (S2): Packet receiving means 3200 converts the packet into an access request to a core of a connection destination and delivers it to adaptor filter control means 3300.

Step 3 (S3): Adaptor filter control means 3300 determines whether the access request can be processed and whether it is necessary to temporarily stop processing of the access request. When it is determined that it is necessary to temporarily stop a processing of the access request, the adaptor filter control means notifies packet receiving means 3200 that processing of the access request is temporarily stopped.

Step 4 (S4): When packet receiving means 3200 receives the notification that processing of the access request is temporarily stopped, it stores the packet of the access request. Then, the packet receiving means retransmits the packet of the access request to adaptor filter control means 3300 for every predetermined period (to Step 3). Here, it is assumed that while the stored packet is retransmitted to adaptor filter control means 3300 for every predetermined period, reception filter data 3321 is updated so that the access request by the packet is processed by adaptor filter control means 3300.

Figure 29:
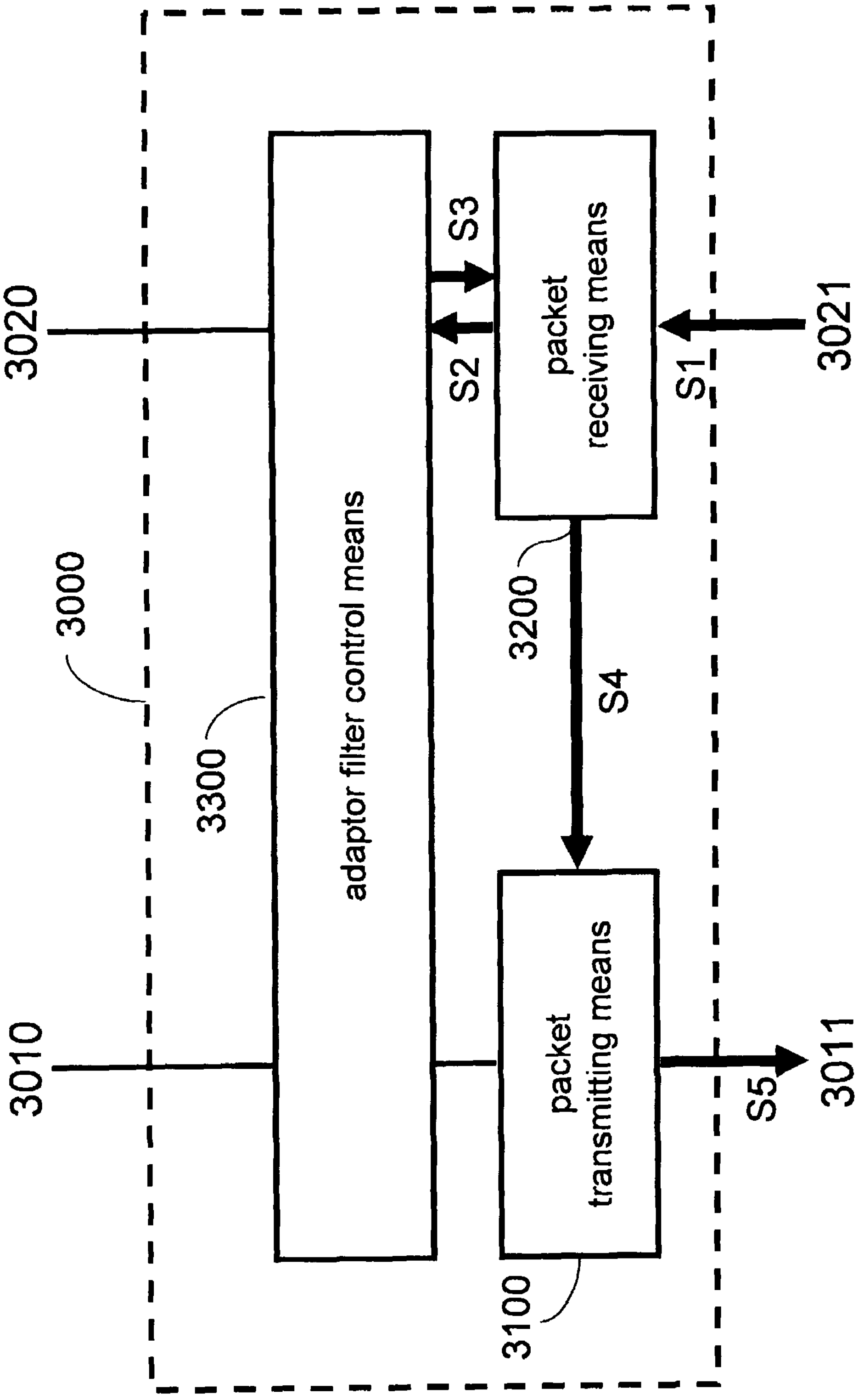
FIG. 29 is a view illustrating an example of an internal operation of the adaptor shown in FIG. 17.

Next, another internal operation of adaptor 3000 will be described when a packet is received and processing of an access request by the received packet is temporarily stopped. FIG. 29 is a view illustrating an example of an internal operation of adaptor 3000 shown in FIG. 17.

Step 1 (S1): Packet receiving means 3200 receives a packet from router node 2000. Step 2 (S2): Packet receiving means 3200 converts the packet into an access request to a core of a connection destination and delivers it to adaptor filter control means 3300.

Step 3 (S3): Adaptor filter control means 3300 determines whether the access request can be processed and whether it is necessary to temporarily stop processing of the access request. When it is determined that it is necessary to temporarily stop a processing of the access request, the adaptor filter control means notifies packet receiving means 3200 that processing of the access request is temporarily stopped.

Step 4 (S4): When packet receiving means 3200 receives the notification that the processing of the access request is temporarily stopped, it generates a retransmission packet including information of the access request, which is a packet to be transmitted to the packet receiving means, and delivers it to packet transmitting means 3100. Here, it is assumed that while the retransmission packet is transmitted between the router nodes in the interconnecting network and then retransmitted to the packet receiving means, reception filter data 3321 is updated so that the access request by the packet is processed by adaptor filter control means 3300.

Step 5 (S5): Packet transmitting means 3100 preferentially delivers the retransmission packet, which is received from packet receiving means 3200, to router node 2000 over the access request from the core. Meantime, when it can be ascertained that there will be no deadlock, there will be no requirement to give priority to the retransmission packet over the access request from the core.

FIGS. 28 and 29 show the operation in which adaptor 3000 temporarily stops processing of the access request. However, it is preferable that when the memory, which temporarily stores the packets, is sufficient, the operation shown in FIG. 28 is carried out, and when the memory is not sufficient, the operation shown in FIG. 29 is carried out.

Figure 30:
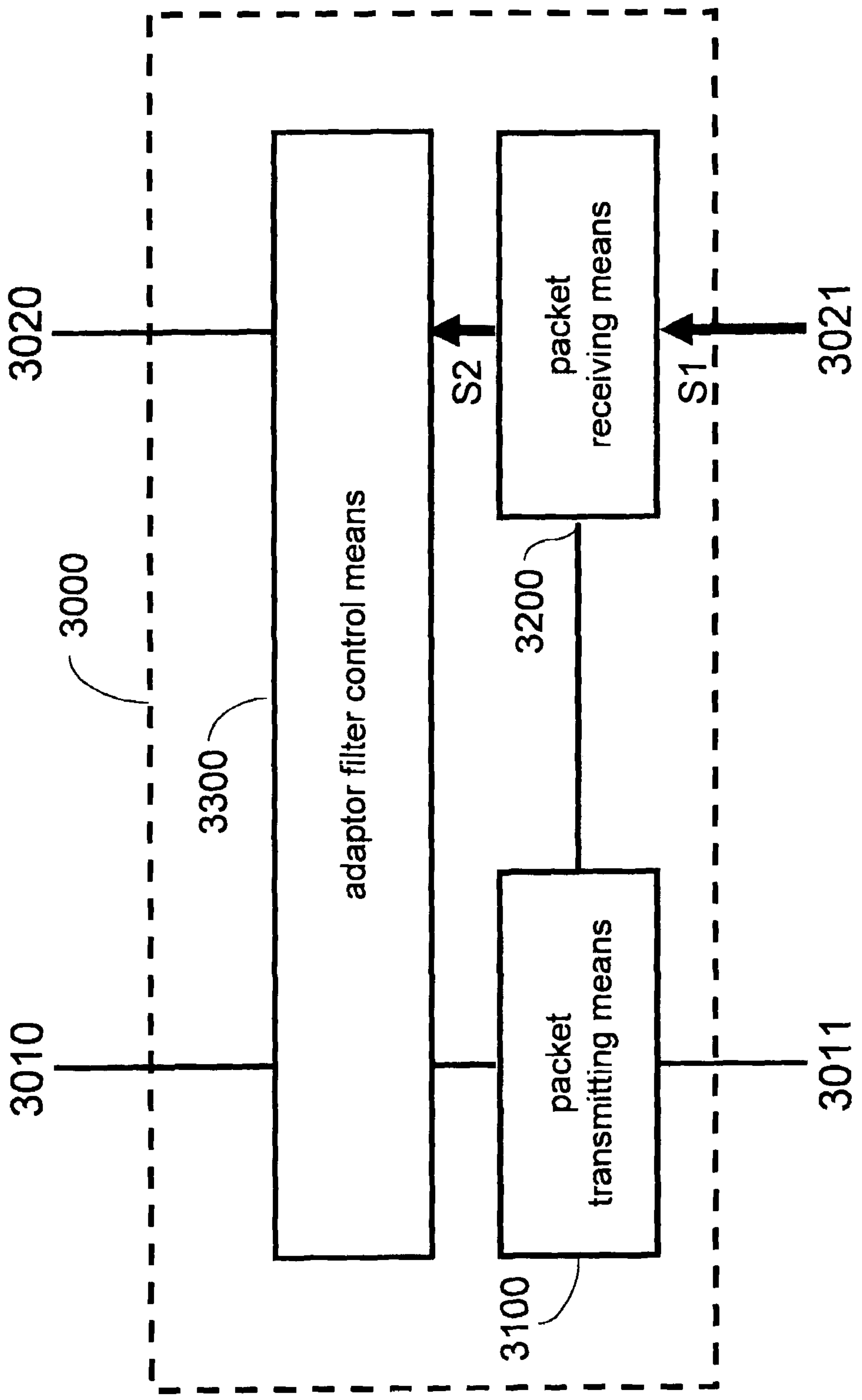
FIG. 30 is a view illustrating an example of an internal operation of the adaptor shown in FIG. 17.

Next, an internal operation of adaptor 3000 will be described when a packet is received from a router node and reception filter data 3321 is updated by data of the received packet. FIG. 30 is a view illustrating an example of an internal operation of adaptor 3000 shown in FIG. 17.

Step 1 (S1): Packet receiving means 3200 receives a packet to be updated, which is a packet including new data of the reception filter data, from router node 2000.

Step 2 (S2): Packet receiving means 3200 converts the received packet to be updated into a write access request for reception filter data 3321 and delivers it to adaptor filter control means 3300. Adaptor filter control means 3300 determines that the access request can be processed, and writes data, which is received together with the access request, to reception filter data 3321. Thereby, reception filter data 3321 is updated. Meanwhile, a case where the updating is not processed is the same as typical error processing that is performed when there occurs an error in which an access request is not processed. Thus, its description is omitted.

Figure 31:
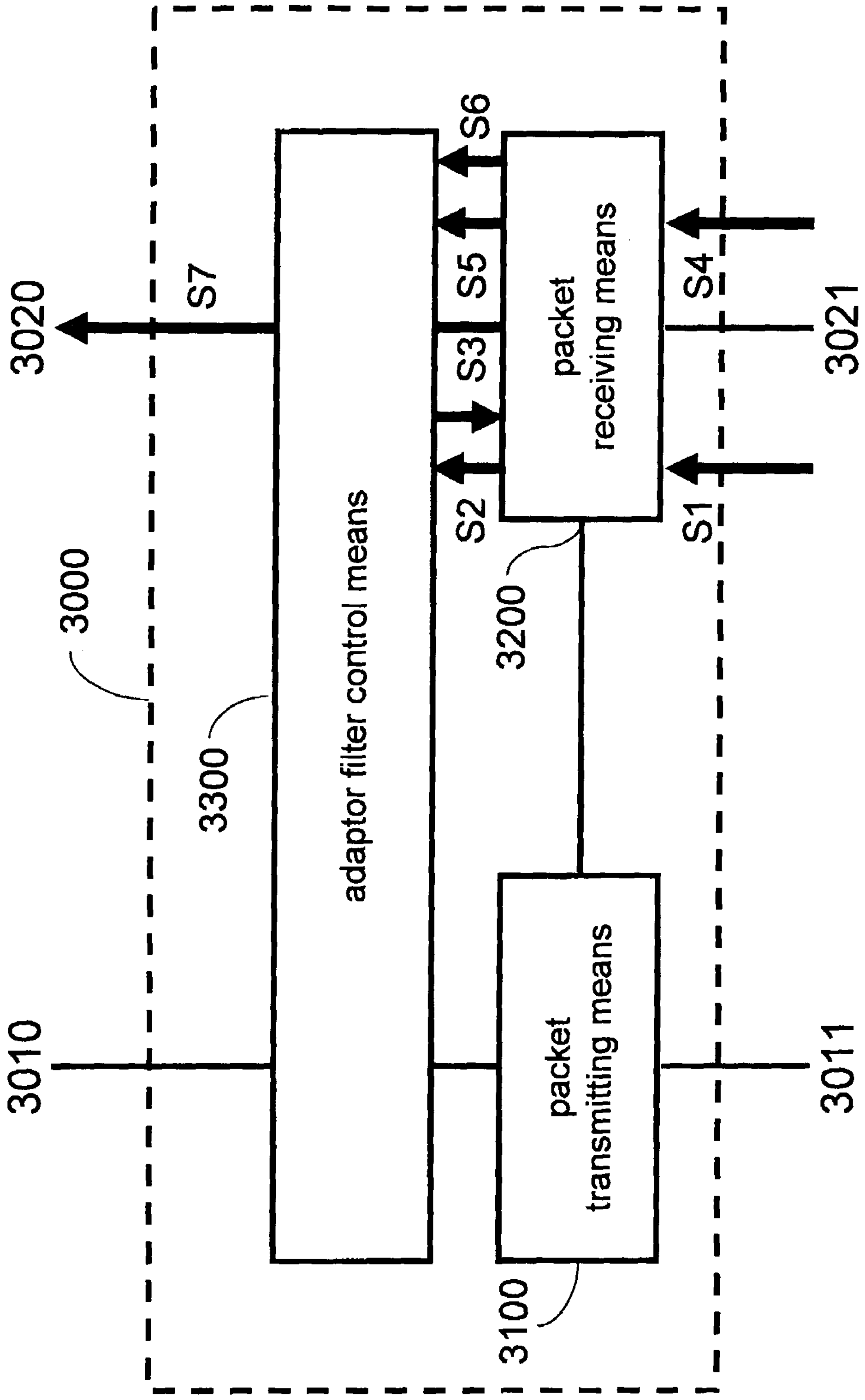
FIG. 31 is a view illustrating an example of an internal operation of the adaptor shown in FIG. 17.

Next, an internal operation of adaptor 3000 will be described when processing of an access request by a packet received from a router node is temporarily stopped, the packet is stored and reception filter data 3321 is updated to enable the access request, whose processing is temporarily stopped, to be processed. This is a combination of the operations shown in FIGS. 28 and 30. FIG. 31 is a view illustrating an example of an internal operation of adaptor 3000 shown in FIG. 17.

Step 1 (S1): Packet receiving means 3200 receives a packet from router node 2000. Step 2 (S2): Packet receiving means 3200 converts the packet into an access request to a core of a connection destination and delivers it to adaptor filter control means 3300.

Step 3 (S3): Adaptor filter control means 3300 determines whether the access request can be processed and whether it is necessary to temporarily stop processing of the access request. When it is determined that it is necessary to temporarily stop processing of the access request, the adaptor filter control means delivers to packet receiving means 3200 a notification that processing of the access request is temporarily stopped. Here, when packet receiving means 3200 receives the notification that processing of the access request is temporarily stopped, it stores the packet.

Step 4 (S4): Packet receiving means 3200 receives a packet to be updated, which is a packet including data for updating the reception filter data, from router node 2000.

Step 5 (S5): Packet receiving means 3200 converts the received packet to be updated into a write access request for reception filter data 3321 and delivers it to adaptor filter control means 3300. Adaptor filter control means 3300 determines that the access request can be processed, and writes data, which is received in accompany with the access request, to reception filter data 3321. Thereby, reception filter data 3321 is updated. At this time, in Step 3, regarding the entry of reception filter data 3321, the temporary stopping of processing of the access request is canceled. Due to this, adaptor filter control means 3300 can process the access request by the packet stored in packet receiving means 3200.

Step 6 (S6): Packet receiving means 3200 again delivers the stored packet to adaptor filter control means 3300. Step 7 (S7): Since the access request by the packet received from packet receiving means 3200 can be processed contrary to Step 3, adaptor filter control means 3300 delivers the access request to core 99.

Figure 32:
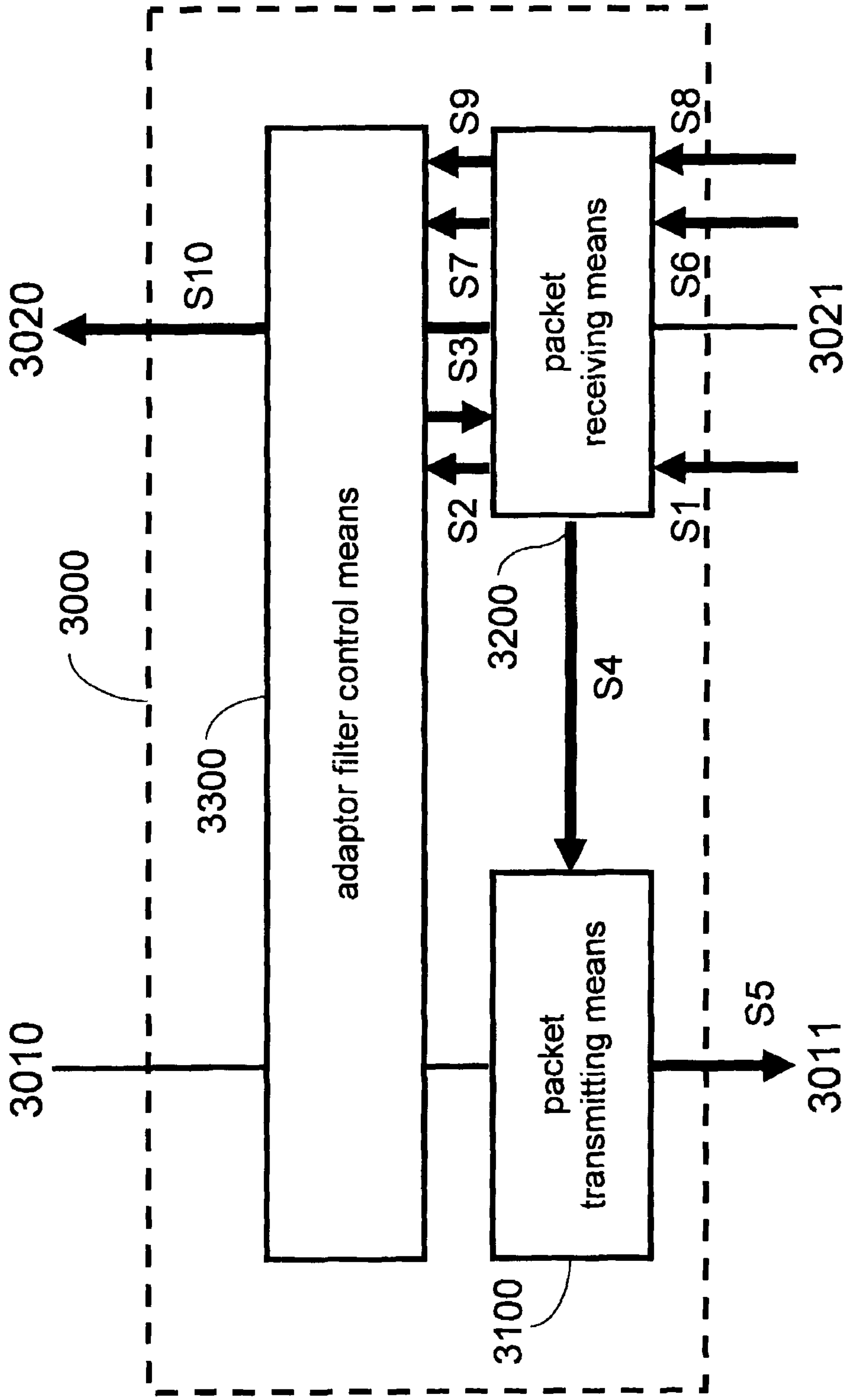
FIG. 32 is a view illustrating an example of an internal operation of adaptor 3000 shown in FIG. 17.

Next, an internal operation of adaptor 3000 will be described when processing of an access request by a packet received from a router node is temporarily stopped, the packet having a destination of the adaptor is just transmitted to the outside and then reception filter data 3321 is updated to enable an access request, whose processing is temporarily stopped, to be processed. This is a combination of the operations shown in FIGS. 29 and 30. FIG. 32 is a view illustrating an example of an internal operation of adaptor 3000 shown in FIG. 17.

Step 1 (S1): Packet receiving means 3200 receives a packet from router node 2000. Step 2 (S2): Packet receiving means 3200 converts the packet into an access request to a core of a connection destination and delivers it to adaptor filter control means 3300.

Step 3 (S3): Adaptor filter control means 3300 determines whether the access request can be processed and whether it is necessary to temporarily stop processing of the access request. When it is determined that it is necessary to temporarily stop processing of the access request, the adaptor filter control means delivers to packet receiving means 3200 a notification that processing of the access request is temporarily stopped.

Step 4 (S4): When packet receiving means 3200 receives the notification that processing of the access request is temporarily stopped, it generates a retransmission packet including information of the access request, which is a packet to be transmitted to the packet receiving means, and delivers it to packet transmitting means 3100.

Step 5 (S5): Packet transmitting means 3100 preferentially delivers the retransmission packet, which is received from packet receiving means, to router node 2000 over the access request from the core. Meantime, when it can be ascertained that there will be no deadlock, there will be no requirement to give priority to the retransmission packet over the access request from the core.

Step 6 (S6): Packet receiving means 3200 receives a packet to be updated, which includes data for updating the reception filter data, from router node 2000.

Step 7 (S7): Packet receiving means 3200 converts the received packet to be updated into a write access request for reception filter data 3321 and delivers it to adaptor filter control means 3300. Adaptor filter control means 3300 determines that the access request can be processed, and writes data, which is received together with the access request, to reception filter data 3321. Thereby, reception filter data 3321 is updated. At this time, in Step 3, regarding the entry of reception filter data 3321, the temporary stopping of processing of the access request is canceled. Due to this, adaptor filter control means 3300 can process the access request by the retransmission packet transmitted to the outside.

Step 8 (S8): Packet receiving means 3200 receives the retransmission packet from router node 2000. Step 9 (S9): Packet receiving means 3200 converts the retransmission packet into an access request to a core of a connection destination and delivers it to adaptor filter control means 3300. Step 10 (S10): Adaptor filter control means 3300 determines whether the access request can be processed. Contrary to Step 3, when it is determined that the access request can be processed, the adaptor filter control means delivers the access request to core 99.

Up to now, each constitutional element of the set consisting of the core, the adaptor and the router node has been specifically described. In the followings, a case where a plurality of sets is connected will be described.

Figure 33:
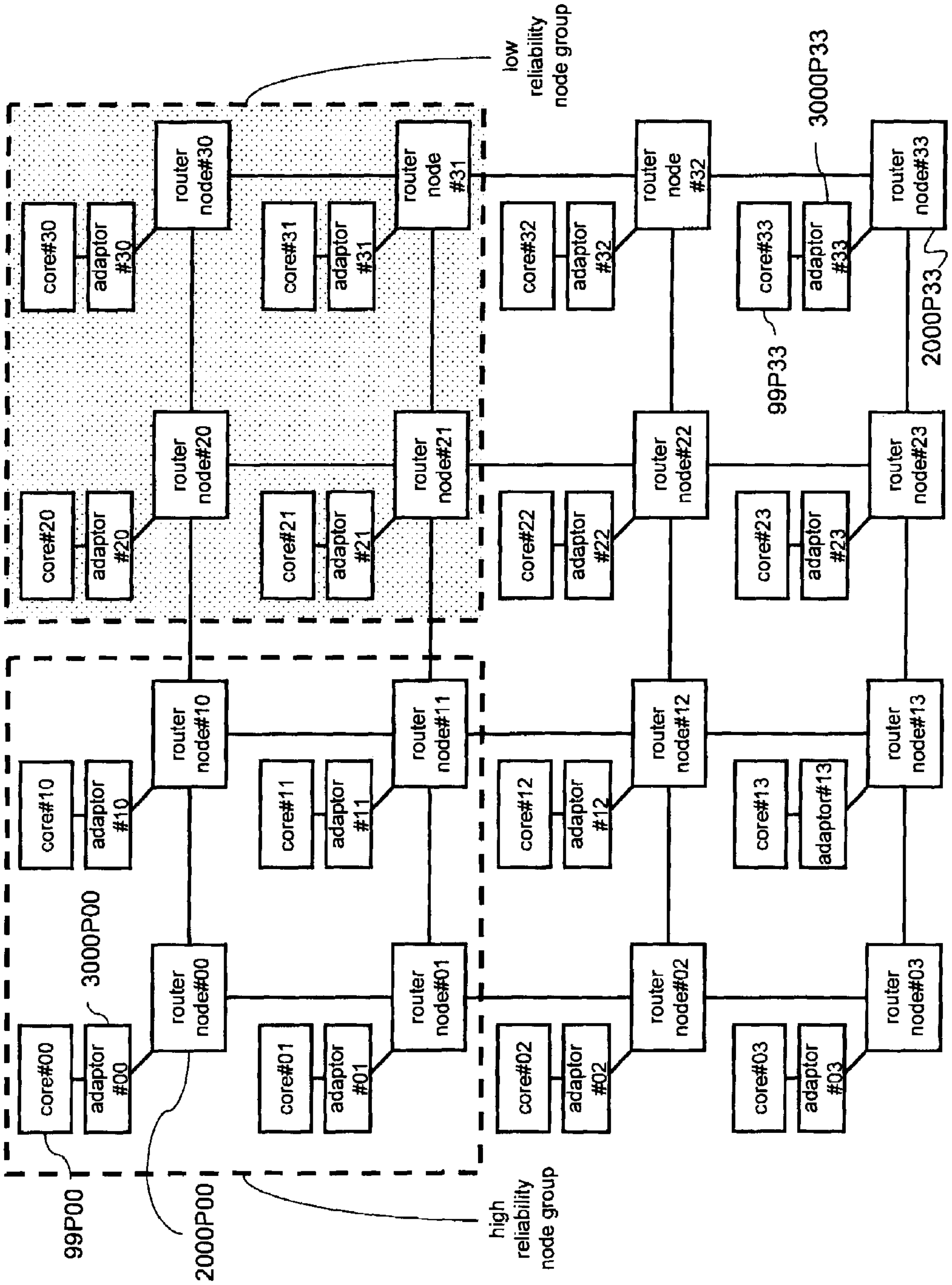
FIG. 33 is a block diagram showing an example of a structure of a semiconductor integrated circuit having a plurality of cores connected to an interconnecting network.

FIG. 33 is a block diagram showing an example of a structure of a semiconductor integrated circuit having a plurality of cores connected to an interconnecting network.

Referring to FIG. 33, the semiconductor integrated circuit has sixteen (16) cores 99P00~99P33 and an interconnecting network connecting the cores. The interconnecting network is provided with sixteen (16) router nodes 2000P0~2000P33 and sixteen (16) adaptors 3000P00~3000P33. Here, each of i and j is indicated with any integer of 0~3. Hence, core 99Pij is connected to adaptor 3000Pij and adaptor 3000Pij is connected to router node 2000Pij.

Router node 2000Pij has four (4) channels for input and output. By connecting the channels of router nodes 2000P00~2000P33 to each other, an interconnecting network, which has a mesh structure in general, is formed as shown in FIG. 33.

In the mean time, the connection between the router nodes positioned at the outermost of the interconnecting network makes two or three channels. In addition, although the connection network has the mesh structure, the invention is not limited to the mesh structure and a general interconnecting network except the mesh structure may be possible.

Further, although one adaptor and one core are connected to each router node in the interconnecting network shown in FIG. 33, a part of the router nodes in the interconnecting network may perform only delivery of a packet, as shown in FIG. 4.

Furthermore, in this exemplary embodiment, it is determined that four cores 99P00, 99P01, 99P10, 99P11 belong to a high reliability group and four cores 99P20, 99P30, 99P21, 99P31 belong to a low reliability group. The reliability may be determined by the system, or alternatively, may be determined by reliability of a certificate of the native code downloaded, as shown in Patent Document 1. Regarding the other eight cores 99P02, 99P03, 99P12, 99P13, 99P22, 99P23, 99P32, 99P33, the reliability thereof is not defined.

In the followings, a permission rule of an access request between the cores will be described. An access request from a core having high reliability (high reliability core) to a core having low reliability (low reliability core) is permitted. However, an access request from a low reliability core to a high reliability core is not permitted. In addition, an access request from a high reliability core to a core having no reliability defined is permitted. In the circumstances, an access request from a low reliability core to a core having no reliability defined is permitted or not permitted, which is predefined. The initial state of the setting information is described in reception filter data 3321 in advance.

Figure 34:
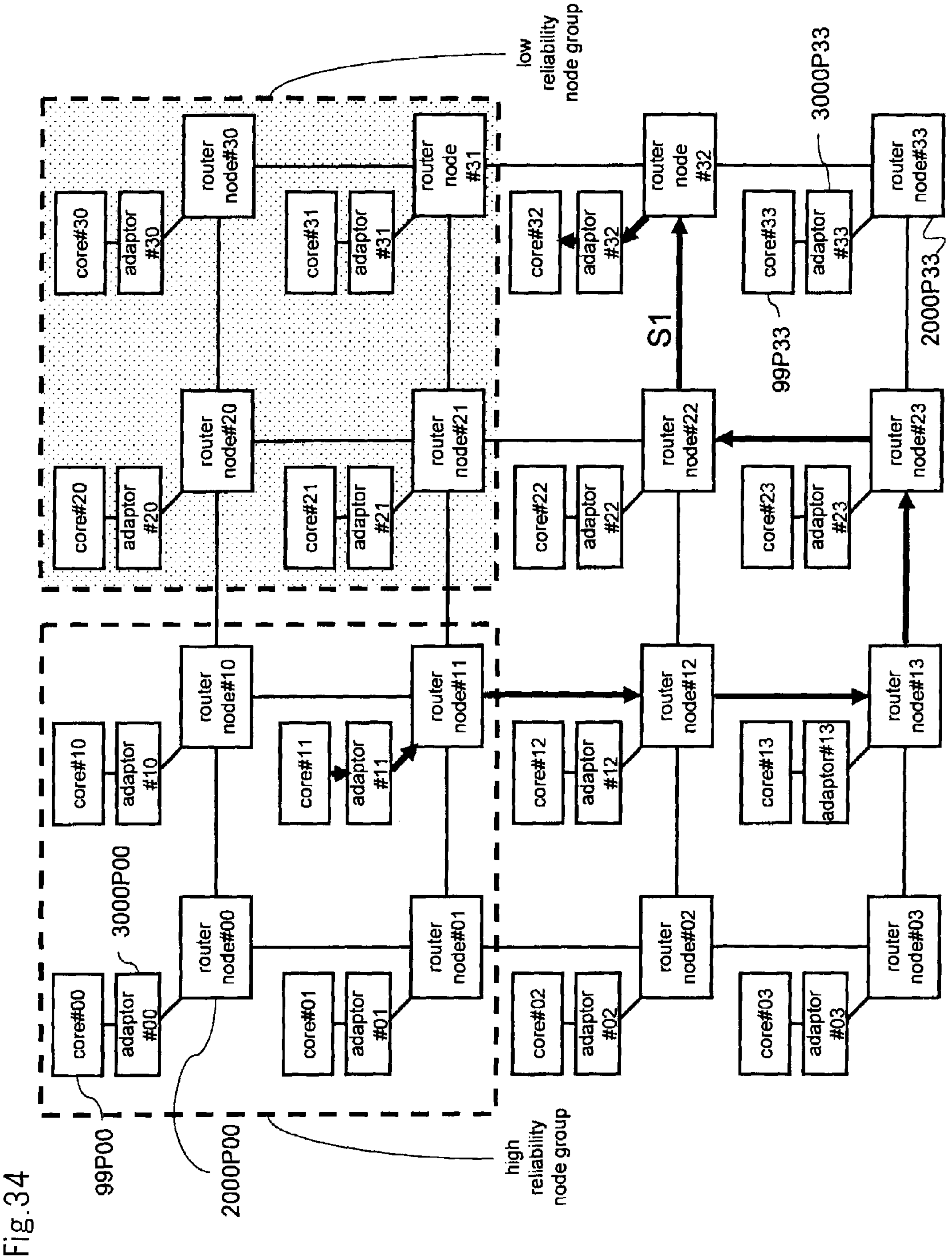
FIG. 34 is a view illustrating an example of an operation of the semiconductor integrated circuit shown in FIG. 33.

Next, an operation will be described when an access request is made from core 99P11 to core 99P32. In this case, since an access request is made from a high reliability core to a core having no reliability defined, the access request is permitted. FIG. 34 is a view illustrating an example of an operation of the semiconductor integrated circuit shown in FIG. 33.

Step 1 (S1): When core 99P11 delivers an access request to adaptor 3000P11, adaptor 3000P11 converts the access request into a packet and transmits the packet having a destination of core 99P32 to router node 2000P11. Router node 2000P11 transmits the packet received from adaptor 3000P11 to adjacent router node 2000P12. The packet transmitted from router node 2000P11 reaches router node 2000P32 through a middle router node group including router nodes 2000P12, 2000P13, 2000P23 and 2000P22. Then, router node 2000P32 delivers the received packet to adaptor 3000P32 and adaptor 3000P32 converts the packet into an access request corresponding to a core and delivers it to core 99P32.

Figure 35:
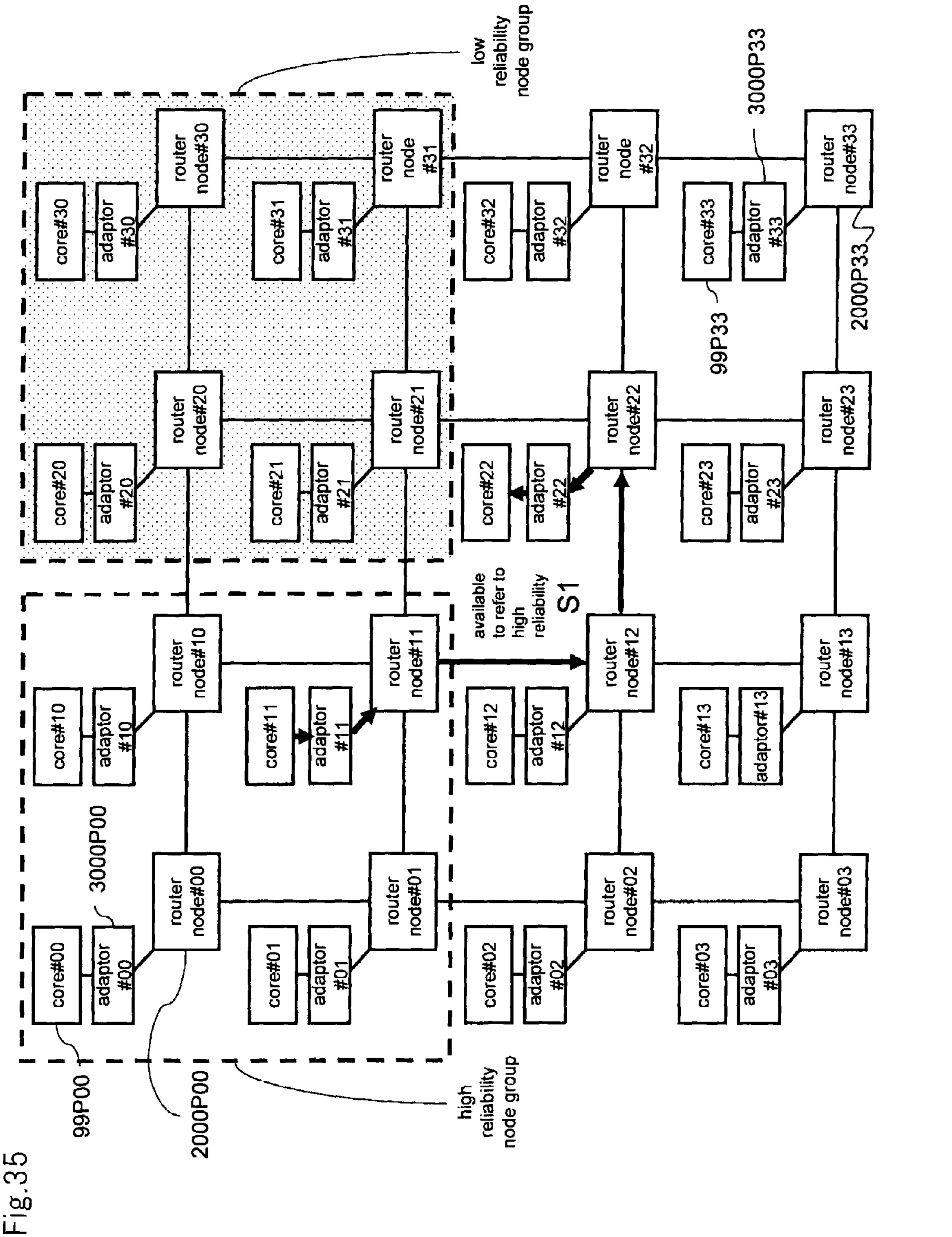
FIG. 35 is a view illustrating an example of an operation of the semiconductor integrated circuit shown in FIG. 33.

Next, an operation will be described when an access request is made from core 99P11 to core 99P22. In this case, since an access request is made from a high reliability core to a core whose reliability has not been defined, the access request is permitted. FIG. 35 is a view illustrating an example of an operation of the semiconductor integrated circuit shown in FIG. 33.

Step 1 (S1): When core 99P11 delivers an access request to adaptor 3000P11, adaptor 3000P11 converts the access request into a packet and transmits the packet having a destination of core 99P22 to router node 2000P11. Router node 2000P11 transmits the packet received from adaptor 3000P11 to adjacent router node 2000P12. The packet transmitted from router node 2000P11 reaches router node 2000P22 through router node 2000P12 that is a relay. Then, router node 2000P22 delivers the received packet to adaptor 3000P22 and adaptor 3000P22 converts the packet into an access request corresponding to a core and delivers it to core 99P22.

Figure 36:
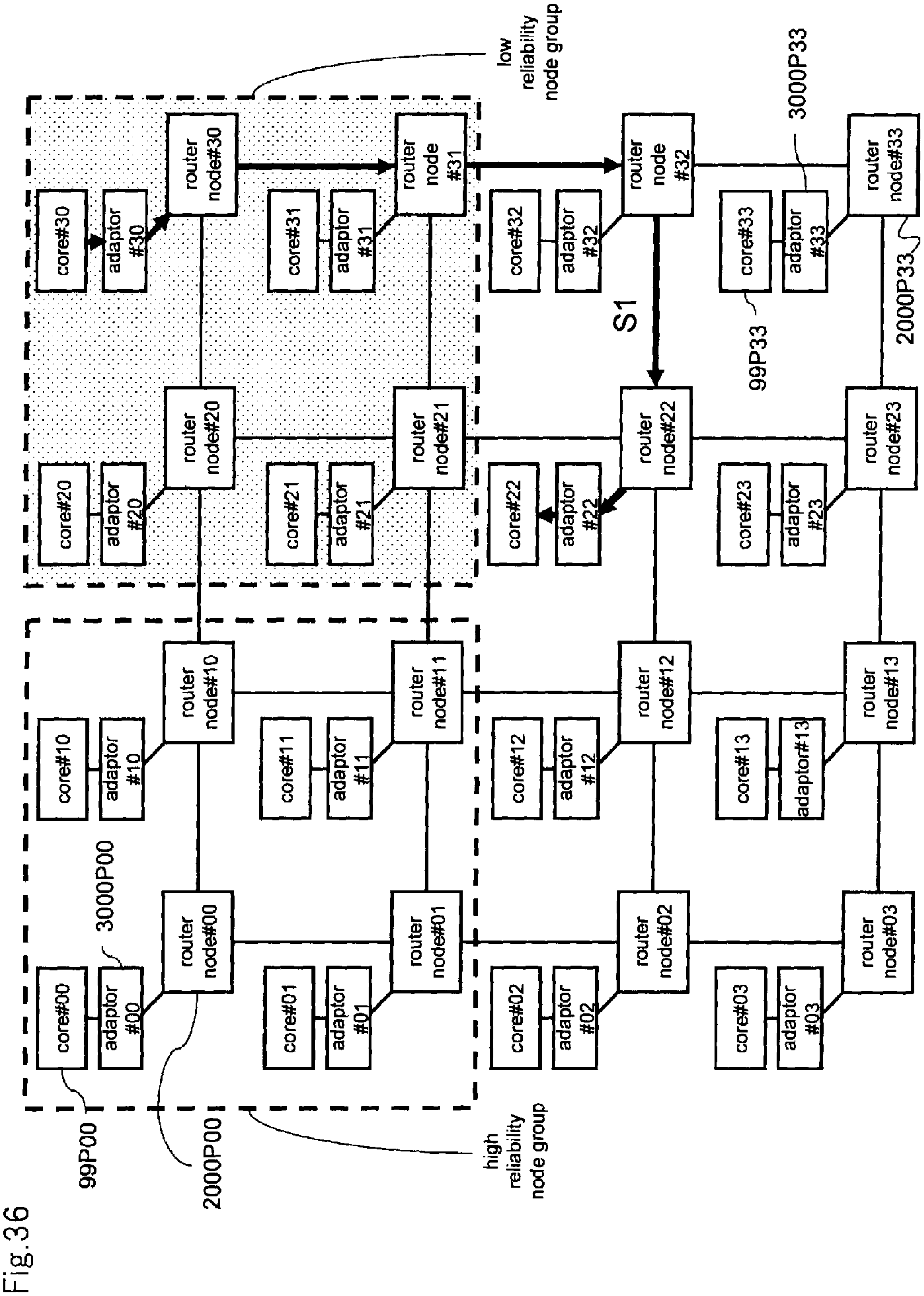
FIG. 36 is a view illustrating an example of an operation of the semiconductor integrated circuit shown in FIG. 33.

Next, an operation will be described when an access request is made from core 99P30 to core 99P22. In this case, although an access request is made from a low reliability core to a core whose reliability has not been defined, it is assumed that the access request is permitted. FIG. 36 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core and delivers it to core 99P22.

Figure 37:
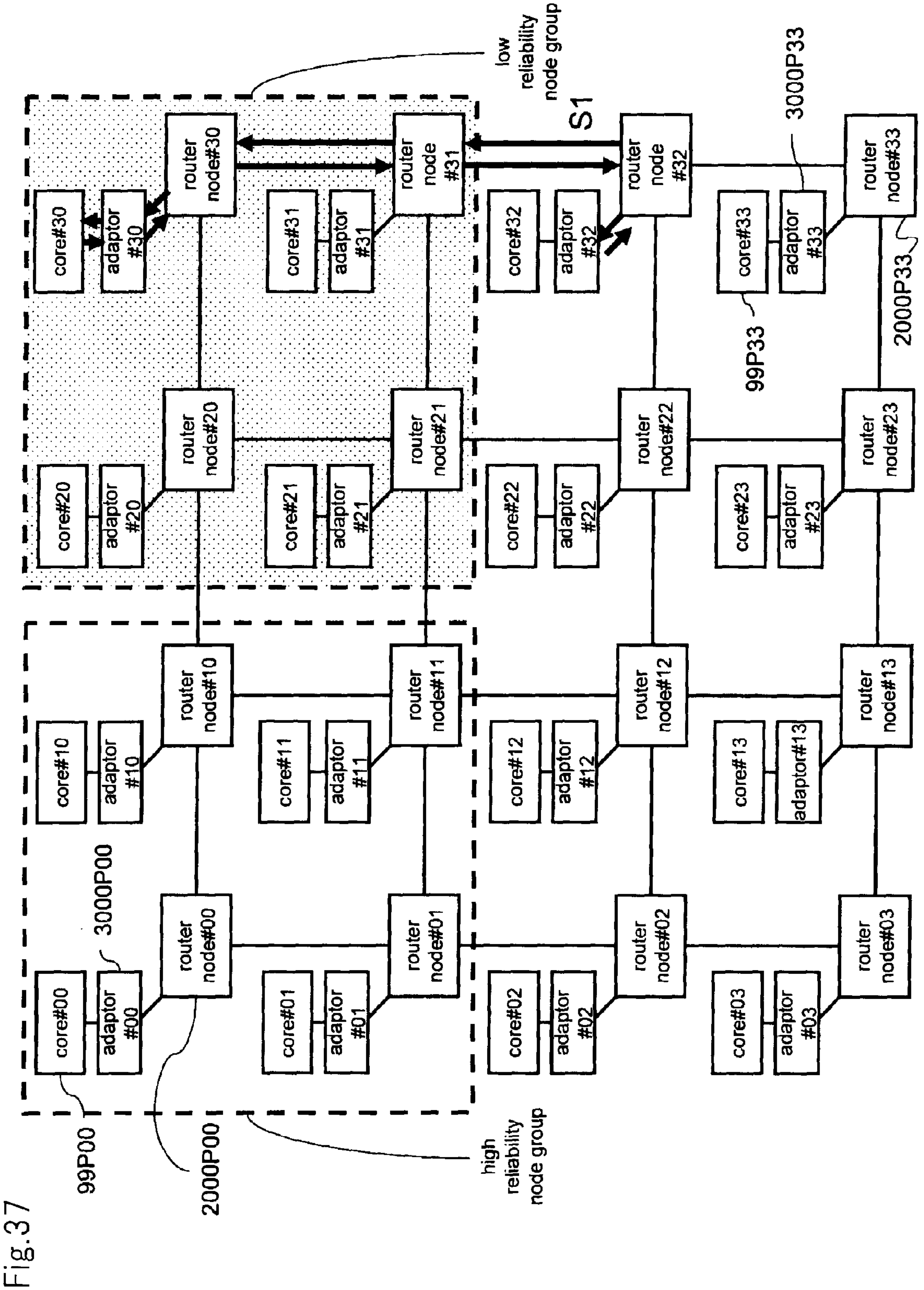
FIG. 37 is a view illustrating an example of an operation of the semiconductor integrated circuit shown in FIG. 33.

Next, an operation will be described when an access request is made from core 99P30 to core 99P32. In this case, although an access request is made from a low reliability core to a core whose reliability has not been defined, it is assumed that the access request is not permitted. FIG. 37 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P32 to router node 2000P30. Router node 2000P30 transmits the packet received from adaptor 3000P30 to adjacent router node 2000P31. The packet transmitted from router node 2000P30 reaches router node 2000P32 through router node 2000P31 that is a relay. Then, router node 2000P32 delivers the received packet to adaptor 3000P32 and adaptor 3000P32 converts the packet into an access request corresponding to a core.

However, since the access request is not permitted, adaptor 3000P32 generates an error packet, which is a packet for notifying core 99P30 that the access request is not permitted and an error is caused. Continuously, the adaptor transmits the error packet to router node 2000P32. Router node 2000P32 transmits the received error packet to adjacent router node 2000P31. The error packet transmitted from router node 2000P32 reaches router node 2000P30 through router node 2000P31 that is a relay. Then, router node 2000P30 delivers the error packet to adaptor 3000P30, and adaptor 3000P30 converts the error packet into an access error response, which is information for notifying the core that the access request has caused an error, and delivers the response to core 99P30. In the meantime, although it has been described that the error packet is distributed in the opposite direction to the path in which the packet of the access request is distributed, the error packet may be distributed in a path different from the corresponding path.

Figure 38:
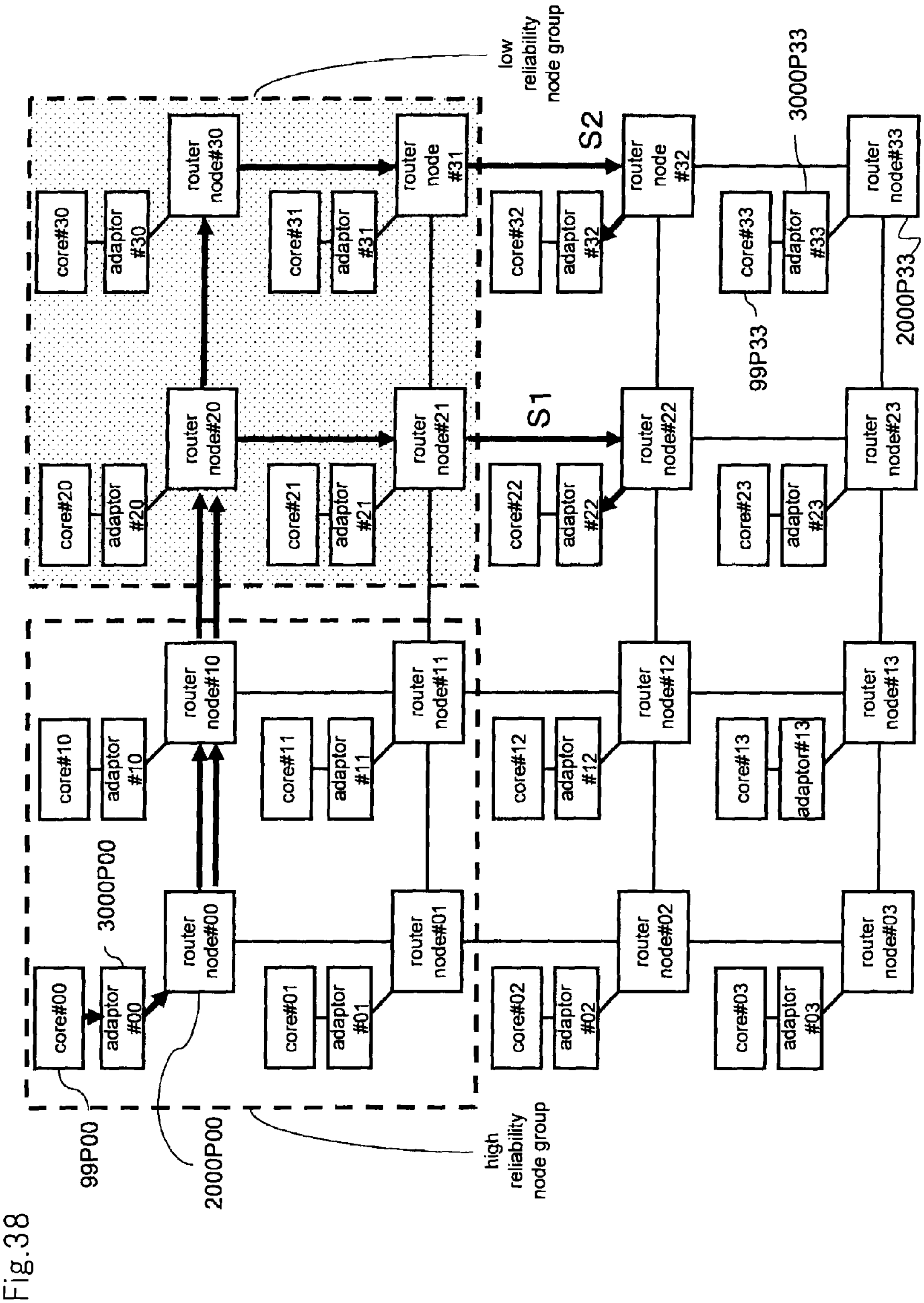
FIG. 38 is a view illustrating an example of an operation of the semiconductor integrated circuit shown in FIG. 33.

Next, an operation of a case will be described where although high reliability core 99P00 inhibits an access request to core 99P22 from low reliability core 99P33, it permits an access request to core 99P32, so that processing of the access request is temporarily stopped in adaptors 3000P22 and 3000P32. Core 99P22 and core 99P32 do not have defined reliability. FIG. 38 is a view illustrating an example of an operation of the semiconductor integrated circuit shown in FIG. 33.

Step 1 (S1): When core 99P00 delivers to adaptor 3000P00 a temporary stop request, which provides instructions to indicate a temporary stopping of processing of the access request in adaptor 3000P22, to be written into reception filter data 3321, adaptor 3000P00 transmits to router node 2000P00 a temporary-stop-packet having a destination of adaptor 3000P22, that provides instructions to indicate a temporary stopping of processing of the access request, to be written on reception filter data 3321. Router node 2000P00 transmits the received temporary-stop-packet to adjacent router node 2000P10. The packet transmitted from router node 2000P00 reaches router node 2000P22 through router nodes 2000P10, 2000P20 and 2000P21.

Then, router node 2000P22 delivers the temporary-stop-packet received through the router nodes to adaptor 3000P22. When adaptor 3000P22 recognizes that the received temporary-stop-packet instructs a temporary stopping of processing of the access request, it sets "Yes" in a temporary stop bit, which indicates whether or not to temporarily stop processing of the access request in reception filter data 3321, and changes processing of the access request to a temporary stop state.

Step 2 (S2): When core 99P00 delivers to adaptor 3000P00 the temporary stop request, which provides instructions to indicate a temporary stopping of processing of the access request in adaptor 3000P32, to be written into reception filter data 3321, adaptor 3000P00 transmits the temporary-stop-packet having a destination of adaptor 3000P32 to router node 2000P00. Router node 2000P00 transmits the received temporary-stop-packet to adjacent router node 2000P10. The packet transmitted from router node 2000P00 reaches router node 2000P32 through router nodes 2000P10, 2000P20, 2000P30 and 2000P31.

Then, router node 2000P32 delivers the temporary-stop-packet received through the router nodes to adaptor 3000P32. When adaptor 3000P32 recognizes that the received temporary-stop-packet instructs a temporary stopping of processing of the access request, it sets "Yes" in the temporary stop bit, which indicates whether or not to temporarily stop processing of the access request in reception filter data 3321, and changes processing of the access request to a temporary stop state.

Figure 39:
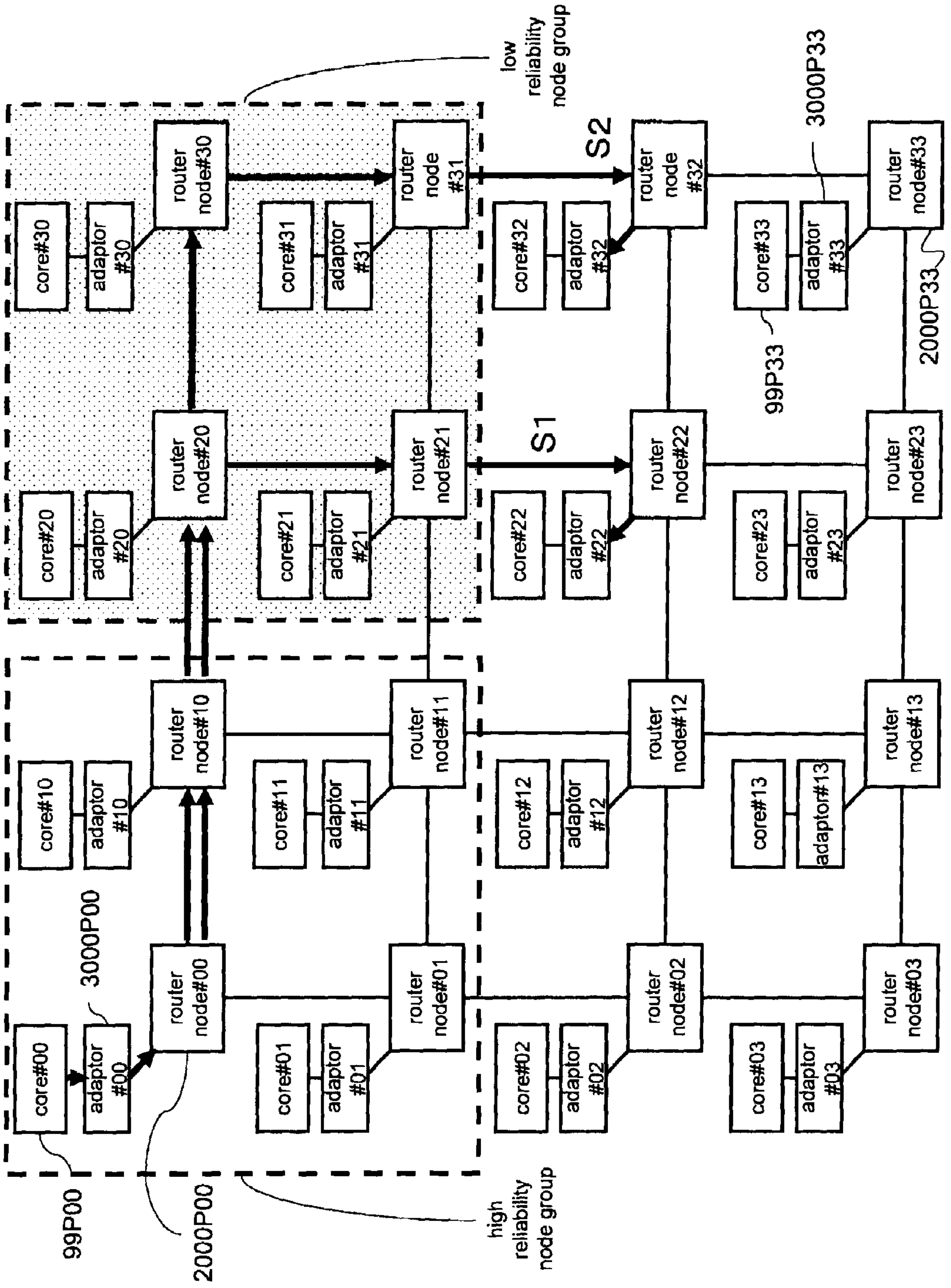
FIG. 39 is a view illustrating an example of an operation of the semiconductor integrated circuit shown in FIG. 33.

Next, an operation of a case will be described where although high reliability core 99P00 inhibits an access request to core 99P22 from low reliability core 99P30, it permits an access request to core 99P32, so that it updates the reception filter data of adaptors 3000P22 and 3000P32 in a temporary stop state for processing the access request. FIG. 39 is a view illustrating an example of an operation of the semiconductor integrated circuit shown in FIG. 33

Step 1 (S1): When core 99P00 delivers to adaptor 3000P00 a reception filter data update request, which is to update the reception filter data into reception filter data inhibiting processing of an access request from core 99P30 in adaptor 3000P22, adaptor 3000P00 transmits to router node 2000P00 a packet to be updated having a destination of adaptor 3000P22, which includes information indicating that the access request from core 99P30 is inhibited from being processed. Router node 2000P00 transmits the received packet to be updated to adjacent router node 2000P10. The packet transmitted from router node 2000P00 reaches router node 2000P22 through router nodes 2000P10, 2000P20 and 2000P21.

Then, router node 2000P22 delivers the packet to be updated received through the router nodes to adaptor 3000P22. When adaptor 3000P22 recognizes that the packet to be updated inhibits processing of the access request from core 99P30, the adaptor sets no "R" and "W" in the permission bit for router node 2000P30 connected to core 99P30 through adaptor 3000P30 while maintaining the temporary stop bit as "Yes" in reception filter data 3321, and changes the state into a state inhibiting processing of the access request from core 99P30.

Step 2 (S2): When core 99P00 delivers to adaptor 3000P00 a reception filter data update request, which is to update the reception filter data into reception filter data permitting a processing of the access request from core 99P30 in adaptor 3000P32, adaptor 3000P00 transmits to router node 2000P00 a packet to be updated having a destination of adaptor 3000P32, which includes information indicating that processing of the access request from core 99P30 is permitted. Router node 2000P00 transmits the received update packet to adjacent router node 2000P10. The packet transmitted from router node 2000P00 reaches router node 2000P32 through router nodes 2000P10, 2000P20, 2000P30 and 2000P31.

Then, router node 2000P32 delivers the packet to be updated received through the router nodes to adaptor 3000P32. When adaptor 3000P32 recognizes that the packet to be updated permits processing of the access request from core 99P30, the adaptor sets "R" and "W" in the permission bit for router node 2000P30 connected to core 99P30 through adaptor 3000P30 while maintaining the temporary stop bit as "Yes" in reception filter data 3321, and changes the state into a state permitting a processing of the access request from core 99P30.

Figure 40:
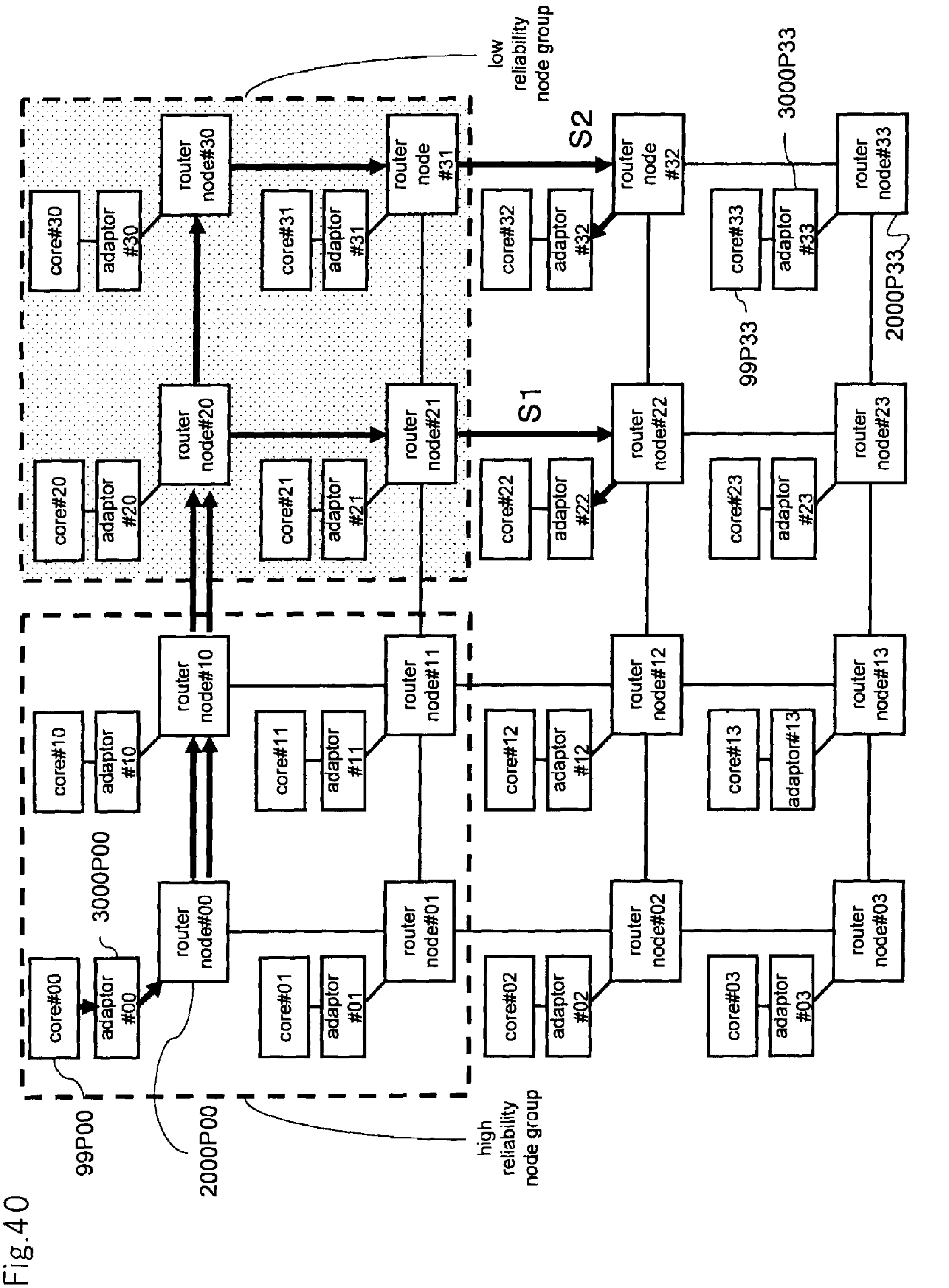
FIG. 40 is a view illustrating an example of an operation of the semiconductor integrated circuit shown in FIG. 33.

Next, an operation of a case will be described where although high reliability core 99P00 inhibits an access request to core 99P22 from low reliability core 99P30, it releases the temporary stop state of the access request for adaptors 3000P2 and 3000P32 after updating the reception filter data for permitting the access request to core 99P32. FIG. 40 is a view illustrating an example of an operation of the semiconductor integrated circuit shown in FIG. 33

Step 1 (S1): When core 99P00 delivers to adaptor 3000P00 a temporary stop release request, which provides instructions to indicate cancellation of the temporary stopping of processing of an access request in adaptor 3000P22, to be written into reception filter data 3321, adaptor 3000P00 transmits to router node 2000P00 a temporary stop release packet having a destination of adaptor 3000P22, which provides instructions to indicate cancellation of the temporary stopping of processing of the access request, to be written into reception filter data 3321. Router node 2000P00 transmits the received temporary stop release packet to adjacent router node

2000P10. The packet transmitted from router node 2000P00 reaches router node 2000P22 through router nodes 2000P10, 2000P20 and 2000P21.

Then, router node 2000P22 delivers the temporary stop release packet received through the router nodes to adaptor 3000P22. When adaptor 3000P22 recognizes that the temporary stop release packet instructs cancellation of the temporary stopping of processing of the access request, the adaptor sets "No" in the temporary stop bit, which indicates whether or not to temporarily stop processing of the access request in reception filter data 3321, and cancels the temporary stop state of processing of the access request. In this case, adaptor 3000P22 maintains the state in which processing of the access request from core 99P00 is inhibited.

Step 2 (S2): When core 99P00 delivers to adaptor 3000P00 the temporary stop release request, which provides instructions to indicate cancellation of the temporary stopping of processing of the access request in adaptor 3000P32, to be written into reception filter data 3321, adaptor 3000P00 transmits the temporary stop release packet having a destination of adaptor 3000P32 to router node 2000P00. Router node 2000P00 transmits the received temporary stop release packet to adjacent router node 2000P10. The packet transmitted from router node 2000P00 reaches router node 2000P32 through router nodes 2000P10, 2000P20, 2000P30 and 2000P31.

Then, router node 2000P32 delivers the temporary stop release packet received through the router nodes to adaptor 3000P32. When adaptor 3000P32 recognizes that the temporary stop release packet instructs cancellation of the temporary stopping of processing of the access request, the adaptor sets "No" in the temporary stop bit, which indicates whether or not to temporarily stop processing of the access request in reception filter data 3321, and cancels the temporary stop state of processing of the access request. In this case, adaptor 3000P32 maintains the state in which processing of the access request from core 99P00 is permitted.

Figure 41:
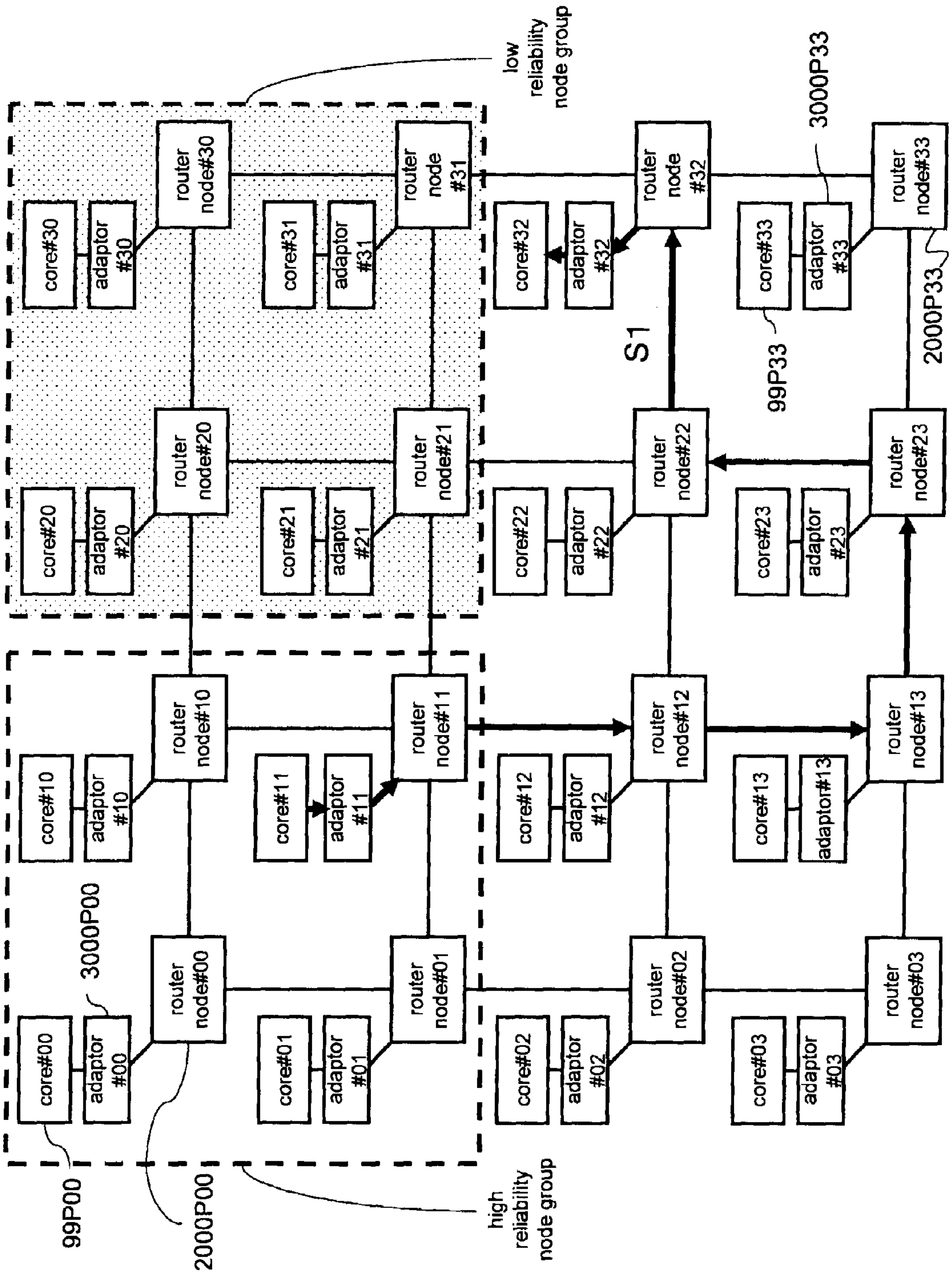
FIG. 41 is a view illustrating an example of an operation of the semiconductor integrated circuit shown in FIG. 33.

Next, an operation of a case will be described where core 99P11 makes an access request to core 99P32 after setting of the reception filter data has been changed as described in FIGS. 38, 39 and 40. As described above, although the setting of the reception filter data has been changed, core 99P11 is the high reliability core, so that an access request to core 99P32, whose reliability has not been defined, from core 99P11 is permitted. FIG. 41 is a view illustrating an example of an operation of the semiconductor integrated circuit shown in FIG. 33.

Step 1 (S1): When core 99P11 delivers an access request to adaptor 3000P11, adaptor 3000P11 converts the access request into a packet and transmits the packet having a destination of core 99P32 to router node 2000P11. Router node 2000P11 transmits the packet received from adaptor 3000P11 to adjacent router node 2000P12. The packet transmitted from router node 2000P11 reaches router node 2000P32 through a middle router node group including router nodes 2000P12, 2000P13, 2000P23 and 2000P22. Then, router node 2000P32 delivers the received packet to adaptor 3000P32 and adaptor 3000P32 converts the packet into an access request corresponding to a core and delivers it to core 99P32.

Figure 42:
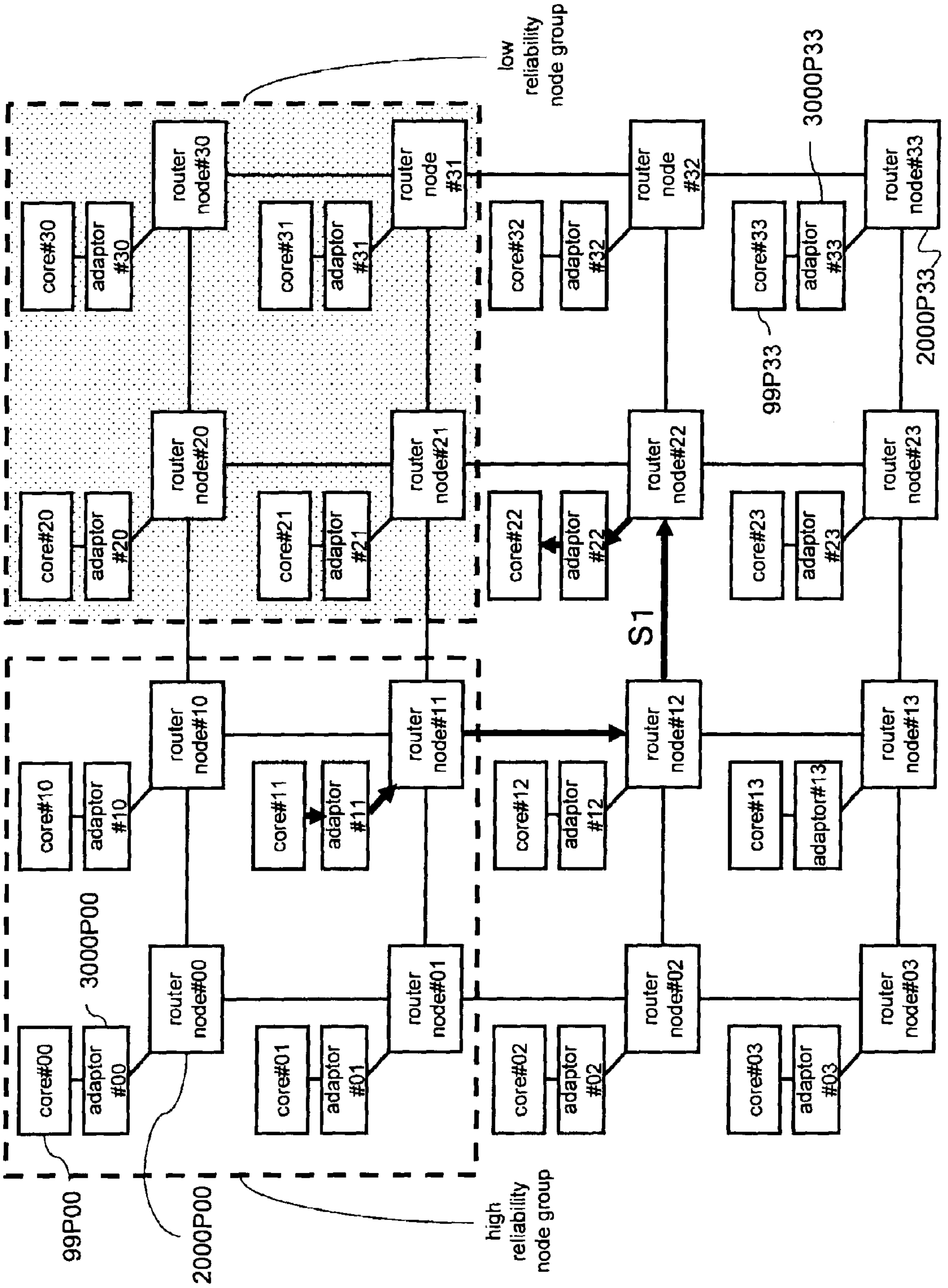
FIG. 42 is a view illustrating an example of an operation of the semiconductor integrated circuit shown in FIG. 33.

Next, an operation of a case will be described where core 99P11 makes an access request to core 99P22 after setting of the reception filter data has been changed, as described in FIGS. 38, 39 and 40. As described above, although the setting of the reception filter data has been changed, core 99P11 is the high reliability core, so that an access request to core 99P22, whose reliability has not been defined, from core 99P11 is permitted. FIG. 42 is a view illustrating an example of an operation of the semiconductor integrated circuit shown in FIG. 33.

Step 1 (S1): When core 99P11 delivers an access request to adaptor 3000P11, adaptor 3000P11 converts the access request into a packet and transmits the packet having a destination of core 99P22 to router node 2000P11. Router node 2000P11 transmits the packet received from adaptor 3000P11 to adjacent router node 2000P12. The packet transmitted from router node 2000P11 reaches router node 2000P22 through router node 2000P12 that is a relay. Then, router node 2000P22 delivers the received packet to adaptor 3000P22 and adaptor 3000P22 converts the packet into an access request corresponding to a core and delivers it to core 99P22.

Figure 43:
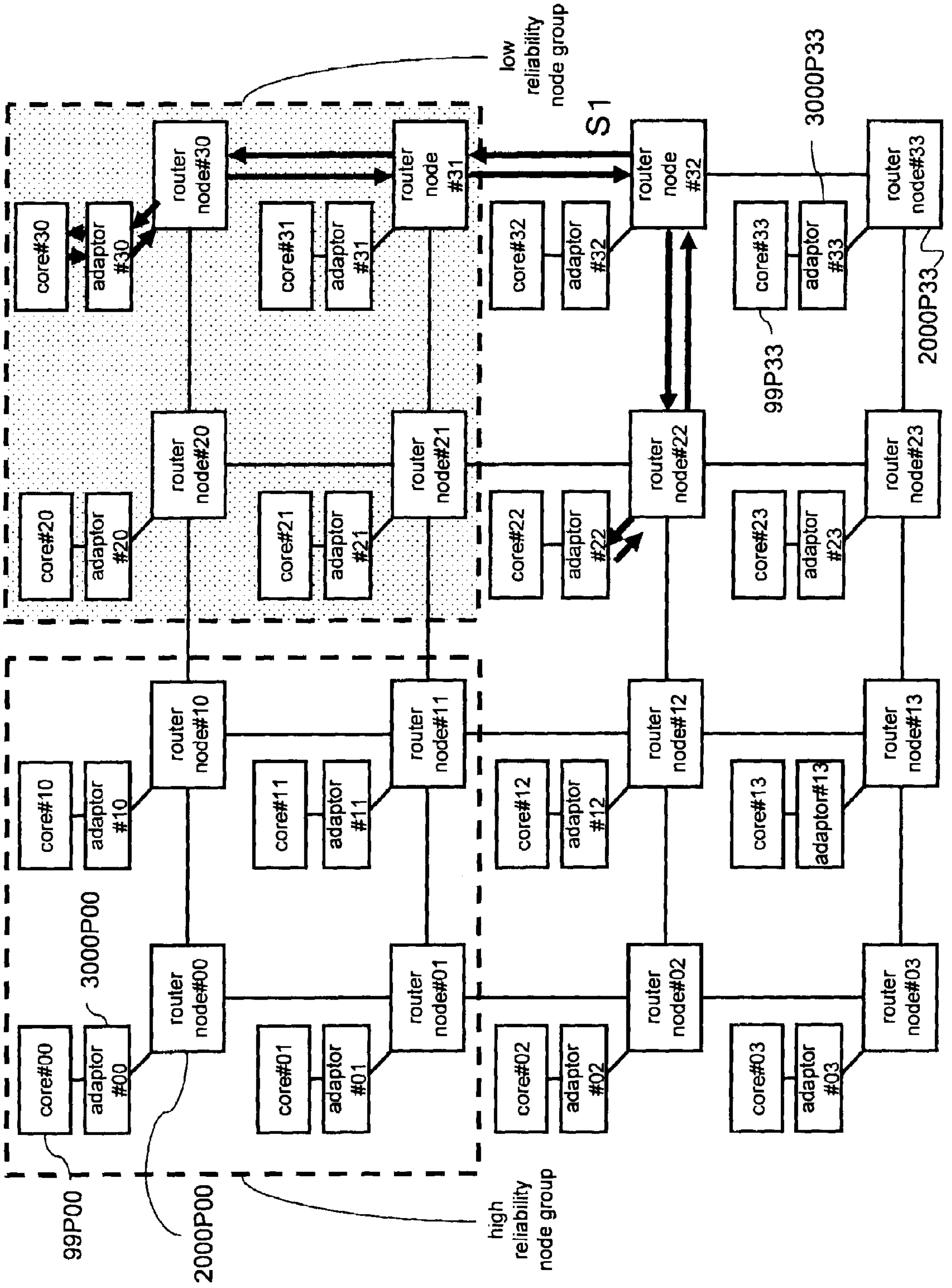
FIG. 43 is a view illustrating an example of an operation of the semiconductor integrated circuit shown in FIG. 33.

Next, an operation of a case will be described where core 99P30 makes an access request to core 99P22 after setting of the reception filter data has been changed, as described in FIGS. 38, 39 and 40. As described above, since the setting of the reception filter data has been changed, an access request to core 99P22 from low reliability core 99P30 is not permitted, contrary to the case described in FIG. 36. FIG. 43 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core.

However, since the access request is not permitted, adaptor 3000P32 generates an error packet, which is a packet for notifying core 99P30 that the access request is not permitted and an error is thus caused. Continuously, the adaptor transmits the error packet to router node 2000P22. Router node 2000P22 transmits the received error packet to adjacent router node 2000P32. The error packet transmitted from router node 2000P22 reaches router node 2000P30 through a middle router node group including router nodes 2000P32 and 2000P31. Then, router node 2000P30 delivers the error packet to adaptor 3000P30, and adaptor 3000P30 converts the error packet into an access error response, which is information for notifying the core that the access request has caused an error, and delivers the response to core 99P30. In the meantime, although it has been described that the error packet is distributed in an opposite direction to the path in which the packet of the access request is distributed, the error packet may be distributed in a path different from the corresponding path.

Figure 44:
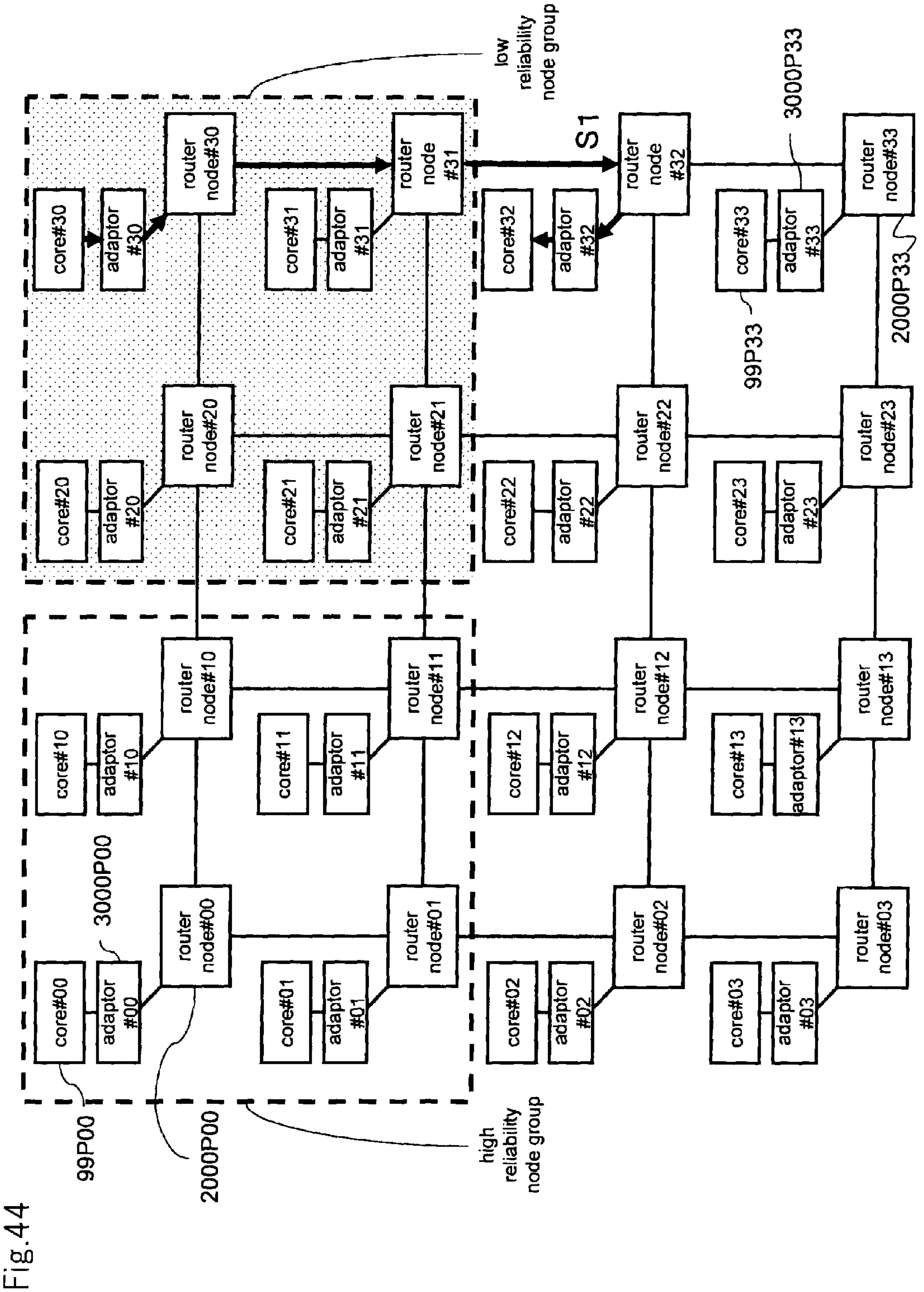
FIG. 44 is a view illustrating an example of an operation of the semiconductor integrated circuit shown in FIG. 33.

Next, an operation of a case will be described where core 99P30 makes an access request to core 99P32 after setting of the reception filter data has been changed, as described in FIGS. 38, 39 and 40. As described above, since the setting of the reception filter data has been changed, even though core 99P30 is the low reliability core, an access request to core 99P22 from core 99P30 is permitted, contrary to the case described in FIG. 37. FIG. 44 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P32 to router node 2000P30. Router node 2000P30 transmits the packet received from adaptor 3000P30 to adjacent router node 2000P31. The packet transmitted from router node 2000P30 reaches router node 2000P32 through router node 2000P31 that is a relay. Then, router node 2000P32 delivers the received packet to adaptor 3000P32 and adaptor 3000P32 converts the packet into an access request corresponding to a core and delivers it to core 99P32.

Figure 45:
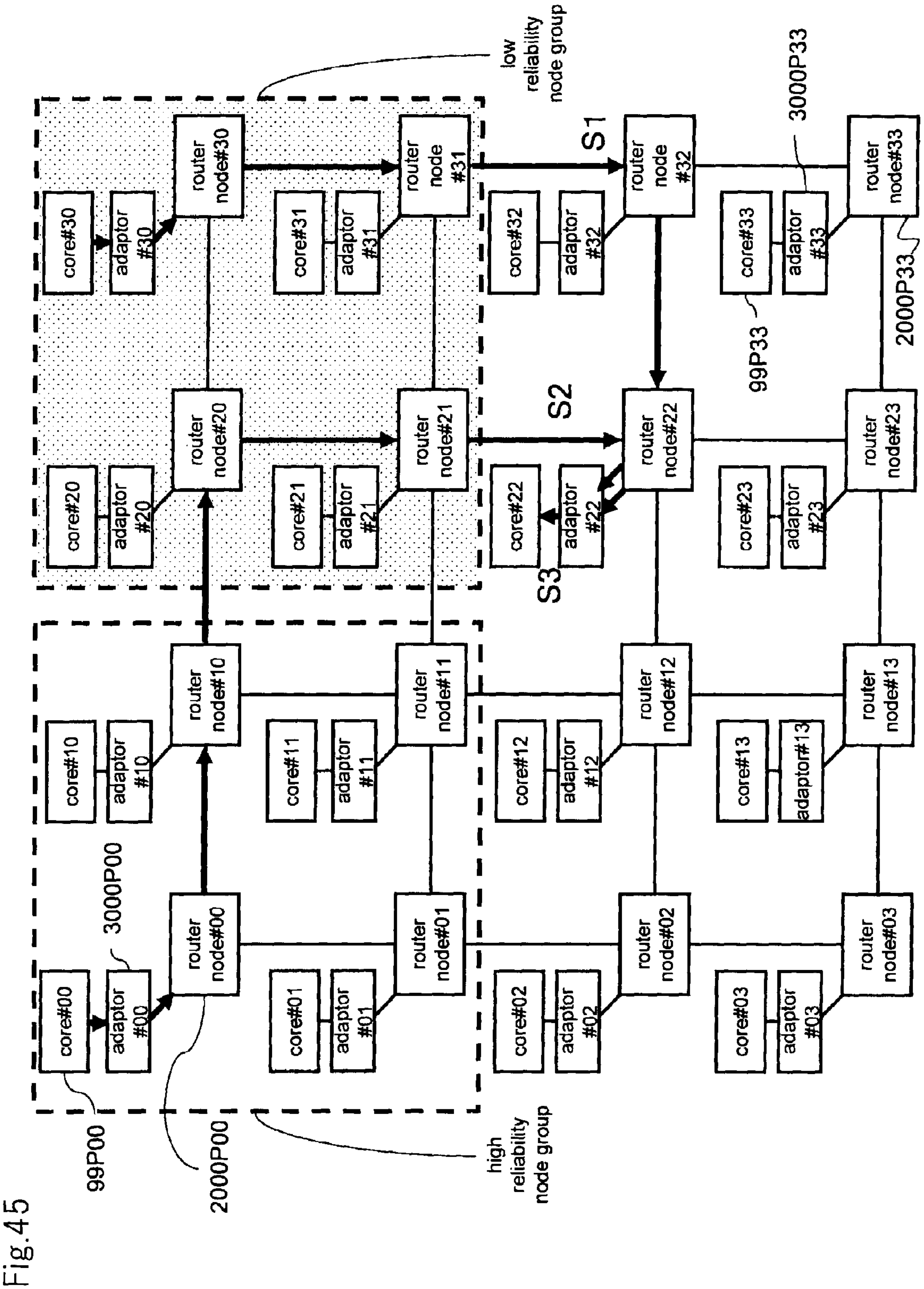
FIG. 45 is a view illustrating an example of an operation of the semiconductor integrated circuit shown in FIG. 33.

Next, a case will be described where a processing of an access request is temporarily stopped so as to update the reception filter data in one adaptor and then the reception filter data is updated to enable the adaptor to process an access request from a predetermined core. Here, processing of an access request to core 99P22 from low reliability core 99P30 is temporarily stopped, and then high reliability core 99P00 sets that the access request from core 99P30 can be processed in core 99P22 and cancels the temporary stopping of processing of the access request. FIG. 45 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core. Continuously, adaptor 3000P22 refers to reception filter data 3321 and stores the packet when it recognizes that the temporary stop bit, which indicates whether or not to process the access request, is "Yes."

Step 2 (S2): Core 99P00 delivers to adaptor 3000P00 a reception filter data update request, which is to update the reception filter data into reception filter data permitting processing of an access request from core 99P30 in adaptor 3000P22, and a temporary stop release request, which provides instructions to indicate cancellation of the temporary stopping of processing of the access request in adaptor 3000P22, to be written into reception filter data 3321. When adaptor 3000P00 receives the reception filter data update request and the temporary stop release request from core 99P00, it transmits to router node 2000P00 an update/temporary stop release packet having a destination of adaptor 3000P22, which provides instructions to notify permission for processing of the access request from core 99P00 and cancellation of the temporary stopping of processing of the access request, to be written into reception filter data 3321. Router node 2000P00 transmits the received update/temporary stop release packet to adjacent router node 2000P10. The packet transmitted from router node 2000P00 reaches router node 2000P22 through router nodes 2000P10, 2000P20 and 2000P21.

Then, router node 2000P22 delivers the update/temporary stop release packet received through the router nodes to adaptor 3000P22. Adaptor 3000P22 recognizes that the update/temporary stop release packet is to permit processing of the access request from core 99P30 in adaptor 3000P22 and to cancel the temporary stopping of processing of the access request. Continuously, the adaptor sets "R" and "W" in the permission bit for router node 2000P30 connected to core 99P30 through adaptor 3000P30 and changes the state into a state permitting the processing of the access request from core 99P30. In addition, the adaptor sets "No" in the temporary stop bit of reception filter data 3321 and cancels the temporary stop state of processing of the access request.

Step 3 (S3): When adaptor 3000P22 refers to reception filter data 3321 to recognize that processing of the access request from core 99P30 is permitted and temporary stopping of processing of the access request is canceled, the adaptor converts the packet stored in Step 1 into an access request corresponding to a core and delivers it to core 99P22.

Figure 46:
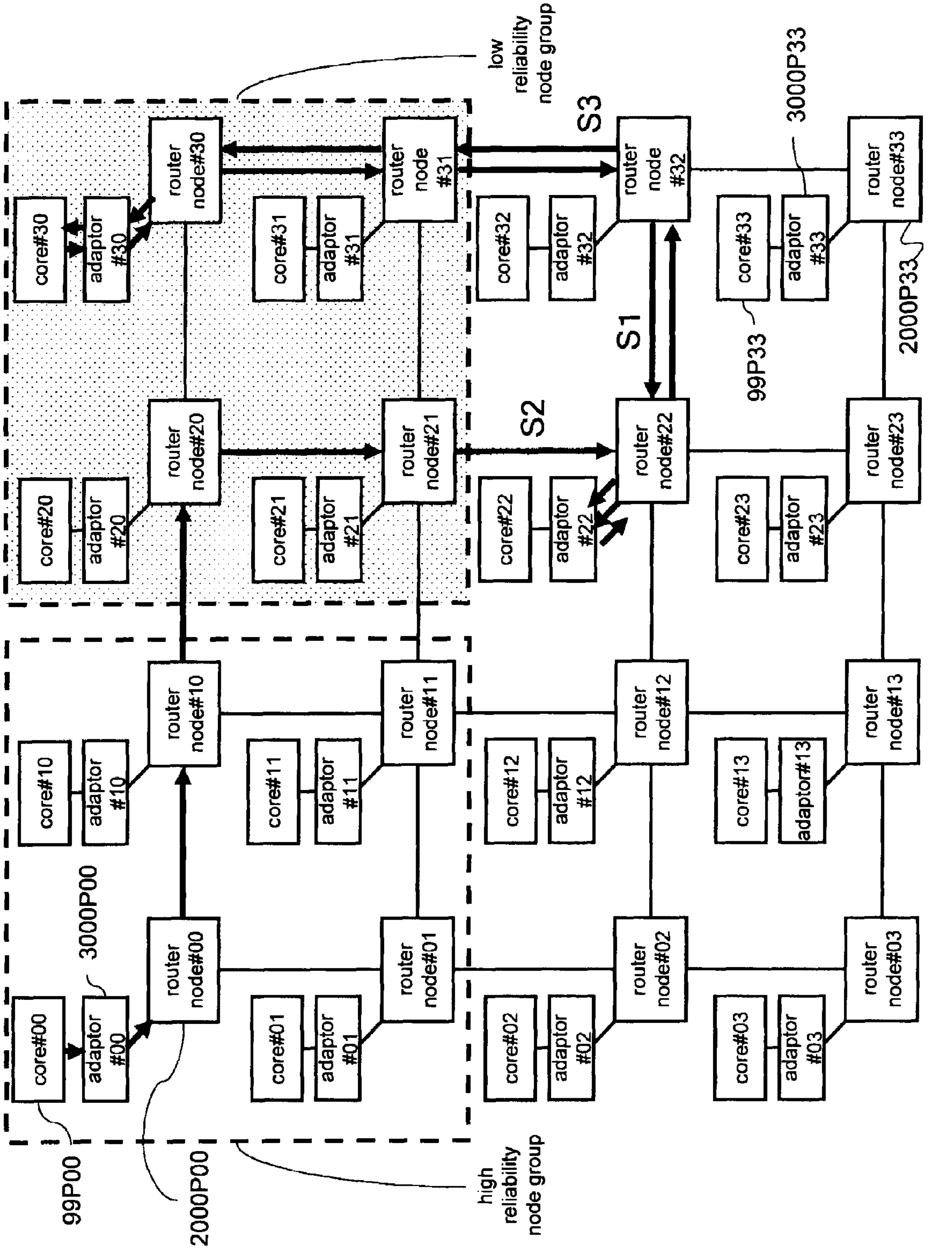
FIG. 46 is a view illustrating an example of an operation of the semiconductor integrated circuit shown in FIG. 33.

Next, an operation of a case will be described where processing of an access request is temporarily stopped so as to update the reception filter data in one adaptor and then the reception filter data is updated not to permit the adaptor to process an access request from a predetermined core. Here, processing of an access request to core 99P22 from low reliability core 99P30 is temporarily stopped, and high reliability core 99P00 inhibits the access request from core 99P30 from being processed in core 99P22 and cancels the temporary stopping of processing of the access request. FIG. 46 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core. Continuously, adaptor 3000P22 refers to reception filter data 3321, and stores the packet when it recognizes that the temporary stop bit, which indicates whether or not to process the access request, is "Yes."

Step 2 (S2): Core 99P00 delivers to adaptor 3000P00 a reception filter data update request, which is to update the reception filter data to reception filter data inhibiting processing of the access request from core 99P30 in adaptor 3000P22, and a temporary stop release request, which provides instructions to indicate cancellation of the temporary stopping of processing of the access request in adaptor 3000P22, to be written into reception filter data 3321. When adaptor 3000P00 receives the reception filter data update request and the temporary stop release request from core 99P00, it transmits to router node 2000P00 an update/temporary stop release packet having a destination of adaptor 3000P22, which provides instructions to notify inhibition of processing of the access request from core 99P00 and cancellation of the temporary stopping of processing of the access request, to be written into reception filter data 3321. Router node 2000P00 transmits the received update/temporary stop release packet to adjacent router node 2000P10. The packet transmitted from router node 2000P00 reaches router node 2000P22 through router nodes 2000P10, 2000P20 and 2000P21.

Then, router node 2000P22 delivers the update/temporary stop release packet received through the router nodes to adaptor 3000P22. Adaptor 3000P22 recognizes that the update/temporary stop release packet is to inhibit processing of the access request from core 99P30 in adaptor 3000P22 and to cancel the temporary stopping of processing of the access request. Continuously, the adaptor sets no "R" and "W" in the permission bit for router node 2000P30 connected to core 99P30 through adaptor 3000P30 and changes the state into a state inhibiting processing of the access request from core 99P30. In addition, the adaptor sets "No" in the temporary stop bit of reception filter data 3321 and cancels the temporary stop state of processing of the access request.

Step 3 (S3): Adaptor 3000P22 refers to reception filter data 3321 to recognize that the temporary stopping of processing of the access request is canceled. However, when the adaptor recognizes that processing of the access request from core 99P30 is inhibited, adaptor 3000P22 generates an error packet, which is a packet for notifying core 99P30 that the access request is not permitted and an error is caused. Continuously, the adaptor transmits the error packet to router node 2000P22. Router node 2000P22 transmits the received error packet to adjacent router node 2000P32. The error packet transmitted from router node 2000P22 reaches router node 2000P30 through a middle router node group including router nodes 2000P32 and 200P31.

Then, router node 2000P30 delivers the error packet to adaptor 3000P30, and adaptor 3000P30 converts the error packet into an access error response, which is information for notifying the core that the access request has caused an error, and delivers the response to core 99P30. In the meantime, although it has been described that the error packet is distributed in an opposite direction to the path in which the packet of the access request is distributed, the error packet may be distributed in a path different from the corresponding path.

Figure 47:
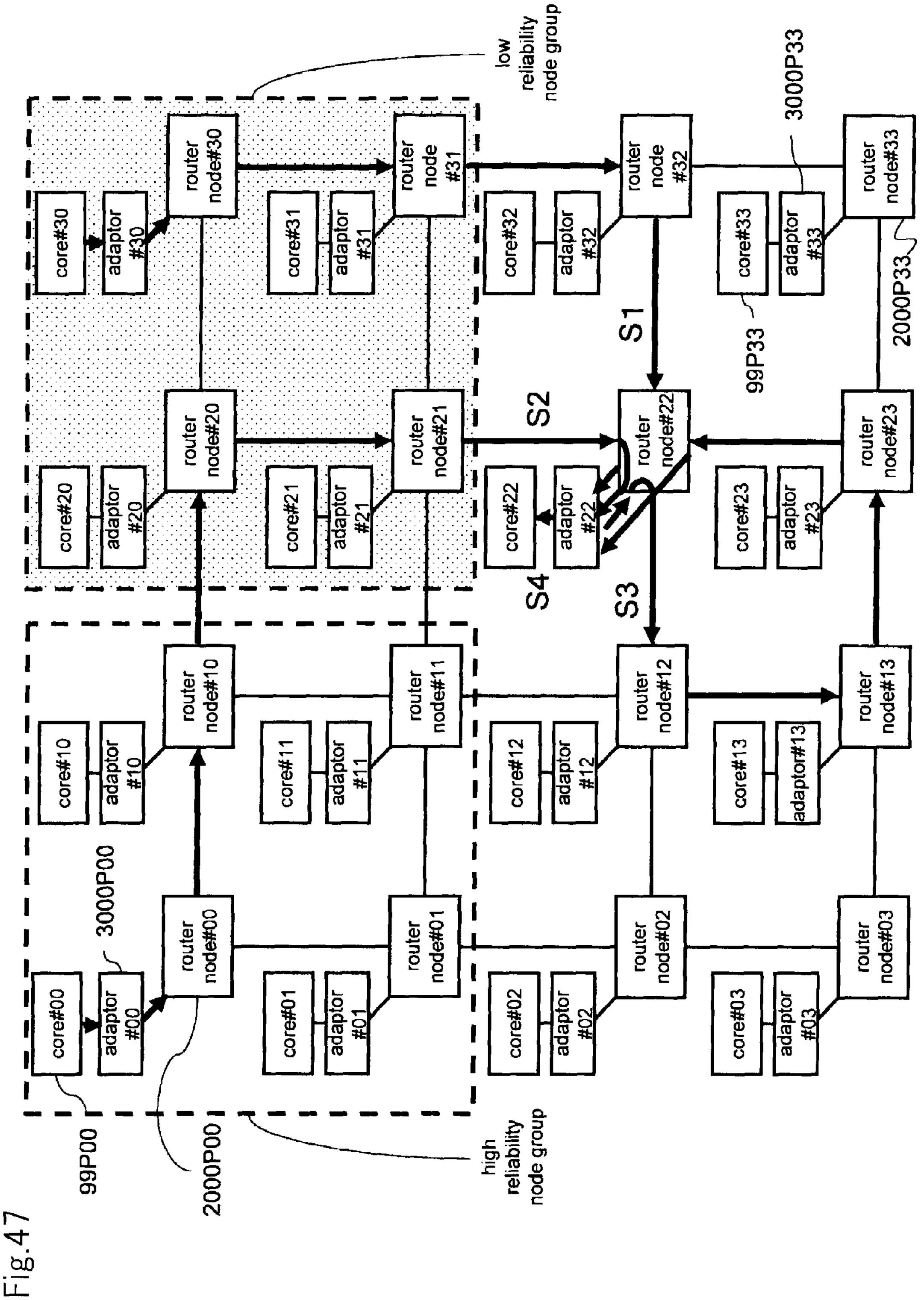
FIG. 47 is a view illustrating an example of an operation of the semiconductor integrated circuit shown in FIG. 33.

Next, for a case where processing of an access request is temporarily stopped so as to update the reception filter data in one adaptor and then the reception filter data is updated to enable the adaptor to process an access request from a predetermined core, an operation will be described that is different from the case shown in FIG. 45. Here, the adaptor does not store a packet for which the processing is temporarily stopped and transmits a packet having a destination which is the adaptor itself to the outside. FIG. 47 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core. Continuously, adaptor 3000P22 refers to reception filter data 3321. When the adaptor recognizes that the temporary stop bit, which indicates whether or not to process the access request, is "Yes," it generates a retransmission packet, which includes information of the corresponding access request and that will be transmitted to the adaptor itself, and transmits it in the interconnecting network.

Step 2 (S2): Core 99P00 delivers to adaptor 3000P00 a reception filter data update request, which is to update the reception filter data into reception filter data permitting processing of the access request from core 99P30 in adaptor 3000P22, and a temporary stop release request, which provides instructions to indicate cancellation of the temporary stopping of processing of the access request in adaptor 3000P22, to be written into reception filter data 3321. When adaptor 3000P00 receives the reception filter data update request and the temporary stop release request from core 99P00, it transmits to router node 2000P00 an update/temporary stop release packet having a destination of adaptor 3000P22, which provides instructions to indicate permission of processing of the access request from core 99P00 and cancellation of temporary stopping of processing of the access request, to be written on reception filter data 3321. Router node 2000P00 transmits the received update/temporary stop release packet to adjacent router node 2000P10. The packet transmitted from router node 2000P00 reaches router node 2000P22 through router nodes 2000P10, 2000P20 and 2000P21.

Then, router node 2000P22 delivers the update/temporary stop release packet received through the router nodes to adaptor 3000P22. Adaptor 3000P22 recognizes that the update/temporary stop release packet is to permit processing of the access request from core 99P30 in adaptor 3000P22 and to cancel the temporary stopping of processing of the access request. Continuously, the adaptor sets "R" and "W" in the permission bit for router node 2000P30 connected to core 99P30 through adaptor 3000P30 and changes the state into a state permitting processing of the access request from core 99P30. In addition, the adaptor sets "No" in the temporary stop bit of reception filter data 3321 and cancels the temporary stop state of processing of the access request.

Step 3 (S3): Adaptor 3000P22 transmits the retransmission packet generated in Step 1 to router node 2000P22 through a middle router node group including router nodes 2000P12, 2000P13 and 2000P23. Then, router node 2000P22 delivers the received retransmission packet to adaptor 3000P22.

Step 4 (S4): When adaptor 3000P22 receives the retransmission packet, it refers to reception filter data 3321. When the adaptor recognizes that processing of the access request from core 99P00 is permitted and the temporary stopping of processing of the access request is canceled, it converts the retransmission packet into an access request corresponding to a core and delivers it to core 99P22.

Figure 48:
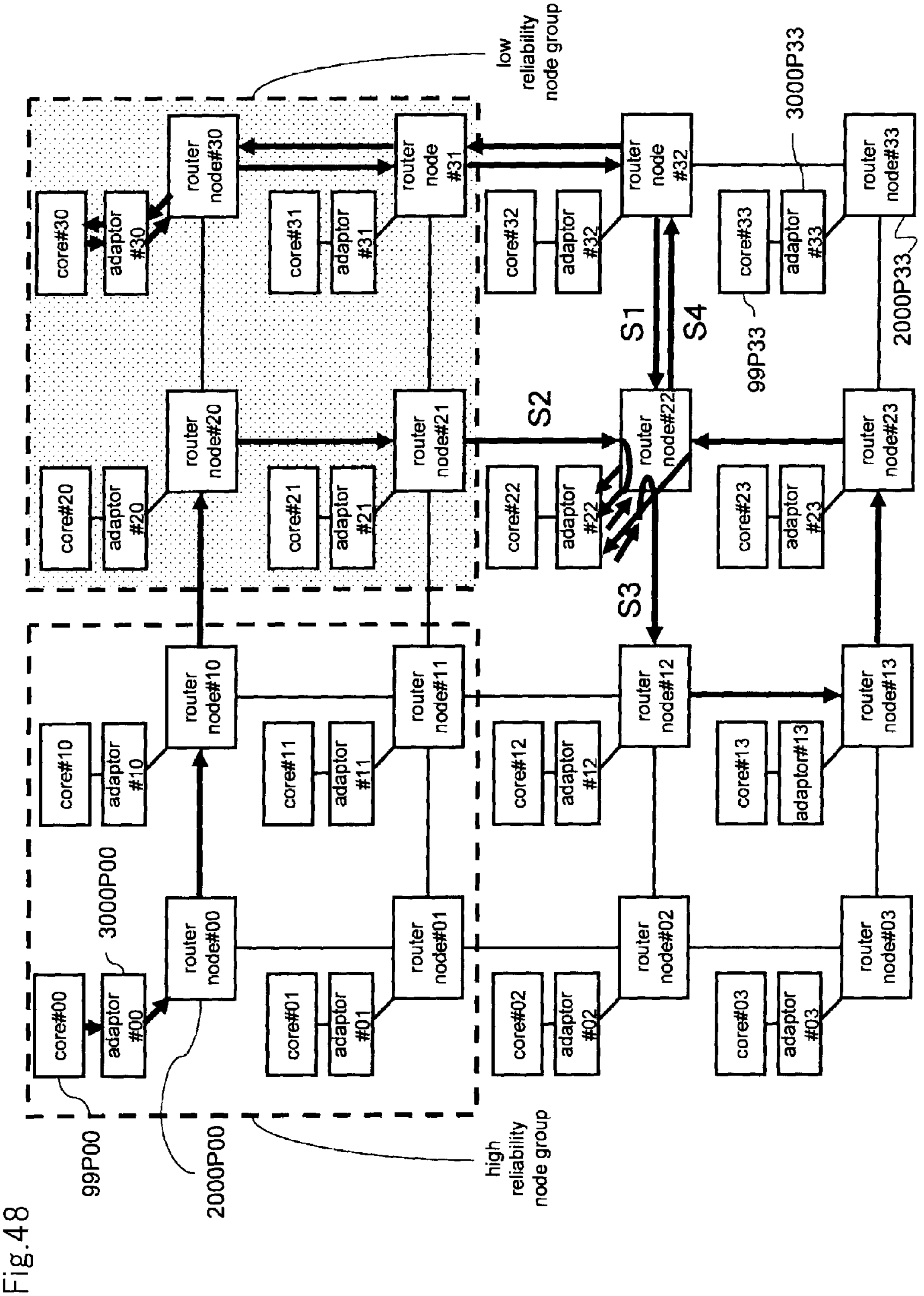
FIG. 48 is a view illustrating an example of an operation of the semiconductor integrated circuit shown in FIG. 33.

Next, for a case where processing of an access request is temporarily stopped so as to update the reception filter data in one adaptor and then when the reception filter data is updated not to permit the adaptor to process the access request from a predetermined core, an operation different from the case shown in FIG. 46 will be described. Here, the adaptor does not store a packet for which processing is temporarily stopped and transmits a packet having a destination whish is the adaptor itself to the outside. FIG. 48 is a view illustrating an example of an operation of the semiconductor integrated circuit shown in FIG. 33.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core. Continuously, adaptor 3000P22 refers to reception filter data 3321. When the adaptor recognizes that the temporary stop bit, which indicates whether or not to process the access request, is "Yes," it generates a retransmission packet, which includes information of the corresponding access request and that will be transmitted to the adaptor itself, and transmits it in the interconnecting network.

Step 2 (S2): Core 99P00 delivers to adaptor 3000P00 a reception filter data update request, which is to update the reception filter data to reception filter data inhibiting processing of the access request from core 99P30 in adaptor 3000P22, and a temporary stop release request, which provides instructions to indicate cancellation of the temporary stopping of processing of the access request in adaptor 3000P22, to be written into reception filter data 3321. When adaptor 3000P00 receives the reception filter data update request and the temporary stop release request from core 99P00, it transmits to router node 2000P00 an update/temporary stop release packet having a destination of adaptor 3000P22, which provides instructions to indicate inhibition of processing of the access request from core 99P00 and cancellation of temporary stopping of processing of the access request, to be written into reception filter data 3321. Router node 2000P00 transmits the received update/temporary stop release packet to adjacent router node 2000P10. The packet transmitted from router node 2000P00 reaches router node 2000P22 through router nodes 2000P10, 2000P20 and 2000P21.

Then, router node 2000P22 delivers the update/temporary stop release packet received through the router nodes to adaptor 3000P22. Adaptor 3000P22 recognizes that the update/temporary stop release packet is to inhibit processing of the access request from core 99P30 in adaptor 3000P22 and to cancel the temporary stopping of processing of the access request. Continuously, the adaptor sets no "R" and "W" in the permission bit for router node 2000P30 connected to core 99P30 through adaptor 3000P30 and changes the state into a state inhibiting processing of the access request from core 99P30. In addition, the adaptor sets "No" in the temporary stop bit of reception filter data 3321 and releases the temporary stop state of processing of the access request.

Step 3 (S3): Adaptor 3000P22 transmits the retransmission packet generated in Step 1 to router node 2000P22 through a middle router node group including router nodes 2000P12, 2000P13 and 2000P23. Then, router node 2000P22 delivers the received retransmission packet to adaptor 3000P22.

Step 4 (S4): When adaptor 3000P22 receives the retransmission packet, it refers to reception filter data 3321. Although the adaptor recognizes that the temporary stopping of processing of the access request is canceled, it also recognizes that processing of the access request from core 99P00 is inhibited. Then, adaptor 3000P22 generates an error packet, which is a packet for notifying core 99P30 that the access request is not permitted and an error is caused. Continuously, the adaptor transmits the error packet to router node 2000P22. Router node 2000P22 transmits the received error packet to adjacent router node 2000P32. The error packet transmitted from router node 2000P22 reaches router node 2000P30 through a middle router node group including router nodes 2000P32 and 2000P31.

Then, router node 2000P30 delivers the error packet to adaptor 3000P30, and adaptor 3000P30 converts the error packet into an access error response, which is information for notifying the core that the access request has caused an error, and delivers the response to core 99P30. In the meantime, although it has been described that the error packet is distributed in opposite direction to the path in which the packet of the access request is distributed, the error packet may be distributed in a path different from the corresponding path.

In this exemplary embodiment, regarding the access request from the core, each of the adaptors in the interconnecting network controls the delivery of the access request in accordance with the delivery information.

In addition, when updating the delivery information, the instruction of the temporary stopping of processing of the access request and the instructions of the update of the reception filter data and the cancellation of the temporary stopping of processing of the access request are simultaneously made from a predetermined core, with respect to the adaptors in the interconnecting network. Processing of the access request in each adaptor is temporarily stopped, so that it is possible to consistently update the filter setting over the entire interconnecting network.

According to the invention, for a semiconductor integrated circuit connecting a plurality of CPUs by a bus connection and a semiconductor integrated circuit connecting a plurality of CPUs by an interconnecting network, even when there is a danger that a program, that is to be newly added, such as download program, may contain computer virus, it is possible to enable a low reliability CPU from among CPUs which are grouped into high and low reliability CPUs, to execute the program by updating the filter data. When the newly added program is authenticated, the filter data may be updated to enable the high reliability CPU to execute the program. Like this, even when a new program or data is added, it is possible to increase security by setting which group of high and low reliability CPUs will execute the program or data depending on the reliability of the program or data and thus performing CPU separating control.

Furthermore, in the interconnecting network, it is possible to dynamically change the setting of the CPU separating control depending on the security policy. As a result, it is possible to realize a more flexible system structure.

Meanwhile, the other structure of the interconnecting network will be considered. Hereinafter, the other examples of the structure will be described.

Figure 49:
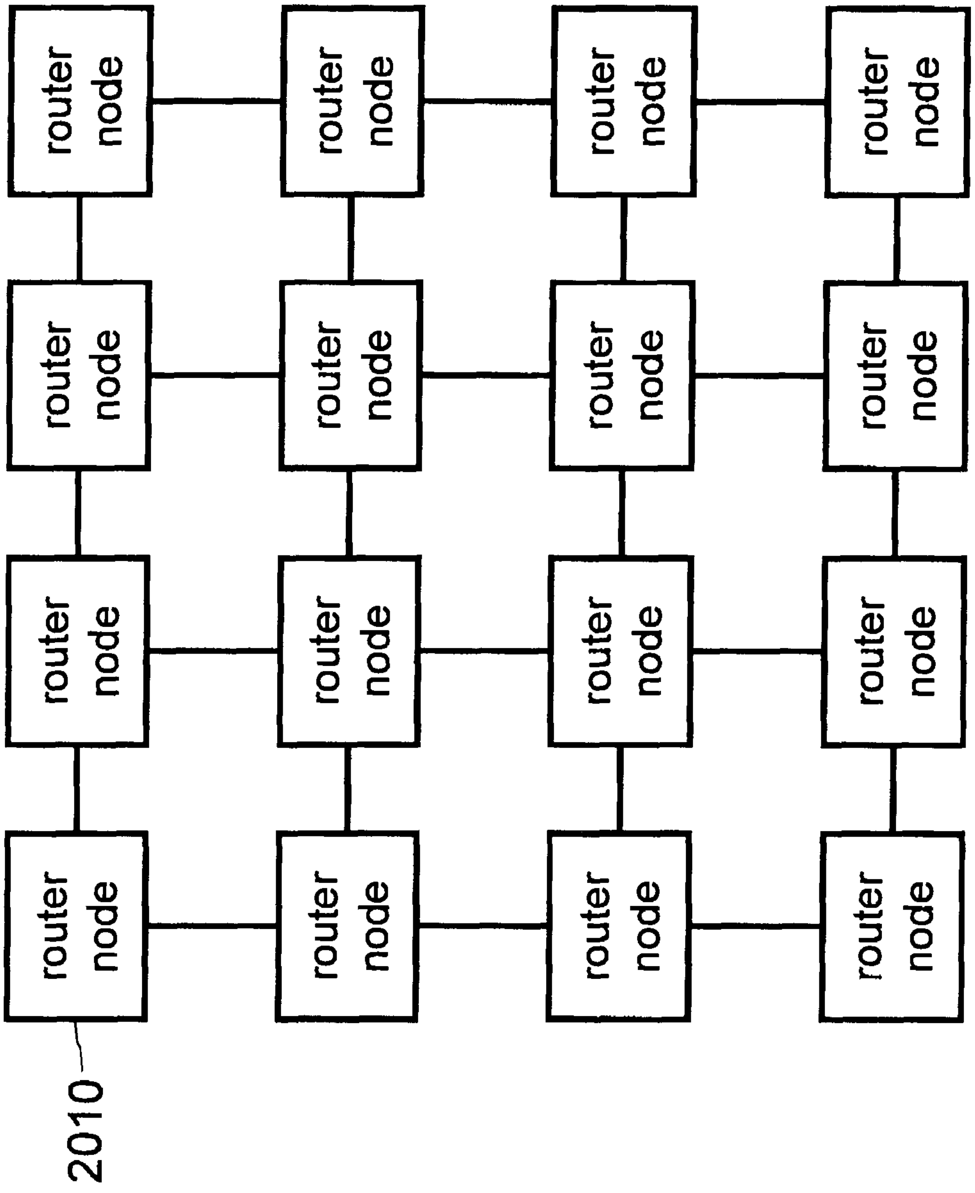
FIG. 49 is a view showing an example of a structure of an interconnecting network.

FIG. 49 is a view showing an example of a structure of an interconnecting network. The interconnecting network shown in FIG. 49 has the same structure as that of the semiconductor integrated circuit shown in FIG. 33. Here, 16 (sixteen) router nodes 2010 are connected in a mesh structure.

Figure 50:
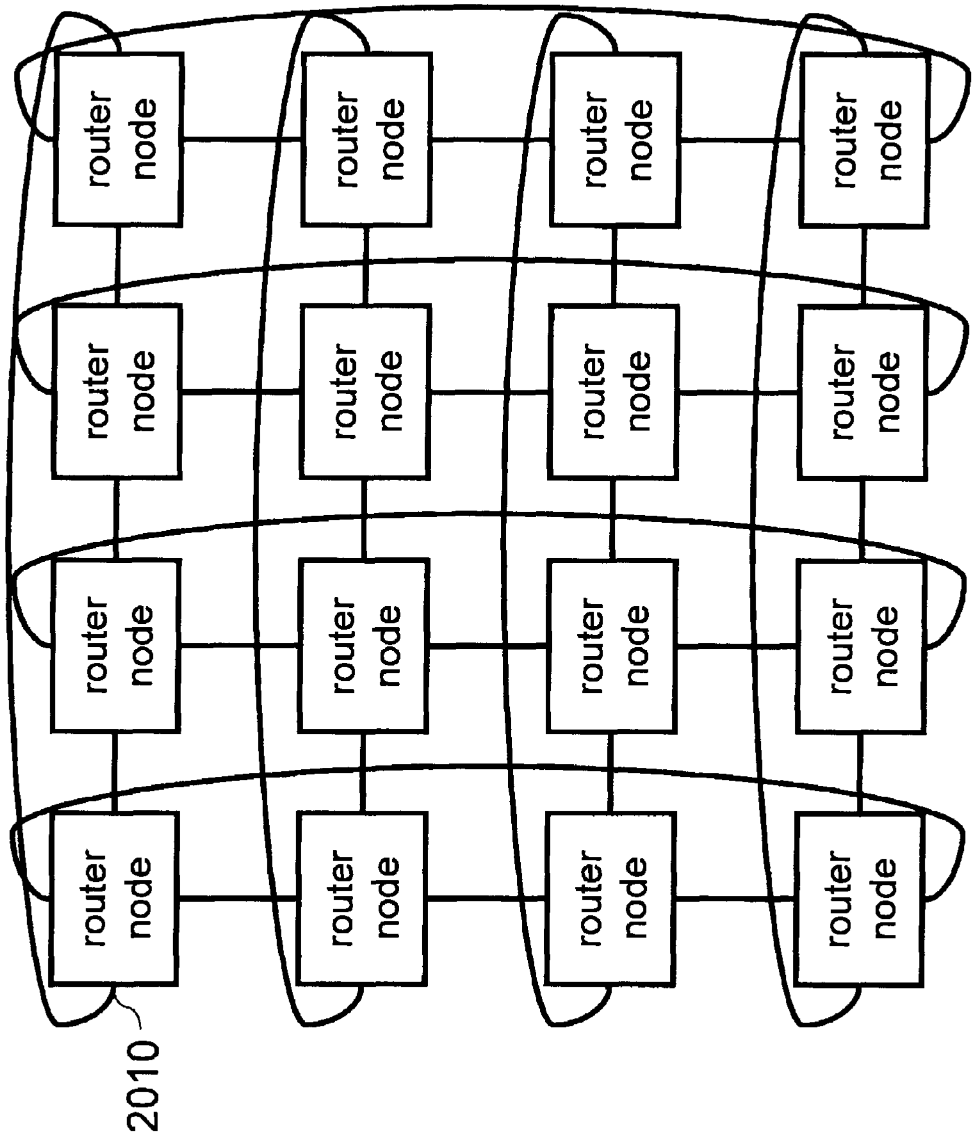
FIG. 50 is a view showing another example of an interconnecting network.
Figure 51:
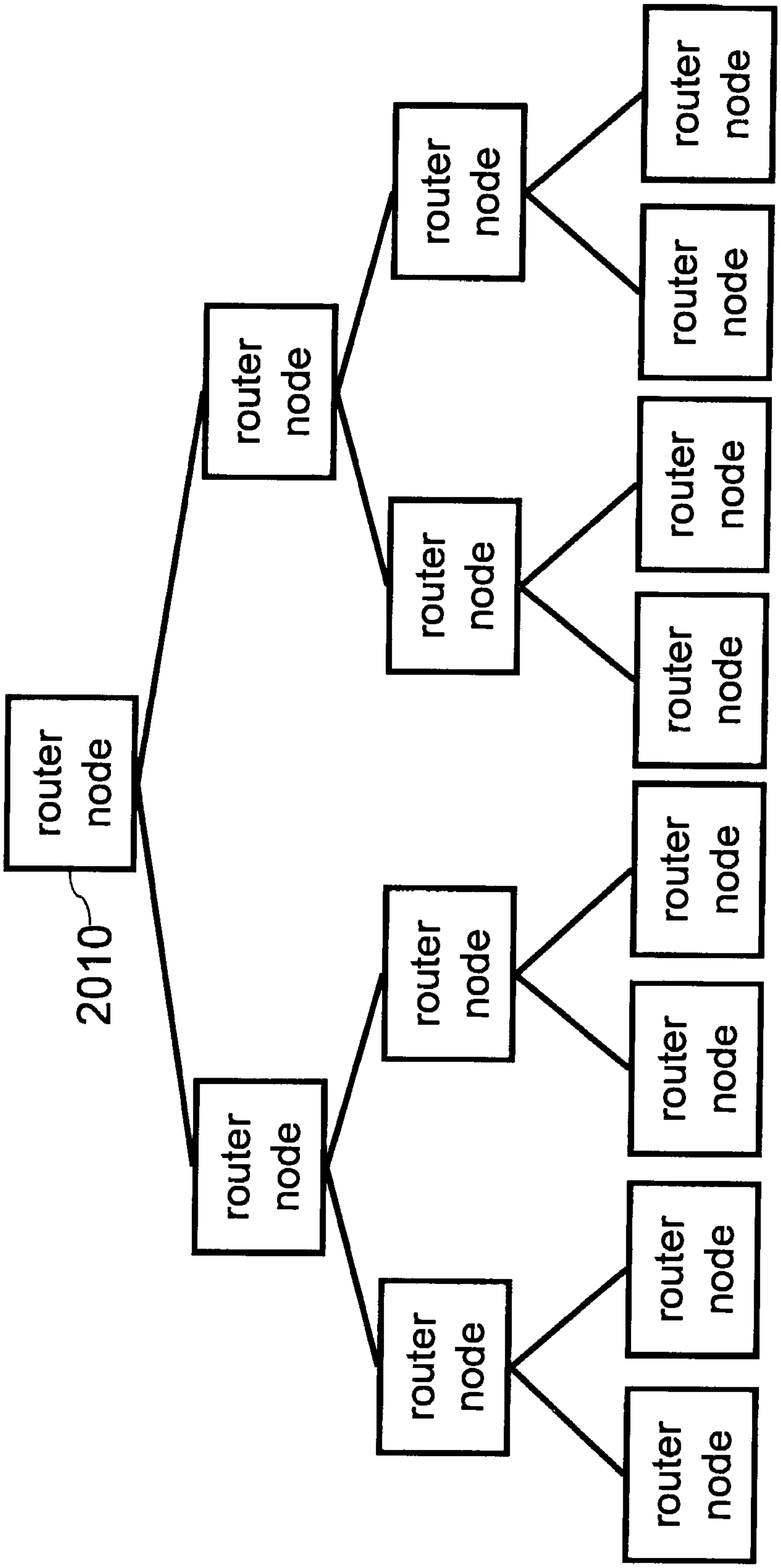
FIG. 51 is a view showing another example of an interconnecting network.

FIG. 50 is a view showing another example of an interconnecting network. Referring to FIG. 50, 16 (sixteen) router nodes 2010 are connected in a torus structure. FIG. 51 is a view showing another example of an interconnecting network. Referring to FIG. 51, 15 (fifteen) router nodes 2010 are connected in a tree structure.

As shown in FIGS. 49, 50 and 51, the interconnecting network having various topologies may be used.

Figure 52:
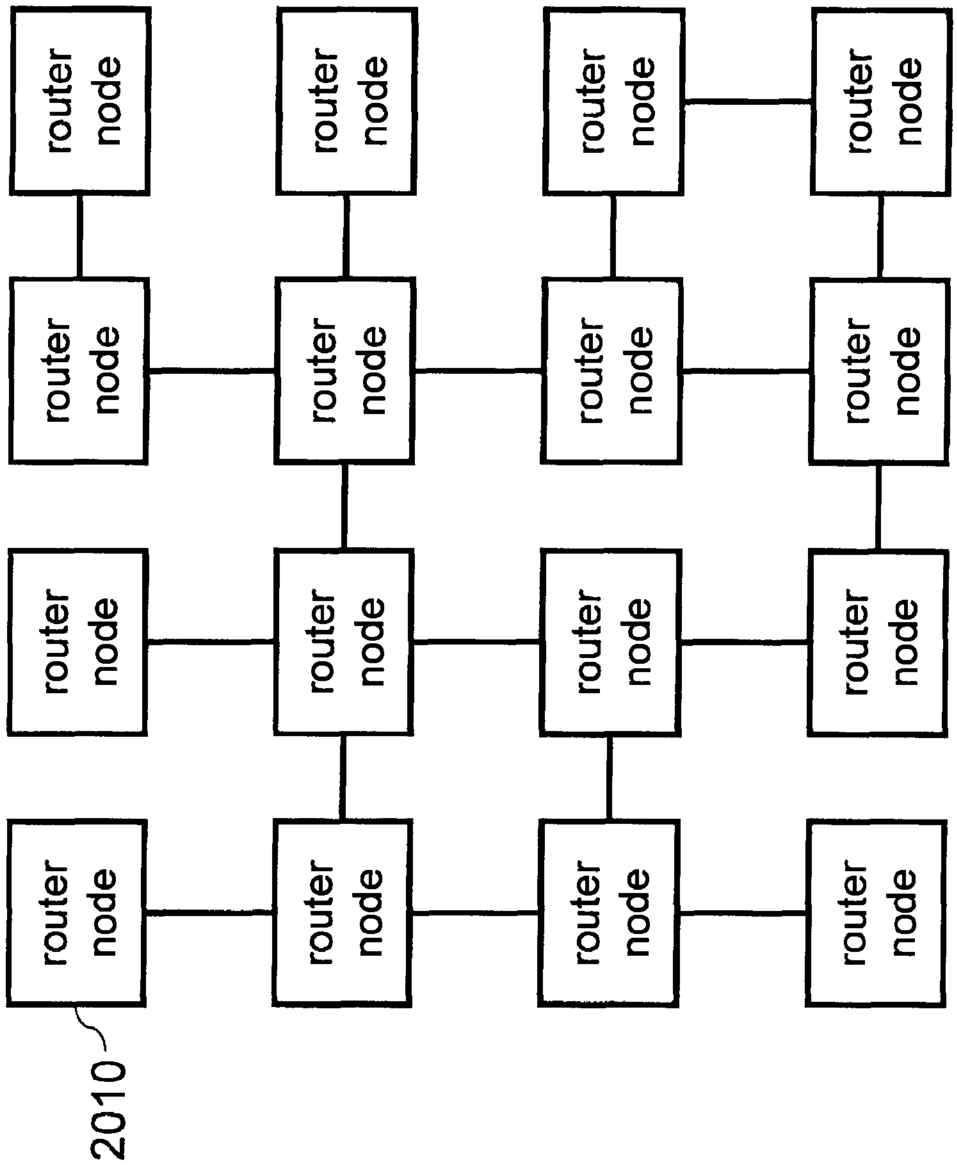
FIG. 52 is a view showing another example of an interconnecting network.

FIG. 52 is a view showing another example of an interconnecting network. Referring to FIG. 52, 16 (sixteen) router nodes 2010 are arranged to form a mesh structure, as the case shown in FIG. 49. However, the links between some router nodes are not connected. In this way, an interconnecting network having an irregular topology may be used.

Figure 53:
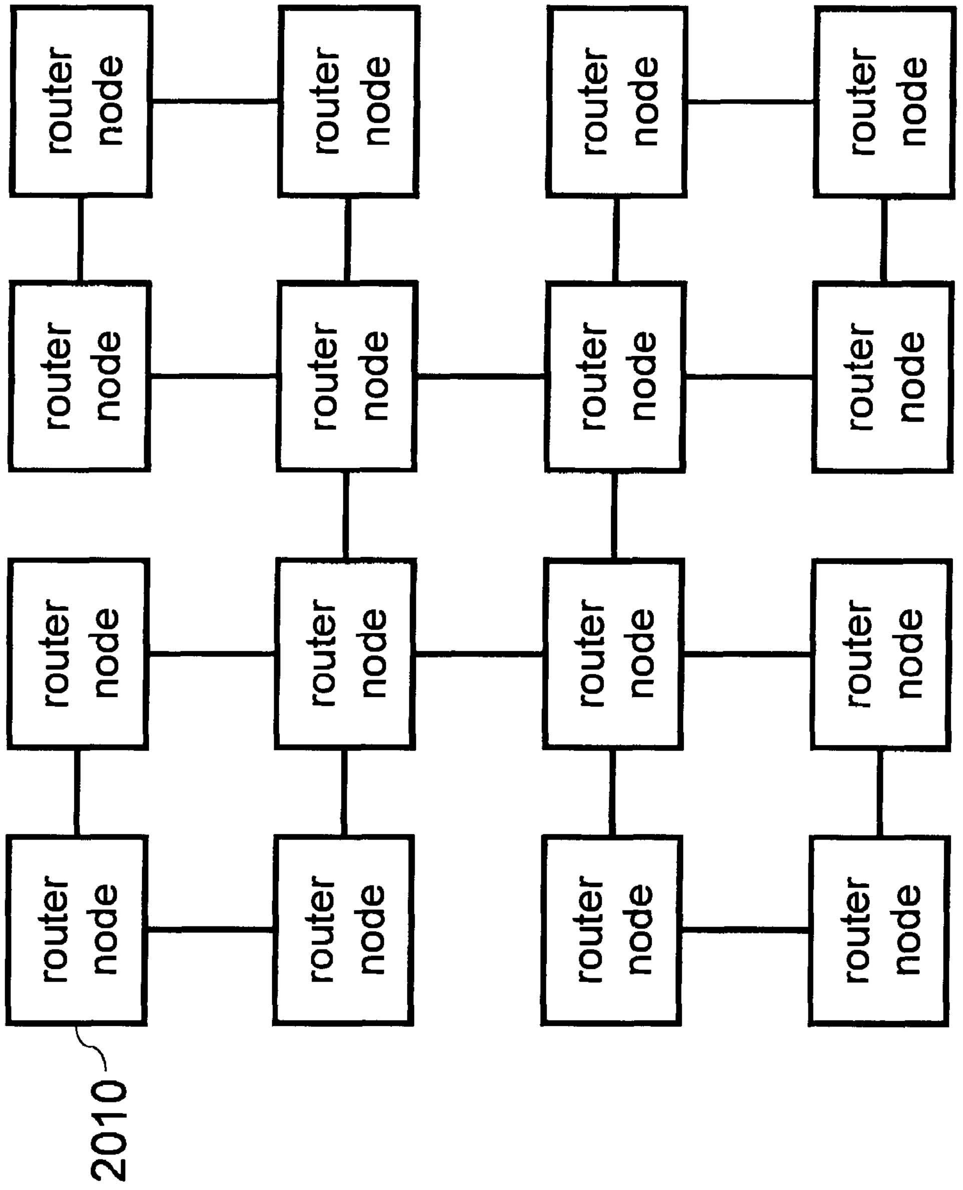
FIG. 53 is a view showing another example of an interconnecting network.

FIG. 53 is a view showing another example of an interconnecting network. Referring to FIG. 53, 16 (sixteen) router nodes 2010 are divided into four groups by ring-connecting four router nodes to form one group. Furthermore, the four groups are ring-connected. In this way, an interconnecting network having a hierarchical topology may be used.

The connection manners of the router nodes are not limited to the above examples. In other words, a bus or switch connecting manner may be combined with the above examples.

Second Exemplary Embodiment

In the first exemplary embodiment, the reception side of the adaptor controls the access request. However, in this exemplary embodiment, the transmission side of the adaptor controls the access request. In the following, since the structures, except the adaptor filter control means, are same as those of the first exemplary embodiment, detailed explanations thereof will be omitted.

Figure 54:
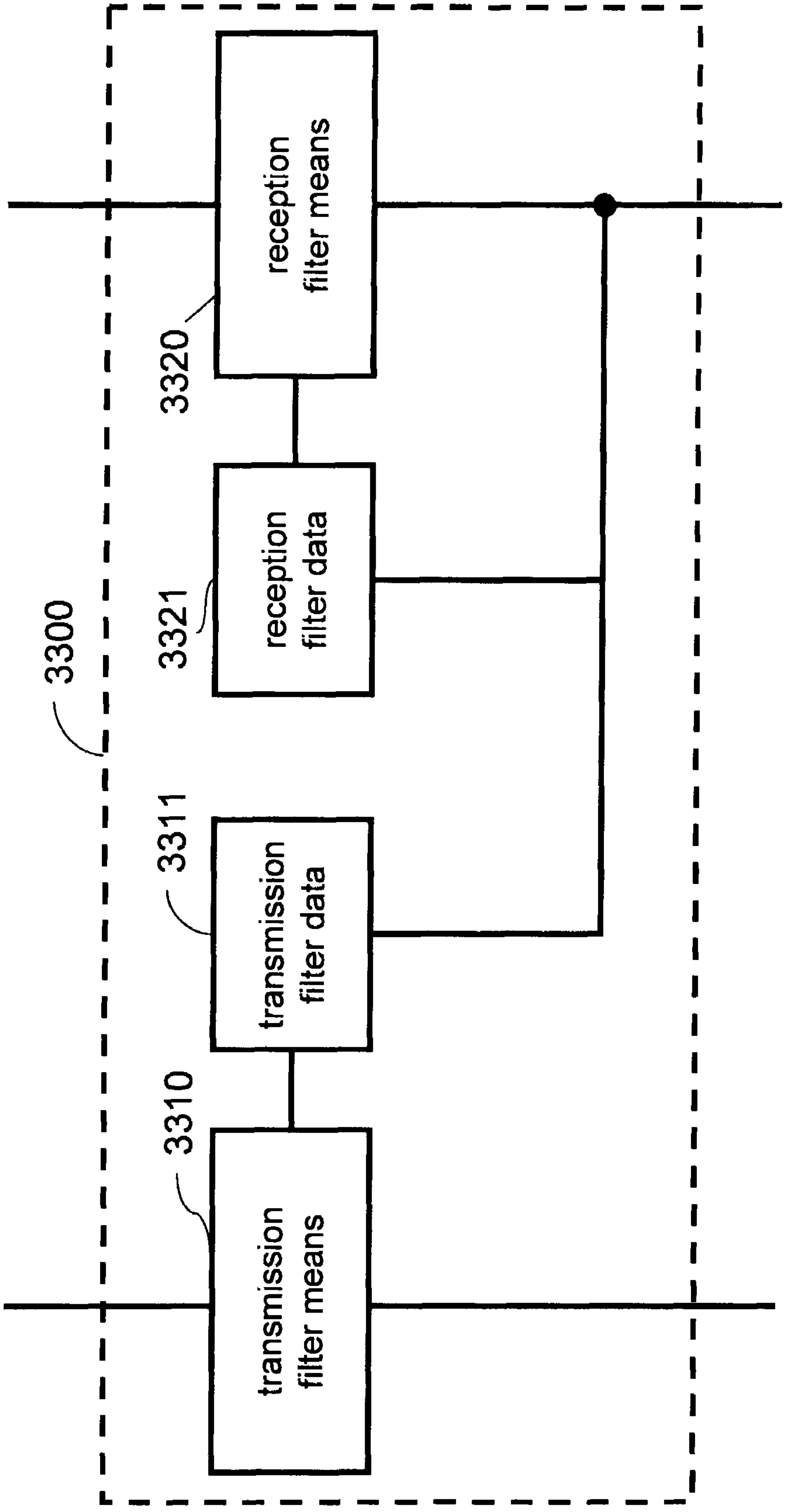
FIG. 54 is a view showing an example of a structure of adaptor filter control means according to a second exemplary embodiment.

A structure of adaptor filter control means 3300 of adaptor 3000 shown in FIG. 17, in accordance with this exemplary embodiment will be described. FIG. 54 is a view showing an example of a structure of adaptor filter control means 3300 according to this exemplary embodiment.

Referring to FIG. 54, adaptor filter control means 3300 comprises reception filter means 3320 that determines whether or not to process an access request from the outside to a core connected to the means and whether or not to temporarily stop processing of the access request, reception filter data 3321 that is information to be used for the determination, transmission filter means 3310 that determines whether or not to transmit to the outside an access request received from a core connected to the means and whether or not to temporarily stop processing of the access request and transmission filter data 3311 that is information to be used for the determination. Reception filter data 3321 and transmission filter data 3311 are stored in storage means (not shown).

Transmission filter means 3310 determines whether or not to transmit to the outside an access request received from a core 99 connected to the means and whether or not to temporarily stop processing of the access request. When the transmission filter means does not transmit the access request, it notifies core 99 of the information. When the transmission filter means transmits the access request, it delivers the access request to packet transmitting means 3100.

Next, transmission filter data 3311 will be described. FIG. 55 is a view showing an example of a structure of transmission filter data 3321. Here, it is exemplified that the core connected to adaptor 3000 is a CPU and the router node connected to adaptor 3000 is the router node #2 shown in the table of FIG. 19(*b*).

Transmission filter data 3311 of FIG. 55 shows that the access request from the CPU is permitted for which type of request within which range, with respect to the memory connected to the adaptor that stores the reception filter data shown in FIG. 19(*b*). Referring to FIG. 55, there is provided an entry that is a set of divided memory areas, a "permission bit" indicating a type of an access request permitted and a "temporary stop bit" indicating whether or not to temporarily stop processing of an access request. In the followings, the contents in the table will be specifically described.

For a high reliability area having an address range of 0x00000000~0x10000000, the permission bit is "R," so that an access request for reading is permitted. Since the temporary stop bit is "No," when there is an access request to the high reliability area from the CPU, it is not necessary to temporarily stop processing of the access request. For a low reliability area having an address range of 0x10000000~0x20000000, the permission bit is "R" and "W," so that access requests for reading and writing are permitted. Since the temporary stop bit is "No," it is not necessary to temporarily stop processing of an access request to the low reliability area from the CPU, like the high reliability area.

Here, it is assumed that it is not possible to directly update the transmission filter data of an adaptor storing it from the core itself connected to the adaptor. The information of transmission filter data 3311 is updated by re-writing new data that is generated in application software that is to be executed in a core in the high reliability or data that is read out from a file in which setting change information has been previously described. A specific example of updating transmission filter data 3321 will be described below. The update is made when it is necessary to change the range of the high reliability area in accordance with the entire conditions or situations of a semiconductor integrated circuit, like the update of the reception filter data.

In the meantime, it may be possible that only when a condition corresponds to a predetermined condition that has been already set as a semiconductor integrated circuit, a part or all of the transmission filter data of an adaptor, which stores the data therein, is updated from a core itself connected to the adaptor. In this case, it is not necessary to wait for reception of new data for updating the transmission filter data from the high reliability core.

Meanwhile, a case has been described where the access request to one memory is made. However, when there is a plurality of memories each of which is an access request destination, data that includes the entire table shown in FIG. 55 is previously registered as transmission filter data 3311 in adaptor 3000, for each of the memories. However, the invention is not limited to the case where the data is previously registered. In other words, when a memory of an access request destination is changed or newly added, the transmission filter data may be updated correspondingly to the changed content. The information of the transmission destination of the access request, the memory area and the type of the access request corresponds to the delivery information that is a condition for processing.

In addition, transmission filter data 3311 shown in FIG. 55 may be stored in each adaptor 3000, instead of the reception filter data shown in FIG. 19. In this case, since the access control is performed in the access request transmitting side, it is not necessary for reception filter means 3320 of each adaptor 3000 to determine whether or not to respond to an access request received from the outside. Thus, the load of the processing of the adaptor in the access request receiving side is reduced.

Additionally, transmission filter data 3311 is not limited to the table type as shown in FIG. 55. In other words, any type of transmission filter data may be possible as long as transmission filter means 3310 can read the data and control the access in accordance with the read information.

Figure 56:
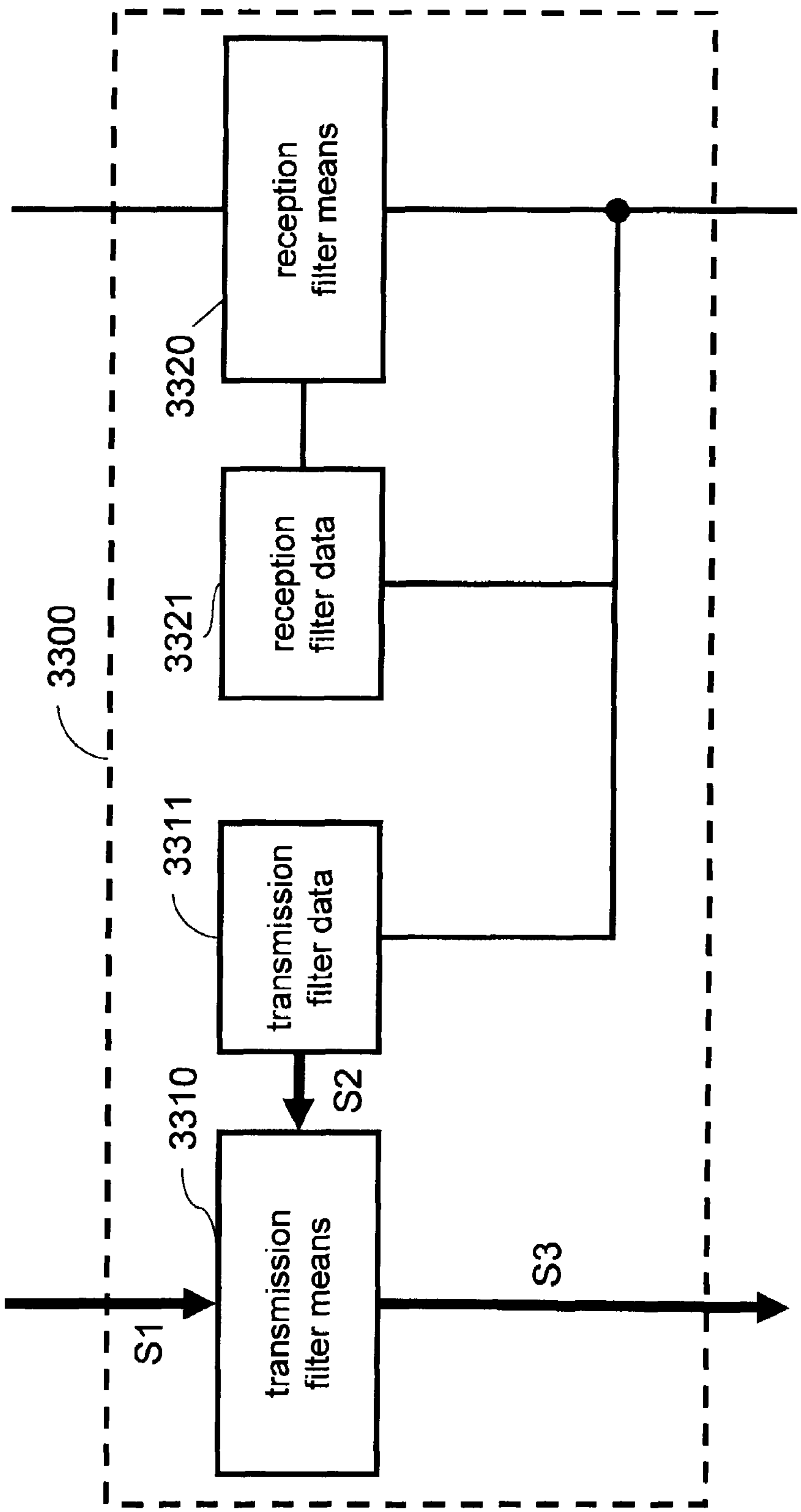
FIG. 56 is a view illustrating an example of an operation of the adaptor filter control means shown in FIG. 54.

Next, an operation will be described in which adaptor filter control means 3300 receives an access request and permits transmission of the access request. FIG. 56 is a view illustrating an example of an operation of adaptor filter control means 3300 shown in FIG. 54.

Step 1 (S1): Transmission filter means 3310 receives an access request from core 99 connected to adaptor 3000 to which the transmission filter means belongs. Step 2 (S2): Transmission filter means 3310 reads out transmission filter data 3311 and determines whether the access request can be transmitted to the outside, based on the read information. As a result, the transmission filter means recognizes that it is not necessary to temporarily stop processing of the access request and the access request can be transmitted. Step 3 (S3): Transmission filter means 3310 delivers the access request to packet transmitting means 3100.

Figure 57:
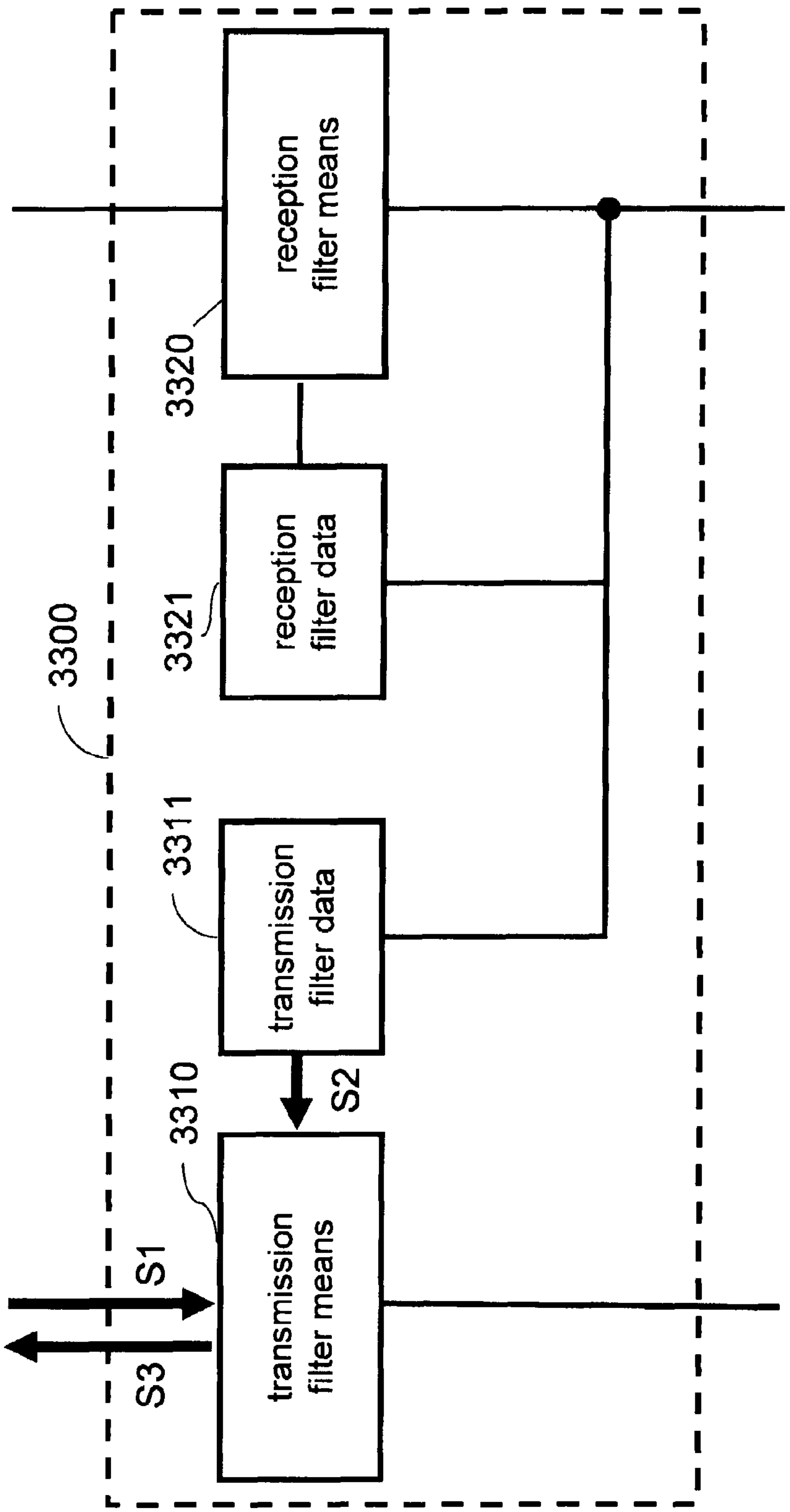
FIG. 57 is a view illustrating an example of an operation of the adaptor filter control means shown in FIG. 54.

Next, an operation will be described in which adaptor filter control means 3300 receives an access request and denies transmission of the access request. FIG. 57 is a view illustrating an example of an operation of adaptor filter control means 3300 shown in FIG. 54.

Step 1 (S1): Transmission filter means 3310 receives an access request from core 99 connected to adaptor 3000 to which the transmission filter means belongs. Step 2 (S2): Transmission filter means 3310 reads out transmission filter data 3311 and determines whether the access request can be transmitted to the outside, based on the read information. As a result, the transmission filter means recognizes that transmission of the access request is inhibited. Step 3 (S3): Transmission filter means 3310 delivers an access error response to core 99 so as to notify that the access request cannot be transmitted.

Figure 58:
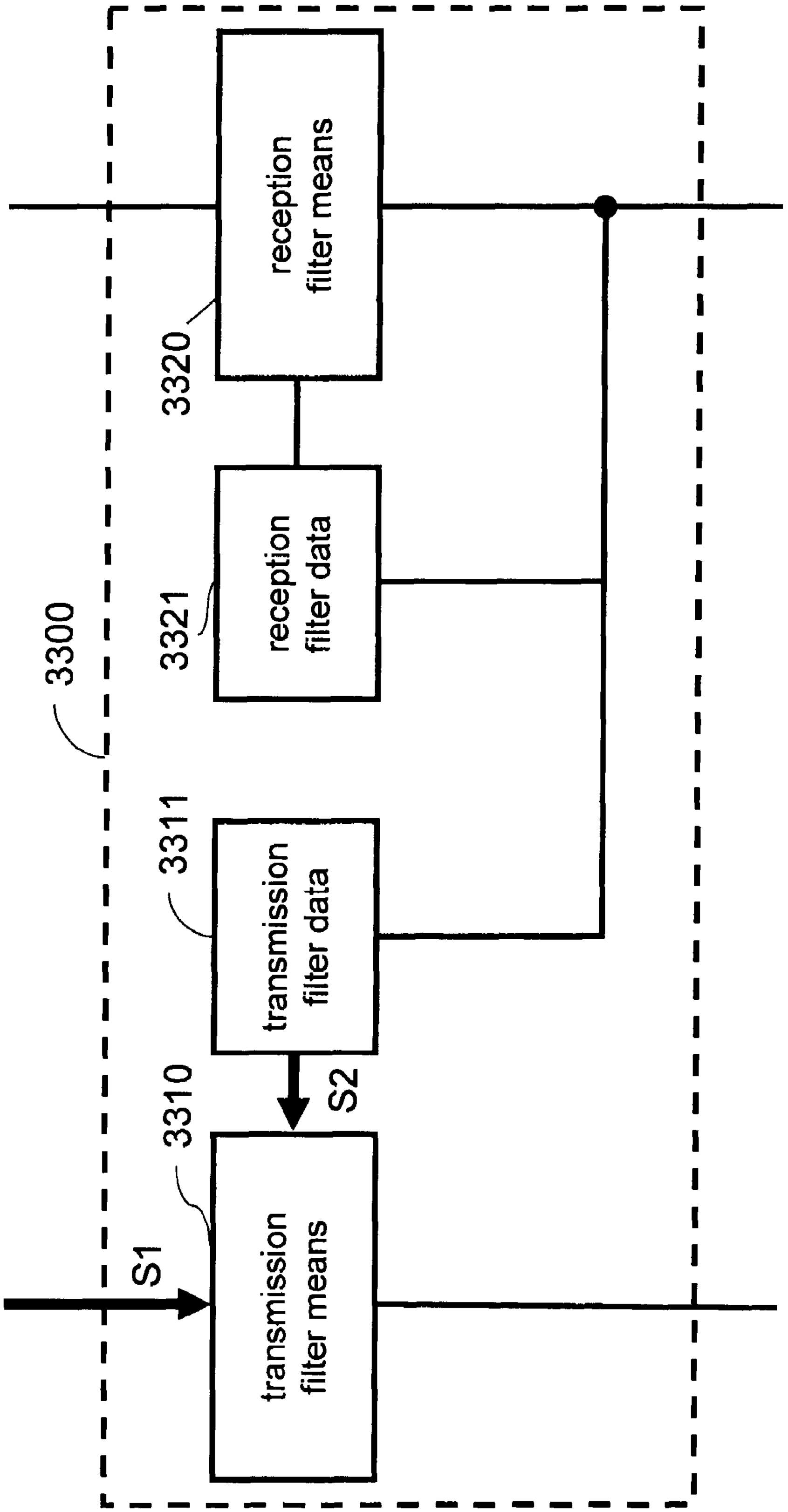
FIG. 58 is a view illustrating an example of an operation of the adaptor filter control means shown in FIG. 54.

Next, an operation will be described in which adaptor filter control means 3300 receives an access request and temporarily stops processing of the access request. FIG. 58 is a view illustrating an example of an operation of adaptor filter control means 3300 shown in FIG. 54.

Step 1 (S1): Transmission filter means 3310 receives an access request from core 99 connected to adaptor 3000 to which the transmission filter means belongs. Step 2 (S2): Transmission filter means 3310 reads out transmission filter data 3311 and determines whether the access request can be transmitted to the outside, based on the read information. As a result, the transmission filter means recognizes that it is necessary to temporarily stop processing of the access request. Transmission filter means 3310 holds the access request until the temporary stop state is released.

Figure 59:
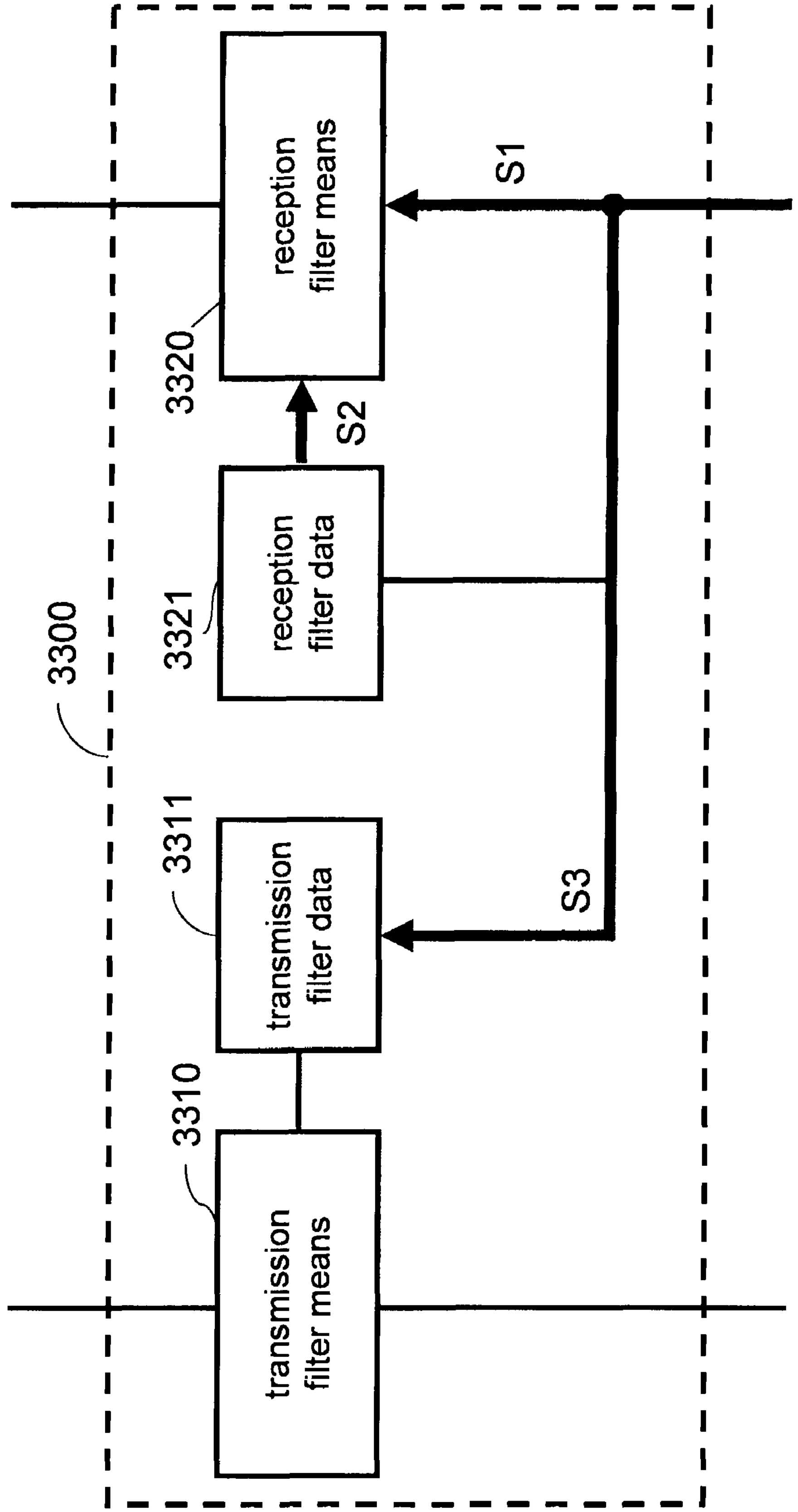
FIG. 59 is a view illustrating an example of an operation of the adaptor filter control means shown in FIG. 54.

Next, an operation will be described in which adaptor filter control means 3300 updates transmission filter data 3311. FIG. 59 is a view illustrating an example of an operation of adaptor filter control means 3311 shown in FIG. 54. New data for updating transmission filter data 3311 is inputted from router node 2000. A specific example of a method for inputting the new data will be described below.

Step 1 (S1): Reception filter means 3320 receives an access request for writing new data to transmission filter data 3311 from packet receiving means 3200. Step 2 (S2): Reception filter means 3320 reads out reception filter data 3321 and determines that the access request may be processed on the basis of the read information. Step 3 (S3): When reception filter means 3320 recognizes that the access request is to update the transmission filter data, it reads out new data from the access request without temporarily stopping the processing thereof. The reception filter means writes the read new data to transmission filter data 3311. By doing so, transmission filter data 3311 is updated.

Here, when updating transmission filter data 3311, reception filter means 3320 performs the access control of the data for update that is received from the outside. However, the invention is not limited to reception filter means 3320. In other words, another circuit that is equivalent to reception filter means 3320 and that can perform access control such as transmission filter means 3310 may execute the above process.

Figure 60:
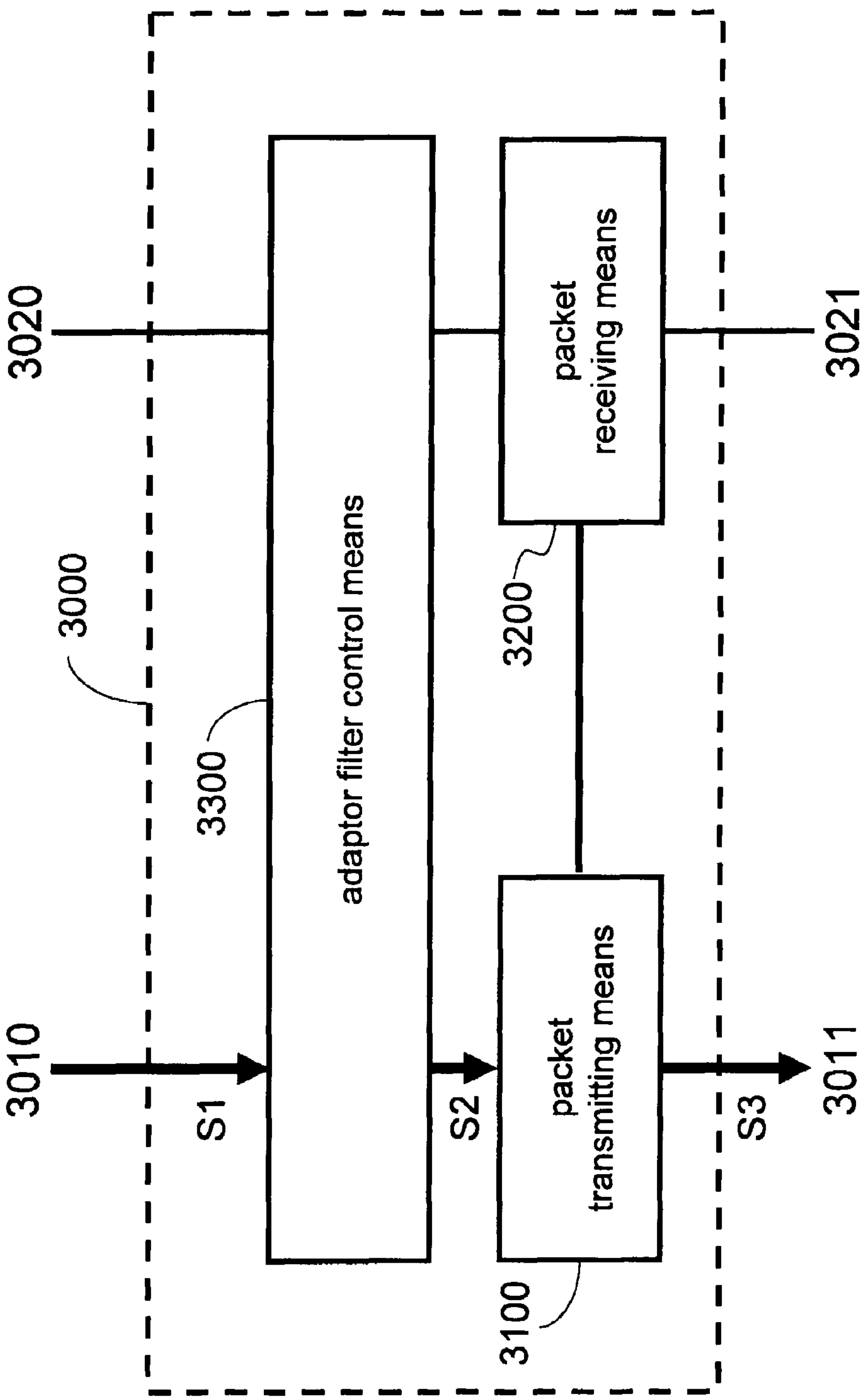
FIG. 60 is a view illustrating an example of an internal operation of an adaptor having the adaptor filter control means shown in FIG. 54.

Next, an internal operation of adaptor 3000 will be described when there is an access request from core 99 connected to adaptor 3000 and transmission of the access request is permitted. FIG. 60 is a view illustrating an example of an internal operation of adaptor 3000 having adaptor filter control means 3300 shown in FIG. 54.

Step 1 (S1): Adaptor filter control means 3300 receives an access request from core 99. Step 2 (S2): Adaptor filter control means 3300 refers to transmission filter data 3311 to determine whether or not to transmit the received access request and to temporarily stop processing thereof. When it is determined that the transmission of the access request has been permitted, the adaptor filter control means delivers the access request to packet transmitting means 3100. Step 3 (S3): Packet transmitting means 3100 converts the access request into a packet and transmits the packet to router node 2000.

Figure 61:
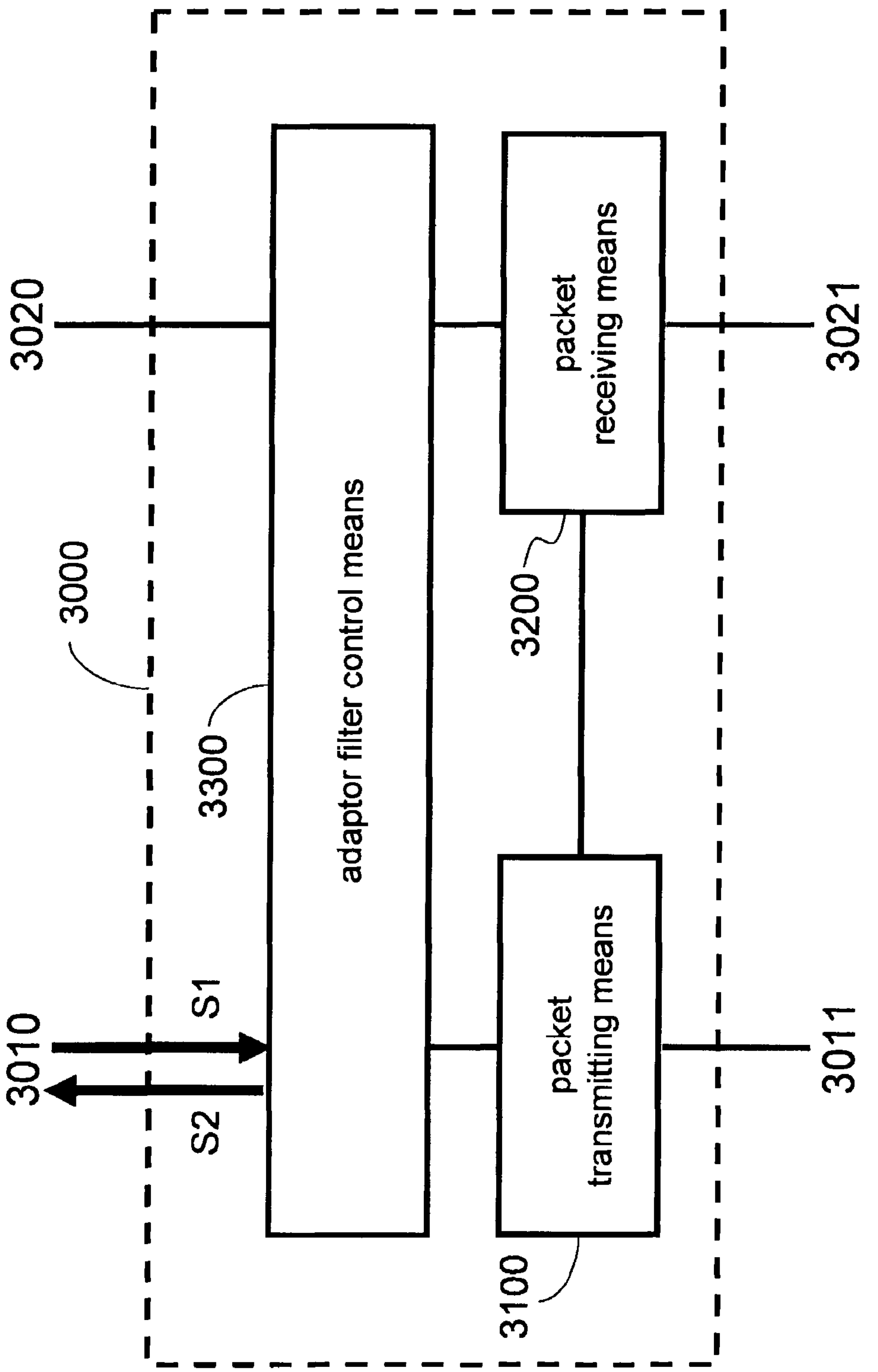
FIG. 61 is a view illustrating an example of an internal operation of an adaptor having the adaptor filter control means shown in FIG. 54.

Next, an internal operation of adaptor 3000 will be described when there is an access request from core 99 connected to adaptor 3000 and transmission of the access request is not permitted. FIG. 61 is a view illustrating an example of an internal operation of adaptor 3000 having adaptor filter control means 3300 shown in FIG. 54.

Step 1 (S1): Adaptor filter control means 3300 receives an access request from core 99. Step 2 (S2): Adaptor filter control means 3300 refers to transmission filter data 3311 to determine whether or not to transmit the received access request and to temporarily stop processing thereof. When it is determined that the transmission of the access request has not been permitted, the adaptor filter control means delivers an access error response to core 99 so as to notify that the access request cannot be transmitted.

Figure 62:
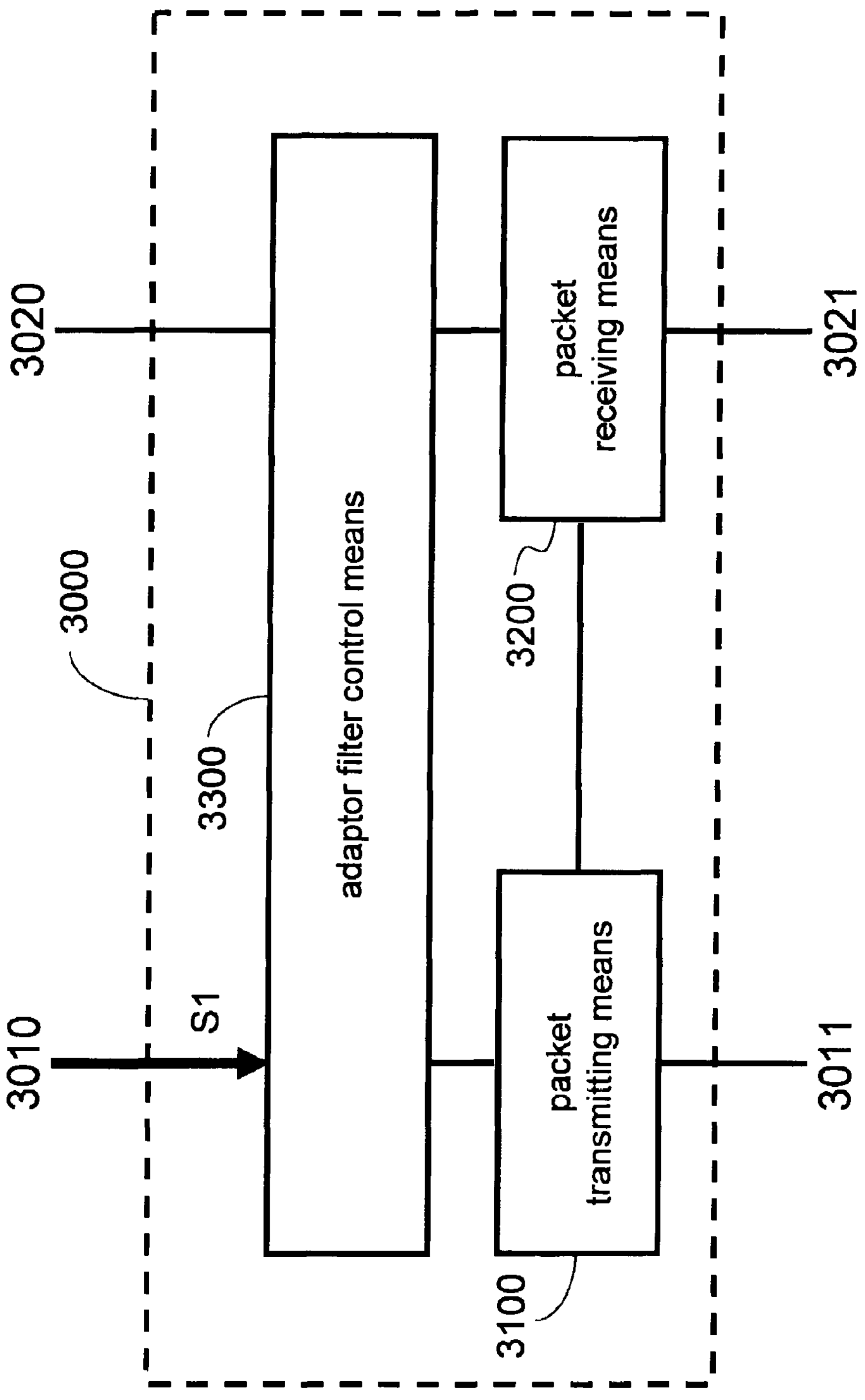
FIG. 62 is a view illustrating an example of an internal operation of an adaptor having the adaptor filter control means shown in FIG. 54.

Next, an internal operation of adaptor 3000 will be described when there is an access request from core 99 connected to adaptor 3000 and processing of the access request is temporarily stopped. FIG. 62 is a view illustrating an example of an internal operation of adaptor 3000 having adaptor filter control means 3300 shown in FIG. 54.

Step 1 (S1): Adaptor filter control means 3300 receives an access request from core 99. Step 2 (S2): Adaptor filter control means 3300 refers to transmission filter data 3311 to determine whether or not to transmit the received access request and to temporarily stop processing thereof. When it is determined that it is necessary to temporarily stop processing of the access request, the adaptor filter control means maintains the access request.

Figure 63:
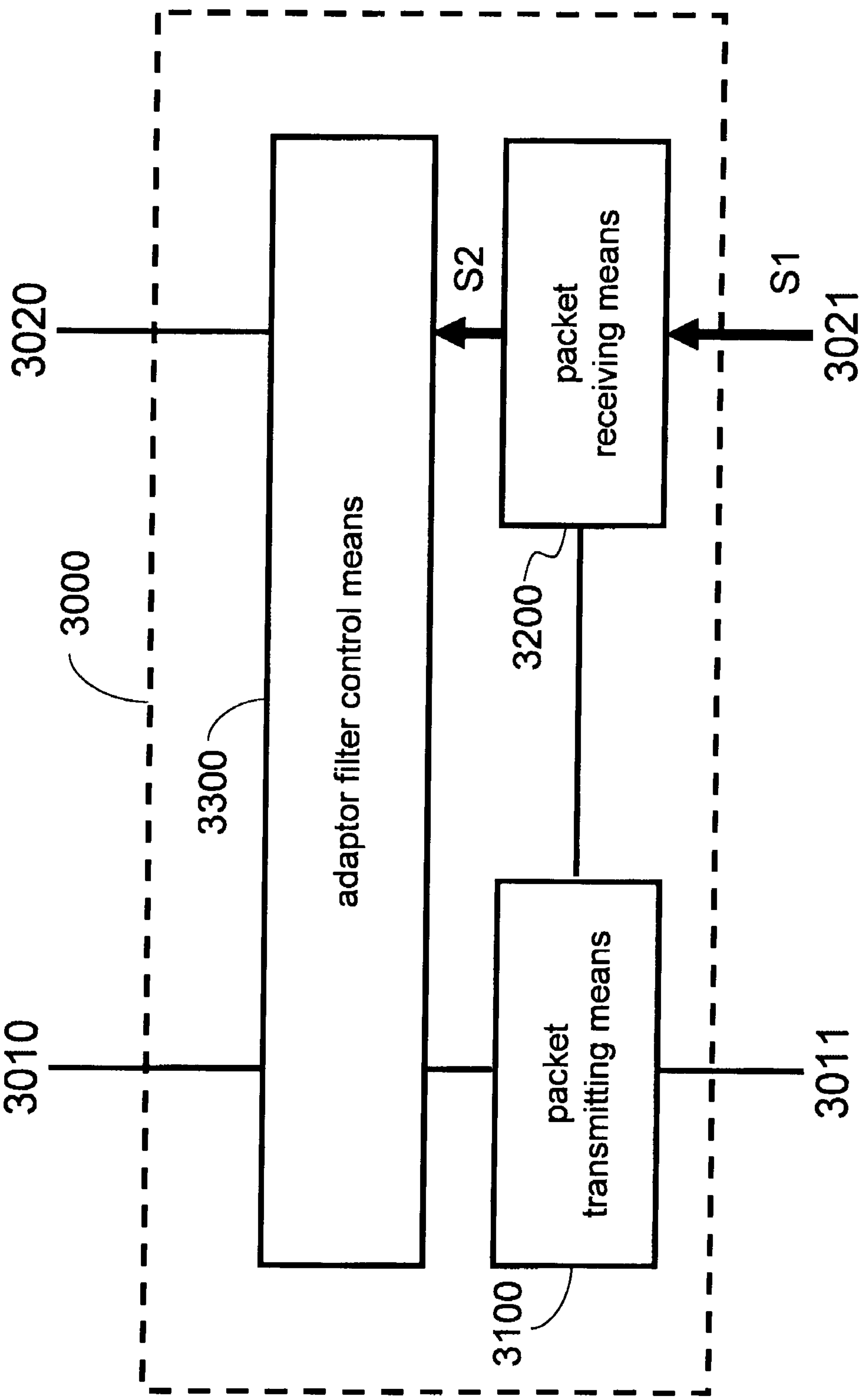
FIG. 63 is a view illustrating an example of an internal operation of an adaptor having the adaptor filter control means shown in FIG. 54.

Next, an internal operation of adaptor 3000 will be described when a packet is received from router node 2000 connected to adaptor 3000 and transmission filter data 3311 is updated by data of the received packet. FIG. 63 is a view illustrating an example of an internal operation of adaptor 3000 having adaptor filter control means 3300 shown in FIG. 54.

Step 1 (S1): Packet receiving means 3200 receives a packet to be updated from router node 2000, which is a packet including new data of the transmission filter data.

Step 2 (S2): Packet receiving means 3200 converts the received packet to be updated into an access request for writing to transmission filter data 3311 and delivers the access request to adaptor filter control means 3300. Adaptor filter control means 3300 determines that the access request can be processed, and writes the data, which is received together with the access request, to transmission filter data 3311. Thereby, transmission filter data 3311 is updated. Meanwhile, a case where the update is not received is the same as a case of typical error processing when an error occurs in which an access request is not received. Thus, a detailed description thereof is omitted.

Figure 64:
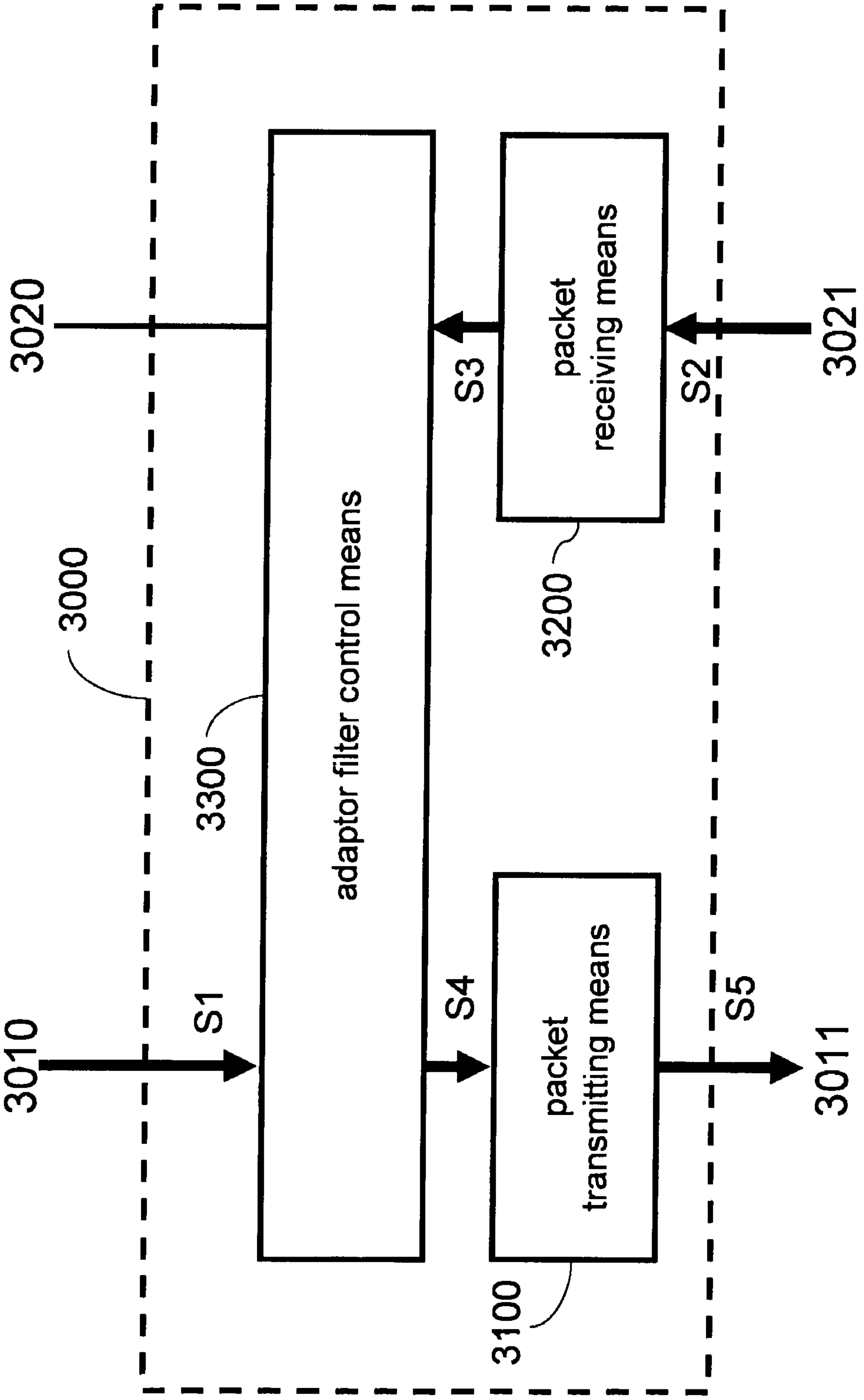
FIG. 64 is a view illustrating an example of an internal operation of an adaptor having the adaptor filter control means shown in FIG. 54.

Next, an internal operation of adaptor 3000 will be described when processing of an access request by a packet received from router node 2000 connected to adaptor 3000 is temporarily stopped, the access request is just maintained and then transmission filter data 3311 is updated to enable the access request, for which the processing is temporarily stopped, to be transmitted. FIG. 64 is a view illustrating an example of an internal operation of adaptor 3000 having adaptor filter control means 3300 shown in FIG. 54.

Step 1 (S1): Adaptor filter control means 3300 receives an access request from core 99. Adaptor filter control means 3300 refers to transmission filter data 3311 to determine whether or not to transmit the received access request and to temporarily stop processing thereof. When it is determined that it is necessary to temporarily stop processing of the access request, the adaptor filter control means maintains the access request.

Step 2 (S2): Packet receiving means 3200 receives a packet to be updated from router node 2000, which is a packet including new data of the transmission filter data.

Step 3 (S3): Packet receiving means 3200 converts the received packet to be updated into an access request for writing to transmission filter data 3311 and delivers the access request to adaptor filter control means 3300. Adaptor filter control means 3300 determines that the access request can be processed, and writes the data, which is received together with the access request, to transmission filter data 3311. Thereby, transmission filter data 3311 is updated and the temporary stop state of processing of the maintained access request is released.

Step 4 (S4): Through the update of transmission filter data 3311, adaptor filter control means 3300 determines that transmission of the maintained access request has been permitted and delivers the access request to packet transmitting means 3100. Step 5 (S5): Packet transmitting means 3100 converts the access request into a packet and transmits the packet to router node 2000.

Up to now, the structure of adaptor 3000 having adaptor filter control means 3300 shown in FIG. 54 has been specifically described. Next, a case will be described where a plurality of sets, each of which consists of the adaptor, the core and the router node, is connected.

The structure of the case where a plurality of sets, each of which consists of the adaptor, the core and the router node, is connected is same as that shown in FIG. 33. Due to this, the structure shown in FIG. 33 will be omitted.

Figure 65:
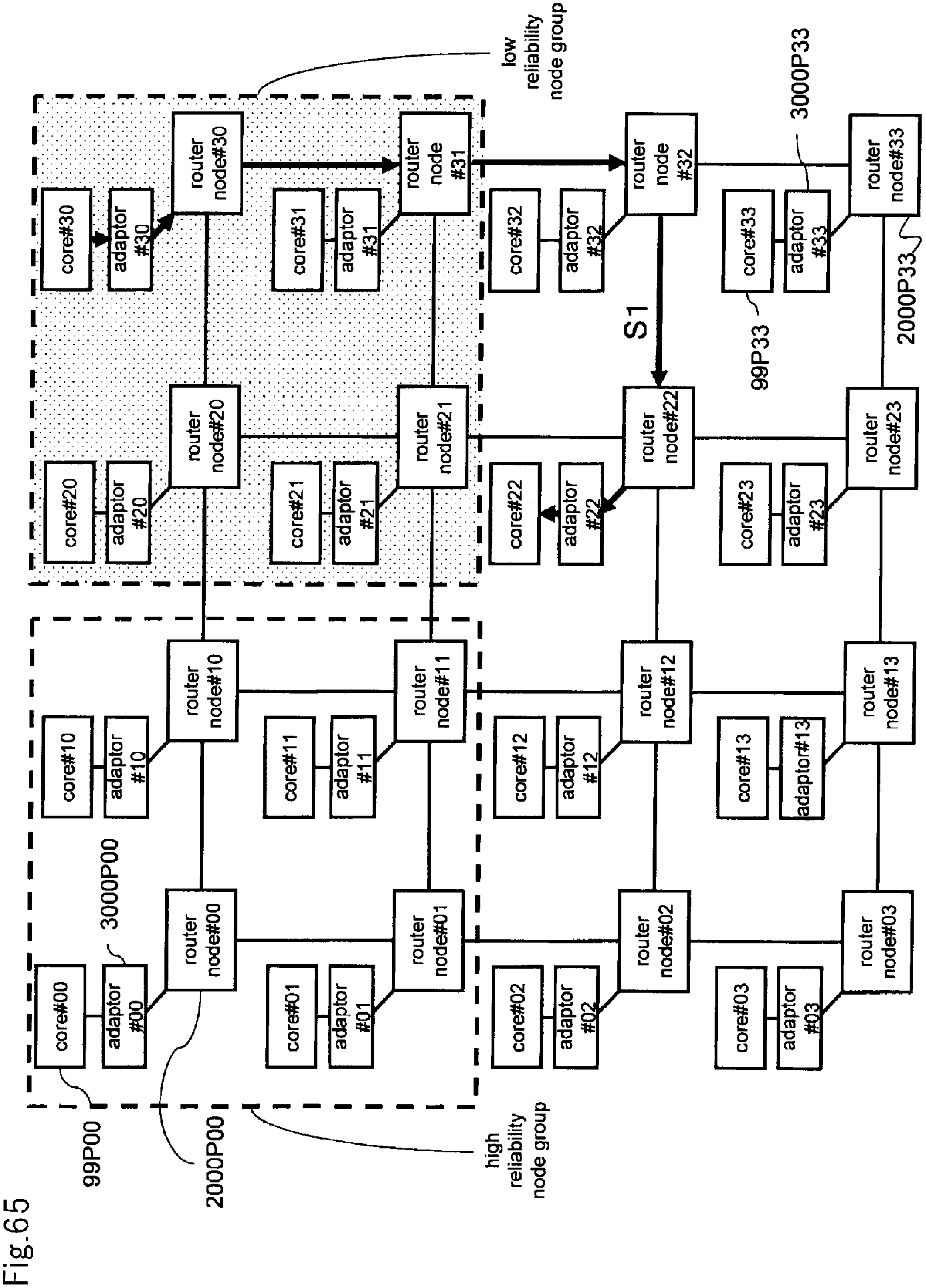
FIG. 65 is a view illustrating an example of an operation of the semiconductor integrated circuit shown in FIG. 33 in a second exemplary embodiment.

Next, an operation will be described when an access request is made to core 99P22 from core 99P30 in the structure shown in FIG. 33. In this case, it is assumed that although an access request is made to a core whose reliability has not been defined from a low reliability core, the access request is permitted. FIG. 65 is a view illustrating an example of an operation of the semiconductor integrated circuit shown in FIG. 33. The adaptor shown in FIG. 65 has adaptor filter control means 3300 shown in FIG. 54.

Step 1 (S1): Core 99P30 delivers an access request to adaptor 3000P30. When adaptor 3000P30 receives the access request from core 99P30, it refers to transmission filter data 3311 and recognizes that transmission of the access request to core 99P22 is permitted. Continuously, the adaptor converts the access request into a packet and transmits the packet having a destination of core 99P22 to router node 2000P30.

Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core and delivers it to core 99P22.

Figure 66:
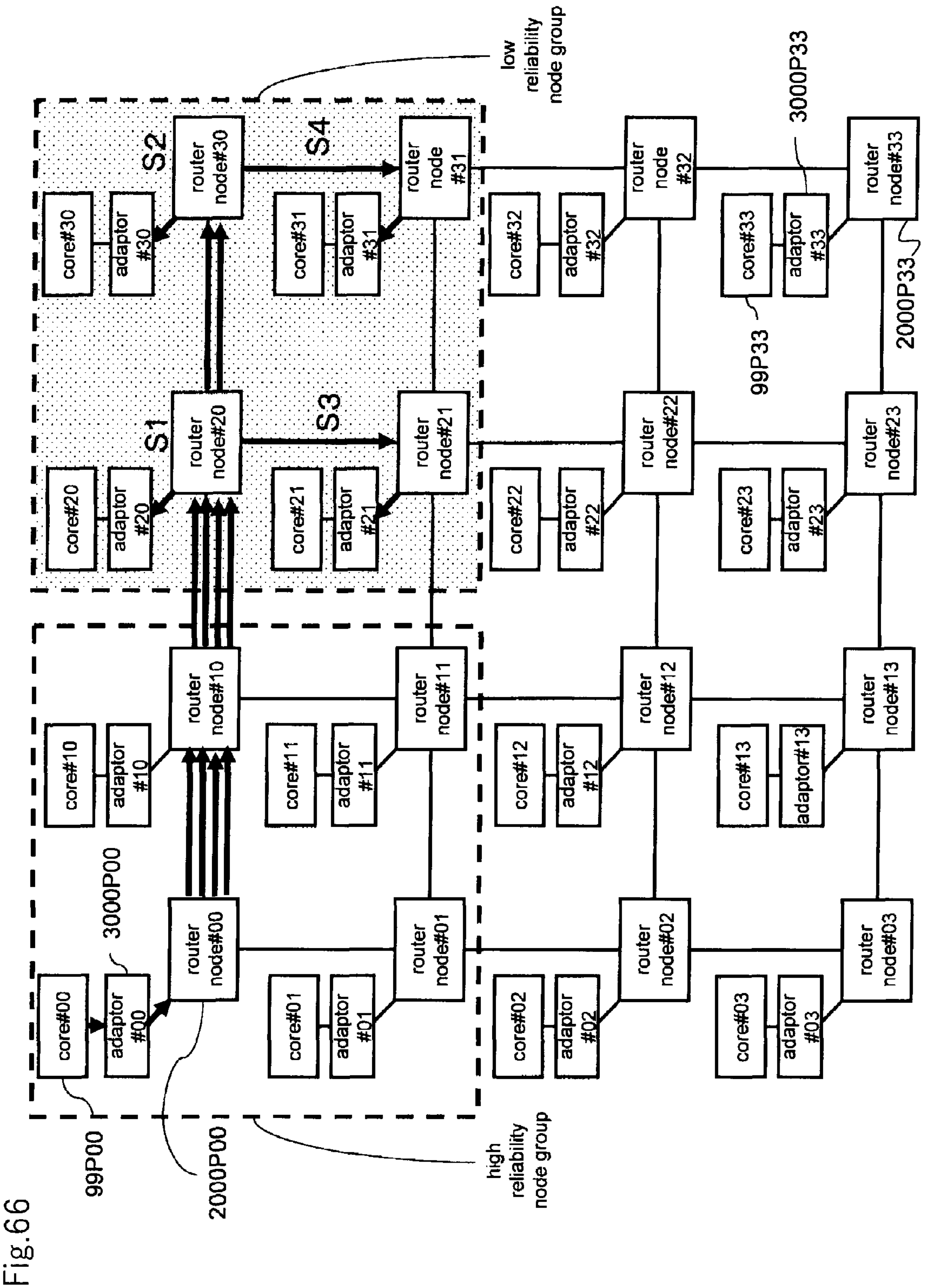
FIG. 66 is a view illustrating an example of an operation of the semiconductor integrated circuit shown in FIG. 33 in a second exemplary embodiment.

Next, an operation of a case will be described where processing of an access request to core 99P22 in the transmission filter data is temporarily stopped in adaptors 3000P20, 3000P21, 3000P30 and 3000P31 because high reliability core 99P00 inhibits the access request to core 99P22 from each of low reliability cores 99P20, 99P30, 99P21 and 99P31. Core 99P22 is a core whose reliability has not been defined. FIG. 66 is a view illustrating an example of an operation of the semiconductor integrated circuit shown in FIG. 33. The adaptor shown in FIG. 66 has adaptor filter control means 3300 shown in FIG. 54.

Step 1 (S1): When core 99P00 delivers to adaptor 3000P00 a temporary stop request, which provides instructions to indicate the temporary stopping of processing of an access request to core 99P22, to be written into transmission filter data 3311, adaptor 3000P00 transmits to router node 2000P00 a temporary-stop-packet having a destination of adaptor 3000P20, which provides instructions to indicate the temporary stopping of processing of the access request to core 99P22, to be written into transmission filter data 3311. Router node 2000P00 transmits the received temporary-stop-packet to adjacent router node 2000P10. The packet transmitted from router node 2000P00 reaches router node 2000P20 through router node 2000P10 that is a relay.

Then, router node 2000P20 delivers the received temporary-stop-packet to adaptor 3000P20. When adaptor 3000P20 recognizes that the temporary-stop-packet instructs a temporary stopping of processing of the access request to core 99P22, it sets "Yes" in the temporary stop bit, which indicates whether or not to temporarily stop processing of the access request to core 99P22, and changes processing of the access request to a temporary stop state.

Step 2 (S2): When core 99P00 delivers to adaptor 3000P00 a temporary stop request, which provides instructions to indicate the temporary stopping of processing of the access request to core 99P22, to be written into transmission filter data 3311, adaptor 3000P00 transmits to router node 2000P00 a temporary-stop-packet having a destination of adaptor 3000P30, which provides instructions to indicate the temporary stopping of processing of the access request to core 99P22, to be written into transmission filter data 3311. Router node 2000P00 transmits the received temporary-stop-packet to adjacent router node 2000P10. The packet transmitted from router node 2000P00 reaches router node 2000P30 through router nodes 2000P10 and 2000P20, which are relays.

Then, router node 2000P30 delivers the received temporary-stop-packet to adaptor 3000P30. When adaptor 3000P30 recognizes that the temporary-stop-packet instructs a temporary stopping of processing of the access request to core 99P22, it sets "Yes" in the temporary stop bit, which indicates whether or not to temporarily stop processing of the access request to core 99P22 in transmission filter data 3311, and changes processing of the access request to a temporary stop state.

Step 3 (S3): When core 99P00 delivers to adaptor 3000P00 a temporary stop request, which provides instructions to indicate the temporary stopping of processing of the access request to core 99P22, to be written into transmission filter data 3311, adaptor 3000P00 transmits to router node 2000P00 a temporary-stop-packet having a destination of adaptor 3000P21, which provides instructions to indicate the temporary stopping of processing of the access request to core 99P22, to be written on transmission filter data 3311. Router node 2000P00 transmits the received temporary-stop-packet to adjacent router node 2000P10. The packet transmitted from router node 2000P00 reaches router node 2000P21 through router nodes 2000P10 and 2000P20, which are relays.

Then, router node 2000P21 delivers the received temporary-stop-packet to adaptor 3000P21. When adaptor 3000P21 recognizes that the temporary-stop-packet instructs a temporary stopping of processing of the access request to core 99P22, it sets "Yes" in the temporary stop bit, which indicates whether or not to temporarily stop processing of the access request to core 99P22 in transmission filter data 3311, and changes processing of the access request to a temporary stop state.

Step 4 (S4): When core 99P00 delivers to adaptor 3000P00 the temporary stop request, which provides instructions to indicate the temporary stopping of processing of the access request to core 99P22, to be written into transmission filter data 3311, adaptor 3000P00 transmits to router node 2000P00 a temporary-stop-packet having a destination of adaptor 3000P31, which provides instructions to indicate the temporary stopping of processing of the access request to core 99P22, to be written into transmission filter data 3311. Router node 2000P00 transmits the received temporary-stop-packet to adjacent router node 2000P10. The packet transmitted from router node 2000P00 reaches router node 2000P31 through router nodes 2000P10, 2000P20 and 2000P30 that are relays.

Then, router node 2000P31 delivers the received temporary-stop-packet to adaptor 3000P31. When adaptor 3000P31 recognizes that the temporary-stop-packet instructs a temporary stopping of processing of the access request to core 99P22, it sets "Yes" in the temporary stop bit, which indicates whether or not to temporarily stop processing of the access request to core 99P22 in transmission filter data 3311, and changes processing of the access request to a temporary stop state.

Figure 67:
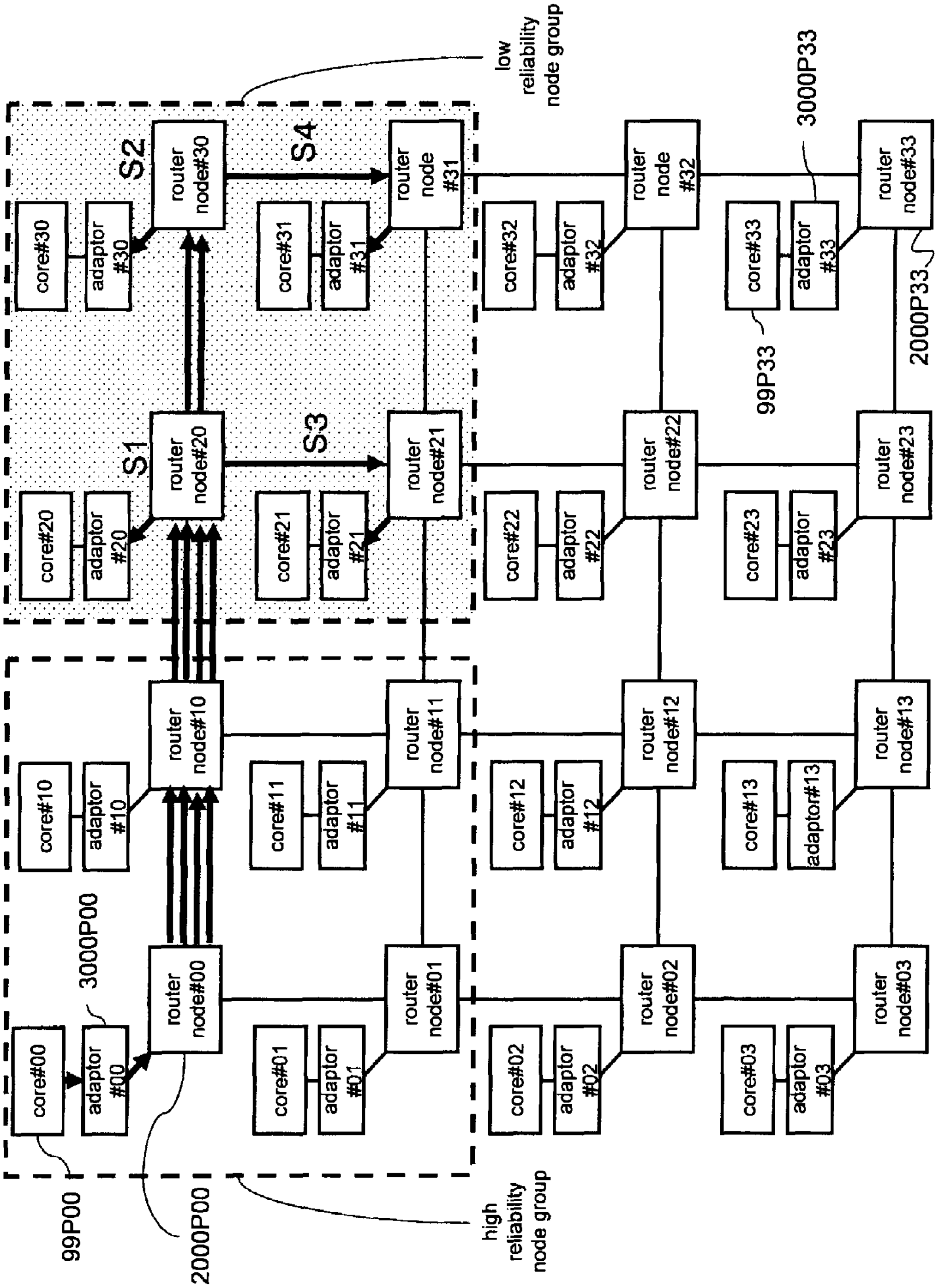
FIG. 67 is a view illustrating an example of an operation of the semiconductor integrated circuit shown in FIG. 33 in a second exemplary embodiment.

Next, an operation of a case will be described where an item indicating permission or inhibition of an access request to core 99P22 in the transmission filter data is updated in adaptors 3000P20, 3000P21, 3000P30 and 3000P31 because high reliability core 99P00 inhibits the access request to core 99P22 from each of low reliability cores 99P20, 99P30, 99P21 and 99P31. FIG. 67 is a view illustrating an example of an operation of the semiconductor integrated circuit shown in FIG. 33. The adaptor shown in FIG. 67 has adaptor filter control means 3300 shown in FIG. 54.

Step 1 (S1): When core 99P00 delivers to adaptor 3000P00 a transmission filter data update request, which is to update the transmission filter data into content for inhibiting transmission of an access request to core 99P22 from adaptor 3000P20, adaptor 3000P00 transmits to router node 2000P00 a packet to be updated having a destination of adaptor 3000P20, which includes information indicating inhibition of transmission of the access request to core 99P22. Router node 2000P00 transmits the received packet to be updated to adjacent router node 2000P10. The packet transmitted from router node 2000P00 reaches router node 2000P20 through router node 2000P10.

Then, router node 2000P20 delivers the received packet to be updated to adaptor 3000P20. When adaptor 3000P20 recognizes that the packet to be updated inhibits transmission of the access request to core 99P22, it sets no "R" and "W" in the permission bit, which indicates the type of the access request to core 99P22, while maintaining the temporary stop bit as "Yes," in transmission filter data 3311, and changes the state into a state inhibiting transmission of the access request to core 99P22.

Step 2 (S2): When core 99P00 delivers to adaptor 3000P00 a transmission filter data update request, which is to update the transmission filter data into content for inhibiting transmission of an access request to core 99P22 from adaptor 3000P30, adaptor 3000P00 transmits to router node 2000P00 a packet to be updated having a destination of adaptor 3000P30, which includes information indicating inhibition of transmission of the access request to core 99P22. Router node 2000P00 transmits the received packet to be updated to adjacent router node 2000P10. The packet transmitted from router node 2000P00 reaches router node 2000P30 through router nodes 2000P10 and 2000P20.

Then, router node 2000P30 delivers the received packet to be updated to adaptor 3000P30. When adaptor 3000P30 recognizes that the packet to be updated inhibits transmission of the access request to core 99P22, it sets no "R" and "W" in the permission bit for core 99P22 while maintaining the temporary stop bit as "Yes," in transmission filter data 3311, and changes the state into a state inhibiting transmission of the access request to core 99P22.

Step 3 (S3): When core 99P00 delivers to adaptor 3000P00 a transmission filter data update request, which is to update the transmission filter data into content for inhibiting transmission of an access request to core 99P22 from adaptor 3000P21, adaptor 3000P00 transmits to router node 2000P10 a packet to be updated having a destination of adaptor 3000P21, which includes information indicating inhibition of transmission of the access request to core 99P22. Router node 2000P00 transmits the received packet to be updated to adjacent router node 2000P10. The packet transmitted from router node 2000P00 reaches router node 2000P21 through router nodes 2000P10 and 2000P20.

Then, router node 2000P21 delivers the received packet to be updated to adaptor 3000P21. When adaptor 3000P21 recognizes that the packet to be updated inhibits transmission of the access request to core 99P22, it sets no "R" and "W" in the permission bit for core 99P22 while maintaining the temporary stop bit as "Yes," in transmission filter data 3311, and changes the state into a state inhibiting transmission of the access request to core 99P22.

Step 4 (S4): When core 99P00 delivers to adaptor 3000P00 a transmission filter data update request, which is to update the transmission filter data into content for inhibiting transmission of an access request to core 99P22 from adaptor 3000P31, adaptor 3000P00 transmits to router node 2000P00 a packet to be updated having a destination of adaptor 3000P31, which includes information indicating inhibition of transmission of the access request to core 99P22. Router node 2000P00 transmits the received packet to be updated to adjacent router node 2000P10. The packet transmitted from router node 2000P00 reaches router node 2000P31 through router nodes 2000P10, 2000P20 and 2000P30.

Then, router node 2000P31 delivers the received packet to be updated to adaptor 3000P31. When adaptor 3000P31 recognizes that the packet to be updated inhibits transmission of the access request to core 99P22, it sets no "R" and "W" in the permission bit for core 99P22 while maintaining the temporary stop bit as "Yes," in transmission filter data 3311, and changes the state into a state inhibiting transmission of the access request to core 99P22.

Figure 68:
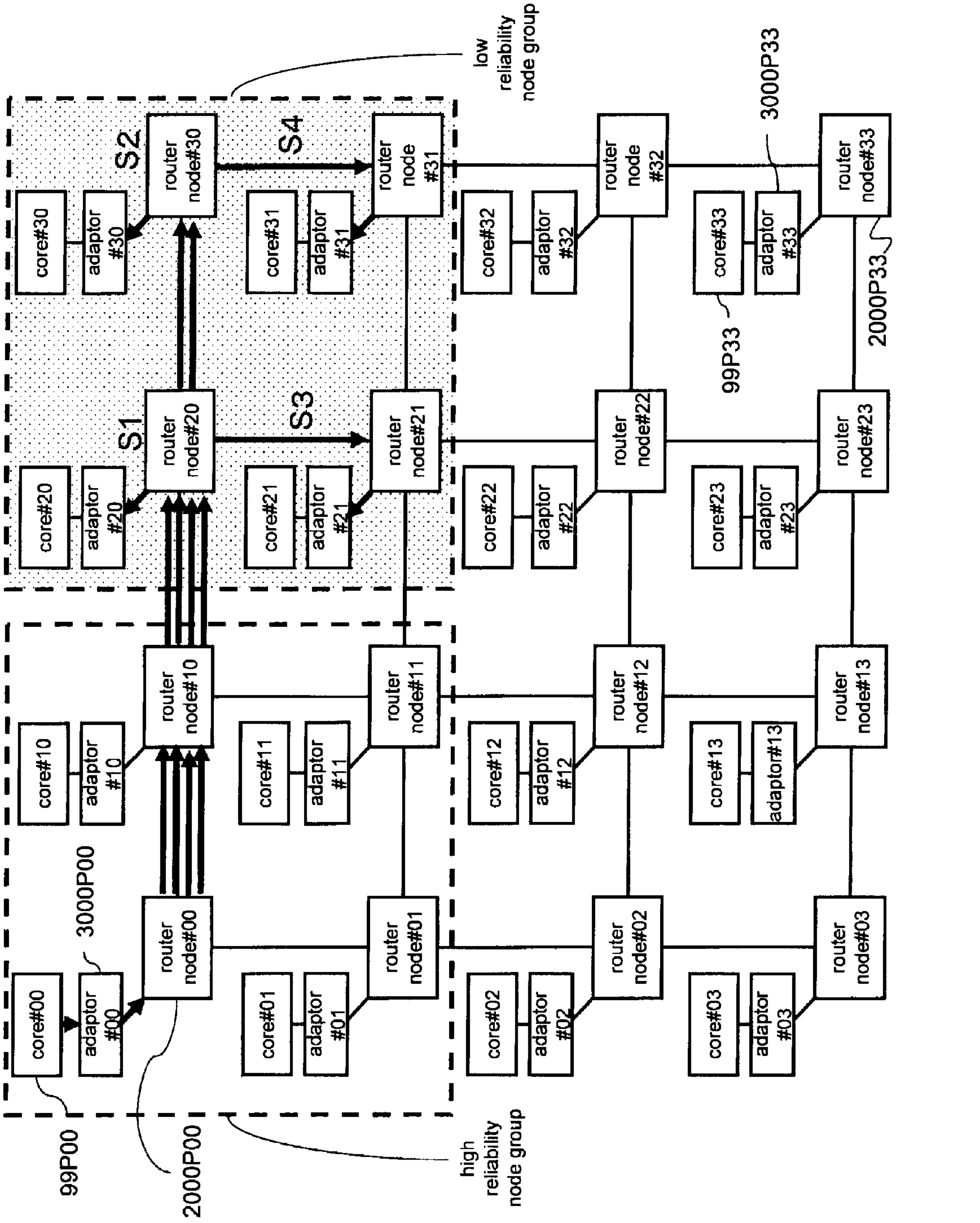
FIG. 68 is a view illustrating an example of an operation of the semiconductor integrated circuit shown in FIG. 33 in a second exemplary embodiment.

Next, an operation of a case will be described where after high reliability core 99P00 inhibits an access request to core 99P22 from each of low reliability cores 99P20, 99P30, 99P21 and 99P31, as described in FIG. 66, it releases the temporary stopping of processing of the access request to core 99P22 in the transmission filter data in adaptors 3000P20, 3000P21, 3000P30 and 3000P31. FIG. 68 is a view illustrating an example of an operation of the semiconductor integrated circuit shown in FIG. 33. The adaptor shown in FIG. 68 has adaptor filter control means 3300 shown in FIG. 54.

Step 1 (S1): When core 99P00 delivers to adaptor 3000P00 a temporary stop release request, which provides instructions to indicates cancellation of a temporary stopping of processing of an access request to core 99P22 from adaptor 3000P20, to be written into transmission filter data 3311, adaptor 3000P00 transmits to router node 2000P00 a temporary stop release packet having a destination of adaptor 3000P20, which provides instructions to indicate cancellation the temporary stopping of processing of the access request to core 99P22, to be written into transmission filter data 3311. Router node 2000P00 transmits the received temporary stop release packet to adjacent router node 2000P10. The packet transmitted from router node 2000P00 reaches router node 2000P20 through router node 2000P10.

Then, router node 2000P20 delivers the received temporary stop release packet to adaptor 3000P20. When adaptor 3000P20 recognizes that the temporary stop release packet instructs cancellation of the temporary stopping of processing of the access request to core 99P22, the adaptor sets "No" in the temporary stop bit, which indicates whether or not to temporarily stop processing of the access request to core 99P22 in transmission filter data 3311, and cancels the temporary stop state of processing of the access request.

Step 2 (S2): When core 99P00 delivers to adaptor 3000P00 a temporary stop release request, which provides instructions to indicate cancellation of a temporary stopping of processing of an access request to core 99P22 from adaptor 3000P30, to be written into transmission filter data 3311, adaptor 3000P00 transmits to router node 2000P00 the temporary stop release packet having a destination of adaptor 3000P30, which provides instructions to indicate cancellation of the temporary stopping of processing of the access request to core 99P22, to be written into transmission filter data 3311. Router node 2000P00 transmits the received temporary stop release packet to adjacent router node 2000P10. The packet transmitted from router node 2000P00 reaches router node 2000P30 through router nodes 2000P10 and 2000P20.

Then, router node 2000P30 delivers the received temporary stop release packet to adaptor 3000P30. When adaptor 3000P30 recognizes that the temporary stop release packet is to instruct cancellation of the temporary stopping of processing of the access request to core 99P22, the adaptor sets "No" in the temporary stop bit for core 99P22 in transmission filter data 3311 and cancels the temporary stop state of processing of the access request.

Step 3 (S3): When core 99P00 delivers to adaptor 3000P00 a temporary stop release request, which provides instructions to indicate cancellation of a temporary stopping of transmission of an access request to core 99P22 from adaptor 3000P21, to be written into transmission filter data 3311, adaptor 3000P00 transmits to router node 2000P00 a temporary stop release packet having a destination of adaptor 3000P21, which provides instructions to indicate cancellation of the temporary stopping of the transmission of the access request to core 99P22, to be written into transmission filter data 3311. Router node 2000P00 transmits the received temporary stop release packet to adjacent router node 2000P10. The packet transmitted from router node 2000P00 reaches router node 2000P21 through router nodes 2000P10 and 2000P20.

Then, router node 2000P21 delivers the received temporary stop release packet to adaptor 3000P21. When adaptor 3000P21 recognizes that the temporary stop release packet is to instruct cancellation of the temporary stopping of processing of the access request to core 99P22, the adaptor sets "No" in the temporary stop bit for core 99P22 in transmission filter data 3311 and cancels the temporary stop state of processing of the access request.

Step 4 (S4): When core 99P00 delivers to adaptor 3000P00 a temporary stop release request, which provides instructions to indicate cancellation of the temporary stopping of processing of the access request to core 99P22 from adaptor 3000P31, to be written into transmission filter data 3311, adaptor 3000P00 transmits to router node 2000P00 a temporary stop release packet having a destination of adaptor 3000P31, which provides instructions to indicate cancellation of the temporary stopping of processing of the access request to core 99P22, to be written into transmission filter data 3311. Router node 2000P00 transmits the received temporary stop release packet to adjacent router node 2000P10. The packet transmitted from router node 2000P00 reaches router node 2000P31 through router nodes 2000P10, 2000P20 and 2000P30.

Then, router node 2000P31 delivers the received temporary stop release packet to adaptor 3000P31. When adaptor 3000P31 recognizes that the temporary stop release packet is to instruct cancellation of the temporary stopping of processing of the access request to core 99P22, the adaptor sets "No" in the temporary stop bit for core 99P22 in transmission filter data 3311 and cancels the temporary stop state of processing of the access request.

By doing so, the temporary stop state of processing of the access request to core 99P22 is canceled in each adaptor of the four low reliability cores. However, since reading and writing for core 99P22 are "inhibited" in transmission filter data 3311, each adaptor maintains the state in which transmission of the access request to core 99P22 is inhibited.

Figure 69:
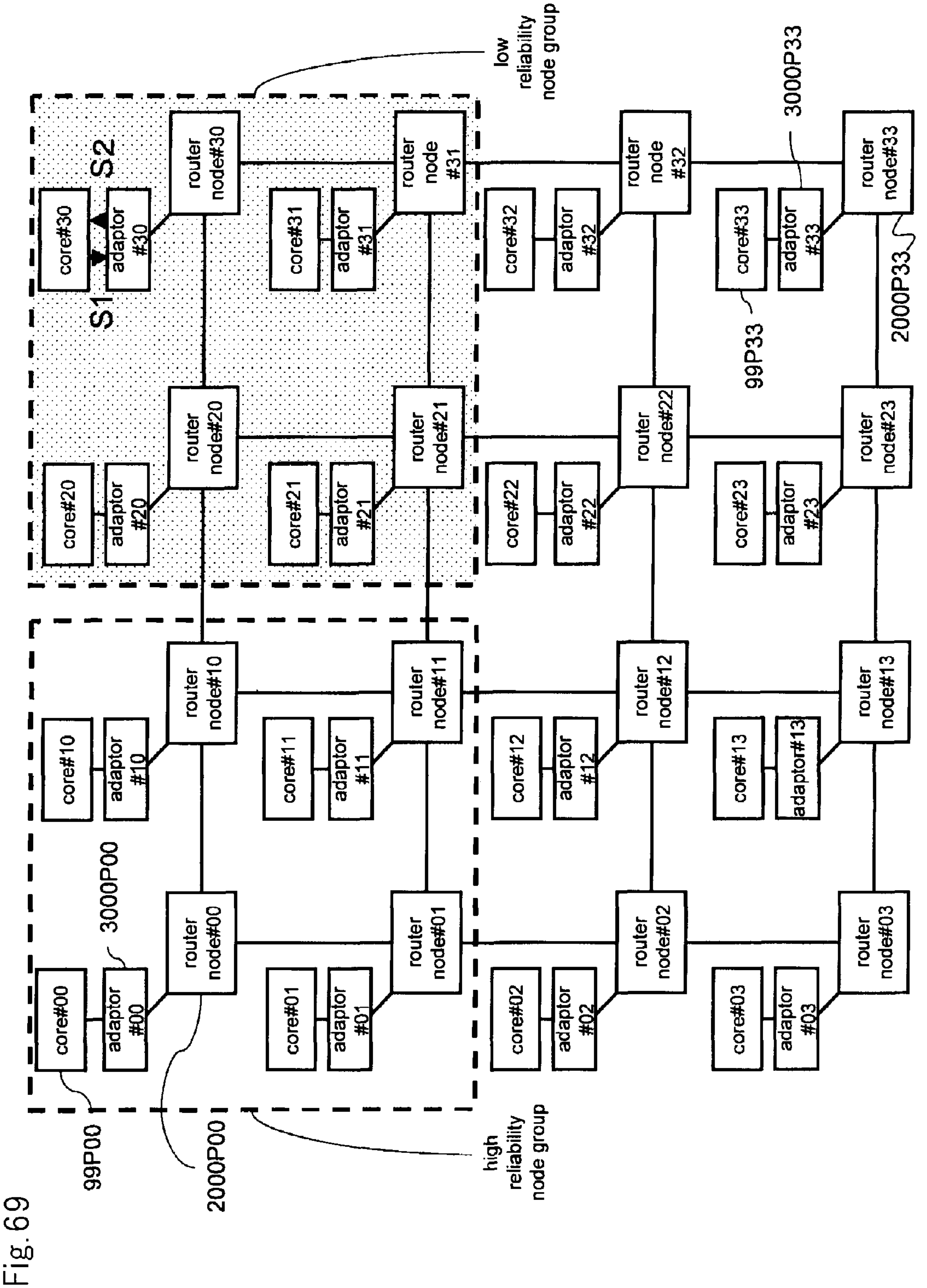
FIG. 69 is a view illustrating an example of an operation of the semiconductor integrated circuit shown in FIG. 33 in a second exemplary embodiment.

Next, an operation of a case will be described where low reliability core 99P30 makes an access request to core 99P22 after the setting of the transmission filter data is changed, as described in FIGS. 66, 67 and 68. The setting of the transmission filter data is changed, as described and an access request from low reliability core 99P30 to core 99P22 whose reliability has not been defined. FIG. 69 is a view illustrating an example of an operation of the semiconductor integrated circuit shown in FIG. 33. The adaptor shown in FIG. 69 has adaptor filter control means 3300 shown in FIG. 54.

Step 1 (S1): Core 99P30 delivers an access request to core 99P22 to adaptor 3000P30. Step 2 (S2): When adaptor 3000P30 receives the access request from core 99P30, it refers to transmission filter data 3311. When the adaptor recognizes that the access request to core 99P22 is inhibited, it returns the access error response to core 99P30.

Figure 70:
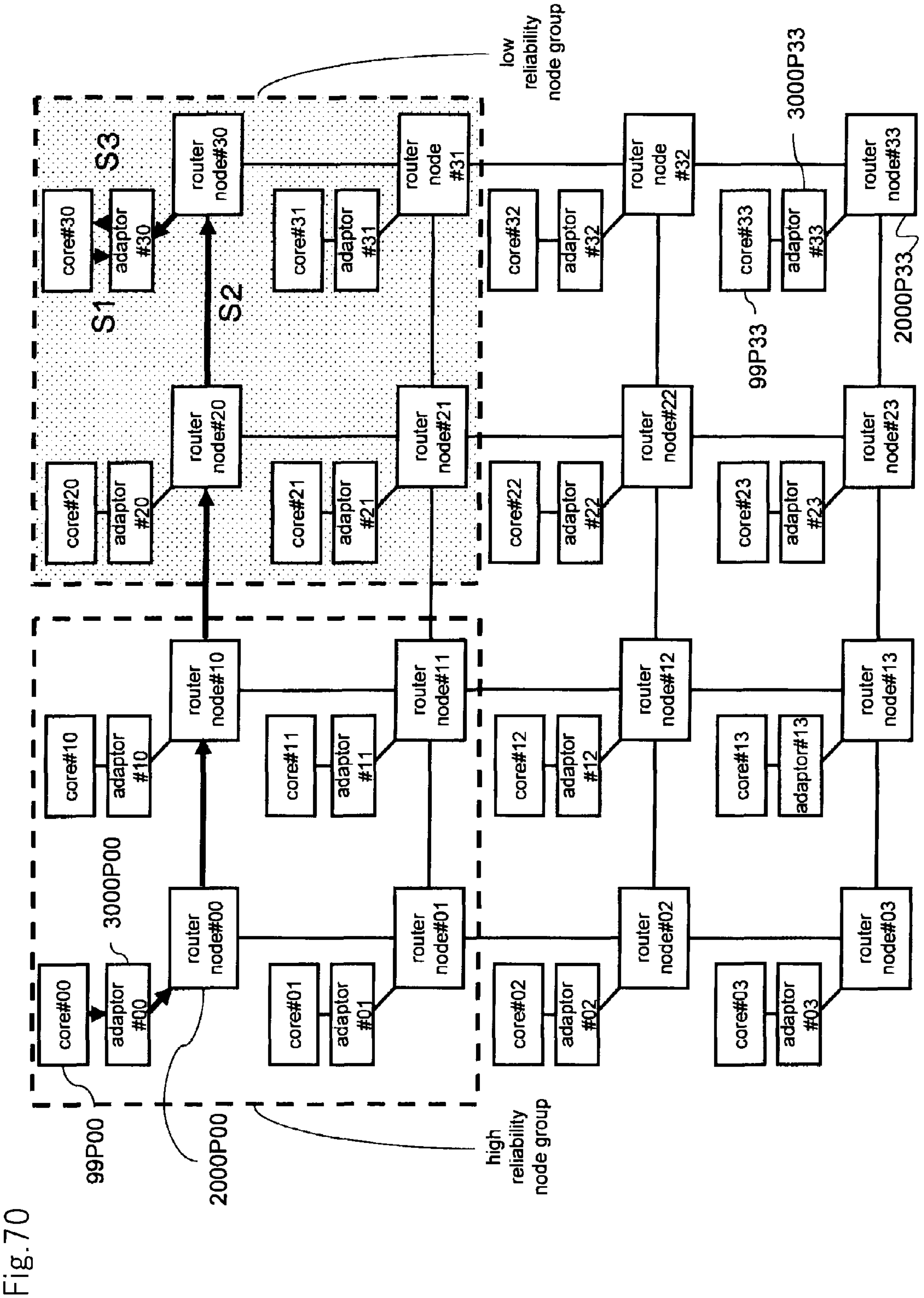
FIG. 70 is a view illustrating an example of an operation of the semiconductor integrated circuit shown in FIG. 33 in a second exemplary embodiment.

Next, an operation of a case will be described where processing of an access request is temporarily stopped so as to update the transmission filter data in one adaptor and then the transmission filter data is updated so as not to permit the adaptor to transmit the access request to a predetermined core. Here, processing of the access request to core 99P22 from low reliability core 99P30 is temporarily stopped, and then high reliability core 99P00 inhibits transmission of the access request from core 99P30 to core 99P22 and cancels the temporary stopping of processing of the access request. FIG. 70 is a view illustrating an example of an operation of the semiconductor integrated circuit shown in FIG. 33. The adaptor shown in FIG. 69 has adaptor filter control means 3300 shown in FIG. 54.

Step 1 (S1): Core 99P30 delivers an access request to core 99P22 to adaptor 3000P30. When adaptor 3000P30 receives the access request from core 99P30, it refers to transmission filter data 3311 to recognize that processing of the access request is temporarily stopped and maintains the access request.

Step 2 (S2): Core 99P00 delivers to adaptor 3000P00 a reception filter data update request, which is to update the transmission filter data into content for inhibiting transmission of the access request to core 99P22 from adaptor 3000P30, and a temporary stop release request, which provides instructions to indicate cancellation of the temporary stopping of processing of the access request to core 99P22 from adaptor 3000P30, to be written into transmission filter data 3311. When adaptor 3000P00 receives the transmission filter data update request and the temporary stop release request from core 99P00, it transmits to router node 2000P00 an update/temporary stop release packet having a destination of adaptor 3000P30, which provides instructions to indicate inhibition of transmission of the access request to core 99P22 and cancellation of the temporary stopping of processing of the access request to core 99P22, to be written into transmission filter data 3311. Router node 2000P00 transmits the received update/temporary stop release packet to adjacent router node 2000P10. The packet transmitted from router node 2000P00 reaches router node 2000P30 through router nodes 2000P10 and 2000P20.

Then, router node 2000P30 delivers the received update/temporary stop release packet to adaptor 3000P30. Adaptor 3000P22 recognizes that the update/temporary stop release packet is to inhibit the transmission of the access request to core 99P22 and to release the temporary stopping of processing of the access request to core 99P22. Continuously, the adaptor sets no "R" and "W" in the permission bit for core 99P22 and changes the state into a state inhibiting transmission of the access request to core 99P22. In addition, the adaptor sets "No" in the temporary stop bit of processing of the access request to core 99P22 and cancels the temporary stop state of processing of the access request to core 99P22, in transmission filter data 3311.

Step 3 (S3): Adaptor 3000P30 refers to transmission filter data 3311 before re-transmitting the maintained access request to core 99P22. Since transmission of the access request to core 99P22 is inhibited in transmission filter data 3311, the adaptor delivers to core 99P30 an access error response that is information for notifying that a packet by the access request cannot be transmitted and an error is thus caused.

In this exemplary embodiment, regarding the access request from the core, each of the adaptors in the interconnecting network controls delivery of the access request in accordance with the delivery information. By making the contents of the delivery information, which is maintained by each adaptor, consistent, it is possible to consistently perform filter control.

In addition, when updating the delivery information, the instruction of the temporary stopping of processing of the access request and instructions of the update of the transmission filter data and cancellation of the temporary stopping of processing of the access request are simultaneously made from a predetermined core with respect to the adaptors in the interconnecting network.

In this exemplary embodiment, it is possible to control access to the cores in the transmission side as well as in the reception side, and to obtain the same effects as those of the first exemplary embodiment. In addition, in this exemplary embodiment, both the reception side and the transmission side perform filter control. However, filter control of the reception side may not be provided.

Third Exemplary Embodiment

In the second exemplary embodiment, the transmission filter means of the transmission side of the adaptor controls the access request. However, in this exemplary embodiment, the packet transmitting filter means of the transmission side controls the access request. In the followings, the structures, except the adaptor, are same as those of the first exemplary embodiment. Thus, detailed descriptions thereof will be omitted.

Figure 71:
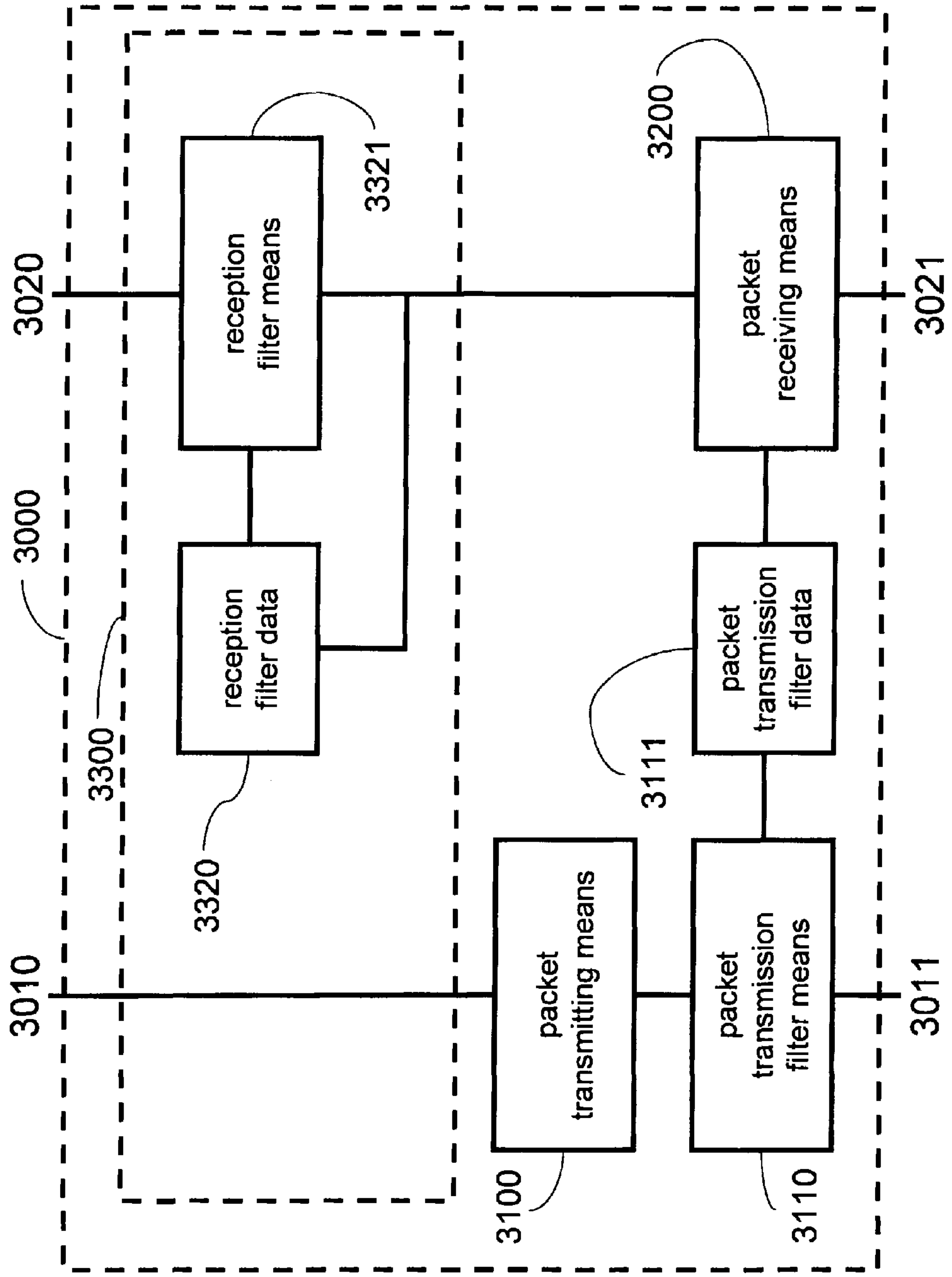
FIG. 71 is a view showing an example of a structure of an adaptor in a third exemplary embodiment.

The structure of adaptor 3000 shown in FIG. 17 according to this exemplary embodiment will be described. FIG. 71 is a view showing an example of a structure of adaptor 3000 in this exemplary embodiment.

Referring to FIG. 71, adaptor 3000 comprises adaptor control means 3300 including reception filter means 3320 and reception filter data 3321, packet transmitting means 3100 that transmits a packet to a router node, and packet receiving means 3200 that receives the packet from the router node, like the adaptor shown in FIG. 17.

Furthermore, adaptor 3000 shown in FIG. 71 comprises packet transmission filter means 3110 that determines whether or not to transmit to the outside a packet corresponding to an access request from a core connected to the means and whether or not to temporarily stop processing of a packet, and packet transmission filter data 3111 that is information to be used for the determinations. Packet transmission filter data 3111 is stored in storage means (not shown).

Packet transmission filter means 3310 refers to packet transmission filter data 3111 and determines whether or not to transmit to a predetermined destination a packet corresponding to an access request from a core connected to the means and whether or not to temporarily stop processing of a packet having a predetermined destination. When transmission of a packet having a predetermined destination is permitted in packet transmission filter data 3111, the packet is transmitted to the destination, and when the transmission of the packet is inhibited, packet transmitting means 3100 is notified that the packet is not transmitted. In addition, when it is set in packet transmission filter data 3111 that processing of a packet having a predetermined destination is temporarily stopped, the packet is maintained without being transmitted, and when the temporary stopping of processing of the packet is released, it is checked whether transmission of the packet to the destination is permitted and then the processing is performed as described above.

Next, packet transmission filter data 3111 will be described. FIG. 72 is a view showing an example of a structure of packet transmission filter data 3111.

Packet transmission filter data 3111 of FIG. 72 shows information of a type of a packet for which transmission is permitted and whether or not to temporarily stop processing of the packet in an adaptor, with respect to a router node that is a destination of a packet that is converted in an adaptor from an access request from a core connected to the adaptor.

Referring to FIG. 72, an entry is provided which is a set of an identifier of a router node that is a destination of a packet, a "permission bit" that is an item indicating a type of a packet that is permitted, and a "temporary stop bit" that is an item indicating whether or not to temporarily stop processing of a packet. The information of the destination of a packet and the type of a packet corresponds to delivery information that is a condition to be processed. In the following, the content of the table will be specifically described.

For a destination router node #0, since the permission bit is "A" and "B," A and B are permitted as types of a packet to be transmitted. Since the temporary stop bit is "No," when packet transmission filter means 3310 receives a packet having a destination router node #0 from packet transmitting means 3100, it is not necessary to temporarily stop processing of the packet. For router node #1, only A is permitted as a type of a packet to be transmitted. For router node #2, C and D are permitted as types of a packet to be transmitted. Even when packet transmission filter means 3310 receives a packet having destination router node #1 or #2 from packet transmitting means 3100, it is not necessary to temporarily stop processing of the packet, like the case of router node #0.

In the meantime, for a destination router node #3, since the permission bit is "E," E is permitted as a type of a packet to be transmitted. In addition, since the temporary stop bit is "Yes," when packet transmission filter means 3310 receives a packet having destination router node #3 from packet transmitting means 3100, it is necessary to temporarily stop a processing of the packet regardless of a type of the packet.

Here, it is assumed that a core connected to an adaptor cannot directly update the packet transmission filter data which is stored in the adaptor. The information of packet transmission filter data 3111 is updated by re-writing new data that is generated from an application software to be executed by a core in a high reliability area or data that is read out from a file in which setting change information has been previously described. A specific example of a method for updating transmission filter data 3111 will be described below. The update is made when it is necessary to change the range of the high reliability area in accordance with the entire conditions or situations of a semiconductor integrated circuit, like the update of the reception filter data.

In the meantime, it may be possible that only when a condition corresponds to a predetermined condition that has been already set as a semiconductor integrated circuit, a part or all of the packet transmission filter data of an adaptor, which stores the packet transmission filter data therein, is directly updated from a core itself connected to the adaptor. In this case, it is not necessary to wait for reception of new data for updating the packet transmission filter data from a high reliability core.

Meanwhile, packet transmission filter data 3111 is not limited to the table type as shown in FIG. 72. In other words, any type of packet transmission filter data may be possible as long as packet transmission filter means 3110 can read the data and control access in accordance with the read information.

In addition, the table shown in FIG. 72 sets the information of a type of a packet that can be transmitted, and whether or not to temporarily stop processing of the packet, correspondingly to a router node. However, a core may be possible instead of the router node.

Figure 73:
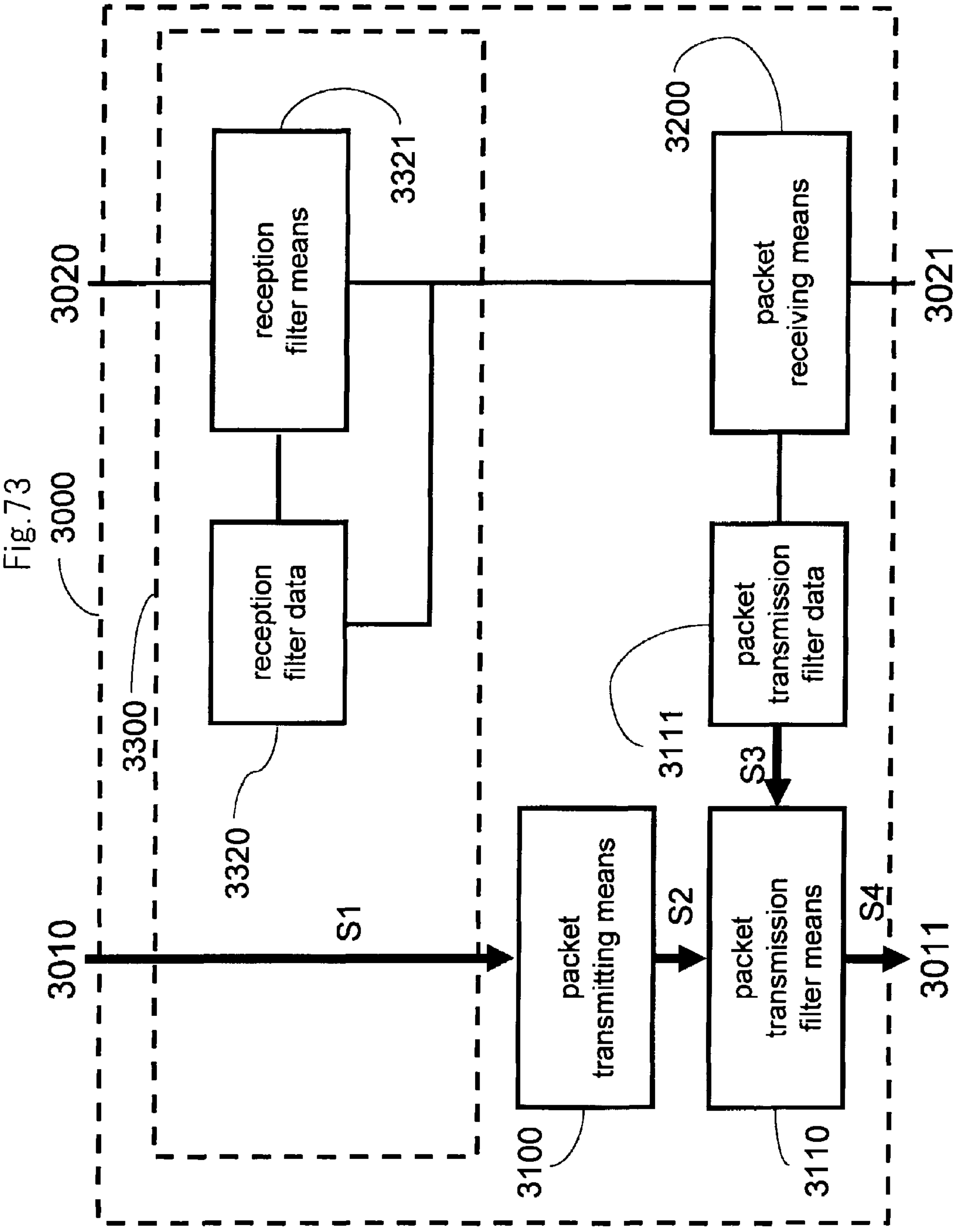
FIG. 73 is a view illustrating an example of an internal operation of the adaptor shown in FIG. 71.

Next, an internal operation of adaptor 3000 will be described when an access request is received from core 99 connected to adaptor 3000 and transmission of the access request to a destination node is permitted. FIG. 73 is a view illustrating an example of an internal operation of adaptor 3000 shown in FIG. 71.

Step 1 (S1): Packet transmitting means 3100 receives an access request from core 99. Step 2 (S2): Packet transmitting means 3100 converts the access request into a packet and delivers it to packet transmission filter means 3110.

Step 3 (S3): When packet transmission filter means 3110 receives the packet from packet transmitting means 3100, it refers to packet transmission filter data 3111 and recognizes that transmission of the packet to a destination node is permitted. Step 4 (S4): When packet transmission filter means 3110 receives the packet, it transmits the packet to router node 2000 that is designated as a destination of the packet.

Figure 74:
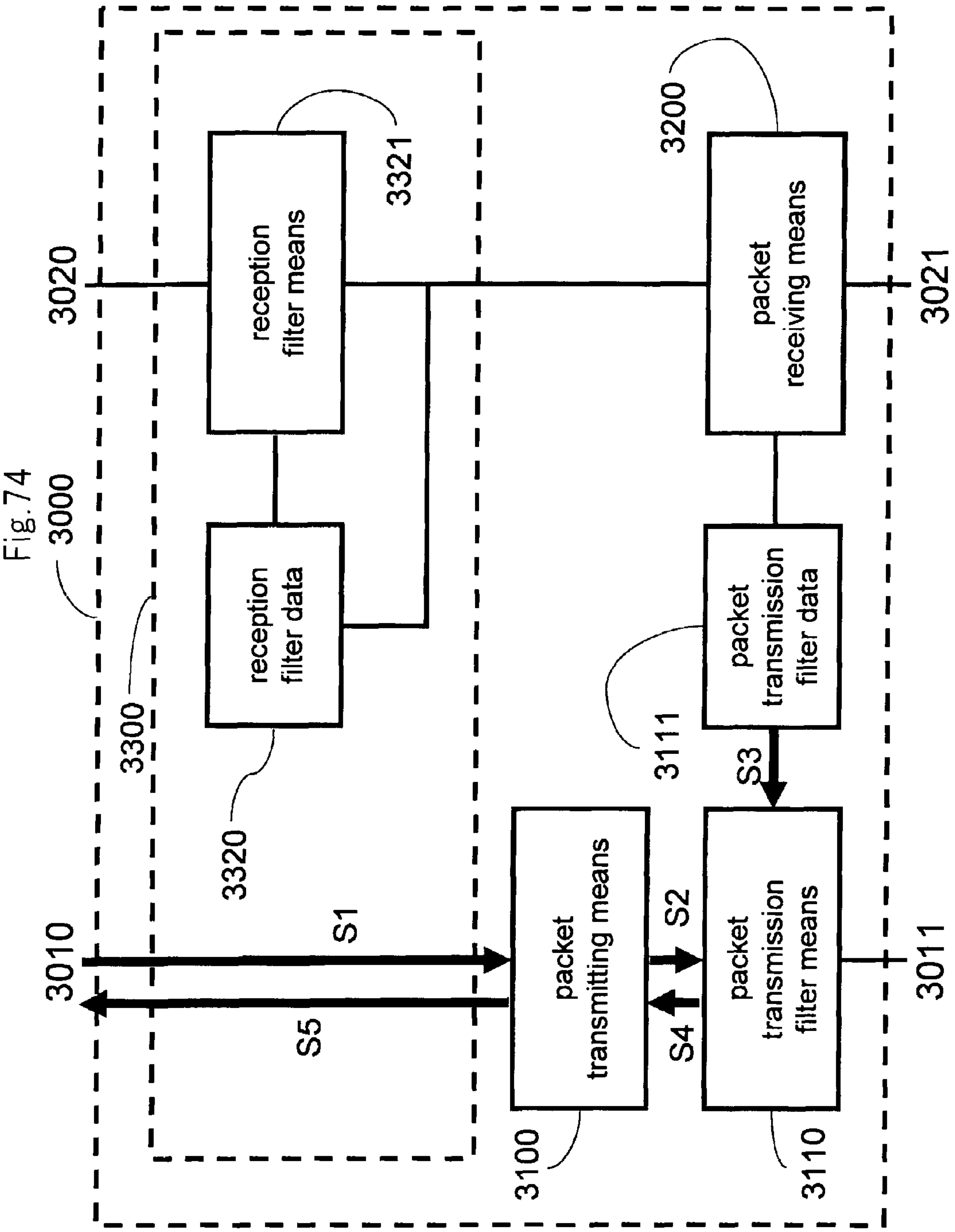
FIG. 74 is a view illustrating an example of an internal operation of the adaptor shown in FIG. 71.

Next, an internal operation of adaptor 3000 will be described when an access request is received from core 99 connected to adaptor 3000 and transmission of the access request to a destination node is denied. FIG. 74 is a view illustrating an example of an internal operation of adaptor 3000 shown in FIG. 71.

Step 1 (S1): Packet transmitting means 3100 receives an access request from core 99. Step 2 (S2): Packet transmitting means 3100 converts the access request into a packet and delivers it to packet transmission filter means 3110.

Step 3 (S3): When packet transmission filter means 3110 receives the packet from packet transmitting means 3100, it refers to packet transmission filter data 3111 and recognizes that transmission of the packet to a destination node is inhibited. Step 4 (S4): Packet transmission filter means 3110 generates an error packet for notifying that the packet cannot be processed and delivers the error packet to packet transmitting means 3100.

Step 5 (S5): Packet transmitting means 3100 converts the error packet into an access error response and delivers it to core 99.

Figure 75:
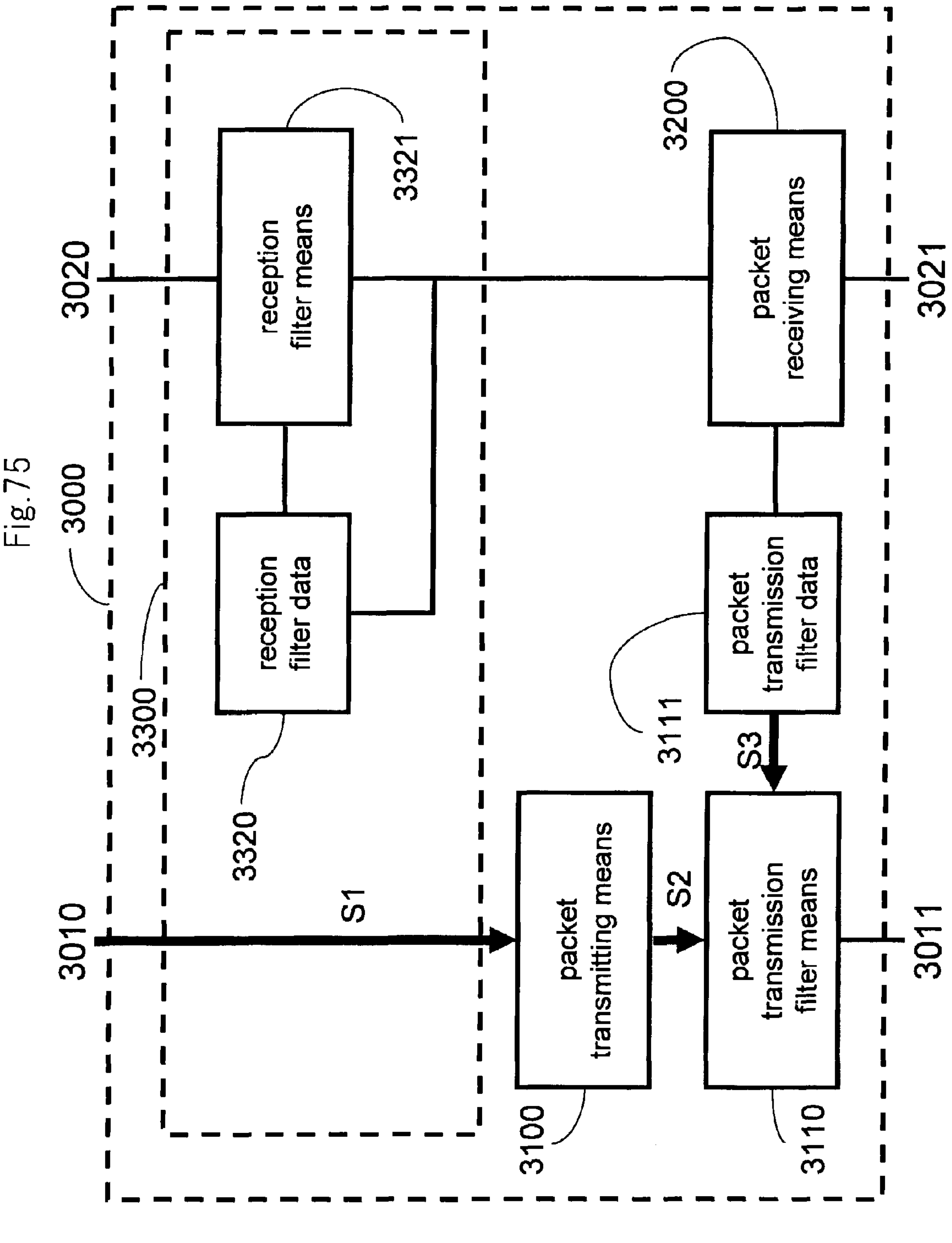
FIG. 75 is a view illustrating an example of an internal operation of the adaptor shown in FIG. 71.

Next, an internal operation of adaptor 3000 will be described when an access request is received from core 99 connected to adaptor 3000 and processing of the access request for a destination node is temporarily stopped. FIG. 75 is a view illustrating an example of an internal operation of adaptor 3000 shown in FIG. 71.

Step 1 (S1): Packet transmitting means 3100 receives an access request from core 99. Step 2 (S2): Packet transmitting means 3100 converts the access request into a packet and delivers it to packet transmission filter means 3110.

Step 3 (S3): When packet transmission filter means 3110 receives the packet from packet transmitting means 3100, it refers to packet transmission filter data 3111 and recognizes that a processing of the packet for a destination node is temporarily stopped. When packet transmission filter means 3110 notifies packet transmitting means 3100 of the information, packet transmitting means 3110 maintains the packet.

Figure 76:
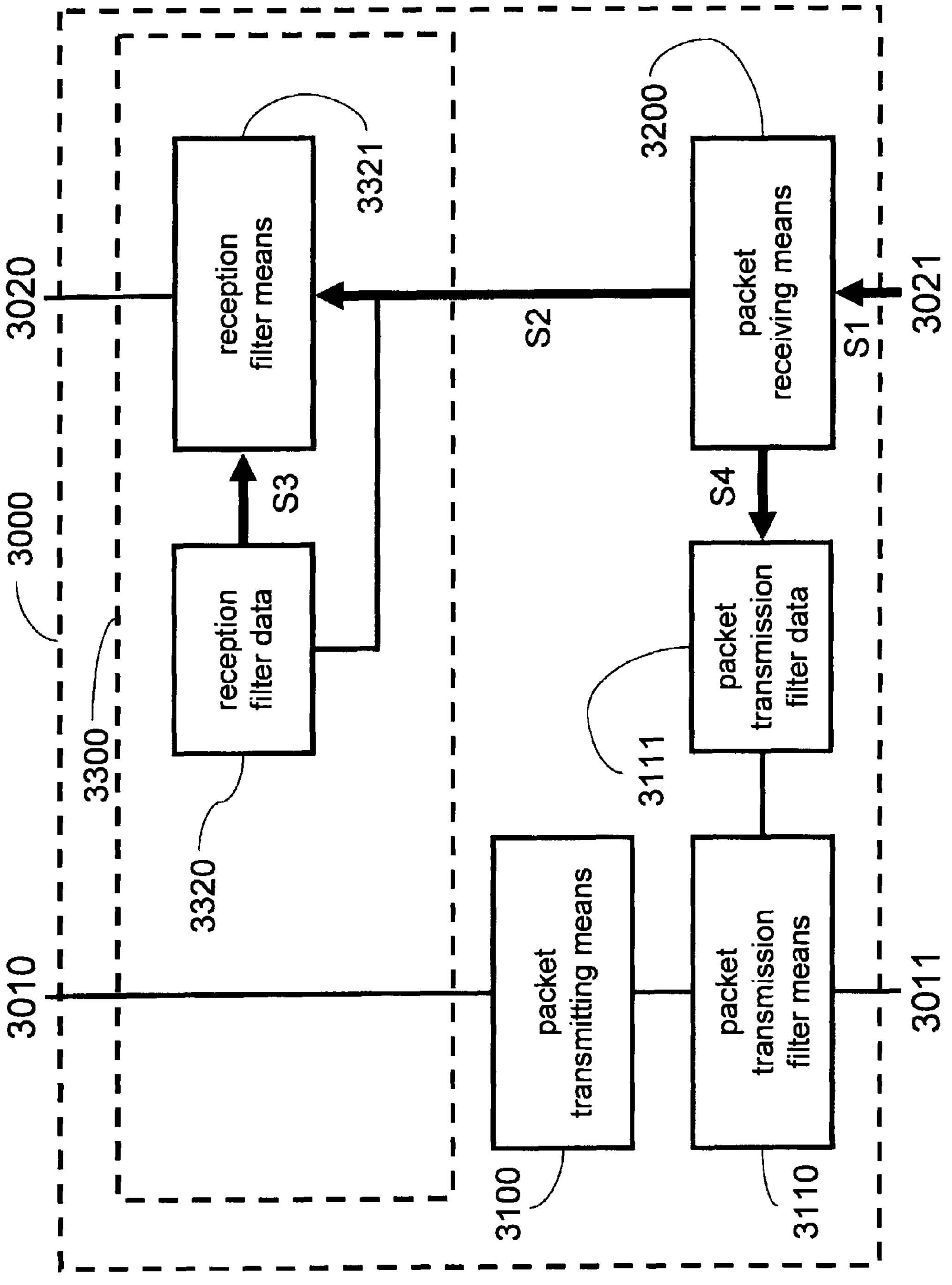
FIG. 76 is a view illustrating an example of an internal operation of the adaptor shown in FIG. 71.

Next, an internal operation of adaptor 3000 will be described when a packet is received from router node 2000 connected to adaptor 3000 and packet transmission filter data 3111 is updated by data of the received packet. FIG. 76 is a view illustrating an example of an internal operation of adaptor 3000 shown in FIG. 71.

Step 1 (S1): Packet receiving means 3200 receives a packet to be updated, which is a packet including new data of the packet transmission filter data, from router node 2000. Step 2 (S2): Packet receiving means 3200 converts the received packet to be updated into an access request for writing new data to packet transmission filter data 3111 and delivers it to reception filter means 3320.

Step 3 (S3): When reception filter means 3321 receives the access request from packet receiving means 3200, it refers to reception filter data 3320 and determines whether the access request can be processed. As a result, the reception filter means recognizes that it is not necessary to temporarily stop processing of the access request and the access request can be processed. Then, reception filter means 3321 reads out new data of the packet transmission filter data from the access request, and transmits it to packet receiving means 3200.

Step 4 (S4): When packet receiving means 3200 receives the new data of the packet transmission filter data from reception filter means 3321, it writes the new data in packet transmission filter data 3111. By doing so, packet transmission filter data 3111 is updated.

Meantime, in the structure example shown in FIG. 71, reception filter means 3321 carries out the access control when updating packet transmission filter data 3111. However, the invention is not limited to reception filter means 3321. Another circuit capable of performing the same access control as above may be possible.

Up to now, the structure of adaptor 3000 shown in FIG. 71 has been specifically described. Next, a case will be described where a plurality of sets, each of which consists of the adaptor, the core and the router node, is connected.

The structure of the case where a plurality of sets, each of which consists of the adaptor, the core and the router node, is connected is the same as that shown in FIG. 33. Due to this, the structure shown in FIG. 33 will be omitted.

Figure 77:
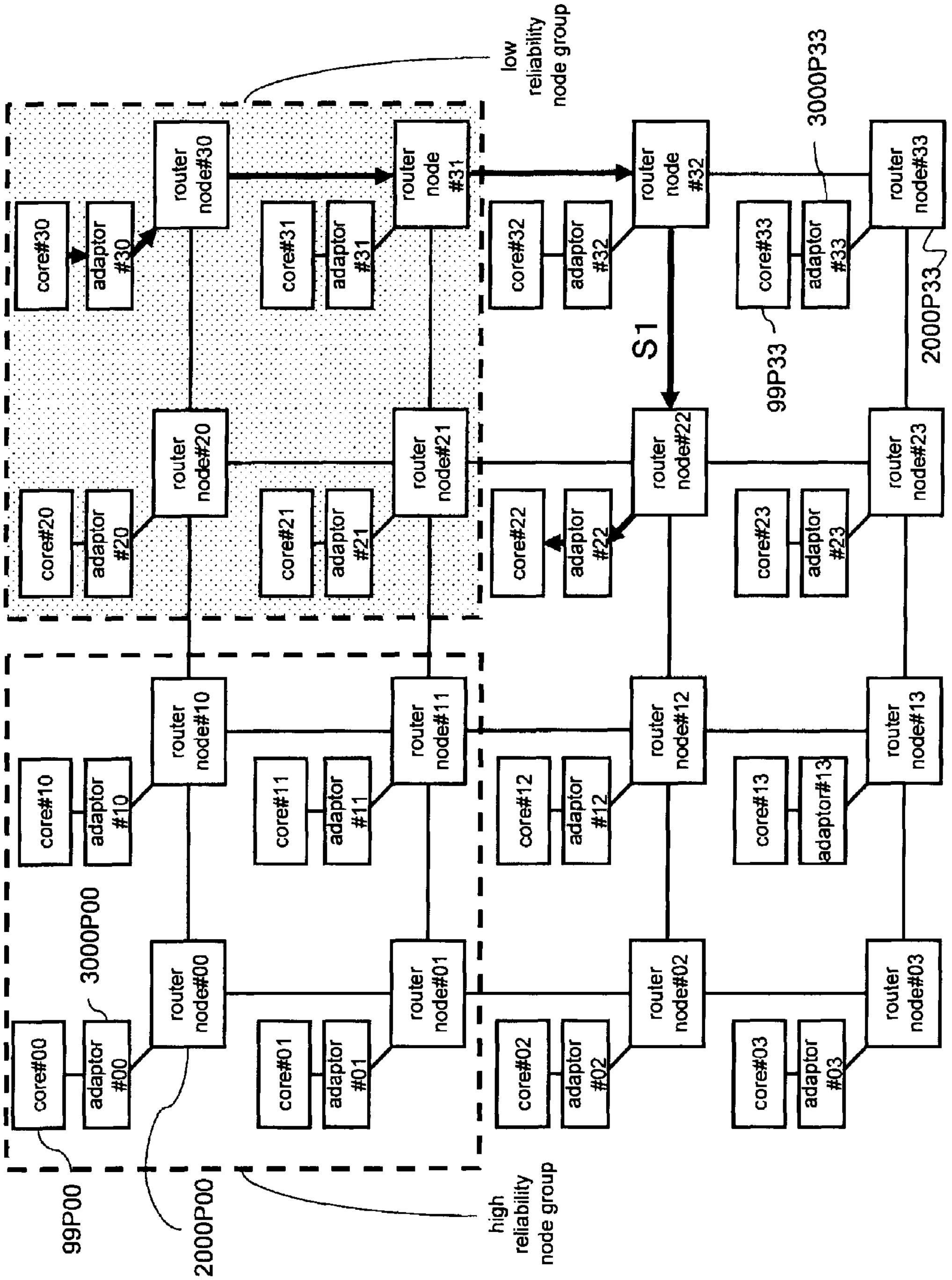
FIG. 77 is a view illustrating an example of an operation of the semiconductor integrated circuit shown in FIG. 33 in a third exemplary embodiment.

Next, an operation of a case will be described where an access request is made to core 99P22 from core 99P30 in the structure shown in FIG. 33. In this case, it is assumed that although an access request is made to a core whose reliability has not been defined from a low reliability core, the access request is permitted. FIG. 77 is a view illustrating an example of an 3000P20. When adaptor 3000P20 recognizes that the temporary-stop-packet instructs a temporary stopping of processing of the packet to router node 2000P22, it sets "Yes" in the temporary stop bit, which indicates whether or not to temporarily stop processing of the packet to router node 2000P22 in the packet transmission filter data 3111, and changes processing of the packet to a temporary stop state.

Step 2 (S2): When core 99P00 delivers to adaptor 3000P00 a temporary stop request, which instructs adaptor 3000P30 to temporarily stop processing of the access request to core 99P22 from core 99P30, adaptor 3000P00 transmits to router node 2000P00 a temporary-stop-packet having a destination of adaptor 3000P30, which provides instructions to indicate the temporary stopping of processing of the packet to router node 2000P22, to be written into packet transmission filter data 3111. Router node 2000P00 transmits the received temporary-stop-packet to adjacent router node 2000P10. The packet transmitted from router node 2000P00 reaches router node 2000P30 through router nodes 2000P10 and 2000P20, which are relays.

Then, router node 2000P30 delivers the received temporary-stop-packet to adaptor 3000P30. When adaptor 3000P30 recognizes that the temporary-stop-packet instructs temporary stopping of processing of the packet to router node 2000P22, it sets "Yes" in the temporary stop bit, which indicates whether or not to temporarily stop processing of the router node 2000P22 in packet transmission filter data 3111, and changes processing of the packet to a temporary stop state.

Step 3 (S3): When core 99P00 delivers to adaptor 3000P00 a temporary stop request, which instructs adaptor 3000P21 to temporarily stop processing of the access request to core 99P22 from core 99P21, adaptor 3000P00 transmits to router node 2000P00 a temporary-stop-packet having a destination of adaptor 3000P21, which provides instructions to indicate the temporary stopping of processing of a packet to router node 2000P22, to be written into packet transmission filter data 3111. Router node 2000P00 transmits the received temporary-stop-packet to adjacent router node 2000P10. The packet transmitted from router node 2000P00 reaches router node 2000P21 through router nodes 2000P10 and 2000P20, which are relays.

Then, router node 2000P21 delivers the received temporary-stop-packet to adaptor 3000P21. When adaptor 3000P21 recognizes that the temporary-stop-packet instructs temporary stopping of processing of the packet to router node 2000P22, it sets "Yes" in the operation of the semiconductor integrated circuit shown in FIG. 33. The adaptor shown in FIG. 77 corresponds to adaptor 3000 shown in FIG. 71.

Step 1 (S1): Core 99P30 delivers to adaptor 3000P30 an access request to core 99P22. When adaptor 3000P30 receives the access request from core 99P30, it converts the access request into a packet. Continuously, the adaptor refers to packet transmission filter data 3111. When the adaptor recognizes that transmission of the packet to router node 2000P22 connected to core 99P22 is permitted, it transmits the packet having a destination of core 99P22 to router node 2000P30.

Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32. Then, router node 2000P22 delivers the received packet to adaptor 3000P22 and adaptor 3000P22 converts the packet into an access request corresponding to a core and delivers it to core 99P22.

Figure 78:
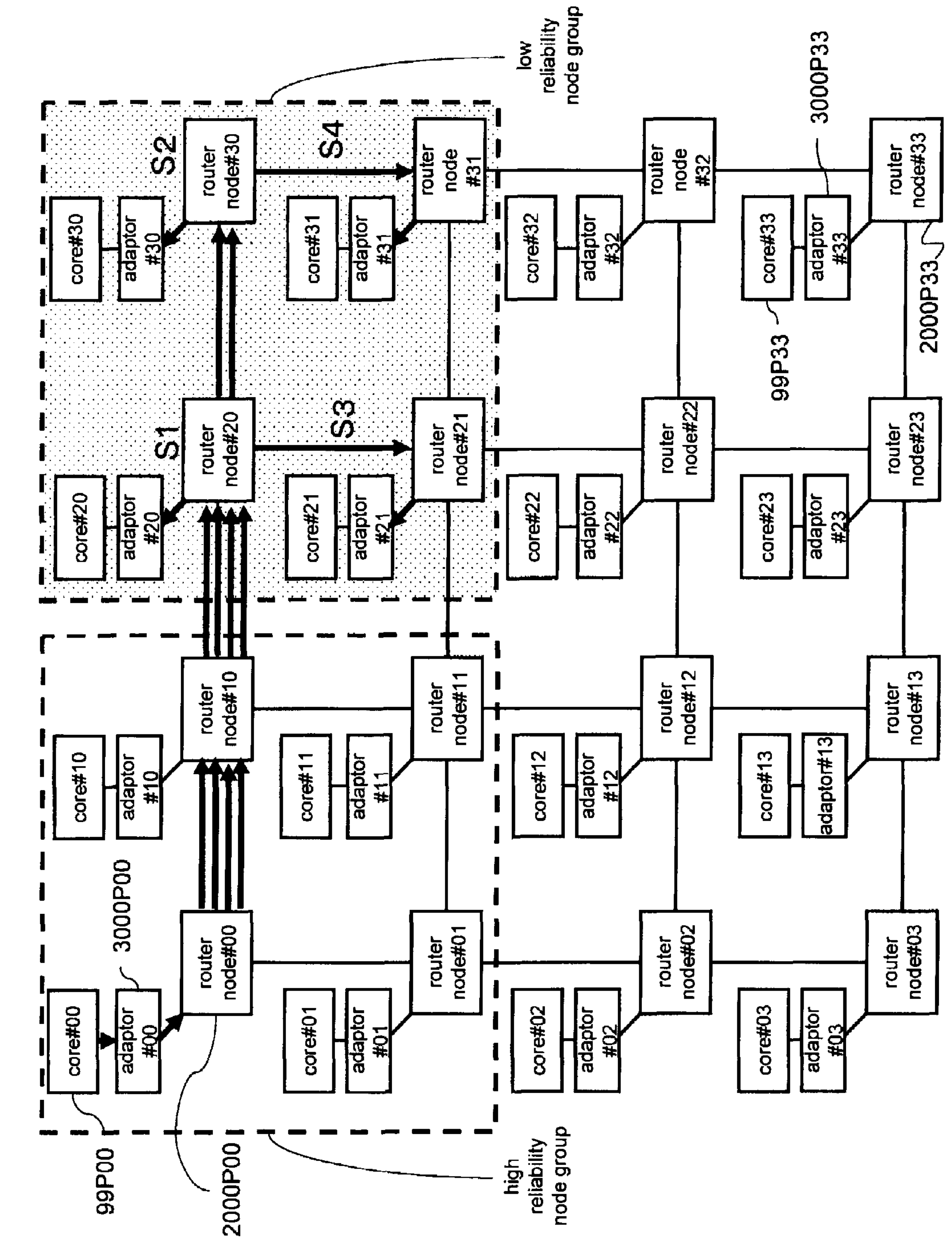
FIG. 78 is a view illustrating an example of an operation of the semiconductor integrated circuit shown in FIG. 33 in a third exemplary embodiment.

Next, an operation of a case will be described where processing of a packet to router node 2000P22 in the packet transmission filter data is temporarily stopped in adaptors 3000P20, 3000P21, 3000P30 and 3000P31 because high reliability core 99P00 inhibits the access request to core 99P22 from each of low reliability cores 99P20, 99P30, 99P21 and 99P31. FIG. 78 is a view illustrating an example of an operation of the semiconductor integrated circuit shown in FIG. 33. The adaptor shown in FIG. 78 corresponds to adaptor 3000 shown in FIG. 71.

Step 1 (S1): When core 99P00 delivers to adaptor 3000P00 a temporary stop request, which instructs adaptor 3000P20 to temporarily stop processing of an access request to core 99P22 from core 99P20, adaptor 3000P00 transmits to router node 2000P00 a temporary-stop-packet having a destination of adaptor 3000P20, which provides instructions to indicate the temporary stopping of processing of a packet to router node 2000P22, to be written into packet transmission filter data 3111. Router node 2000P00 transmits the received temporary-stop-packet to adjacent router node 2000P10. The packet transmitted from router node 2000P00 reaches router node 2000P20 through router node 2000P10 that is a relay.

Then, router node 2000P20 delivers the received temporary-stop-packet to adaptor temporary stop bit, which indicates whether or not to temporarily stop processing of the packet to router node 2000P22 in packet transmission filter data 3111, and changes processing of the packet to a temporary stop state.

Step 4 (S4): When core 99P00 delivers to adaptor 3000P00 the temporary stop request, which instructs adaptor 3000P31 to temporarily stop processing of the access request to core 99P22 core 99P31, adaptor 3000P00 transmits to router node 2000P00 a temporary-stop-packet having a destination of adaptor 3000P31, which provides instructions to indicate the temporary stopping of processing of the packet to router node 2000P22, to be written into packet transmission filter data 3111. Router node 2000P00 transmits the received temporary-stop-packet to adjacent router node 2000P10. The packet transmitted from router node 2000P00 reaches router node 2000P31 through router nodes 2000P10, 2000P20 and 2000P30, which are relays.

Then, router node 2000P31 delivers the received temporary-stop-packet to adaptor 3000P31. When adaptor 3000P31 recognizes that the temporary-stop-packet instructs temporary stopping of processing of the packet to router node 2000P22, it sets "Yes" in the temporary stop bit, which indicates whether or not to temporarily stop processing of the packet to router node 2000P22 in packet transmission filter data 3111, and changes processing of the packet to a temporary stop state.

Figure 79:
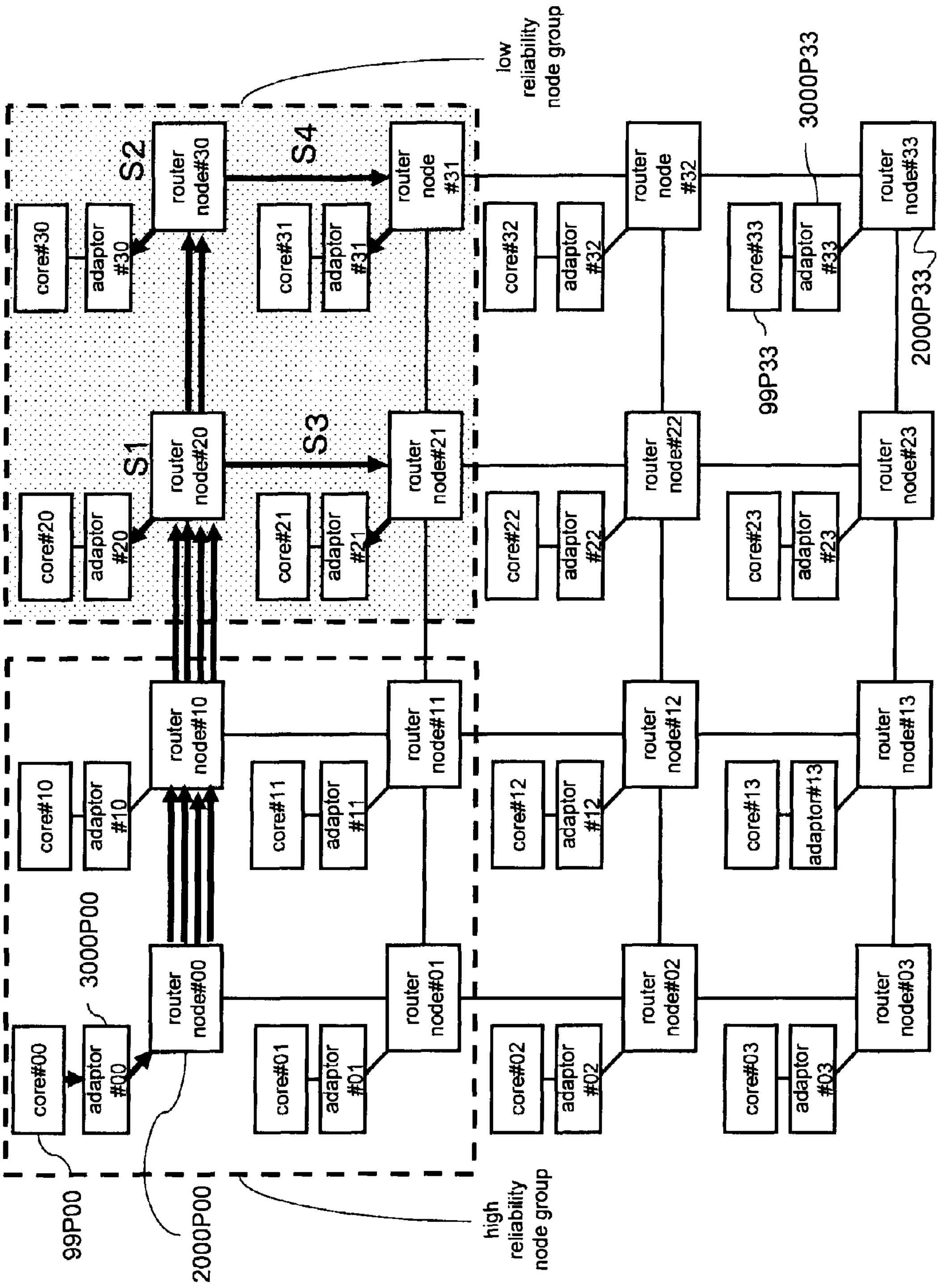
FIG. 79 is a view illustrating an example of an operation of the semiconductor integrated circuit shown in FIG. 33 in a third exemplary embodiment.

Next, an operation of a case will be described where an item indicating permission or inhibition of packet transmission to core 99P22 in the packet transmission filter data is updated in adaptors 3000P20, 3000P21, 3000P30 and 3000P31 because high reliability core 99P00 inhibits the access request to core 99P22 from each of low reliability cores 99P20, 99P30, 99P21 and 99P31. FIG. 79 is a view illustrating an example of an operation of the semiconductor integrated circuit shown in FIG. 33. The adaptor shown in FIG. 79 corresponds to adaptor 3000 shown in FIG. 71.

Step 1 (S1): When core 99P00 delivers to adaptor 3000P00 a filter data update request, which is to update the filter data into content for inhibiting an access request to core 99P22 from core 99P20, adaptor 3000P00 transmits to router node 2000P00 a packet to be updated having a destination of adaptor 3000P20, which includes information indicating inhibition of packet transmission to router node 2000P22. Router node 2000P00 transmits the received packet to be updated to adjacent router node 2000P10. The packet transmitted from router node 2000P00 reaches router node 2000P20 through router node 2000P10.

Then, router node 2000P20 delivers the received packet to be updated to adaptor 3000P20. When adaptor 3000P20 recognizes that the packet to be updated inhibits packet transmission to router node 2000P22, it sets a vacant space in the permission bit, which indicates the type of the packet to router node 2000P22, while maintaining the temporary stop bit as "Yes," in packet transmission filter data 3111, and changes the state into a state inhibiting the packet transmission to router node 2000P22.

Step 2 (S2): When core 99P00 delivers to adaptor 3000P00 a filter data update request, which is to update the filter data into content for inhibiting an access request to core 99P22 from core 99P30, adaptor 3000P00 transmits to router node 2000P00 a packet to be updated having a destination of adaptor 3000P30, which includes information indicating inhibition of packet transmission to router node 2000P22. Router node 2000P00 transmits the received packet to be updated to adjacent router node 2000P10. The packet transmitted from router node 2000P00 reaches router node 2000P30 through router nodes 2000P10, 2000P20.

Then, router node 2000P30 delivers the received packet to be updated to adaptor 3000P30. When adaptor 3000P30 recognizes that the packet to be updated inhibits packet transmission to router node 2000P22, it sets a vacant space in the permission bit, which indicates the type of the packet to router node 2000P22, while maintaining the temporary stop bit as "Yes," in packet transmission filter data 3111, and changes the state into a state inhibiting the packet transmission to router node 2000P22.

Step 3 (S3): When core 99P00 delivers to adaptor 3000P00 a filter data update request, which is to update the filter data into content for inhibiting an access request to core 99P22 from core 99P21, adaptor 3000P00 transmits to router node 2000P00 a packet to be updated having a destination of adaptor 3000P21, which includes information indicating inhibition of packet transmission to router node 2000P22. Router node 2000P00 transmits the received packet to be updated to adjacent router node 2000P10. The packet transmitted from router node 2000P00 reaches router node 2000P21 through router nodes 2000P10 and 2000P20.

Then, router node 2000P21 delivers the received packet to be updated to adaptor 3000P21. When adaptor 3000P21 recognizes that the packet to be updated inhibits packet transmission to router node 2000P22, it sets a vacant space in the permission bit, which indicates the type of the packet to router node 2000P22, while maintaining the temporary stop bit as "Yes," in packet transmission filter data 3111, and changes the state into a state inhibiting the packet transmission to router node 2000P22.

Step 4 (S4): When core 99P00 delivers to adaptor 3000P00 a filter data update request, which is to update the filter data into content for inhibiting an access request to core 99P22 from core 99P31, adaptor 3000P00 transmits to router node 2000P00 a packet to be updated having a destination of adaptor 3000P31, which includes information indicating inhibition of packet transmission to router node 2000P22. Router node 2000P00 transmits the received packet to be updated to adjacent router node 2000P10. The packet transmitted from router node 2000P00 reaches router node 2000P31 through router nodes 2000P10, 2000P20 and 2000P30.

Then, router node 2000P31 delivers the received packet to be updated to adaptor 3000P31. When adaptor 3000P31 recognizes that the packet to be updated inhibits packet transmission to router node 2000P22, it sets a vacant space in the permission bit, which indicates the type of the packet to router node 2000P22, while maintaining the temporary stop bit as "Yes," in packet transmission filter data 3111, and changes the state into a state inhibiting the packet transmission to router node 2000P22.

Figure 80:
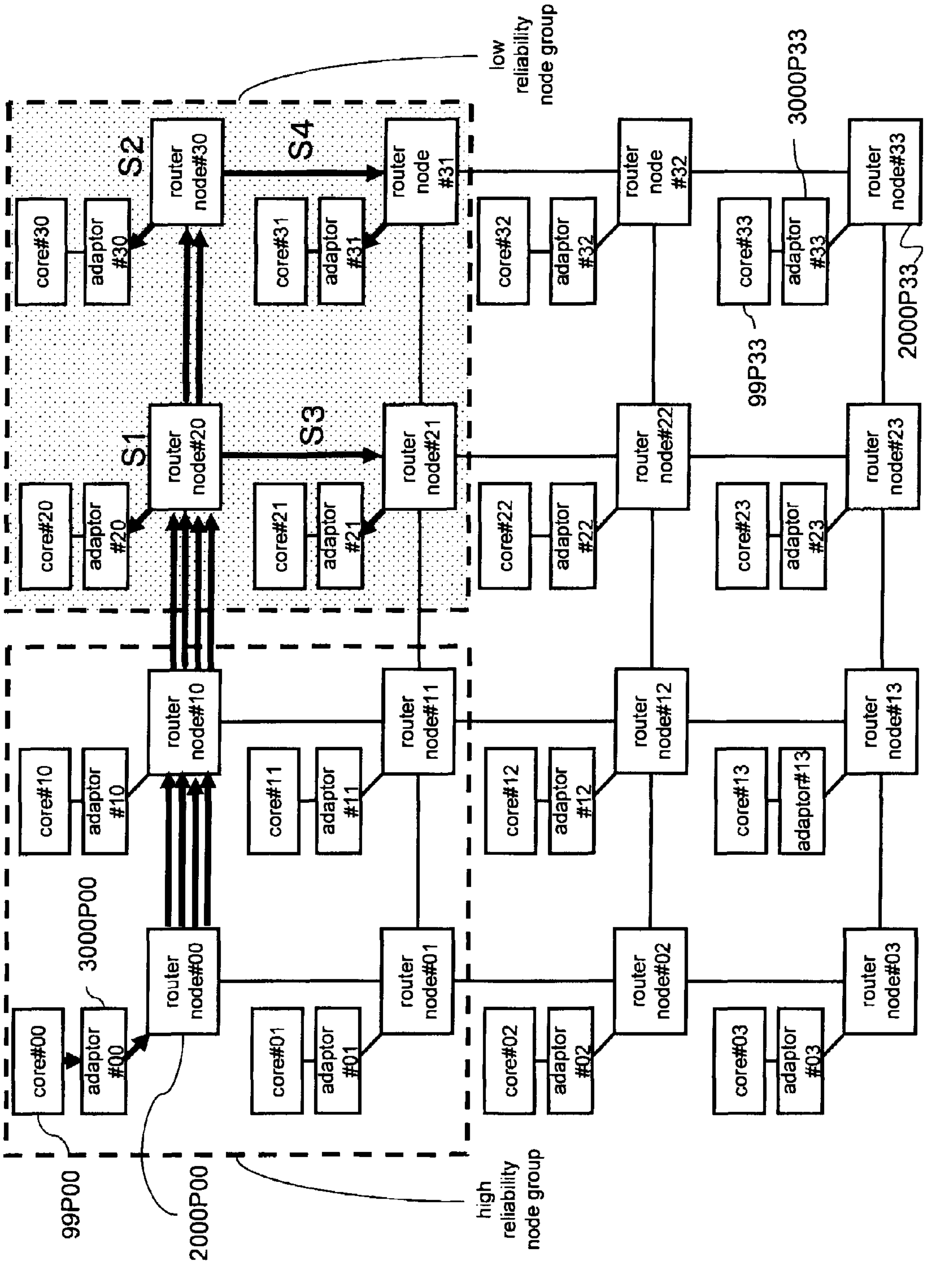
FIG. 80 is a view illustrating an example of an operation of the semiconductor integrated circuit shown in FIG. 33 in a third exemplary embodiment.

Next, an operation of a case will be described where after high reliability core 99P00 inhibits an access request to core 99P22 from each of low reliability cores 99P20, 99P30, 99P21 and 99P31, as described in FIG. 79, it cancels the temporary stopping of processing of a packet to router node 2000P22 in the packet transmission filter data in adaptors 3000P20, 3000P21, 3000P30 and 3000P31. FIG. 80 is a view illustrating an example of an operation of the semiconductor integrated circuit shown in FIG. 33. The adaptor shown in FIG. 80 corresponds to adaptor 3000 shown in FIG. 71.

Step 1 (S1): When core 99P00 delivers to adaptor 3000P00 a temporary stop release request, which instructs adaptor 3000P20 to cancel a temporary stopping of processing of an access request to core 99P22 from core 99P20, adaptor 3000P00 transmits to router node 2000P00 a temporary stop release packet having a destination of adaptor 3000P20, which provides instructions to indicate cancellation of the temporary stopping of processing of the packet to router node 2000P22, to be written into packet transmission filter data 3111. Router node 2000P00 transmits the received temporary stop release packet to adjacent router node 2000P10. The packet transmitted from router node 2000P00 reaches router node 2000P20 through router node 2000P10.

Then, router node 2000P20 delivers the received temporary stop release packet to adaptor 3000P20. When adaptor 3000P20 recognizes that the temporary stop release packet instructs cancellation of the temporary stopping of processing of the packet to router node 2000P22, the adaptor sets "No" in the temporary stop bit, which indicates whether or not to temporarily stop processing of the packet to router node 2000P22, and cancels the temporary stop state of processing of the packet to router node 2000P22.

Step 2 (S2): When core 99P00 delivers to adaptor 3000P00 a temporary stop release request, which instructs adaptor 3000P30 to cancel the temporary stopping of processing of an access request to core 99P22 from core 99P30, adaptor 3000P00 transmits to router node 2000P00 a temporary stop release packet having a destination of adaptor 3000P30, which provides instructions to indicate cancellation of the temporary stopping of processing of the packet to router node 2000P22, to be written into packet transmission filter data 3111. Router node 2000P00 transmits the received temporary stop release packet to adjacent router node 2000P10. The packet transmitted from router node 2000P00 reaches router node 2000P20 through router nodes 2000P10 and 2000P20.

Then, router node 2000P30 delivers the received temporary stop release packet to adaptor 3000P30. When adaptor 3000P30 recognizes that the temporary stop release packet is to instruct cancellation of the temporary stopping of processing of the packet to router node 2000P22, the adaptor sets "No" in the temporary stop bit for router node 2000P22 in packet transmission filter data 3111, and cancels the temporary stop state of processing of the packet to router node 2000P22.

Step 3 (S3): When core 99P00 delivers to adaptor 3000P00 a temporary stop release request, which instructs adaptor 3000P21 to cancel the temporary stopping of processing of an access request to core 99P22 from core 99P21, adaptor 3000P00 transmits to router node 2000P00 a temporary stop release packet having a destination of adaptor 3000P21, which provides instructions to indicate cancellation of the temporary stopping of processing of the packet to router node 2000P22, to be written into packet transmission filter data 3111. Router node 2000P00 transmits the received temporary stop release packet to adjacent router node 2000P10. The packet transmitted from router node 2000P00 reaches router node 2000P21 through router nodes 2000P10 and 2000P20.

Then, router node 2000P21 delivers the received temporary stop release packet to adaptor 3000P21. When adaptor 3000P21 recognizes that the temporary stop release packet is to instruct cancellation of the temporary stopping of processing of the packet to router node 2000P22, the adaptor sets "No" in the temporary stop bit for router node 2000P22 in packet transmission filter data 3111, and cancels the temporary stop state of processing of the packet to router node 2000P22.

Step 4 (S4): When core 99P00 delivers to adaptor 3000P00 a temporary stop release request, which instructs adaptor 3000P31 to cancel the temporary stopping of processing of an access request to core 99P22 from core 99P31, adaptor 3000P00 transmits to router node 2000P00 a temporary stop release packet having a destination of adaptor 3000P31, which provides instructions to indicate cancellation of the temporary stopping of processing of the packet to router node 2000P22, to be written into packet transmission filter data 3111. Router node 2000P00 transmits the received temporary stop release packet to adjacent router node 2000P10. The packet transmitted from router node 2000P00 reaches router node 2000P31 through router nodes 2000P10, 2000P20 and 2000P30.

Then, router node 2000P31 delivers the received temporary stop release packet to adaptor 3000P31. When adaptor 3000P31 recognizes that the temporary stop release packet is to instruct cancellation of the temporary stopping of processing of the packet to router node 2000P22, the adaptor sets "No" in the temporary stop bit for router node 2000P22 in packet transmission filter data 3111, and cancels the temporary stop state of processing of the packet to router node 2000P22.

Figure 81:
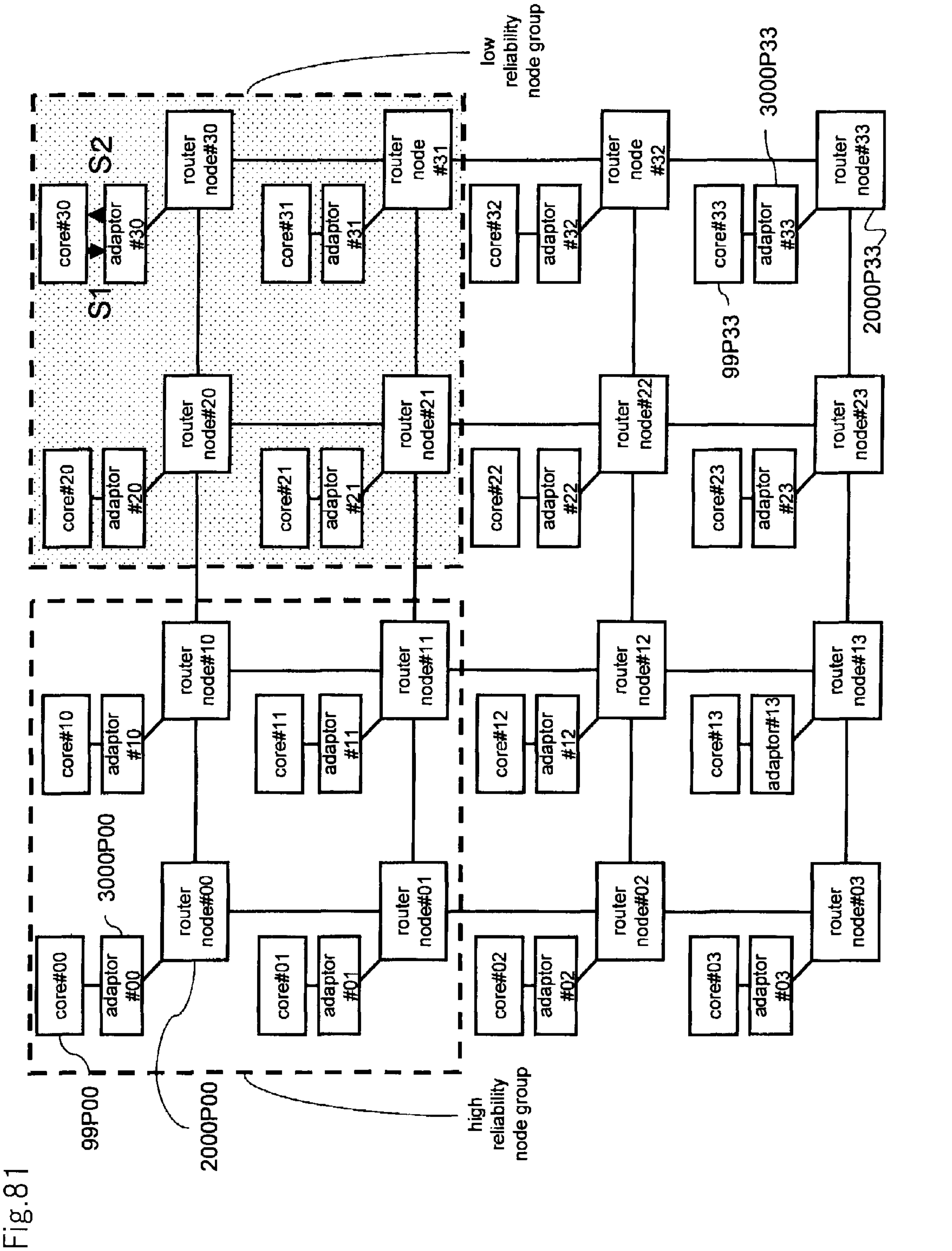
FIG. 81 is a view illustrating an example of an operation of the semiconductor integrated circuit shown in FIG. 33 in a third exemplary embodiment.

Next, an operation of a case will be described where low reliability core 99P30 makes an access request to core 99P22 after the setting of the packet transmission filter data is changed as described in FIGS. 78, 79 and 80. The setting of the packet transmission filter data is changed as described above and an access request from low reliability core 99P30 to core 99P22 whose reliability has not been defined is inhibited. FIG. 81 is a view illustrating an example of an operation of the semiconductor integrated circuit shown in FIG. 33. The adaptor shown in FIG. 81 corresponds to adaptor 3000 shown in FIG. 71.

Step 1 (S1): Core 99P30 delivers an access request to core 99P22 to adaptor 3000P30. Step 2 (S2): When adaptor 3000P30 receives the access request from core 99P30, the adaptor converts it into a packet. Then, the adaptor refers to packet transmission filter data 3111. When the adaptor recognizes that packet transmission to router node 2000P22 is inhibited, it returns the access error response to core 99P30.

Figure 82:
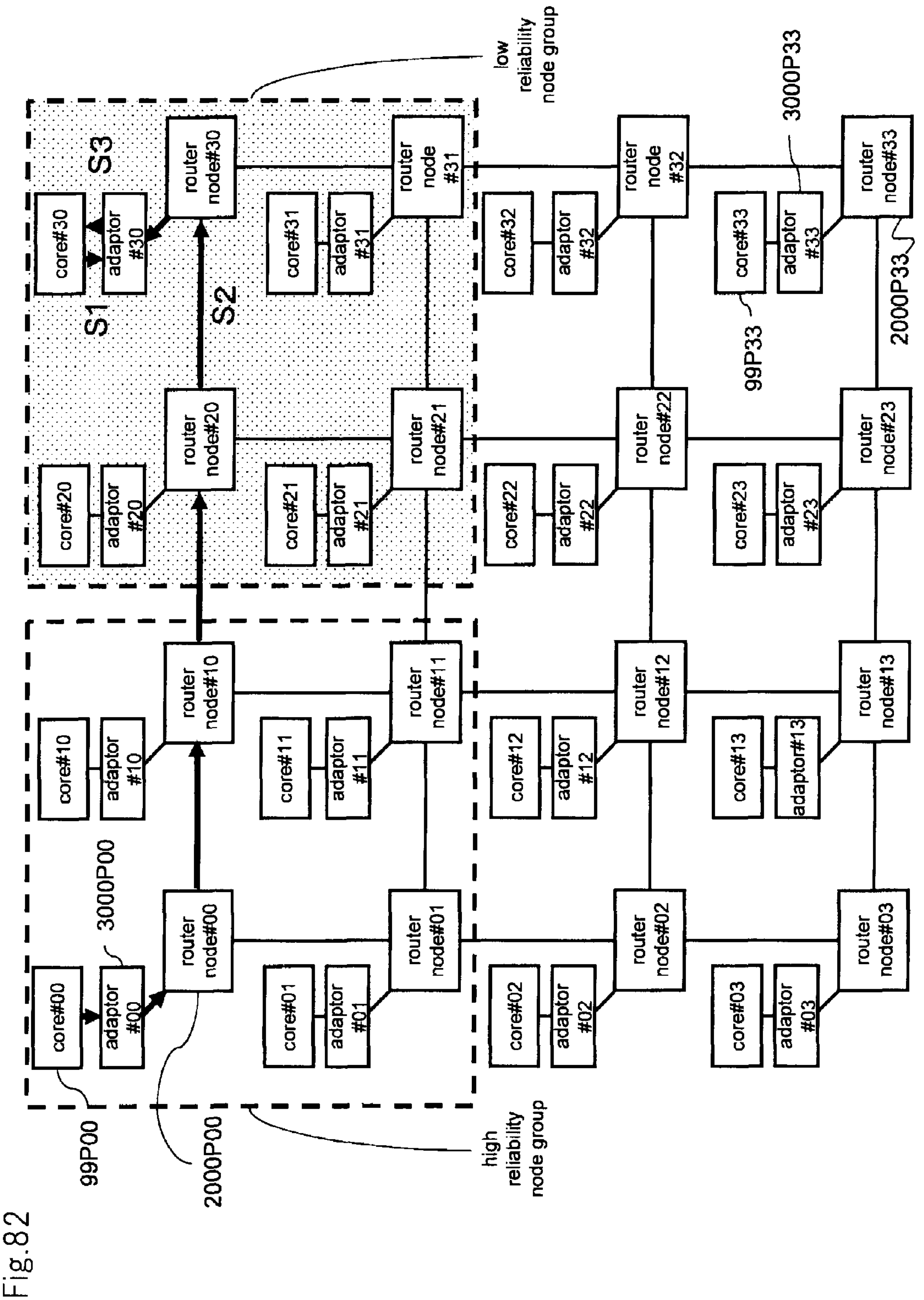
FIG. 82 is a view illustrating an example of an operation of the semiconductor integrated circuit shown in FIG. 33 in a third exemplary embodiment.

Next, an operation of a case will be described where processing of an access request is temporarily stopped so as to update the transmission filter data in one adaptor and then the packet transmission filter data is updated so as not to permit the adaptor to transmit the access request to a predetermined core. Here, processing of the access request to core 99P22 from low reliability core 99P30 is temporarily stopped, and high reliability core 99P00 inhibits transmission of the access request from core 99P30 to core 99P22 and cancels the temporary stopping of processing of the access request. FIG. 82 is a view illustrating an example of an operation of the semiconductor integrated circuit shown in FIG. 33. The adaptor shown in FIG. 82 corresponds to adaptor 3000 shown in FIG. 71.

Step 1 (S1): Core 99P30 delivers an access request to core 99P22 to adaptor 3000P30. When adaptor 3000P30 receives the access request from core 99P30, the adaptor converts it into a packet. Continuously, the adaptor refers to packet transmission filter data 3111. When the adaptor recognizes that processing of the packet is temporarily stopped, it maintains the packet.

Step 2 (S2): Core 99P00 delivers to adaptor 3000P00 a filter data update request, which is to update the filter data into content for inhibiting an access request to core 99P22 from core 99P30, and a temporary stop release request, which provides instructions to indicate cancellation of a temporary stopping of processing of a packet to router node 2000P22 from adaptor 3000P30, to be written into packet transmission filter data 3111. When adaptor 3000P00 receives the filter data update request and the temporary stop release request from core 99P00, it transmits to router node 2000P00 an update/temporary stop release packet having a destination of adaptor 3000P30, which provides instructions to indicate inhibition of packet transmission to router node 2000P22 and cancellation of the temporary stopping of processing of the packet to router node 2000P22, to be written into packet transmission filter data 3111. Router node 2000P00 transmits the received update/temporary stop release packet to adjacent router node 2000P10. The packet transmitted from router node 2000P00 reaches router node 2000P30 through router nodes 2000P10 and 2000P20.

Then, router node 2000P30 delivers the received update/temporary stop release packet to adaptor 3000P30. Adaptor 3000P30 recognizes that the update/temporary stop release packet is to inhibit packet transmission to router node 2000P22 and to cancel the temporary stopping of processing of the packet to router node 2000P22. Continuously, the adaptor sets a vacant space in the permission bit for router node 2000P22 and changes the state into a state inhibiting packet transmission to router node 2000P22, in packet transmission filter data 3111. In addition, the adaptor sets "No" in the temporary stop bit of the processing of the packet to router node 2000P22 and cancels the temporary stop state of processing of the packet to router node 2000P22, in packet transmission filter data 3111.

Step 3 (S3): Adaptor 3000P30 refers to packet transmission filter data 3111 before re-transmitting the maintained packet to router node 2000P22. Since the packet transmission to router node 2000P22 is inhibited in packet transmission filter data 3111, the adaptor delivers to core 99P30 an access error response that is information for notifying that a packet by the access request cannot be transmitted and an error is thus caused.

In this exemplary embodiment, regarding the access request from the core, each of the adaptors in the interconnecting network controls the delivery of the packet in accordance with the delivery information. By making the contents of the delivery information, which is maintained by each adaptor, consistent, it is possible to consistently perform filter control.

In addition, when updating the delivery information, the instruction of the temporary stopping of processing of the packet and the instructions of the update of the packet transmission filter data and the cancellation of the temporary stopping of processing of the packet are simultaneously made from a predetermined core with respect to the adaptors in the interconnecting network.

In this exemplary embodiment, when transmitting the access request from the core to the outside, the access request is converted into a packet and it is then determined whether or not to distribute the packet. Thus, it is possible to obtain the effects same as the first exemplary embodiment. In this case, the filter control may not be performed by adaptor filter control means 3300 described in the first or second exemplary embodiment.

Fourth Exemplary Embodiment

In the first to third exemplary embodiments, the adaptor controls the access request. However, in this exemplary embodiment, the router node controls the access request. In the followings, since the structures, except the router node, are the same as those of the first exemplary embodiment, detailed explanations thereof will be omitted.

Figure 83:
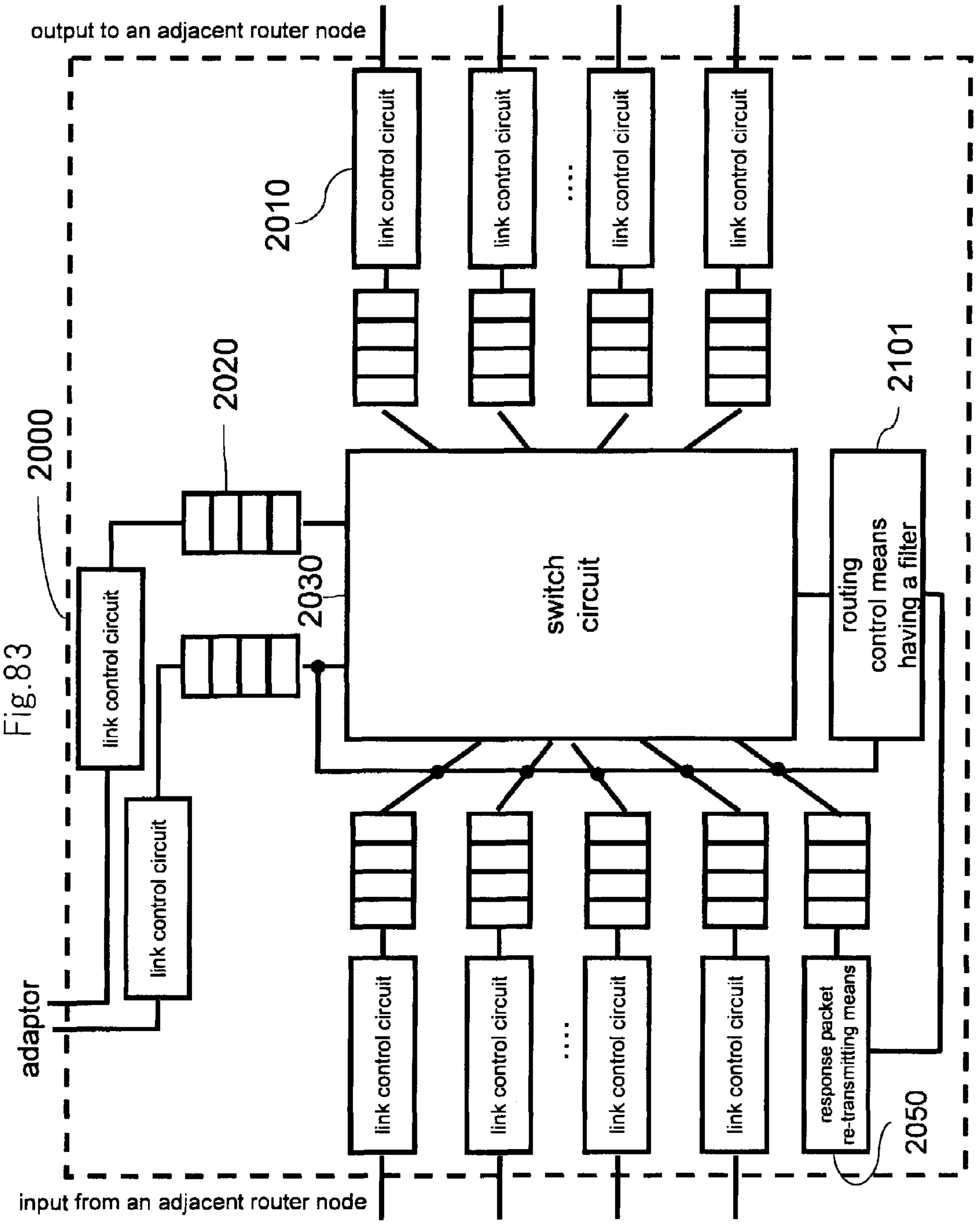
FIG. 83 is a view showing an example of a structure of a router node according to a fourth exemplary embodiment.

The structure of the router node in this exemplary embodiment will be described. FIG. 83 is a view showing an example of a structure of router node 2000 according to this exemplary embodiment. A detailed description of the structures which are the same as the router node shown in FIG. 7 will be omitted.

Referring to FIG. 83, this structure has a characteristic in which routing control means 2100 of router node 2000 shown in FIG. 7 is replaced with routing control means 2101 having a filter.

Routing control means 2101 having a filter refers to information of destinations included in packet headers of input channels connected to adjacent router nodes and adaptors and notifies switch circuit 2030 which input channel is preferably connected to which output channel in accordance with the destinations of the packets. In addition, it refers to router filter data 2141, which indicates in which range processing of a packet is permitted, together with information of a router node of a packet transmission source and a router node of a packet destination, and determines whether or not to route a packet to be distributed. The routing control means refers to information of whether or not to temporarily stop processing of a packet in router filter data 2141 and re-transmits a packet to be distributed to its own router node or performs the routing control again. In addition, when the routing control means cannot process a packet, it generates an error packet for notifying the transmission source of the information.

Response packet re-transmitting means 2050 transmits an error packet to a transmission source when a packet to be distributed cannot be processed. In addition, when the response packet re-transmitting means receives a packet, whose processing is temporarily stopped, from routing control means 2101 having a filter as a re-transmission packet, it transmits the re-transmission packet to the interconnecting network.

Accordingly, routing control means 2101 having a filter has a characteristic in which it is provided with an access control device of routing control means 2100 and refers to the temporary stop information to control the packet delivery.

Figure 84:
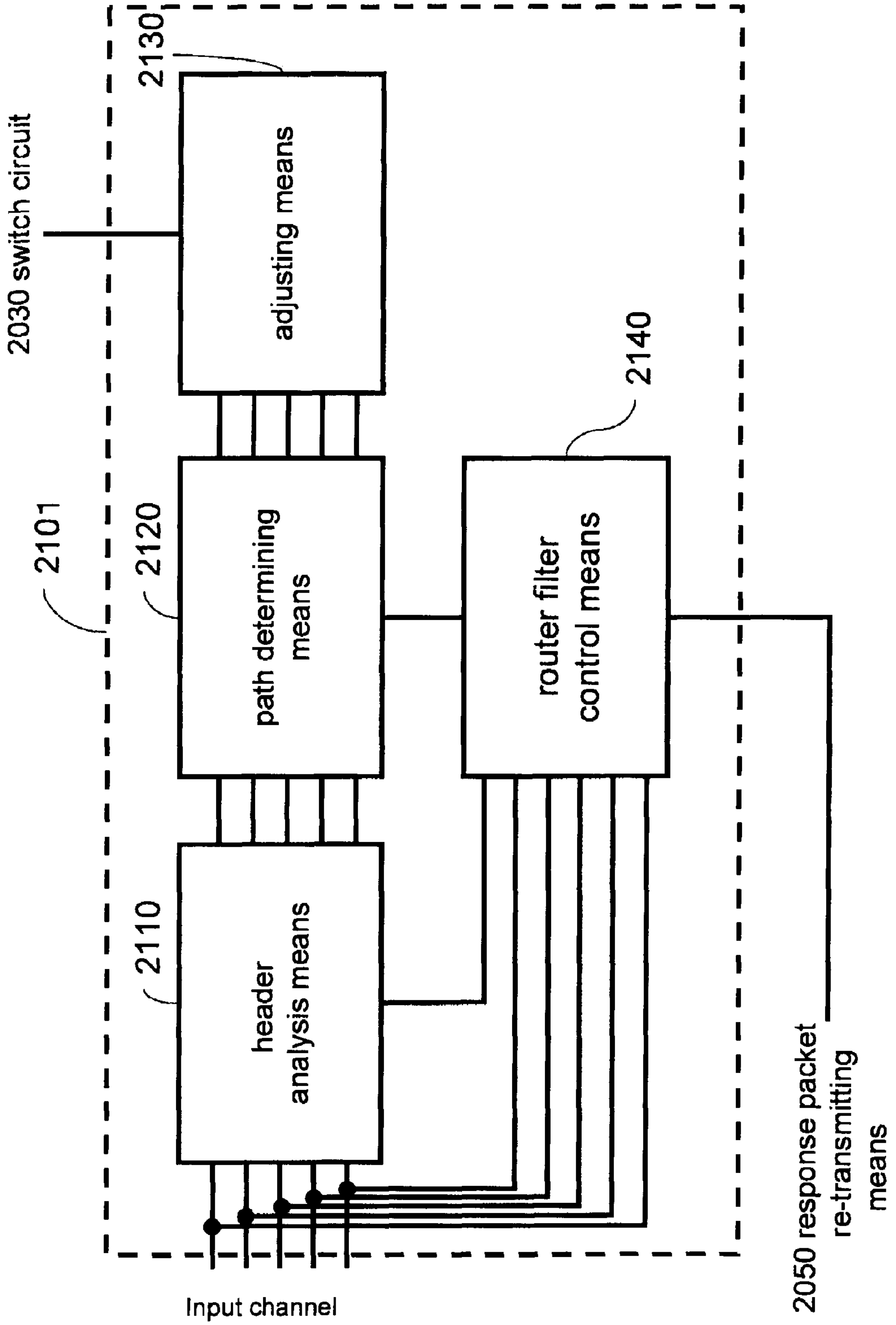
FIG. 84 is a view showing an example of a structure of routing control means having a filter of a fourth exemplary embodiment.

Next, a structure of routing control means 2101 having a filter will be described. FIG. 84 is a view showing an example of a structure of routing control means having a filter.

Referring to FIG. 84, routing control means 2101 having a filter comprises header analysis means 2110 shown in FIG. 11, path determining means 2120, adjusting means 2130 and router filter control means 2140 that limits packet routing from a transmission source router node and a destination router node of a packet and a type of an access request of the packet.

Router filter control means 2140 stores router filter data 2141 that is referred to when routing a packet. A structure of router filter data 2141 will be described later.

Router filter control means 2140 receives destination information indicating a destination of a packet and transmission source information indicating a transmission source of a packet from header analysis means 2110. In addition, for a packet having a destination of a core connected to its own node through an adaptor, the router filter control means receives information of an access request from the packet existing in an input channel. Then, the router filter control means refers to router filter data 2141 and determines whether it is preferable to deliver to an adaptor the packet having a destination of a core of its own node. When it is not permitted to transmit the packet to its own node, the router filter control means generates and transmits an error packet, which is to notify that the packet cannot be transmitted, to the transmission source of the packet. In addition, the router filter control means refers to router filter data 2141 and checks whether processing of the packet is temporarily stopped. When processing is temporarily stopped, the router filter control means does not process the packet and transmits the packet to an adjacent router node. Thereby, the transmitted packet is distributed and returned by the router nodes in the interconnecting network.

Next, router filter data 2141 will be described. FIG. 85 is a view illustrating an example of a structure of router filter data 2141. Here, a case is described in which a core, which is connected to a router node storing router filter data 2141 through an adaptor, is a memory.

Router filter data 2141 shown in FIG. 85 shows in which range an access request to the memory from the outside is permitted, which type of request is permitted and which type of a packet is distributed to which router node as destination from which router node as transmission source.

Referring to FIG. 85, an entry is provided which is a set of an identifier of a router node of a packet destination, a router node of a transmission source, a "permission bit" indicating a type of a packet and a "temporary stop bit" indicating whether or not to temporarily stop processing of a packet. However, when the destination of a packet is a router node itself, it is described which type of request and which memory area are permitted, correspondingly to a router node of a transmission source, as regards an access request to a memory connected to the router node through an adaptor. The information of the packet destination, the transmission source, the memory area and the type of the packet corresponds to the delivery information that shows a condition so that the packet is processed. Hereinafter, the contents in the table will be specifically described.

When a packet destination is a router node #4 and a transmission source is a router node #0, the permission bit is "C" and "D." Thus, C and D are permitted as types of the packet to be distributed. Since the temporary stop bit is "No," it is not necessary for router filter control means 2140 to temporarily stop processing of the packet when the router filter control means receives the packet to be transmitted to the router node #0 from the router node #4.

When a packet destination is a router node #5 and a transmission source is a router node #1, the permission bit is "A." Thus, A is permitted as a type of the packet to be distributed. Since the temporary stop bit is "No," it is not necessary for router filter control means 2140 to temporarily stop processing of the packet when the router filter control means receives the packet to be transmitted to the router node #1 from router node #5.

In the meantime, when the destination of a packet is router node #1 itself and a transmission source is router node #0, the permission bit is "R" for the area having the address range of 0x00000000~0x20000000 of the memory, so that an access request for reading is permitted. Since the temporary stop bit is "No," it is not necessary for router filter control means 2140 to temporarily stop processing of the packet when the router filter control means receives the packet by the access request from the router node #0.

When the destination of a packet is router node #1 itself and a transmission source is router node #1, the permission bit is "R" for the high reliability area having the address range of 0x00000000~0x10000000 of the memory, so that an access request for reading is permitted. Since the temporary stop bit is "Yes," it is necessary for router filter control means 2140 to temporarily stop processing of the packet when the router filter control means receives the packet by the access request to the high reliability area from router node #1. For the low reliability area having the address range of 0x10000000~0x20000000, the permission bit is "R" and "W," so that an access request for both reading and writing is permitted. Since the temporary stop bit is "No," it is not necessary for router filter control means 2140 to temporarily stop processing of the packet when the router filter control means receives the packet by the access request to the low reliability area from the router node #1.

Here, it is assumed that it is not possible to directly update the router filter data of a router node storing it from the core itself connected to the router node through an adaptor. The information of router filter data 2141 is updated by re-writing new data that is generated by application software to be executed in a core in the high reliability or data that is read out from a file in which setting change information is previously described. A specific example of updating router filter data 2141 will be described below. The update is made when it is necessary to change the range of the high reliability area in accordance with the entire conditions or situations of a semiconductor integrated circuit, like the update of the reception filter data.

In the meantime, it may be possible that only when a condition corresponds to a predetermined condition that has been already set as a semiconductor integrated circuit, a part or all of the packet transmission filter data of an adaptor is updated from a core itself connected to a router node storing the router filter data through the adaptor. In this case, it is not necessary to wait for reception of new data for updating the packet transmission filter data from the high reliability core.

Meanwhile, router filter data 2141 is not limited to the table type as shown in FIG. 85. In other words, any type of router filter data may be possible as long as router filter control means 2140 can read the data and control the access in accordance with the read information.

Additionally, the table shown in FIG. 85 sets the information of a type of a packet that can be transmitted and of whether or not to temporarily stop processing of a packet, correspondingly to a router node. However, the transmission source or destination may be a core, instead of a router node.

Figure 86:
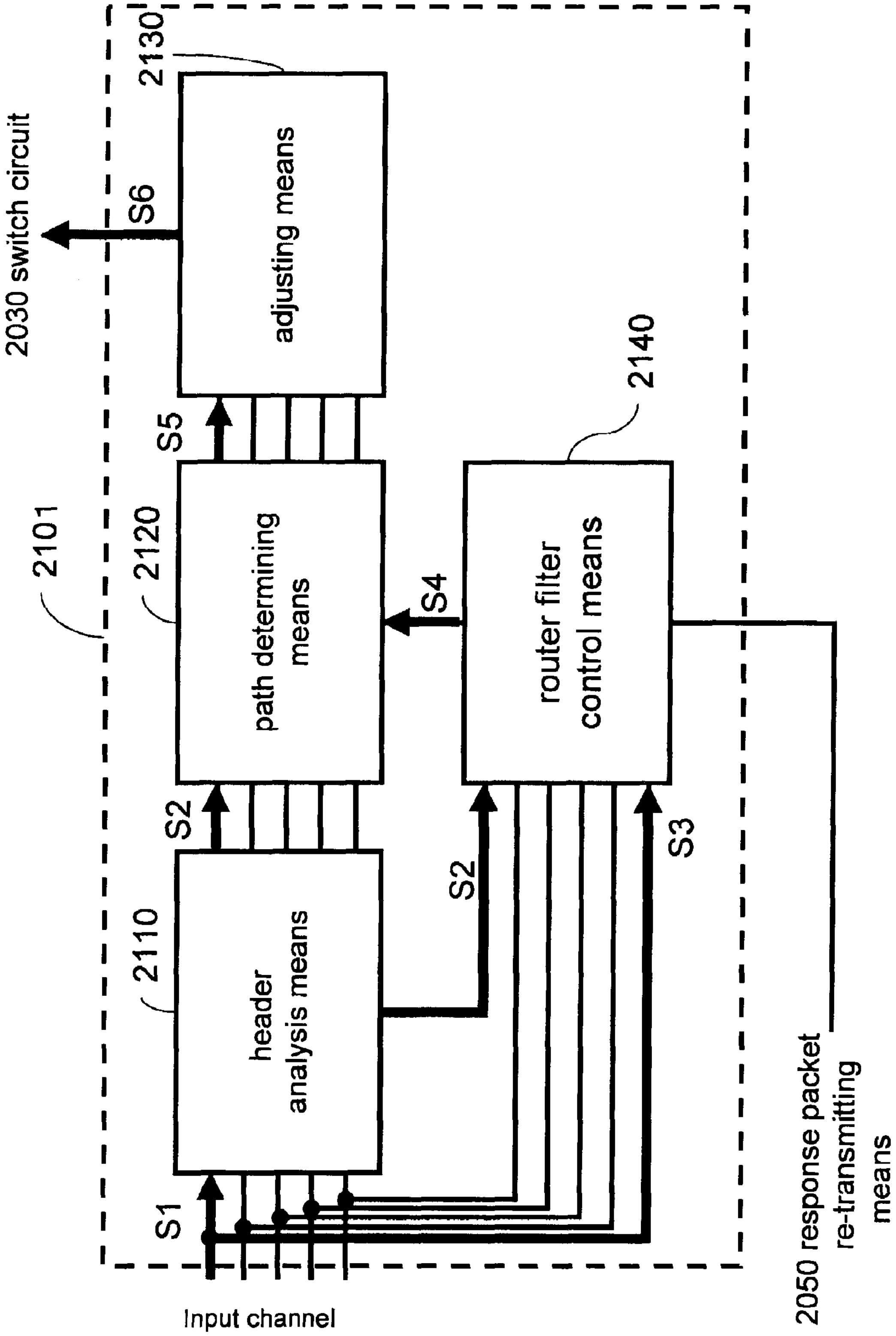
FIG. 86 is a view illustrating an example of an operation of routing control means having a filter shown in FIG. 84.

Next, an operation of router control means 2101 having a filter will be described for a case where when a router node receives a packet from another router node through an input channel, delivery of the packet is permitted. FIG. 86 is a view illustrating an example of an operation of routing control means 2101 having a filter shown in FIG. 84.

Step 1 (S1): Header analysis means 2110 receives header information of a packet through an input channel. Step 2 (S2): Header analysis means 2110 reads out information of a router node of a destination and a router node of a transmission source of the packet, from the received header information, and notifies path determining means 2120 and router filter control means 2140 of the information.

Step 3 (S3): When router filter control means 2140 receives the information of a router node of a destination and a router node of a transmission source, it refers to router filter data 2141 and checks whether routing of the packet is permitted. Here, the router filter control means recognizes that the routing is permitted. Meanwhile, when the destination is the router node itself, the router filter control means converts the packet of the input channel into an access request and obtains information of the access request. Step 4 (S4): Router filter control means 2140 notifies path determining means 2120 that the routing is permitted.

Step 5 (S5): When path determining means 2120 receives the notification that routing is permitted from router filter control means 2140, it determines an output channel suitable for a transmission destination of the packet, based on the information of the router node of the packet destination, and notifies adjusting means 2130 of the output channel information for specifying the output channel.

Step 6 (S6): Adjusting means 2130 confirms that there is no competition in the output channels indicated by the output channel information, and delivers to switch circuit 2030 output node information that is to connect the input channel, to which the packet is inputted, to the designated output channel.

Figure 87:
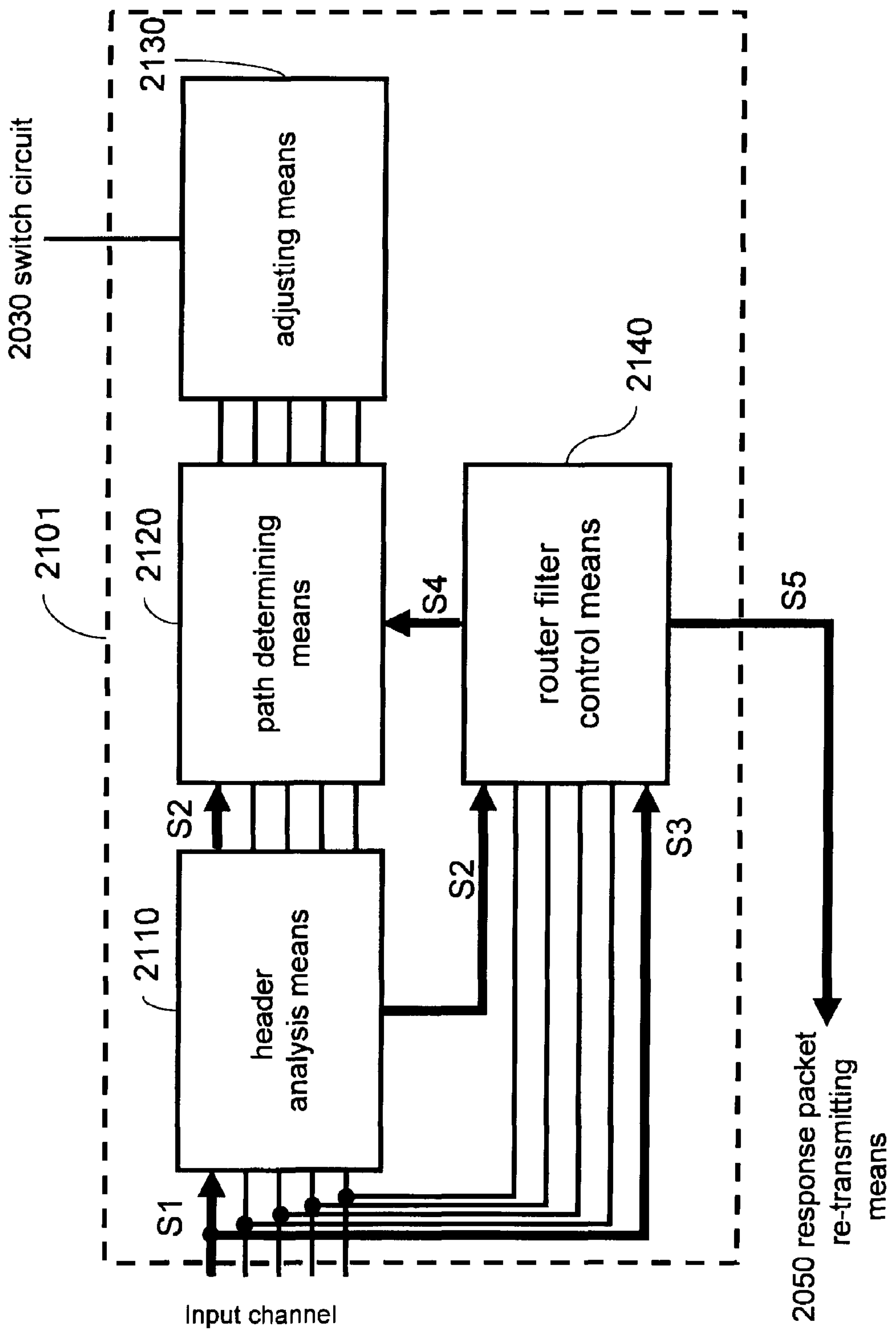
FIG. 87 is a view illustrating an example of an operation of routing control means having a filter shown in FIG. 84.

Next, an operation of router control means 2101 having a filter will be described for a case where, when a router node receives a packet from another router node through an input channel, delivery of the packet is not permitted. FIG. 87 is a view illustrating an example of an operation of routing control means 2101 having a filter shown in FIG. 84.

Step 1 (S1): Header analysis means 2110 receives header information of a packet through an input channel. Step 2 (S2): Header analysis means 2110 reads out information of a router node of a destination and a router node of a transmission source of the packet, from the received header information, and notifies path determining means 2120 and router filter control means 2140 of the information.

Step 3 (S3): When router filter control means 2140 receives the information of a router node of a destination and a router node of a transmission source, it refers to router filter data 2141 and checks whether routing of the packet is permitted. Here, the router filter control means recognizes that routing is not permitted. Step 4 (S4): Router filter control means 2140 notifies path determining means 2120 that the routing is not permitted.

Step 5 (S5): Router filter control means 2140 generates an error packet that is to notify that the packet could not be processed, and delivers the error packet to response packet re-transmitting means 2050.

Figure 88:
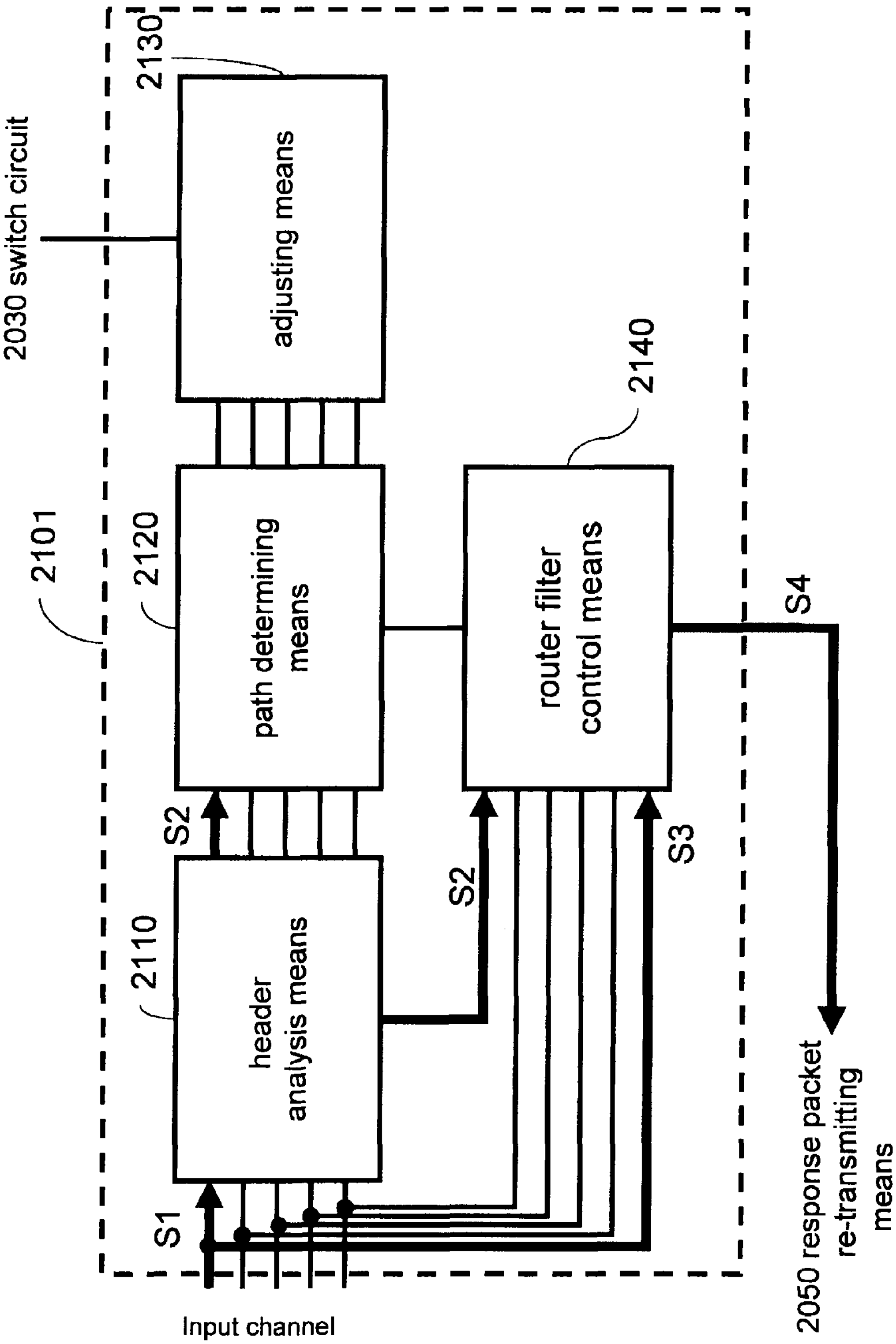
FIG. 88 is a view illustrating an example of an operation of routing control means having a filter shown in FIG. 84.

Next, an operation of router control means 2101 having a filter will be described for a case where, when a router node receives a packet from another router node through an input channel, it temporarily stops delivery of the packet. FIG. 88 is a view illustrating an example of an operation of routing control means 2101 having a filter shown in FIG. 84.

Step 1 (S1): Header analysis means 2110 receives header information of a packet through an input channel. Step 2 (S2): Header analysis means 2110 reads out information of a router node of a destination and a router node of a transmission source of the packet, from the received header information, and notifies path determining means 2120 and router filter control means 2140 of the information.

Step 3 (S3): When router filter control means 2140 receives the information of a router node of a destination and a router node of a transmission source, it refers to router filter data 2141 and checks whether routing of the packet is permitted. Here, the router filter control means recognizes that processing of the packet should be temporarily stopped, and thus temporarily stops a processing of the packet.

Step 4 (S4): Router filter control means 2140 delivers the packet, as a re-transmission packet, to response packet re-transmitting means 2050 so that the object packet should be re-transmitted to its own router node.

Figure 89:
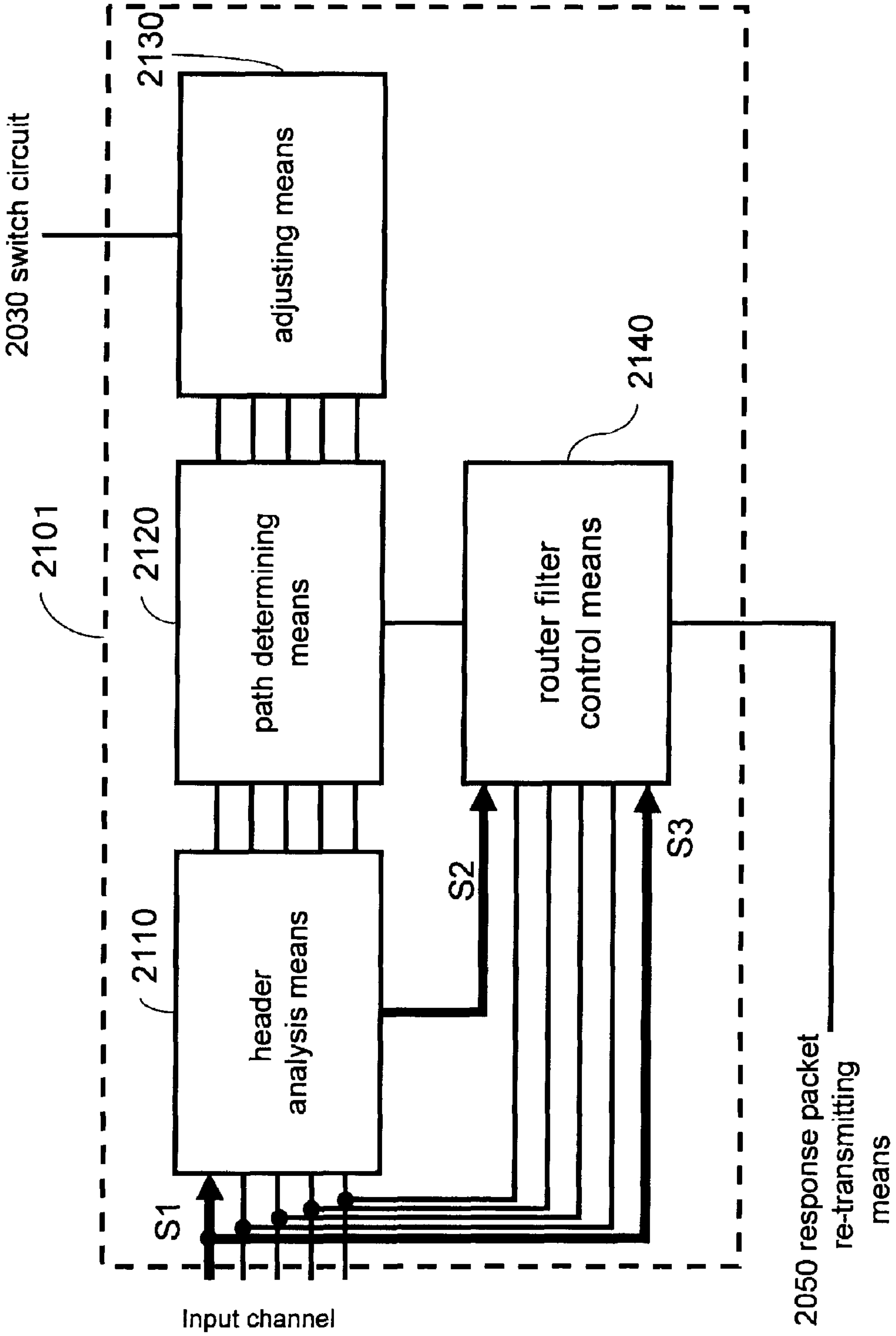
FIG. 89 is a view illustrating an example of an operation of routing control means having a filter shown in FIG. 84.

Next, an operation of router control means 2101 having a filter will be described for a case where, when a router node receives a packet from another router node through an input channel, the packet is data for updating the filter router data. FIG. 89 is a view illustrating an example of an operation of routing control means 2101 having a filter shown in FIG. 84.

Step 1 (S1): Header analysis means 2110 receives header information of a packet to be updated, which is a packet including new data of the packet transmission filter data, through an input channel. Step 2 (S2): Header analysis means 2110 reads out information of a router node of a destination and a router node of a transmission source of the packet, from the received header information, and notifies path determining means 2120 and router filter control means 2140 of the information.

Step 3 (S3): When router filter control means 2140 receives the information of a router node of a destination and a router node of a transmission source, it refers to router filter data 2141 and checks whether routing of the packet is permitted. Here, since the destination is its own router node, the router filter control means converts a packet to be updated of the input channel into an access request and recognizes that the access request is to update router filter data 2141. Then, the router filter control means reads out the data included in the access request and updates router filter data 2141.

Figure 90:
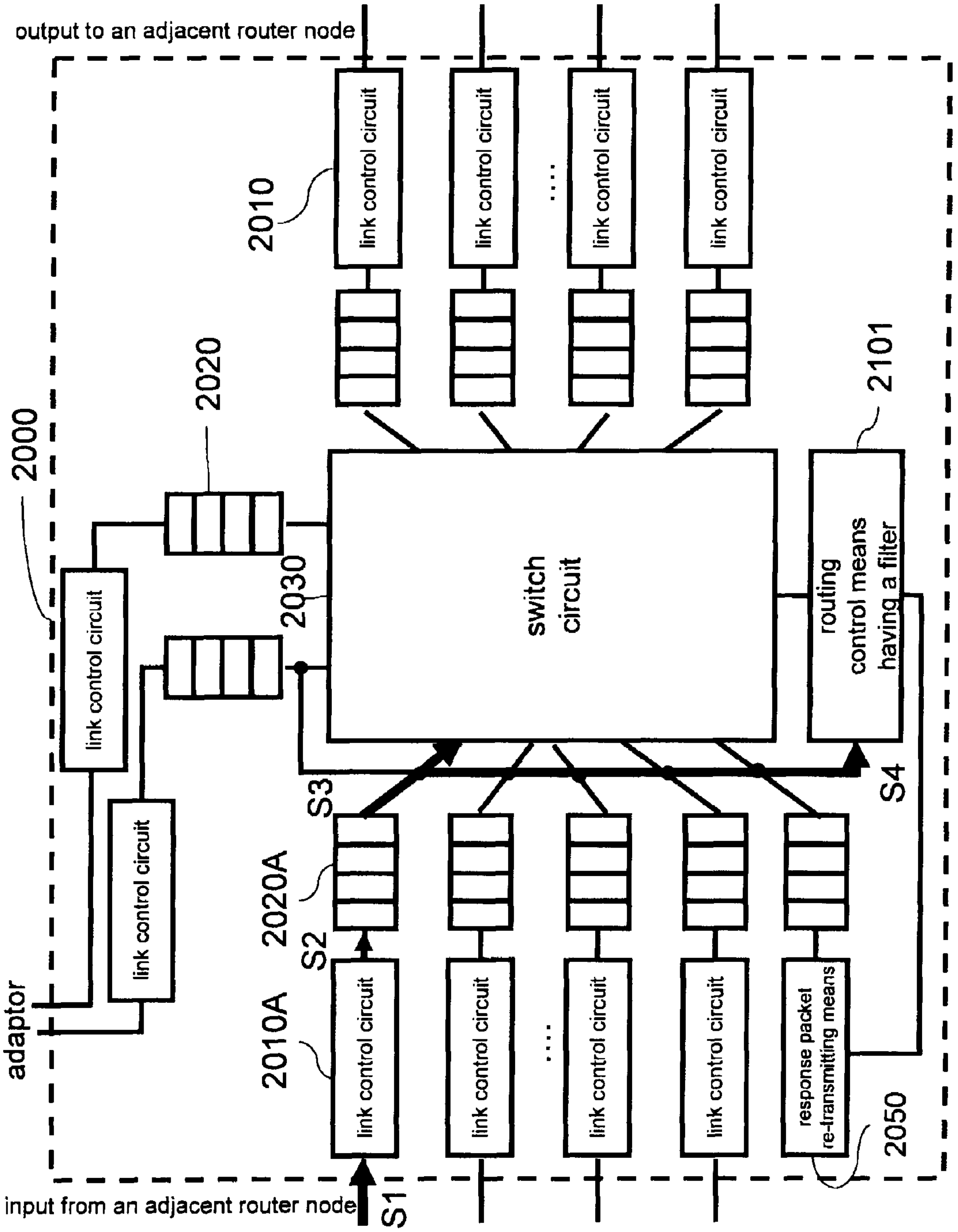
FIG. 90 is a view illustrating an example of an operation of a router node in a fourth exemplary embodiment.

Next, an operation of router node 2000 when it updates router filter data 2141 will be described. FIG. 90 is a view illustrating an example of an operation of router node 2000 in this exemplary embodiment.

Step 1 (S1): Link control circuit 2010A receives a packet to be updated from an adjacent router node. Step 2 (S2): Link control circuit 2010A stores the packet to be updated in buffer 2020A. Step 3 (S3): Buffer 2020A connects to switch circuit 2030 so as to enable the stored packet to be updated to be inputted in switch circuit 2030.

Step 4 (S4): When routing control means 2101 having a filter reads out header information of the packet to be updated in buffer 2020A, it recognizes that the packet is to update the route filter data. Then, the routing control means directly receives the packet to be updated from buffer 2020A not through switch circuit 2030, thereby updating its router filter data 2141.

Figure 91:
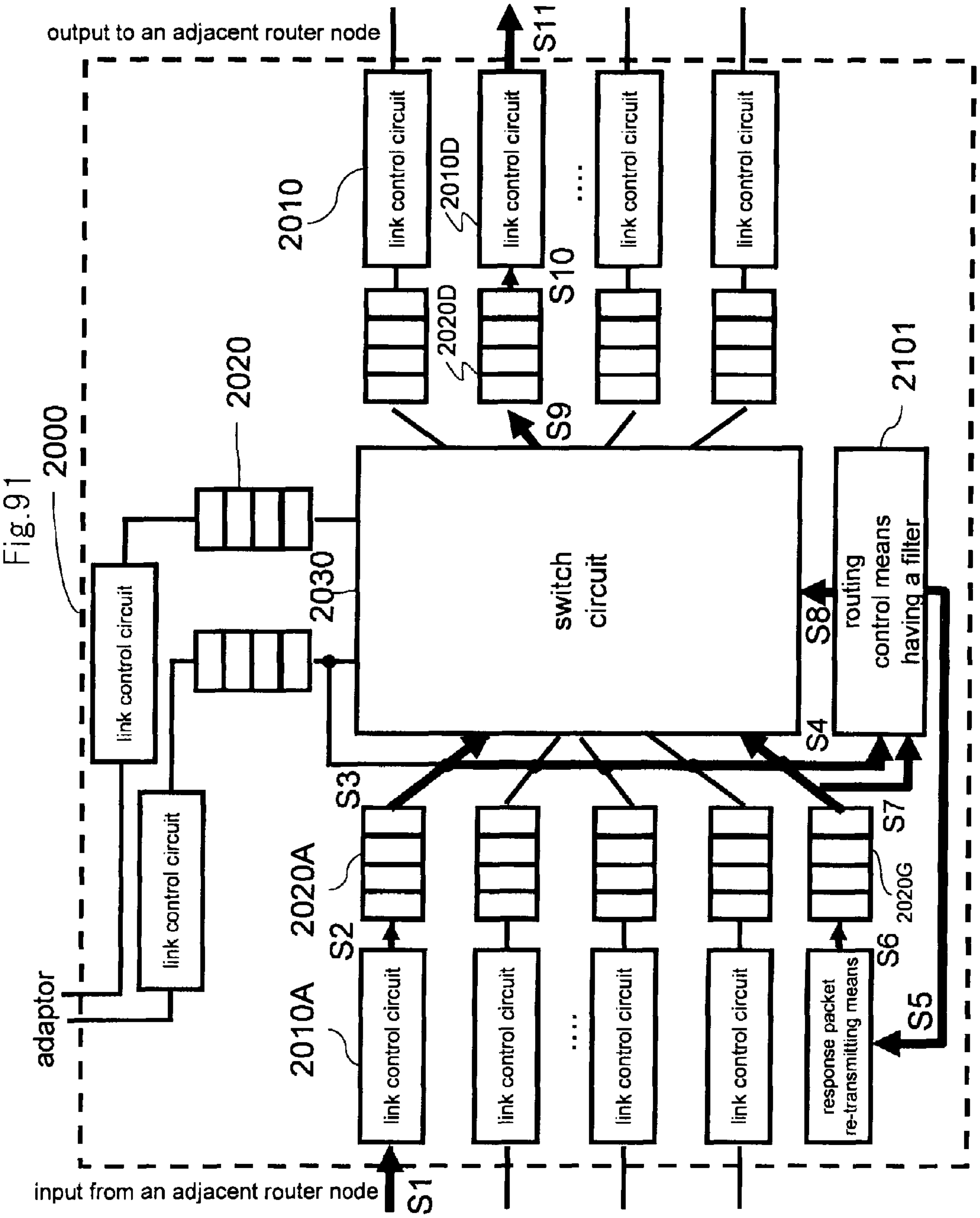
FIG. 91 is a view illustrating an example of an operation of a router node in a fourth exemplary embodiment.

Next, an operation of router node 2000 when it temporarily stops a processing of a packet will be described. FIG. 91 is a view illustrating an example of an operation of router node 2000 in this exemplary embodiment.

Step 1 (S1): Link control circuit 2010A receives a packet to be updated from an adjacent router node. Step 2 (S2): Link control circuit 2010A stores the packet to be updated in buffer 2020A. Step 3 (S3): Buffer 2020A connects to switch circuit 2030 so as to enable the stored packet to be updated to be inputted in switch circuit 2030.

Step 4 (S4): Routing control means 2101 having a filter reads out header information of the packet in buffer 2020A. Continuously, when the routing control means refers to router filter data 2141, it determines that it is necessary to temporarily stop routing of the packet. Step 5 (S5): Routing control means 2101 having a filter delivers the packet, as a retransmission packet to be transmitted to its own router node, to response packet re-transmitting means 2050.

Step 6 (S6): When response packet re-transmitting means 2050 receives the retransmission packet from routing control means 2101 having a filter, it stores the retransmission packet in buffer 2020G.

Step 7 (S7): Buffer 2020G connects to switch circuit 2030 so as to enable the stored re-transmission packet to be inputted to switch circuit 2030. Routing control means 2101 having a filter reads out header information of the retransmission packet stored in buffer 2020G and recognizes that it is a packet whose destination is its own router node. However, since processing of the packet is temporarily stopped, the routing control means determines one of output buffers connected to input buffers 2020G so as to transmit the retransmission packet to the interconnecting network. Here, output buffer 2020D is determined. Step 8 (S8): Routing control means 2101 having a filter notifies switch circuit 2030 of output buffer information indicating the output buffer that is determined in Step 7.

Step 9 (S9): When switch circuit 2030 receives the output buffer information from routing control means 2101 having a filter, it connects input buffer 2020G and output buffer 2020D. Step 10 (S10): Link control circuit 2010D reads out the retransmission packet in output buffer 2020D and is ready for delivery of the retransmission packet to an adjacent router node. Step 11 (S11): Link control circuit 2010D transmits the retransmission packet to the adjacent router node.

Figure 92:
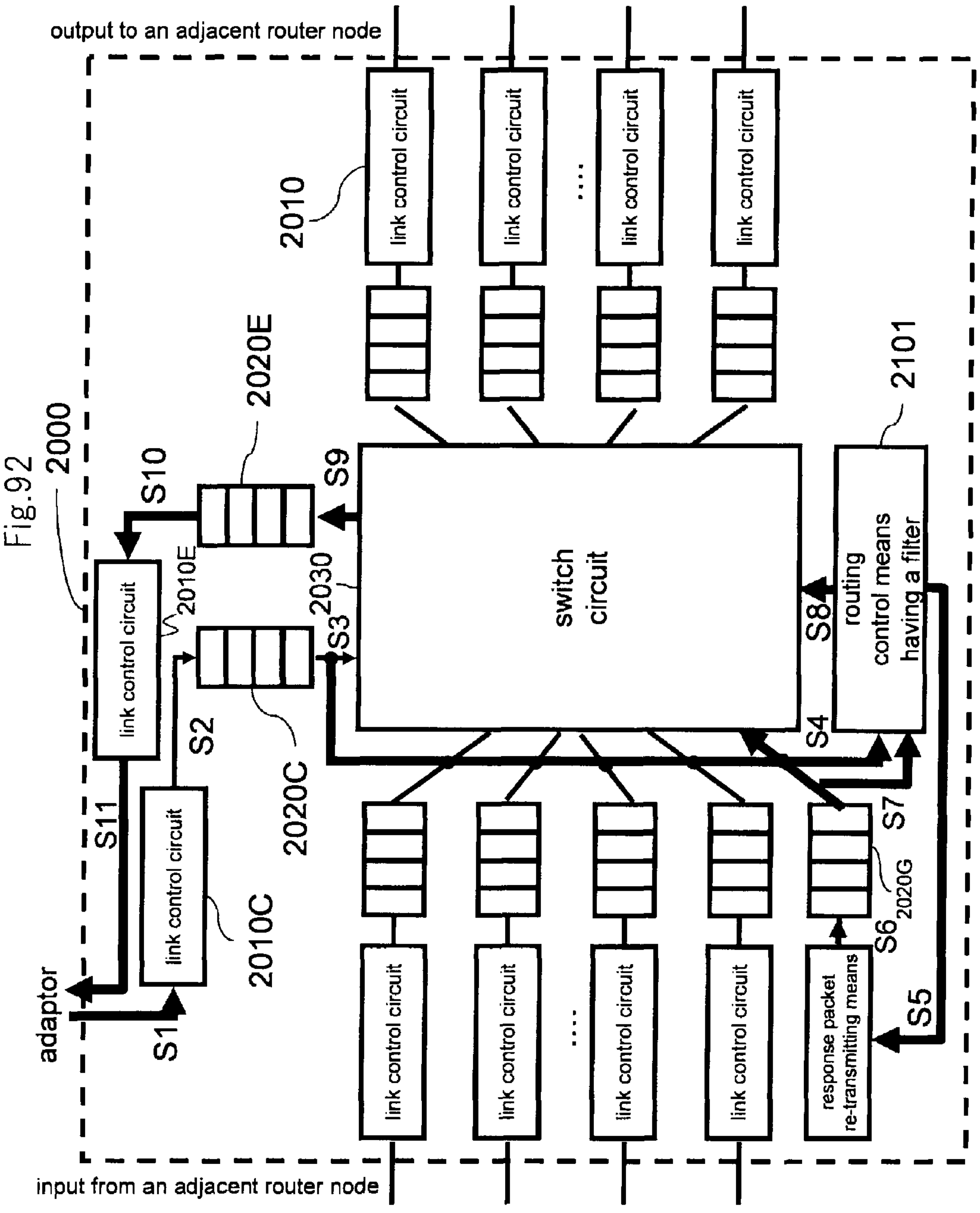
FIG. 92 is a view illustrating an example of an operation of a router node in a fourth exemplary embodiment.

Next, an operation of router node 2000 will be described when an access request from a core is converted into a packet, the packet is received through an adaptor and a routing of the packet is denied. FIG. 92 is a view illustrating an example of an operation of router node 2000 in this exemplary embodiment.

Step 1 (S1): Link control circuit 2010C receives a packet from an adaptor. Step 2 (S2): Link control circuit 2010C stores the packet in buffer 2020C. Step 3 (S3): Buffer 2020C connects to switch circuit 2030 so as to enable the stored packet to be inputted to switch circuit 2030.

Step 4 (S4): Routing control means 2101 having a filter reads out header information of the packet in buffer 2020C. Continuously, when the routing control means refers to router filter data 2141, it determines to deny routing of the packet. Step 5 (S5): Routing control means 2101 having a filter generates an error packet for notifying that the packet cannot be processed, and delivers the error packet to response packet re-transmitting means 2050.

Step 6 (S6): When response packet re-transmitting means 2050 receives the error packet from routing control means 2101 having a filter, it stores the error packet in buffer 2020G.

Step 7 (S7): Buffer 2020G connects to switch circuit 2030 so as to enable the stored error packet to be inputted to switch circuit 2030. Routing control means 2101 having a filter reads out header information of the error packet stored in buffer 2020G and recognizes that the error packet is a packet having a destination of a core connected to its own router node through an adaptor. In order to transmit the error packet to an adaptor, the routing control means determines output buffer 2020E as an output buffer that is connected to input buffer 2020G. Step 8 (S8): Routing control means 2101 having a filter notifies switch circuit 2030 of output buffer information indicating the output buffer determined in Step 7.

Step 9 (S9): When switch circuit 2030 receives the output buffer information from routing control means 2101 having a filter, it connects input buffer 2020G and output buffer 2020E. Step 10 (S10): Link control circuit 2010E reads out the error packet in output buffer 2020E and is ready for delivery of the error packet to an adaptor. Step 11 (S11): Link control circuit 2010E transmits the error packet to the adaptor.

Up to now, the structure of router node 2000 shown in FIG. 83 has been specifically described. Next, a case will be described where a plurality of sets, each of which consists of the router node, the core and the adaptor, is connected.

The structure of the case where a plurality of sets, each of which consists of the router node, the core and the adaptor, is connected is same as that shown in FIG. 33. Due to this, the structure shown in FIG. 33 is omitted.

Figure 93:
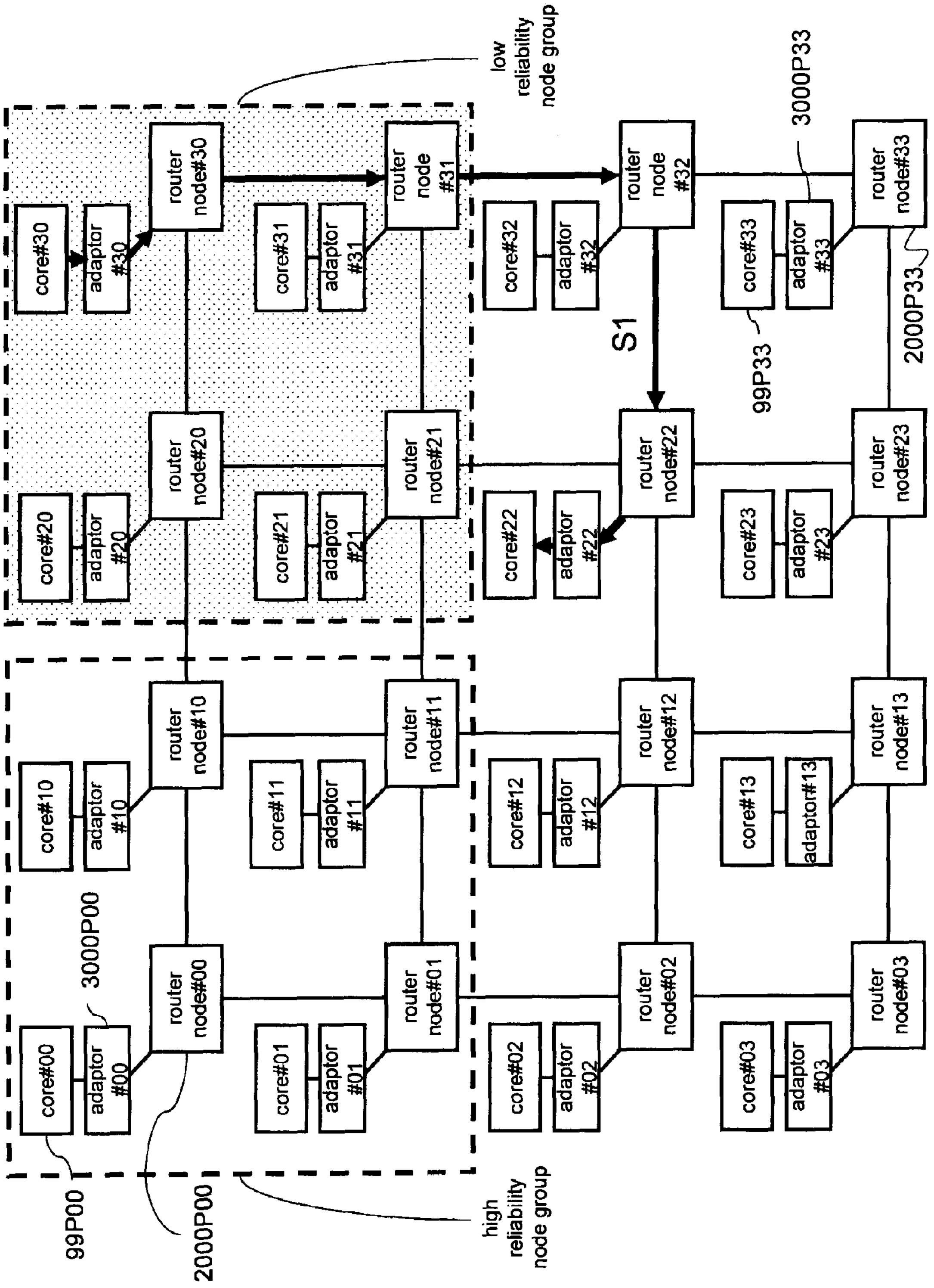
FIG. 93 is a view illustrating an example of an operation of the semiconductor integrated circuit shown in FIG. 33 in a fourth exemplary embodiment.

Next, an operation of a case will be described where an access request is made to core 99P22 from core 99P30 in the structure shown in FIG. 33. In this case, it is assumed that although an access request is made to a core whose reliability has not been defined from a low reliability core, the access request is permitted. FIG. 93 is a view illustrating an example of an operation of the semiconductor integrated circuit shown in FIG. 33. The router node shown in FIG. 93 corresponds to router node 2000 shown in FIG. 83.

Step 1 (S1): Core 99P30 delivers to adaptor 3000P30 an access request to core 99P22. When adaptor 3000P30 receives the access request from core 99P30, it converts it into a packet. Continuously, the adaptor transmits the packet having a destination of core 99P22 to router node 2000P30.

Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32.

Then, when router node 2000P22 receives the packet from router node 2000P32, it refers to the router filter data. When the router node recognizes that the access request to core 99P22 by the received packet is permitted, it delivers the packet to adaptor 3000P22. Adaptor 3000P22 converts the received packet into an access request corresponding to a core and delivers it to core 99P22.

Figure 94:
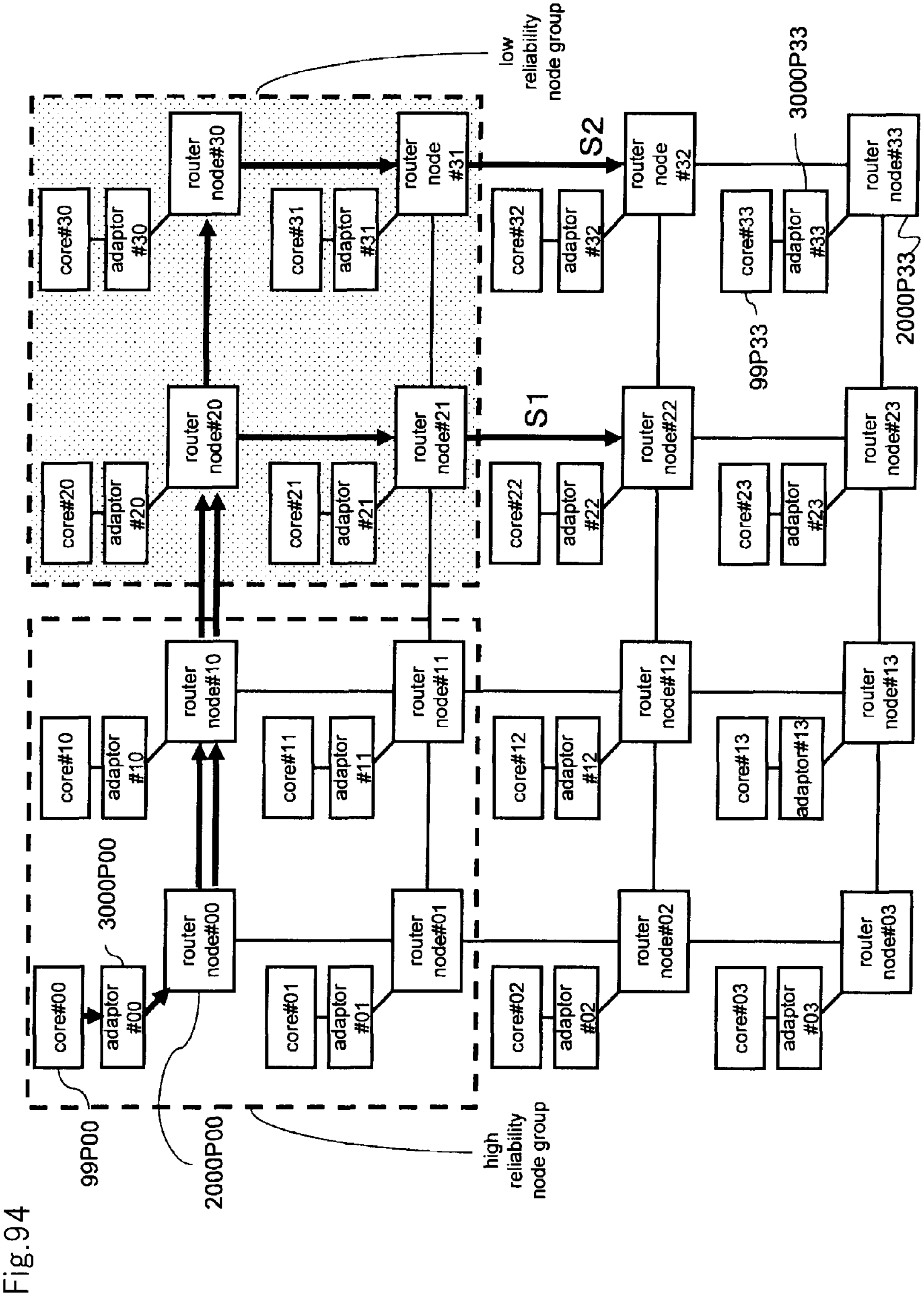
FIG. 94 is a view illustrating an example of an operation of the semiconductor integrated circuit shown in FIG. 33 in a fourth exemplary embodiment.

Next, an operation of a case will be described where processing of a packet from core 99P30 is temporarily stopped in router nodes 2000P22 and 2000P32 because high reliability core 99P00 inhibits an access request to cores 99P22 and 99P32 from low reliability core 99P30. Cores 99P22 and 99P32 are cores whose reliabilities have not been defined. FIG. 94 is a view illustrating an example of an operation of the semiconductor integrated circuit shown in FIG. 33. The router node shown in FIG. 94 corresponds to router node 2000 shown in FIG. 83.

Step 1 (S1): When core 99P00 delivers to adaptor 3000P00 a temporary stop request, which instructs router node 2000P22 to temporarily stop processing of an access request to core 99P22 from core 99P30, adaptor 3000P00 transmits to router node 2000P00 a temporary-stop-packet having a destination of router node 2000P22, which provides instructions to indicate a temporary stopping of processing of a packet to core 99P22, to be written into the router filter data. Router node 2000P00 transmits the received temporary-stop-packet to adjacent router node 2000P10. The packet transmitted from router node 2000P00 reaches router node 2000P22 through router nodes 2000P10, 2000P20 and 2000P21, which are relays.

Then, router node 2000P22 receives the temporary-stop-packet through router node 2000P21. When the router node recognizes that the temporary-stop-packet instructs a temporary stopping of processing of the packet to core 99P22, it sets "Yes" in the temporary stop bit, which indicates whether or not to temporarily stop processing of the packet to core 99P22, and changes processing of the packet to a temporary stop state.

Step 2 (S2): When core 99P00 delivers to adaptor 3000P00 a temporary stop request, which instructs router node 2000P32 to temporarily stop processing of an access request to core 99P32 from core 99P30, adaptor 3000P00 transmits to router node 2000P00 a temporary-stop-packet having a destination of adaptor 2000P32, which provides instructions to indicate a temporary stopping of processing of a packet to core 99P32, to be written into the router filter data. Router node 2000P00 transmits the received temporary-stop-packet to adjacent router node 2000P10. The packet transmitted from router node 2000P00 reaches router node 2000P32 through router nodes 2000P10, 2000P20, 2000P30 and 2000P31, which are relays.

Then, router node 2000P32 receives the temporary-stop-packet through router node 2000P31. When the router node recognizes that the temporary-stop-packet instructs a temporary stopping of processing of the packet to core 99P32, it sets "Yes" in the temporary stop bit, which indicates whether or not to temporarily stop processing of the packet to core 99P32, and changes processing of the packet to a temporary stop state.

Figure 95:
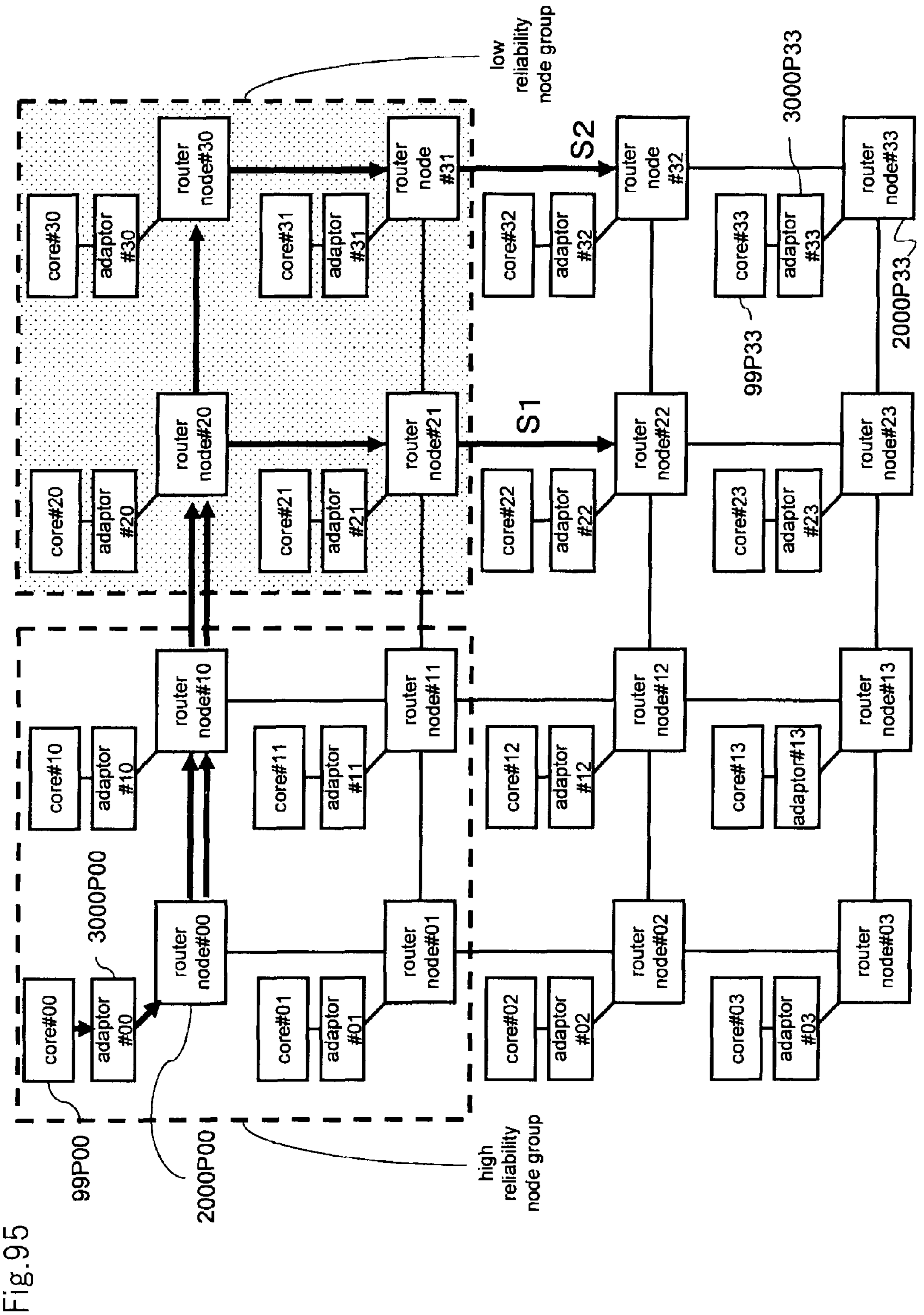
FIG. 95 is a view illustrating an example of an operation of the semiconductor integrated circuit shown in FIG. 33 in a fourth exemplary embodiment.

Next, an operation of a case will be described where router filter data is updated in router nodes 2000P22 and 2000P32 after temporarily stopping processing of a packet because high reliability core 99P00 inhibits an access request to cores 99P22 and 99P32 from low reliability core 99P30. FIG. 95 is a view illustrating an example of an operation of the semiconductor integrated circuit shown in FIG. 33. The router node shown in FIG. 95 corresponds to router node 2000 shown in FIG. 83.

Step 1 (S1): When core 99P00 delivers to adaptor 3000P00 a filter data update request, which is to update the filter data into content for inhibiting an access request to core 99P22 from core 99P30, adaptor 3000P00 transmits to router node 2000P00 a packet to be updated having a destination of adaptor 2000P22, which includes information for inhibition of processing of a packet to core 99P22. Router node 2000P00 transmits the received packet to be updated to adjacent router node 2000P10. The packet transmitted from router node 2000P00 reaches router node 2000P22 through router nodes s2000P10, 2000P20 and 2000P21.

Then, router node 2000P22 receives the packet to be updated through router node 2000P21. When the router node recognizes that the packet to be updated inhibits processing of the packet to core 99P22, it sets a vacant space in the permission bit, which indicates a type of an access request to core 99P22, while maintaining the temporary stop bit as "Yes," in the router filter data, and changes the state into a state inhibiting an access request to core 99P22.

Step 2 (S2): When core 99P00 delivers to adaptor 3000P00 a filter data update request, which is to update the filter data into content for inhibiting an access request to core 99P22 from core 99P30, adaptor 3000P00 transmits to router node 2000P00 a packet to be updated having a destination of adaptor 2000P32, which includes information for inhibition of a processing of a packet to core 99P32. Router node 2000P00 transmits the received packet to be updated to adjacent router node 2000P10. The packet transmitted from router node 2000P00 reaches router node 2000P32 through router nodes 2000P10, 2000P20, 2000P30 and 2000P31.

Then, router node 2000P32 receives the packet to be updated through router node 2000P31. When the router node recognizes that the packet to be updated inhibits processing of a packet to core 99P32, it sets a vacant space in the permission bit, which indicates a type of an access request to core 99P32, while maintaining the temporary stop bit as "Yes," in the router filter data, and changes the state into a state inhibiting an access request to core 99P32.

Figure 96:
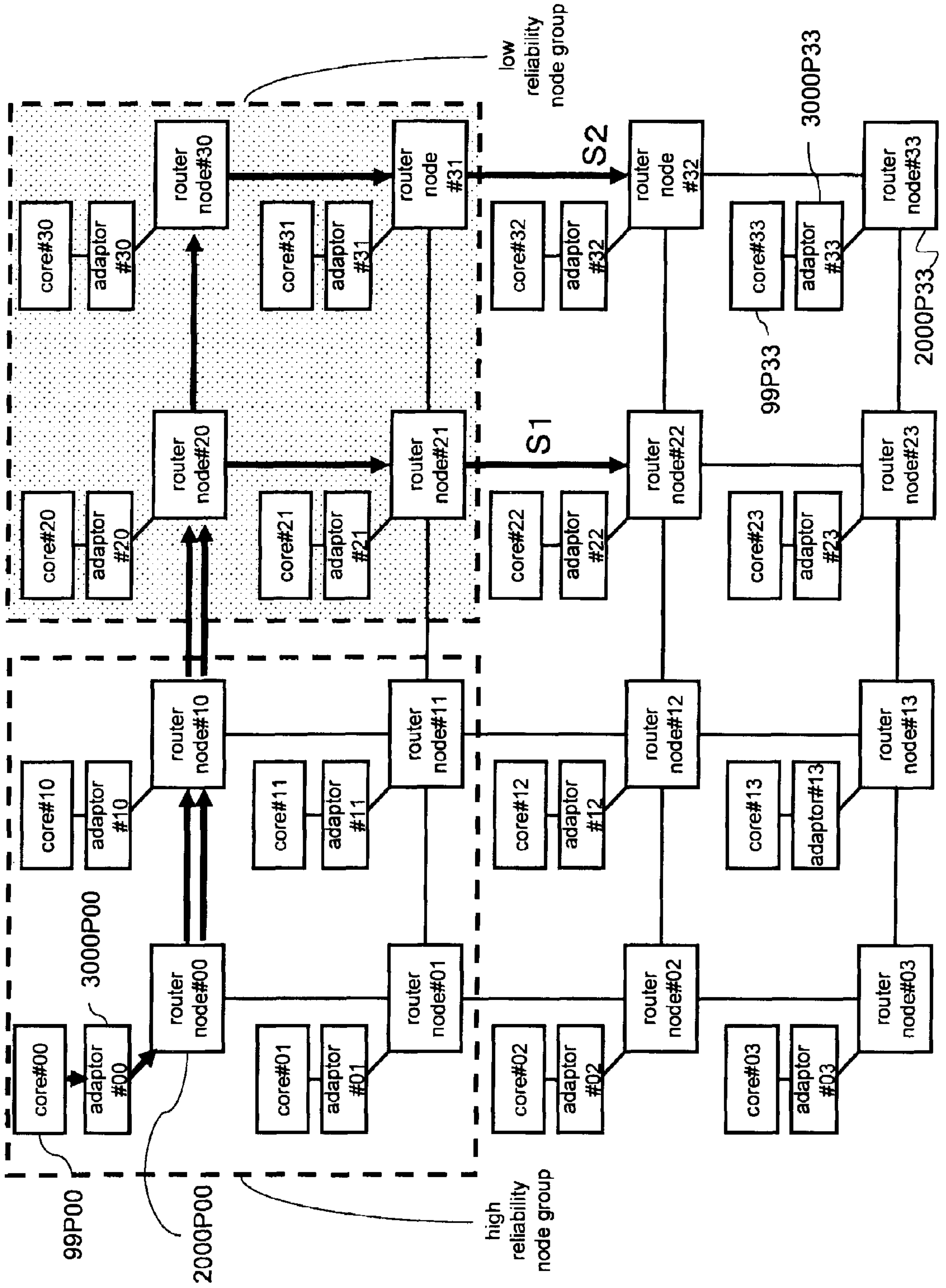
FIG. 96 is a view illustrating an example of an operation of the semiconductor integrated circuit shown in FIG. 33 in a fourth exemplary embodiment.

Next, an operation of a case will be described where after high reliability core 99P00 inhibits an access request to cores 99P22 and 99P32 from low reliability core 99P30, as described in FIG. 95, it cancels a temporary stopping of processing of a packet in router nodes 2000P22 and 2000P32. FIG. 96 is a view illustrating an example of an operation of the semiconductor integrated circuit shown in FIG. 33. The router node shown in FIG. 96 corresponds to router node 2000 shown in FIG. 83.

Step 1 (S1): When core 99P00 delivers to adaptor 3000P30 a temporary stop release request, which instructs router node 2000P22 to cancel a temporary stopping of processing of an access request to core 99P22 from core 99P30, adaptor 3000P00 transmits to router node 2000P00 a temporary stop release packet having a destination of router node 2000P22, which provides instructions to indicate cancellation of a temporary stop of a processing of a packet to core 99P22, to be written into the router filter data. Router node 2000P00 transmits the received temporary stop release packet to adjacent router node 2000P10. The packet transmitted from router node 2000P00 reaches router node 2000P22 through router nodes 2000P10, 2000P20 and 2000P21.

Then, router node 2000P22 receives the temporary stop release packet through router node 2000P21. When the router node recognizes that the temporary stop release packet is to cancel the temporary stopping of processing of the packet to core 99P22, it sets "No" in the temporary stop bit, which indicates whether or not to temporarily stop processing of the packet to core 99P22 in the router filter data, and cancels the temporary stop state of processing of the packet to core 99P22.

Step 2 (S2): When core 99P00 delivers to adaptor 3000P30 a temporary stop release request, which instructs router node 2000P32 to cancel a temporary stopping of processing of an access request to core 99P32 from core 99P30, adaptor 3000P00 transmits to router node 2000P00 a temporary stop release packet having a destination of router node 2000P32, which provides instructions to indicate cancellation of a temporary stopping of processing of a packet to core 99P32, to be written into the router filter data. Router node 2000P00 transmits the received temporary stop release packet to adjacent router node 2000P10. The packet transmitted from router node 2000P00 reaches router node 2000P32 through router nodes 2000P10, 2000P20, 2000P30 and 2000P31.

Then, router node 2000P32 receives the temporary stop release packet through router node 2000P31. When the router node recognizes that the temporary stop release packet is to cancel the temporary stopping of processing of the packet to core 99P32, it sets "No" in the temporary stop bit, which indicates whether or not to temporarily stop processing of the packet to core 99P32 in the router filter data, and cancels the temporary stop state of processing of the packet to core 99P32.

Figure 97:
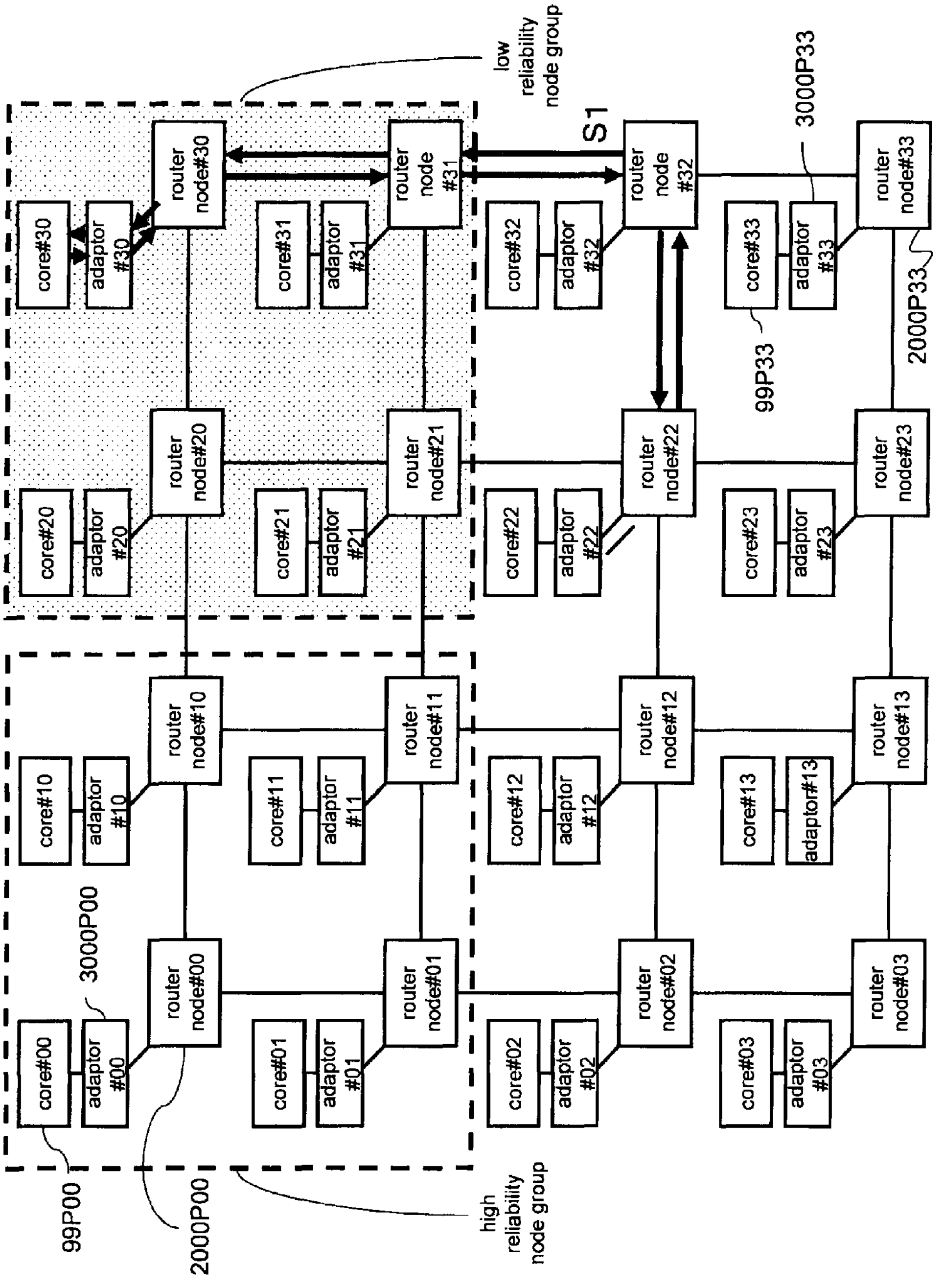
FIG. 97 is a view illustrating an example of an operation of the semiconductor integrated circuit shown in FIG. 33 in a fourth exemplary embodiment.

Next, an operation of a case will be described where low reliability core 99P30 makes an access request to core 99P22 after the setting of the router filter data is changed, as described in FIGS. 94, 95 and 96. The setting of the router filter data is changed as described above and an access request from low reliability core 99P30 to core 99P22 whose reliability has not been defined is inhibited. FIG. 97 is a view illustrating an example of an operation of the semiconductor integrated circuit shown in FIG. 33. The router node shown in FIG. 97 corresponds to router node 2000 shown in FIG. 83.

Step 1 (S1): Core 99P30 delivers an access request to core 99P22 to adaptor 3000P30. Step 2 (S2): When adaptor 3000P30 receives the access request from core 99P30, the adaptor converts it into a packet. Then, the adaptor transmits the packet having a destination of core 99P22 to router node 2000P30. The packet transmitted from router node 2000P30 reaches router node 2000P22 through a middle router node group including router nodes 2000P31 and 2000P32.

Then, when router node 2000P22 receives the packet from router node 2000P32, it refers to the router filter data. Continuously, when the router node recognizes that an access request by the packet is not permitted, it transmits to core 99P30 an error packet for notifying core 99P30 of an access error.

When the error packet is transmitted from router node 2000P22, it reaches router node 2000P30 through a middle router node group including router nodes 2000P32 and 2000P31. Then, router node 2000P30 delivers the error packet to adaptor 3000P30. When adaptor 3000P30 receives the error packet from router node 2000P30, it converts the error packet into an error response for a core and delivers the error response to core 99P30. In the meantime, although it has been described that the error packet is distributed in the opposite direction to the path in which the packet of the access request is distributed, the error packet may be distributed in a path different from the corresponding path.

Figure 98:
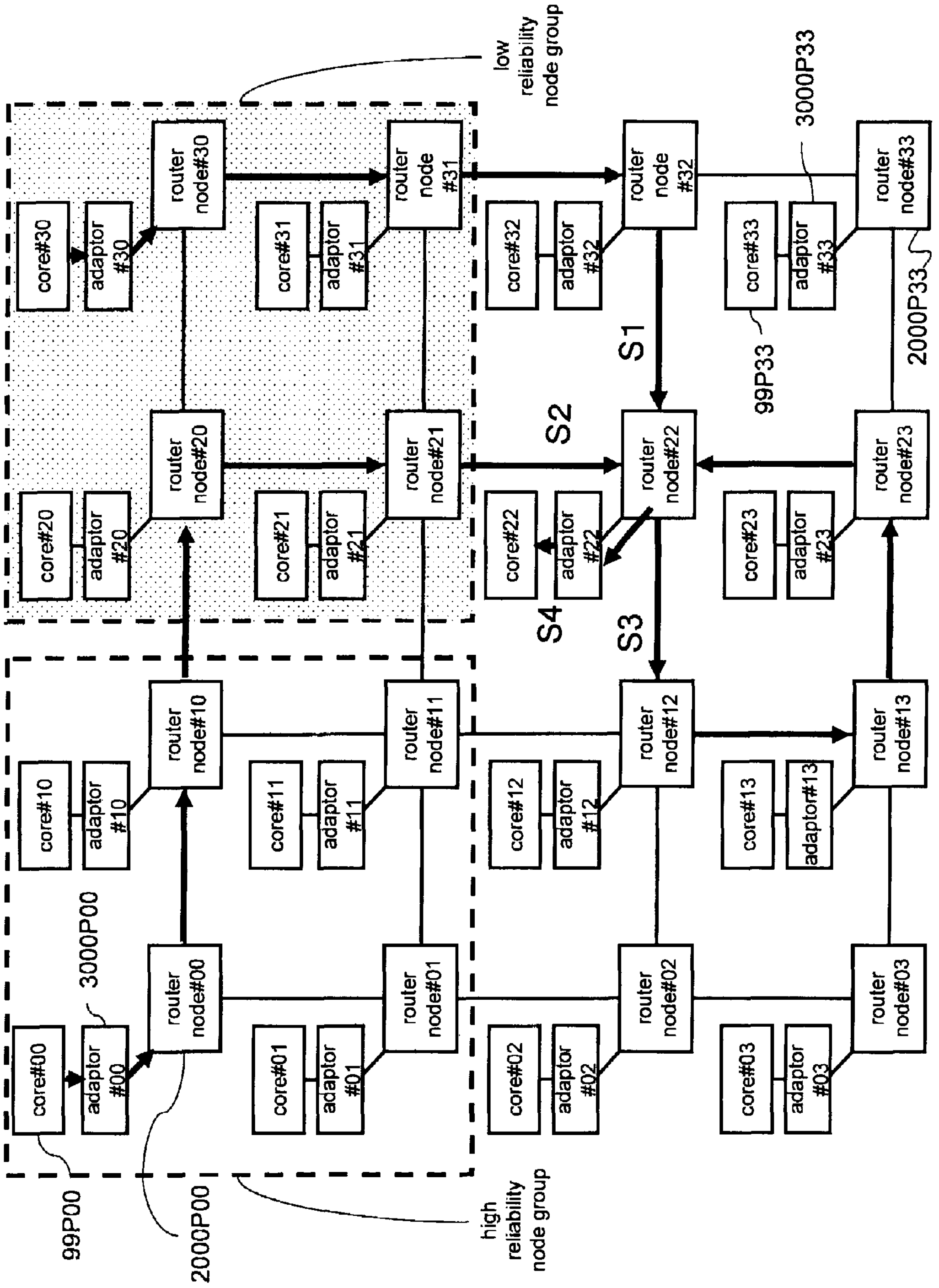
FIG. 98 is a view illustrating an example of an operation of the semiconductor integrated circuit shown in FIG. 33 in a fourth exemplary embodiment.

Next, an operation of a case will be described where processing of an access request is temporarily stopped so as to update the router filter data in one router node and then the router filter data is updated to enable the router node to process an access request from a predetermined core. Here, processing of an access request to core 99P22 from low reliability core 99P30 is temporarily stopped, and then high reliability core 99P00 enables router node 2000P22 to execute processing of the access request from core 99P30 and cancels the temporary stopping of processing of the access request. FIG. 98 is a view illustrating an example of an operation of the semiconductor integrated circuit shown in FIG. 33. The router node shown in FIG. 98 corresponds to router node 2000 shown in FIG. 83.

Step 1 (S1): When core 99P30 delivers an access request to adaptor 3000P30, adaptor 3000P30 converts it into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32.

Then, when router node 2000P22 receives the packet from router node 2000P32, it refers to the router filter data. Continuously, when the router node recognizes that a processing of an access request by the packet is temporarily stopped, it transmits the packet, as a retransmission packet to be transmitted to the own router node, to the interconnecting network.

Step 2 (S2): Core 99P00 delivers to adaptor 3000P00 a router filter data update request, which is to update the router filter data into router filter data permitting processing of an access request from core 99P30 in router node 2000P22, and a temporary stop release request, which provides instructions to indicate cancellation of the temporary stopping of processing of an access request in adaptor 3000P22, to be written into the router filter data. When adaptor 3000P00 receives the router filter data update request and the temporary stop release request from core 99P00, it transmits to router node 2000P00 an update/temporary stop release packet having a destination of adaptor router node 2000P22, which provides instructions to indicate permission of processing of the access request from core 99P30 and cancellation of the temporary stopping of processing of the access request, to be written into the router filter data. Router node 2000P00 transmits the received update/temporary stop release packet to adjacent router node 2000P10. The packet transmitted from router node 2000P00 reaches router node 2000P22 through router nodes 2000P10, 2000P20 and 2000P21.

Then, when router node 2000P22 receives the update/temporary stop release packet through the router nodes, it recognizes that the update/temporary stop release packet is to instruct permission of processing of the access request from core 99P30 in core 99P22 and cancellation of the temporary stopping of processing of the access request. Continuously, the router node changes the state into a state that permits processing of the access request from core 99P30, sets "No" in the temporary stop bit and cancels the temporary stop state of processing of the access request, in packet transmission filter data 3111.

Step 3 (S3): Router node 2000P22 receives the retransmission packet transmitted in Step 1 through a middle router node group including router nodes 2000P12, 2000P13 and 2000P23. Then, router node 2000P22 refers to the router filter data. When the router node recognizes that processing of the received retransmission packet is permitted and that temporary stopping of packet processing is canceled, it delivers the retransmission packet to adaptor 3000P22.

Step 4 (S4): When adaptor 3000P22 receives the retransmission packet from router node 2000P22, it converts the retransmission packet into an access request and delivers the access request to core 99P22.

Figure 99:
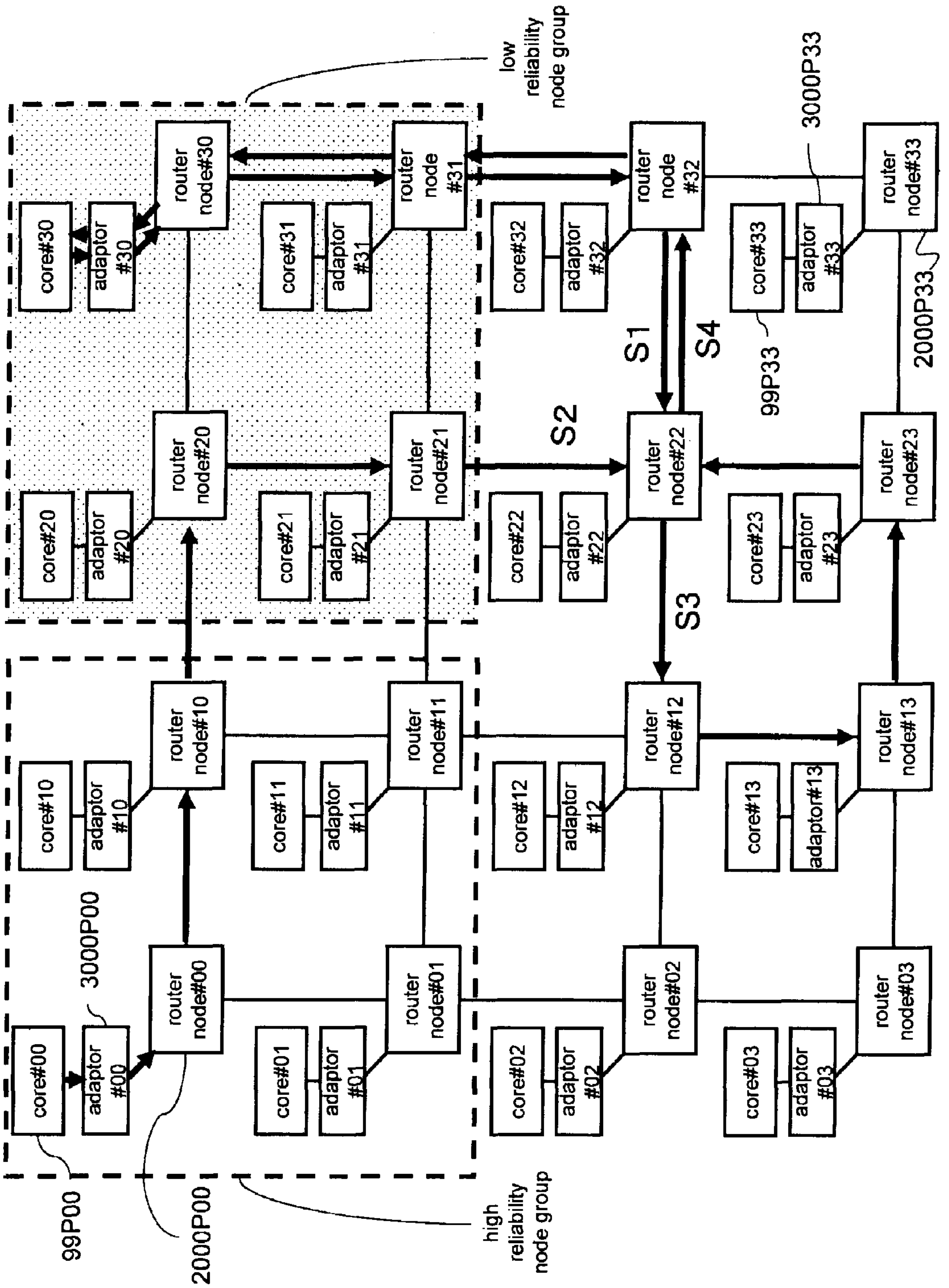
FIG. 99 is a view illustrating an example of an operation of the semiconductor integrated circuit shown in FIG. 33 in a fourth exemplary embodiment.

Next, an operation of a case will be described where a processing of an access request is temporarily stopped so as to update the router filter data in one router node and then the router filter data is updated not to permit the router node to process an access request from a predetermined core. Here, processing of an access request to core 99P22 from low reliability core 99P30 is temporarily stopped, and then high reliability core 99P00 inhibits processing of the access request from core 99P30 in router node 2000P22 and cancels the temporary stopping of processing of the access request. FIG. 99 is a view illustrating an example of an operation of the semiconductor integrated circuit shown in FIG. 33. The router node shown in FIG. 99 corresponds to router node 2000 shown in FIG. 83.

Step 1 (S1): When core 99P30 delivers an access request to adaptor 3000P30, adaptor 3000P30 converts the access request into a packet and transmits the packet having a destination of core 99P22 to router node 2000P30. Router node 2000P30 transmits the packet received from adaptor 3000P30 to adjacent router node 2000P31. The packet transmitted from router node 2000P30 reaches router node 2000P22 through a middle router node group including router nodes 2000P31 and 2000P32.

Then, when router node 2000P22 receives the packet from router node 2000P32, it refers to the router filter data. Continuously, when the router node recognizes that processing of the access request by the packet is temporarily stopped, it transits the packet, as a retransmission packet to be transmitted to the own router node, to the interconnecting network.

Step 2 (S2): Core 99P00 delivers to adaptor 3000P00 a router filter data update request, which is to update the router filter data into router filter data inhibiting the processing of the access request from core 99P30 in router node 2000P22, and a temporary stop release request, which provides instructions to indicate cancellation of the temporary stopping of processing of the access request in router node 2000P22, to be written into the router filter data. When adaptor 3000P00 receives the router filter data update request and the temporary stop release request from core 99P00, it transmits to router node 2000P00 an update/temporary stop release packet having a destination of router node 2000P22, which provides instructions to indicate inhibition of processing of the access request from core 99P30 and cancellation of the temporary stopping of processing of the access request, to be written into the router filter data. Router node 2000P00 transmits the received update/temporary stop release packet to adjacent router node 2000P10. The packet transmitted from router node 2000P00 reaches router node 2000P22 through router nodes 2000P10, 2000P20 and 2000P21.

Then, when router node 2000P22 receives the update/temporary stop release packet through the router nodes, it recognizes that the update/temporary stop release packet is to instruct inhibition of processing of the access request from core 99P30 in core 99P22 and cancellation of the temporary stopping of processing of the access request. Continuously, the router node changes the state into a state of inhibiting processing of the access request from core 99P30, sets "No" in the temporary stop bit and cancels the temporary stop state of processing of the access request, in the router filter data.

Step 3 (S3): Router node 2000P22 receives the retransmission packet transmitted in Step 1 through a middle router node group including router nodes 2000P12, 2000P13 and 2000P23.

Step 4 (S4): When router node 2000P22 receives the retransmission packet, it refers to the router filter data. Then, when the router node recognizes that the temporary stopping of processing of the packet is canceled but that processing of the retransmission packet received is inhibited, it generates an error packet that is a packet for notifying core 99P30 that the access request is not permitted and that an error is thus caused. Continuously, router node 2000P22 transmits the error packet to adjacent router node 2000P32. The error packet transmitted from router node 2000P22 reaches router node 2000P30 through a middle router node group including router nodes 2000P32 and 2000P31.

Then, when router node 2000P30 receives the error packet through the middle router node group, it delivers the error packet to adaptor 3000P30. Adaptor 3000P30 converts the error packet into an access error response, which is information for notifying the core that the access request causes an error, and delivers it to core 99P30. Meanwhile, although it has been described that the error packet is distributed in the opposite direction to the path in which the packet of the access request is distributed, the error packet may be distributed in a path different from the corresponding path.

In this exemplary embodiment, regarding the access request from the core, each of the routers in the interconnecting network controls delivery of the packet in accordance with delivery information. By making the contents of the delivery information, which is maintained by each router, consistent, it is possible to consistently perform filter control.

In addition, when updating the delivery information, the instruction of the temporary stopping of processing of the packet and the instructions for updating the router filter data and for canceling temporary stopping of processing of the packet are simultaneously made from a predetermined core with respect to the routers in the interconnecting network.

In this exemplary embodiment, it is possible to control an access request to a plurality of cores in the router nodes as well as in the adaptors described in the first to third exemplary embodiments, and to obtain the same effects as those of the first exemplary embodiment. In addition, in this exemplary embodiment, the filter control by adaptor 3000 may not be performed.

Fifth Exemplary Embodiment

This exemplary embodiment has a structure that is different from any of the first to fourth exemplary embodiments. In the followings, since the structures, except the router node, are the same as those of the first exemplary embodiment, detailed explanations thereof will be omitted.

Figure 100:
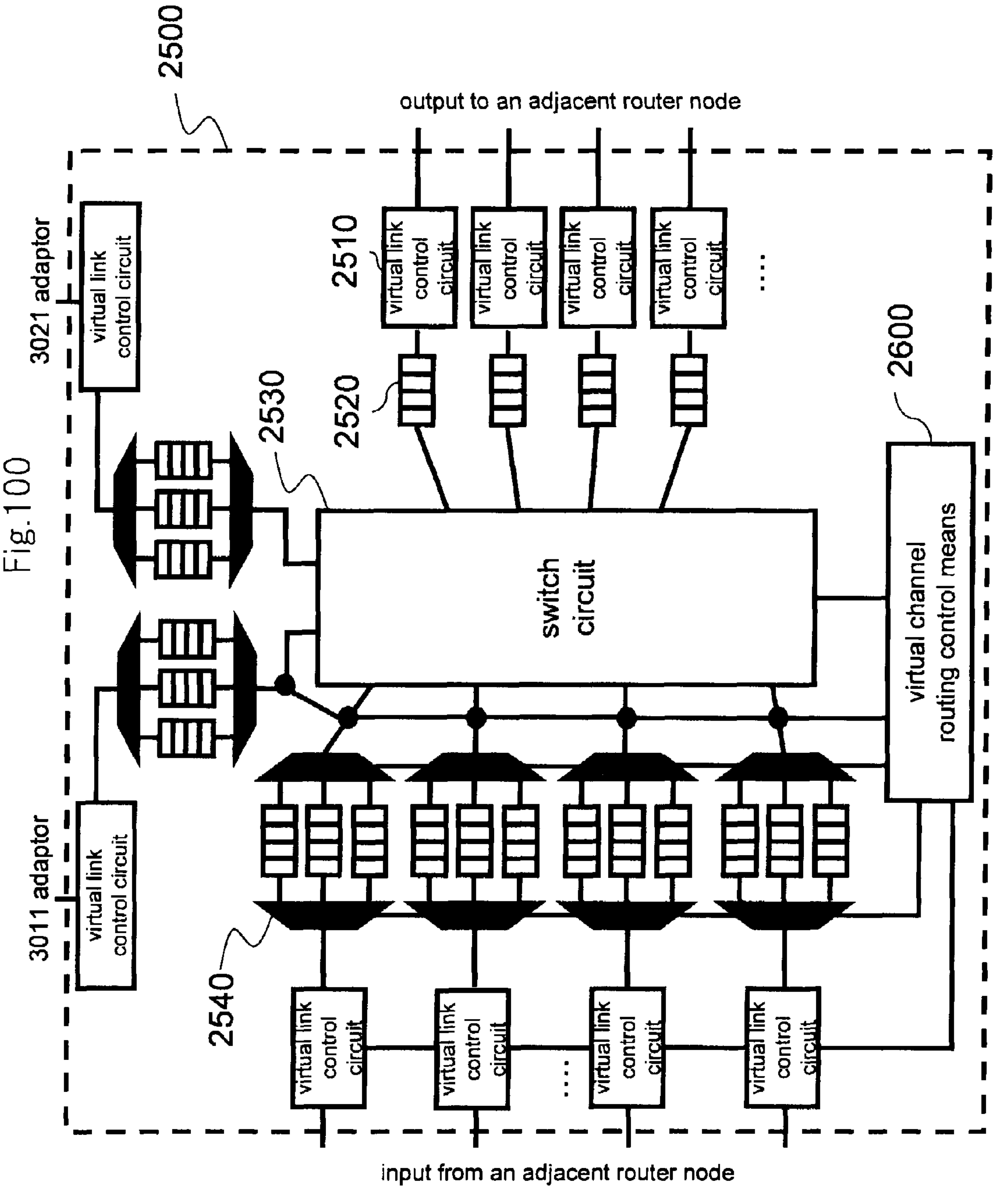
FIG. 100 is a view illustrating an example of a structure of a router node in a fifth exemplary embodiment.

A structure of the router node of this exemplary embodiment will be described. FIG. 100 is a view illustrating an example of a structure of router node 2500 in this exemplary embodiment. Router node shown in FIG. 100 has a characteristic in which it corresponds to a virtual channel, as compared to the router node shown in FIG. 7.

Referring to FIG. 100, router node 2500 comprises a plurality of channels for input from an adjacent router node, a plurality of channels for output to an adjacent router node and one channel for connection with an adaptor. Each channel is provided with virtual link control circuit 2510 that performs flow control of a connection link and virtual channel buffer 2520 that stores a packet. Each of the input channels is provided with three virtual channels. One of the three virtual channels provided to each channel is selected by virtual channel selection device 2540.

In addition, router node 2500 comprises virtual channel switch circuit 2530 that connects the virtual channels and virtual channel routing control means 2600 that notifies virtual channel switch circuit 2530 of information of connection or switching of the virtual channel in accordance with a packet to be received.

Meanwhile, in this exemplary embodiment, one channel is connected to the adaptor. However, even for a plurality of channels, it is possible to realize the connection by extending the number of channels to be connected to the switch circuit.

The operation of router node 2500 shown in FIG. 100 is same as that of the each router node of the first to fourth exemplary embodiments, except that the delivery of a packet is made through a virtual circuit. Thus, detailed descriptions thereof will be omitted.

Next, another example of a structure of the router node of this exemplary embodiment will be described.

Figure 101:
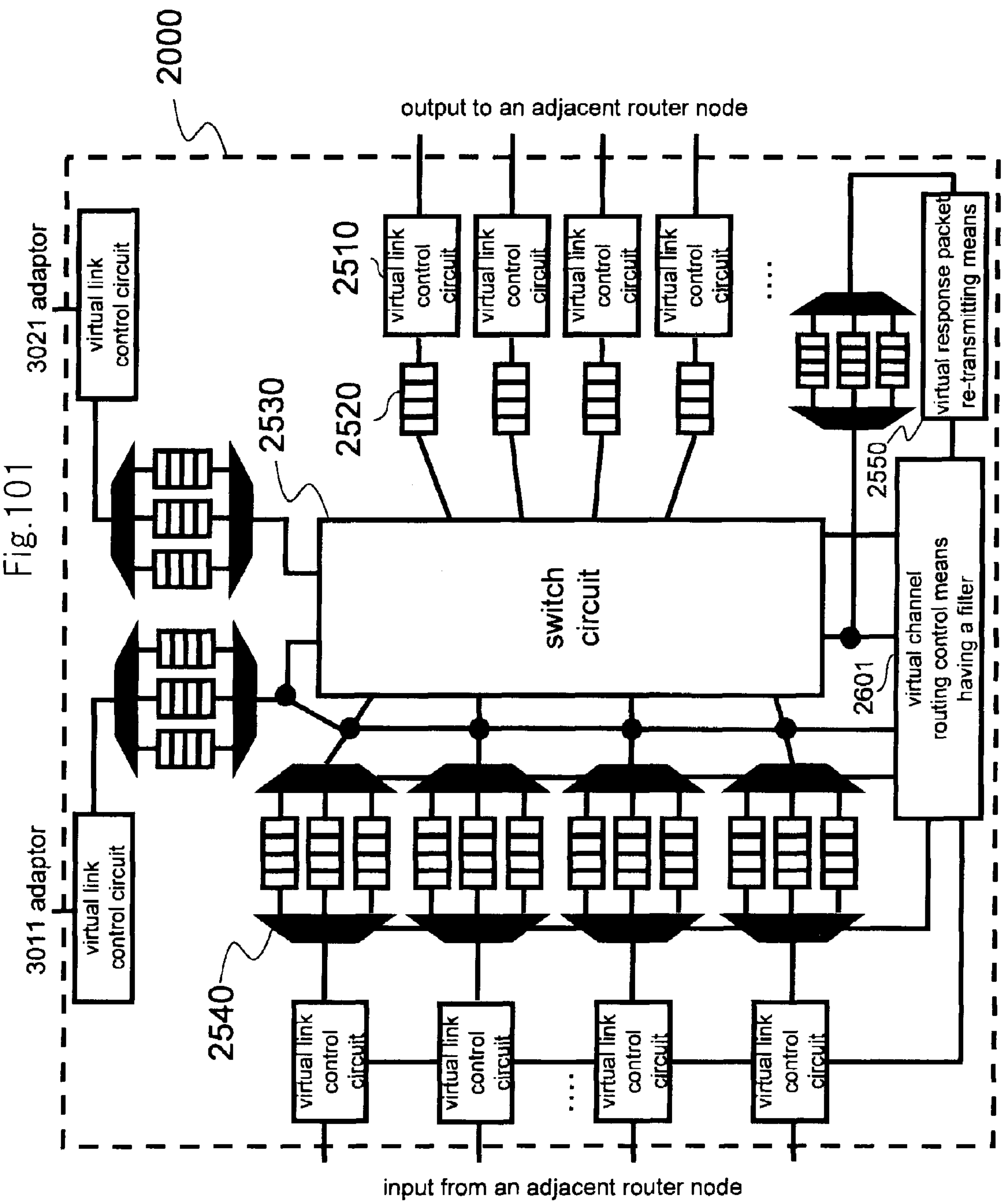
FIG. 101 is a view illustrating another example of a structure of a router node in a fifth exemplary embodiment.

FIG. 101 is a view illustrating another example of a structure of the router node of this exemplary embodiment. Router node 2500 shown in FIG. 101 has a characteristic in which it corresponds to a virtual channel, as compared to the router node shown in FIG. 83.

Referring to FIG. 101, in router node 2500, routing control means 2101 having a filter of router node 2000 shown in FIG. 83 is replaced with routing control means 2601 having a virtual channel filter and response packet re-transmitting means 2050 of router node 2000 is replaced with virtual response packet re-transmitting means 2650, all of which correspond to virtual channels.

The operation of router node 2500 shown in FIG. 101 is the same as that of each router node of the first to fourth exemplary embodiments, except that a packet is distributed through a virtual circuit. Thus, its detailed description will be omitted.

As described above, according to this exemplary embodiment, it is possible to realize the filter control of the invention in the router node by using a virtual channel.

Sixth Exemplary Embodiment

This exemplary embodiment is to suppress the number of entries when there are many cores in a transmission source of an access request signal, regarding the filter control method of the first to fifth exemplary embodiments.

Figure 102:
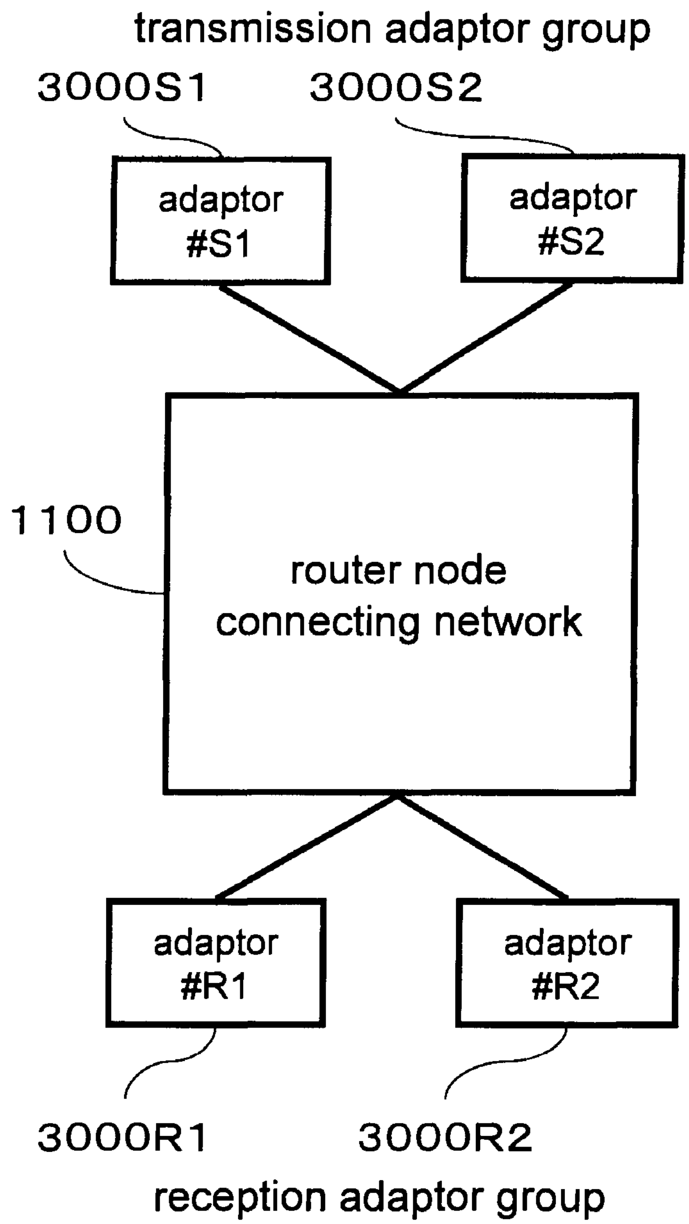
FIG. 102 is a view showing an example of a structure of a semiconductor integrated circuit of a sixth exemplary embodiment.

A semiconductor integrated circuit of this exemplary embodiment will be described. FIG. 102 is a view showing an example of a structure of a semiconductor integrated circuit of this exemplary embodiment.

The semiconductor integrated circuit of this exemplary embodiment comprises a transmission adaptor group including a plurality of transmission adaptors, a reception adaptor group including a plurality of reception adaptors, router node connecting network 1100 that relays a signal to be transmitted and received between the transmission adaptors and the reception adaptors. Router node connecting network 1100 has such a structure in which a plurality of router nodes is connected by signal lines. An example of a structure of router node connecting network 110 is same as that shown in FIGS. 49 to 53.

The example of FIG. 102 shows a case where two transmission adaptors and two reception adaptors are provided. The transmission adaptor group is provided with reception adaptors 3000S1 and 3000S2. The reception adaptor group is provided with reception adaptors 3000R1 and 3000R2.

In the meantime, each adaptor is connected to a core, which is not shown. In this exemplary embodiment, a filter control method of a signal transmitted and received between the adaptors will be specifically described and detailed descriptions of the structure and operation of the core will be omitted. In addition, since the structures and operations of the adaptor and the router are the same as those of the first to fifth exemplary embodiment, except for some parts that are newly described in this exemplary embodiment, detailed descriptions thereof will be also omitted.

Next, filter data that is used for filter control by the adaptor shown in FIG. 102 will be described. Here, it is assumed that a memory (not shown) is connected to reception adaptors 3000R1 and 3000R2, respectively. Meanwhile, regarding the filter data, the parts that overlap with the structures of the data shown in FIGS. 19, 55, 72 and 85 will be omitted.

FIG. 103 is a view showing an example of filter data that is used for filter control in the semiconductor integrated circuit shown in FIG. 102. FIG. 103 shows reception filter data 3321R1, which is referred to by reception adaptor 3000R1 for filter control, and reception filter data 3321R2, which is referred to by reception adaptor 3000R2 for filter control.

As shown in FIG. 103, reception filter data 3321R1 and 3321R2 are provided with an entry that is a set of a “transmission source adaptor number” indicating a transmission source of an access request, an “address range” indicating an accessible area of a memory and “permission” indicating whether or not to permit an access. In FIG. 103, the “range” is described, instead of the address range. In addition, when an access is not permitted, a symbol x is described in the “permission” column. Meanwhile, it is not necessary to provide an entry when an access is permitted. Additionally, a symbol of a transmission adaptor is used for the number of the transmission source adaptor, and two figures of the symbol are shown in FIG. 103.

Reception filter data 3321R1 is provided with an entry for transmission adaptor 3000S1 and an entry for transmission adaptor 3000S2. In the entry of transmission adaptor 3000S1, “0x000-0x100” is described in the range column and “x” is described in the permission column. This means that an access to the address range of 0x000-0x100 from transmission adaptor 3000S1 is inhibited. In the entry of transmission adaptor 3000S2, “option” is described in the range column and “x” is described in the permission column. This means that an access to all the address range from transmission adaptor 3000S1 is inhibited.

Reception filter data 3321R2 is provided with an entry for transmission adaptor 3000S1 and an entry for transmission adaptor 3000S2. In the entry of transmission adaptor 3000S1, "option" is described in the range column and "x" is described in the permission column. This means that an access to all the address range from transmission adaptor 3000S1 is inhibited. In the entry of transmission adaptor 3000S2, "0x000-0x200" is described in the range column and "x" is described in the permission column. This means that an access to the address range of 0x000-0x200 from transmission adaptor 3000S2 is inhibited.

As the example shown in FIG. 103, when only the reception adaptor side is enabled to perform filter control, information for the control is set in the reception filter data. In the example shown in FIG. 103, the number of entries of each reception filter data is 2 (two).

In the meantime, the access limit set in the filter data is determined in accordance with the reliability of the core, which is the same as that described in the first to fifth exemplary embodiments.

Next, another example of the filter data that is used for filter control by the adaptor shown in FIG. 102 will be described.

FIG. 104 is a view showing another example of filter data that is used for filter control in the semiconductor integrated circuit shown in FIG. 102. In FIG. 104, the information for filter control is divided into each filter data of the reception and transmission sides.

FIG. 104 shows packet transmission filter data 3111S1 stored in transmission adaptor 3000S1, packet transmission filter data 3111S2 stored in transmission adaptor 3000S2, reception filter data 3321R1 stored in reception adaptor 3000R1 and reception filter data 3321R2 stored in reception adaptor 3000R2.

Each of packet transmission filter data 3111S1 and 3111S2 is provided with an entry that is a set of a "destination adaptor number" indicating a transmission destination of an access request and "permission" indicating whether or not to permit an access. In the entry of reception adaptor 3000R2 of packet transmission filter data 3111S1, "x" is described in the permission column. This means that an access to reception adaptor 3000R2 from transmission adaptor 3000S1 is inhibited. In the entry of reception adaptor 3000R1 of packet transmission filter data 3111S2, "x" is described in the permission column. This means that an access to reception adaptor 3000R1 from transmission adaptor 3000S2 is inhibited.

In the entry of transmission adaptor 3000S1 of reception filter data 3321R1, "0x000-0x100" is described in the range column and "x" is described in the permission column. This means that an access to the address range of 0x000-0x100 from transmission adaptor 3000S1 is inhibited. In the entry of transmission adaptor 3000S2 of reception filter data 3321R2, "0x100-0x200" is described in the range column and "x" is described in the permission column. This means that an access to the address range of 0x100-0x200 from transmission adaptor 3000S2 is inhibited.

Contrary to FIG. 103, in FIG. 104, packet transmission filter data 3111S1 describes the entry that inhibits an access to reception adaptor 3000R2, and packet transmission filter data 3111S2 describes the entry that inhibits an access to reception adaptor 3000R1. Thereby, reception filter data 3311R1 describes only the entry that inhibits an access to the address range of 0x000-0x100 from transmission adaptor 3000S1 and reception filter data 3311R2 describes only the entry that inhibits an access to the address range of 0x100-0x200 from transmission adaptor 3000S2. Comparing the control information indicated by the filter data of FIG. 104 with the filter data of FIG. 103, the contents thereof are same.

Next, a sequence of the filter control will be described when the filter data of FIG. 104 is used. Here, it is assumed that transmission adaptor 3000S1 transmits a packet for accessing to the address range of 0x100-0x200 of a memory (now shown) connected to reception adaptor 3000R1.

After transmission adaptor 3000S1 checks a destination by a header of the packet, it refers to packet transmission filter data 3111S1 and confirms that it is OK to distribute the packet to a destination of reception adaptor 3000R1. Then, the transmission adaptor transmits the packet to the destination of reception adaptor 3000R1 through router node connecting network 1100. The filter control of a first step is performed for the packet in transmission adaptor 3000S1.

After receiving the packet, reception adaptor 3000R1 refers to reception filter data 3321R1 and confirms that an access to the address range of 0x100-0x200 is permitted. Then, the reception adaptor transmits the packet to the memory connected to reception adaptor 3000R1. The filter control of a second step is performed for the packet in reception adaptor 3000R1.

The filter control information of the first step is set by the filter data of the transmission side, and the filter control information of the second step is set by the filter data of the reception side. In FIG. 104, the filter control information is hierarchically set.

In general, each adaptor is formed by a circuit and the hardware of a chip is structured in such a way that another circuit is designed to meet the highest load. In FIG. 103, the number of entries of the reception filter data in the reception adaptor side is two. Thus, a memory for storing filter data capable of registering at least two entries is provided to all the adaptors. However, actually, it is not necessarily to provide a memory area for storing two entries to all the adaptors. In this case, in an adaptor in which two entries are not registered, a vacant memory area is wasted without being used.

Contrary to the above, as shown in FIG. 104, the number of entries of the reception filter data in the reception adaptor is one. The transmission filter data of the transmission adaptor is the same. For the case shown in FIG. 104, each adaptor only needs a memory area for registering one entry, and the unity hardware size of each adaptor is smaller, as compared to the case shown in FIG. 103. As a result, the unit hardware size of each adaptor is reduced and the entire hardware size of the semiconductor integrated circuit is also reduced.

Further, in the case shown in FIG. 104, the load is dispersed to both the transmission adaptor and the reception adaptor, as compared to the case where the load of the second step of the filter control is applied to the reception adaptor only. Accordingly, the filter data can be referred to quickly, so that it is possible to reduce the time to refer to the filter data.

Seventh Exemplary Embodiment

This exemplary embodiment applies the filter control method of the sixth exemplary embodiment when an adaptor and a core connected to the adaptor are grouped.

Figure 105:
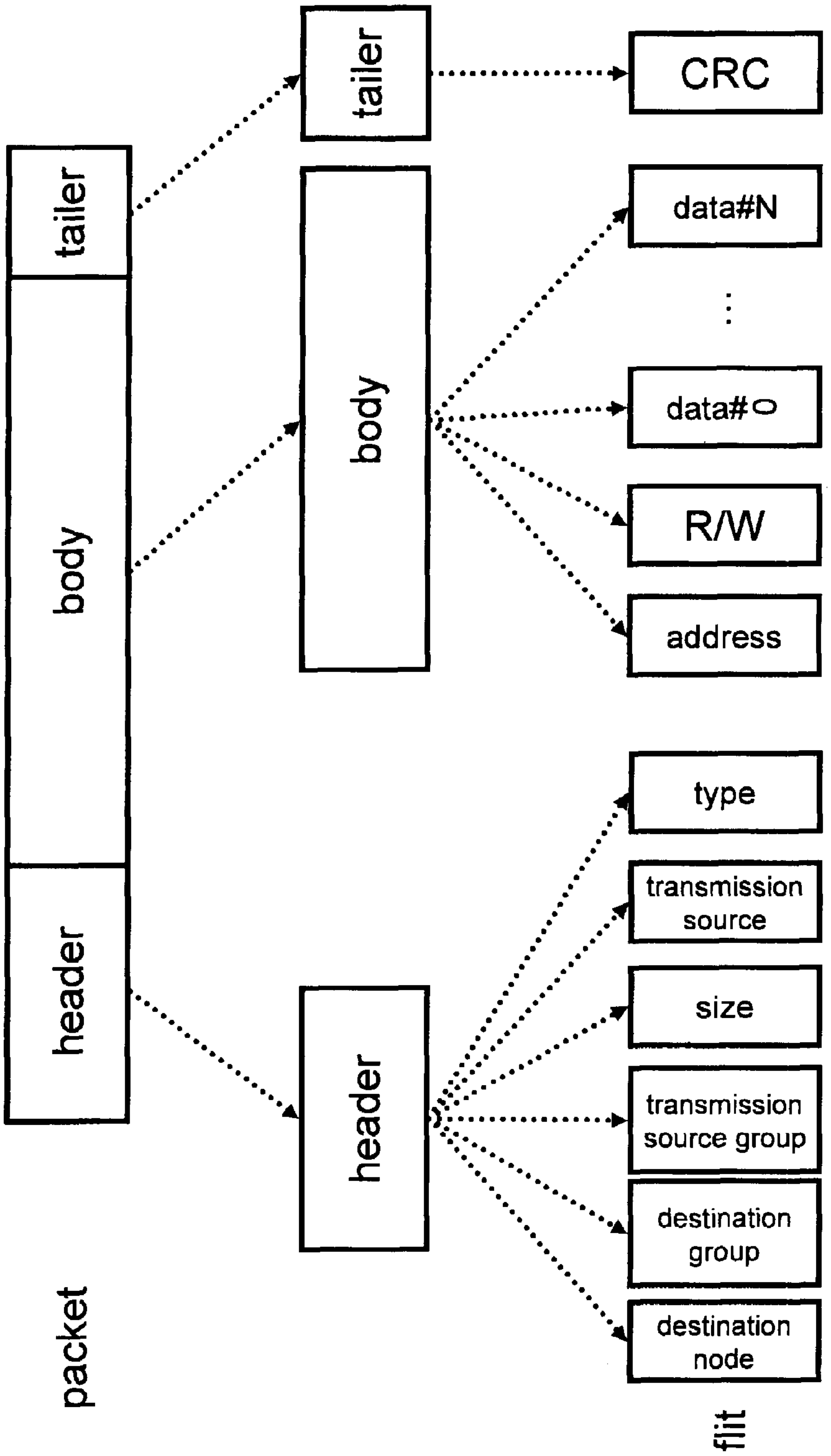
FIG. 105 is a view showing an example of a structure of a packet to be distributed in a semiconductor integrated circuit of a seventh exemplary embodiment.

FIG. 105 is a view showing an example of a structure of a packet to be distributed in a semiconductor integrated circuit of this exemplary embodiment. As shown in FIG. 105, in the packet of this exemplary embodiment, flit included in the header of the packet shown in FIG. 6, is added with information of an identifier of a destination group that is a group including an adaptor of a packet destination and an identifier of a transmission source group that is a group including an adaptor of a packet transmission source.

Each of the destination group and the reception source group is divided and grouped according to reliability of a core connected to each adaptor. The identifier of each group serves as a security ID indicating how high the reliability of the core in each group is. This identifier is not limited to the function of indicating the core reliability and may be any information capable of distinguishing a group to which a core belongs from another group. Even though the header of the packet includes the information of the identifier of a destination group and a transmission source group, it is possible to operate the semiconductor integrated circuit described in the first to sixth exemplary embodiments.

Figure 106:
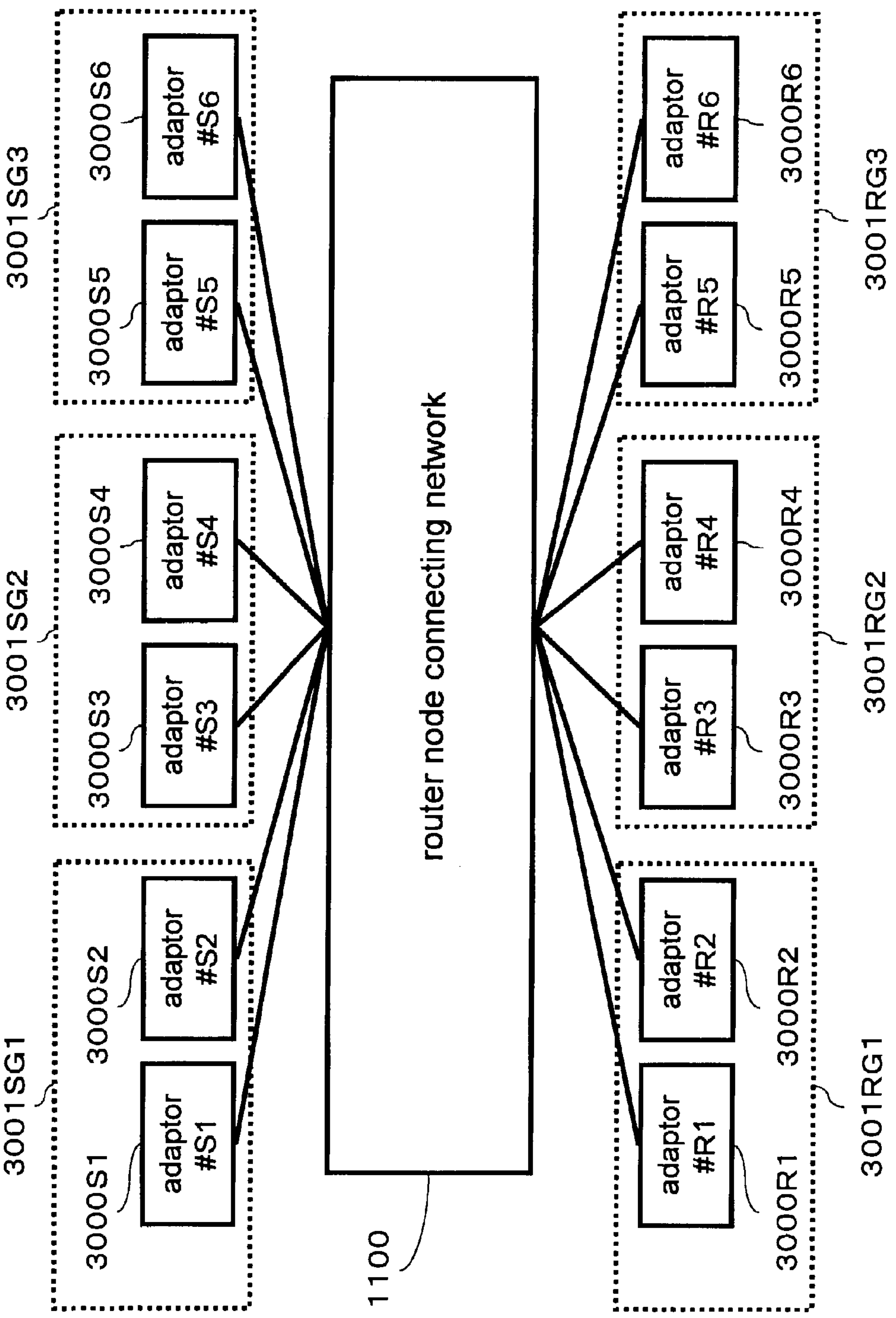
FIG. 106 is a view showing an example of a structure of a semiconductor integrated circuit of a seventh exemplary embodiment.

The semiconductor integrated circuit of this exemplary embodiment will be described. FIG. 106 is a view showing an example of a structure of a semiconductor integrated circuit of this exemplary embodiment.

The semiconductor integrated circuit of this exemplary embodiment comprises a transmission adaptor group including a plurality of transmission adaptors, a reception adaptor group including a plurality of reception adaptors, and router node connecting network 1100 relaying a signal transmitted and received between the transmission adaptors and the reception adaptors. In this exemplary embodiment, the transmission adaptor group is divided into a plurality of groups and the reception adaptor group is also divided into a plurality of groups. Router node connecting network 1100 has such a structure in which a plurality of router nodes is connected by signal lines. The example of the structure of router node connecting network 1100 is the same as those described in FIGS. 49 to 53.

In the example shown in FIG. 106, six transmission adaptors and the six reception adaptors are provided. The six transmission adaptors are grouped two by two and three transmission adaptor groups each of which includes the two transmission adaptors are thus provided. In addition, the six reception adaptors are grouped two by two and three reception adaptor groups each of which includes the two transmission adaptors are thus provided.

Transmission adaptor group 3001SG1 includes transmission adaptors 3000S1 and 3000S2. Transmission adaptor group 30001SG2 includes transmission adaptors 3000S3 and 3000S4. Transmission adaptor group 30001SG3 includes transmission adaptors 3000S5 and 3000S6.

Reception adaptor group 3001RG1 includes reception adaptors 3000R1 and 3000R2. Reception adaptor group 3001RG2 includes reception adaptors 3000R3 and 3000R4. Reception adaptor group 3001RG3 includes reception adaptors 3000R5 and 3000R6.

In the meantime, although not shown, each adaptor is connected to a core. In this exemplary embodiment, a filter control method of a signal transmitted and received between the adaptors will be specifically described and a structure and an operation of the core will not be described. In addition, since the structures and the operations of the adaptor and the router are the same as those described in the first to fifth exemplary embodiments, except for parts that are newly described in this exemplary embodiment, detailed descriptions thereof will be omitted.

Next, filter data that is used for filter control by the adaptor shown in FIG. 106 will be described. Here, it is assumed that a memory (now shown) is connected to each reception adaptor. In addition, the parts that are overlapped with the structures of the data described in the sixth exemplary embodiment will be omitted.

FIG. 107 is a view illustrating an example of filter data that is used for filter control in the semiconductor integrated circuit shown in FIG. 106. FIG. 107 shows reception filter data 3321R12, which is referred to by reception adaptors 3000R1 and 3000R2 for filter control, reception filter data 3321R34, which is referred to by reception adaptors 3000R3 and 3000R4 for filter control and reception filter data 3321R56, which is referred to by reception adaptors 3000R5 and 3000R6 for filter control. The reception adaptors belonging to the same group refer to the same reception filter data.

Reception filter data 3321R12 is provided with entries for each of transmission adaptors 3000S1~3000S6. The entries of transmission adaptors 3000S1 and 3000S2 describe that an access to an address range of 0x000-0x100 from each adaptor is inhibited. The entry of transmission adaptor 3000S3 describes that an access to address ranges of 0x000-0x100 and 0x500-0x600 from transmission adaptor 3000S3 is inhibited. The entries of transmission adaptors 3000S5 and 3000S6 describe that an access to all of the address range from each adaptor is inhibited.

Reception filter data 3321R34 is provided with entries for each of transmission adaptors 3000S1~3000S6. The entry of transmission adaptor 3000S1 describes that an access to the address ranges of 0x000-0x100 and 0x500-0x600 from transmission adaptor 3000S1 is inhibited. The entry of transmission adaptor 3000S2 describes that an access to address ranges of 0x000-0x100 and 0x700-0x800 from transmission adaptor 3000S2 is inhibited. The entries of transmission adaptors 3000S3 and 3000S4 describe that an access to the address range of 0x000-0x100 from each adaptor is inhibited. The entries of transmission adaptors 3000S5 and 3000S6 describe that an access to all of the address range from each adaptor is inhibited.

Reception filter data 3321R56 is provided with entries for each of transmission adaptors 3000S1~3000S6. The entries of transmission adaptors 3000S1~3000S4 describe that an access to all of the address range from each adaptor is inhibited. The entry of transmission adaptor 3000S5 describes that an access to the address ranges of 0x300-0x400 and 0x500-0x600 from transmission adaptor 3000S5 is inhibited. The entry of transmission adaptor 3000S6 describes that an access to address ranges of 0x300-0x400 and 0x500-0x700 from transmission adaptor 3000S6 is inhibited.

As shown in the example of FIG. 107, when only the reception adaptor side is enabled to perform filter control, information for control is set in the reception filter data. In the case shown in FIG. 107, the number of entries included in each reception filter data is six.

Next, another example of the filter data that is used for filter control by the adaptor shown in FIG. 106 will be described.

FIG. 108 is a view showing another example of filter data that is used for filter control in the semiconductor integrated circuit shown in FIG. 106. In FIG. 108, the information for filter control is divided into each filter data of the transmission side and the reception side.

FIG. 108 shows, as the packet transmission filter data, packet transmission filter data 3111S12 stored in transmission adaptors 3000S1 and 3000S2, packet transmission filter data 3111S34 stored in transmission adaptors 3000S3 and 3000S4 and packet transmission filter data 3111S56 stored in transmission adaptors 3000S5 and 3000S6. The transmission adaptors belonging to the same group refer to the same packet transmission filter data.

In addition, FIG. 108 shows, as the reception filter data, reception filter data 3321R12 stored in reception adaptors 3000R1 and 3000R2, reception filter data 3321R34 stored in reception adaptors 3000R3 and 3000R4, and reception filter data 3321R56 stored in reception adaptors 3000R5 and 3000R6. The reception adaptors belonging to the same group refer to the same reception filter data.

Contrary to FIG. 107, the packet transmission filter data of FIG. 108 describes entries inhibiting access to a reception adaptor. Packet transmission filter data 3111S12 and 3111S34 describe entries inhibiting access to reception adaptors 3000R5 and 3000R6. Packet transmission filter data 3111S56 describes entries inhibiting access to each of reception adaptors 3000R1~3000R4.

Thereby, reception filter data 3321R12 describe an entry inhibiting access to an address range of 0x000-0x100 from transmission adaptors 3000S1 and 3000S2, an entry inhibiting access to address ranges of 0x000-0x100 and 0x500-0x600 from transmission adaptor 3000S3 and an entry inhibiting access to address ranges of 0x000-0x100 and 0x700-0x800 from transmission adaptor 3000S4.

In addition, reception filter data 3321R34 describe an entry inhibiting access to the address ranges of 0x000-0x100 and 0x500-0x600 from transmission adaptor 3000S1, an entry inhibiting access to the address ranges of 0x000-0x100 and 0x700-0x800 from transmission adaptor 3000S2 and an entry inhibiting access to the address range of 0x000-0x100 from transmission adaptors 3000S3 and 3000S4.

Furthermore, reception filter data 3321R56 describe an entry inhibiting access to address ranges of 0x300-0x400 and 0x500-0x600 from transmission adaptor 3000S5 and an entry inhibiting access to the address ranges of 0x300-0x400 and 0x500-0x700 from transmission adaptor 3000S6.

Comparing the control information indicated by the filter data of FIG. 108 with the filter data of FIG. 107, the contents thereof are same.

Next, a sequence of the filter control will be described when the filter data of FIG. 108 is used. Here, it is assumed that transmission adaptor 3000S1 transmits a packet for accessing to an address range of 0x100-0x200 of a memory (not shown) connected to reception adaptor 3000R1.

After checking a destination by the header of a packet, transmission adaptor 3000S1 refers to packet transmission filter data 3111S12 and confirms that it is OK to distribute the packet to a destination of reception adaptor 3000R1. Then, the transmission adaptor transmits the packet to the destination of reception adaptor 3000R1 through router node connecting network 1100. The filter control of a first step is performed for the packet in transmission adaptor 3000S1.

After receiving the packet, reception adaptor 3000R1 refers to reception filter data 3321R12 and confirms that access to the address range of 0x100-0x200 is permitted. Then, the reception adaptor transmits the packet to the memory connected to reception adaptor 3000R1. The filter control of a second step is performed for the packet in reception adaptor 3000R1.

The filter control information of the first step is set by the filter data of the transmission side, and the filter control information of the second step is set by the filter data of the reception side. In FIG. 108, the filter control information is hierarchically set.

As shown in FIG. 108, when the filter control information is hierarchically set, the maximum number of entries of each filter data is reduced to 4 (four) from 6 (six). Due to this, as compared to the case shown in FIG. 107, the unity hardware size of each adaptor is reduced and the entire hardware size of the semiconductor integrated circuit is also reduced.

Further, in the case shown in FIG. 108, the load is dispersed to both the transmission adaptor and the reception adaptor, as compared to the case where the load of the filter control of the second step is applied to the reception adaptor only. Accordingly, the filter data can be referred to quickly, so that it is possible to reduce the time to refer to the filter data.

Next, another example of the filter data that is used for filter control by the adaptor shown in FIG. 106 will be described.

FIG. 109 is a view showing another example of filter data that is used for filter control in the semiconductor integrated circuit shown in FIG. 106. In FIG. 109, the information for filter control is divided into each filter data of the transmission side and the reception side and a part of a destination or transmission source is set by an identifier of a group.

FIG. 109 shows, as the packet transmission filter data, packet transmission filter data 3111S12 stored in transmission adaptors 3000S1 and 3000S2, packet transmission filter data 3111S34 stored in transmission adaptors 3000S3 and 3000S4 and packet transmission filter data 3111S56 stored in transmission adaptors 3000S5 and 3000S6. The transmission adaptors belonging to the same group refer to the same packet transmission filter data.

In addition, FIG. 109 shows, as the reception filter data, reception filter data 3321R12 stored in reception adaptors 3000R1 and 3000R2, reception filter data 3321R34 stored in reception adaptors 3000R3 and 3000R4, and reception filter data 3321R56 stored in reception adaptors 3000R5 and 3000R6. The reception adaptors belonging to the same group refer to the same reception filter data.

Contrary to FIG. 108, in FIG. 109, the identifiers of the destination groups and the transmission source groups shown in FIG. 105 are used to set the filter control.

Packet transmission filter data 3111S12 and 3111S34 describe entries inhibiting all access to reception adaptor group 3001RG3. Packet transmission filter data 3111S56 describes entries inhibiting all access to reception adaptor groups 3001RG1 and 3001RG2.

Thereby, reception filter data 3321R12 describe an entry inhibiting access to an address range of 0x000-0x100 from transmission adaptor groups 3001SG1 and 3001SG2, an entry inhibiting access to an address range of 0x500-0x600 from transmission adaptor 3000S3 and an entry inhibiting access to an address range of 0x700-0x800 from transmission adaptor 3000S4.

In addition, reception filter data 3321R34 describe an entry inhibiting access to the address range of 0x000-0x100 from transmission adaptor groups 3001SG1 and 3001SG2, an entry inhibiting access to the address range of 0x500-0x600 from transmission adaptor 3000S1 and an entry inhibiting access to the address range of 0x700-0x800 from transmission adaptor 3000S2.

Furthermore, reception filter data 3321R56 describe an entry inhibiting access to address ranges of 0x300-0x400 and 0x500-0x600 from transmission adaptor group 3001SG3 and an entry inhibiting access to the address range of 0x600-0x700 from transmission adaptor 3000S6.

Comparing the control information indicated by the filter data of FIG. 109 with the filter data of FIGS. 107 and 108, the contents thereof are same.

Next, a sequence of the filter control will be described when the filter data of FIG. 109 is used. Here, it is assumed that transmission adaptor 3000S1 transmits a packet for accessing to an address range of 0x100-0x200 of a memory (not shown) connected to reception adaptor 3000R1.

After checking the destination by a header of the packet, transmission adaptor 3000S1 refers to packet transmission filter data 3111S12 and confirms that it is OK to distribute the packet to a destination of reception adaptor 3000R1. Then, the transmission adaptor transmits the packet to the destination of reception adaptor 3000R1 through router node connecting network 1100. The filter control of a first step is performed for the packet in transmission adaptor 3000S1.

After receiving the packet, reception adaptor 3000R1 refers to reception filter data 3321R12 and confirms that access to the address range of 0x100-0x200 is permitted.

Then, the reception adaptor transmits the packet to the memory connected to reception adaptor 3000R1. The filter control of a second step is performed for the packet in reception adaptor 3000R1.

The filter control information of the first step is set by the filter data of the transmission side, and the filter control information of the second step is set by the filter data of the reception side. Also in the filter data of FIG. 109, the filter control information is hierarchically set.

As shown in FIG. 109, when the filter control information is hierarchically set, the number of all entries for filter control is reduced to 28 (which is a sum of 8 of the transmission side and 10 of the reception side) from 36 (which is obtained by multiplying 6 (the number of the reception adaptors) by 6 (the number of entries of each reception filter data)) of the case shown in FIG. 107. Thereby, it is possible to further reduce the entire hardware size of the semiconductor integrated circuit.

Eighth Exemplary Embodiment

In this exemplary embodiment, the router in the router node connecting network also performs the filter control, in addition to the filter control described in the seventh exemplary embodiment.

Figure 110:
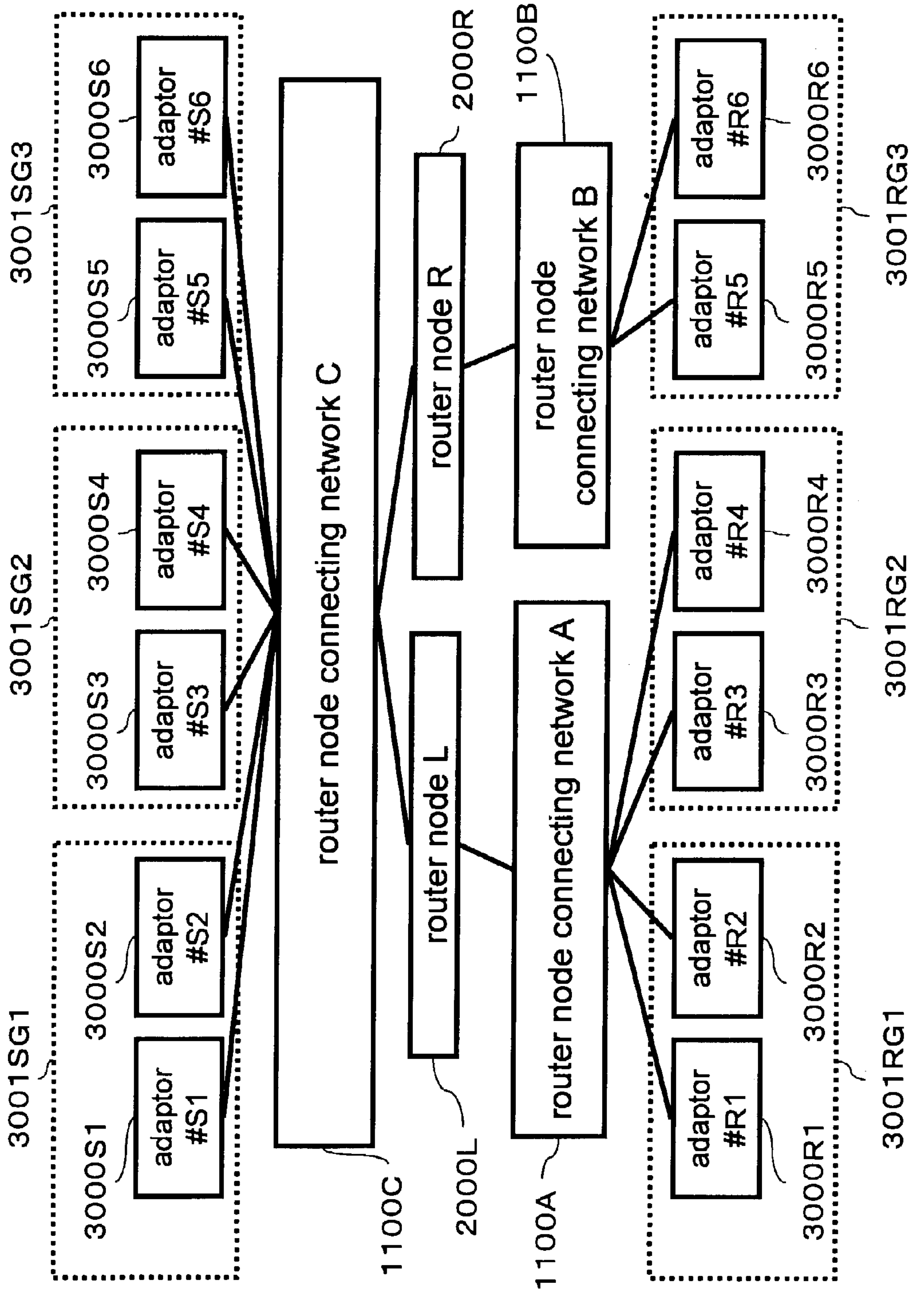
FIG. 110 is a view showing an example of a structure of a semiconductor integrated circuit of an eighth exemplary embodiment.

The semiconductor integrated circuit of this exemplary embodiment will be described. FIG. 110 is a view showing an example of a structure of the semiconductor integrated circuit of an eighth exemplary embodiment.

The semiconductor integrated circuit of this exemplary embodiment comprises a transmission adaptor group including a plurality of transmission adaptors, a reception adaptor group including a plurality of reception adaptors, and a router node connecting network relaying a signal transmitted and received between the transmission adaptors and the reception adaptors, like the seventh exemplary embodiment.

In each of the transmission adaptor group and the reception adaptor group, the adaptors are divided and grouped, like the seventh exemplary embodiment. Since the transmission adaptor group and the reception adaptor group are same as those of the seventh exemplary embodiment, detailed descriptions thereof will be omitted. In addition, the structure in which a core (not shown) is connected to each adaptor is also the same as the seventh exemplary embodiment and detailed descriptions thereof will be omitted. Furthermore, the structures and operations of the adaptor and the router are the same as those of the first to fifth exemplary embodiments, except for parts that will be newly described in this exemplary embodiment. Thus, detailed descriptions thereof will be omitted.

The router node connecting network of this exemplary embodiment comprises router node connecting network 1100A connected to reception adaptor groups 3001RG1 and 3001RG2, router node connecting network 1100B connected to reception adaptor group 3001RG3, router node connecting network 1100C connected to three transmission adaptor groups, router node 2000L relaying between router node connecting networks 1100A and 1100C and router node 2000R relaying router node connecting networks 1100B and 1100C.

When router node connecting network 1100C receives packets having destinations of reception adaptor groups 3001RG1 and 3001RG2 from the transmission adaptor, it delivers the packets to router node 2000L. In addition, when the router node connecting network receives a packet having a destination of reception adaptor group 30001RG3, it delivers the packet to router node 2000R.

Router node connecting network 1100A delivers the packets received from router node 2000L to reception adaptor group 3001RG1 or reception adaptor group 3001RG2. In addition, router node connecting network 1100B delivers the packet received from router node 2000R to reception adaptor group 3001RG3.

Next, a structure of filter data that is used for filter control in the semiconductor integrated circuit shown in FIG. 110 will be described. Here, it is assumed that a memory, which is not shown, is connected to each reception adaptor. In addition, the parts that overlap with the structures of the data described in the sixth and seventh exemplary embodiments will be omitted.

FIG. 111 is a view of an example of filter data that is used for filter control in the semiconductor integrated circuit shown in FIG. 110. In FIG. 111, the information for filter control is divided into filter data of each of the reception side adaptor, the transmission side adaptor and the router node. In this exemplary embodiment, filter control information is set in the router node, too, contrary to FIG. 109 of the seventh exemplary embodiment.

FIG. 111 shows, as the packet transmission filter data, packet transmission filter data 3111S12 stored in transmission adaptors 3000S1 and 3000S2, packet transmission filter data 3111S34 stored in transmission adaptors 3000S3 and 3000S4 and packet transmission filter data 3111S56 stored in transmission adaptors 3000S5 and 3000S6. The transmission adaptors belonging to the same group refer to the same packet transmission filter data.

In addition, FIG. 111 shows, as the reception filter data, reception filter data 3321R12 stored in reception adaptors 3000R1 and 3000R2, reception filter data 3321R34 stored in reception adaptors 3000R3 and 3000R4, and reception filter data 3321R56 stored in reception adaptors 3000R5 and 3000R6. The reception adaptors belonging to the same group refer to the same reception filter data.

In addition, FIG. 111 shows router filter data 2141L for router node 2000L and router filter data 2141R for router node 2000R.

Next, the contents of each filter data will be described. Since the packet transmission filter data is same as that of FIG. 109, detailed descriptions thereof will be omitted.

The router filter data is provided with an entry that is a set of a destination adaptor number indicating an adaptor of a packet destination, a transmission source adaptor number indicating an adaptor of a packet transmission source, an address range and information indicating whether access is permitted for the address range. When an adaptor number is described as an identifier of a group, it indicates one of the adaptors belonging to the corresponding group. It will be specifically described below.

In router filter data 2141L, two identifiers of reception adaptor groups 3001RG1 and 3001RG2 are described in the destination adaptor number column. In router filter data 2141L, each of the two reception adaptor groups is described with an entry indicating that access to the address range of 0x000-0x100 is inhibited for a packet having a transmission source of transmission adaptor group 3001SG1 or 3001SG2.

In router filter data 2141R, an entry is described which indicates that access to the address ranges of 0x300-0x400 and 0x500-0x600 is inhibited for a packet having a destination of reception adaptor group 3001RG3 and a transmission source of transmission adaptor group 3001SG3.

Thereby, reception filter data 3321R12 is described with the entry indicating that access to the address range of 0x500-0x600 from transmission adaptor 3000S3 is inhibited and the entry indicating that an access to the address range of 0x700-

0x800 from transmission adaptor 3000S4 is inhibited. In addition, reception filter data 3321R34 is described with the entry indicating that access to the address range of 0x500-0x600 from transmission adaptor 3000S1 is inhibited and the entry indicating that access to the address range of 0x700-0x800 from transmission adaptor 3000S2 is inhibited.

Furthermore, reception filter data 3321R56 is described with the entry indicating that access to the address range of 0x600-0x700 from transmission adaptor 3000S6 is inhibited. Comparing the control information indicated by the filter data of FIG. 111 with the filter data of FIG. 109, the contents thereof are same.

Next, a sequence of the filter control will be described when the filter data of FIG. 111 is used. Here, it is assumed that transmission adaptor 3000S1 transmits a packet for accessing to the address range of 0x100-0x200 of a memory (not shown) connected to reception adaptor 3000R1.

After checking the destination by a header of the packet, transmission adaptor 3000S1 refers to packet transmission filter data 3111S12 and confirms that it is OK to distribute the packet to a destination of reception adaptor 3000R1. Then, the transmission adaptor transmits the packet to the destination of reception adaptor 3000R1 through router node connecting network 1100C. The filter control of a first step is performed for the packet in transmission adaptor 3000S1.

When router node connecting network 1100C receives the packet from transmission adaptor 3000S1 and recognizes that the destination is reception adaptor 3000R1, it delivers the packet to router node 2000L. When router node 2000L receives the packet, it checks a destination thereof, refers to router filter data 2141L and confirms that it is OK to distribute the packet to the destination of reception adaptor 3000R1. Then, the router node transmits the packet to the destination of reception adaptor 3000R1 through router node connecting network 1100A. The filter control of a second step is performed for the packet in router node 2000L.

After receiving the packet through router node connecting network 1100A, reception adaptor 3000R1 refers to reception filter data 3321R12 and confirms that access to the address range of 0x100-0x200 is permitted. Then, the reception adaptor transmits the packet to the memory connected to reception adaptor 3000R1. The filter control of a third step is performed for the packet in reception adaptor 3000R1.

Filter control information of the first step is set by the filter data of the transmission side, filter control information of the second step is set by the filter data of the router and filter control information of the third step is set by filter data of the reception side. In FIG. 111, filter control information is hierarchically set in the three steps.

As shown in FIG. 111, when filter control information is hierarchically set, the number of all the entries for filter control is reduced to 24 (which is a sum of 9 in each of the transmission side and the reception side and 6 in the router) from 28 shown in FIG. 109. Thereby, it is possible to further reduce the entire hardware size of the semiconductor integrated circuit.

Next, another example of filter data that is used for filter control in the semiconductor integrated circuit shown in FIG. 110 will be described.

FIG. 112 is a view showing another example of filter data that is used for filter control in the semiconductor integrated circuit shown in FIG. 110.

FIG. 112 shows, as the packet transmission filter data, packet transmission filter data 3111S12 stored in transmission adaptors 3000S1 and 3000S2, packet transmission filter data 3111S34 stored in transmission adaptors 3000S3 and 3000S4 and packet transmission filter data 3111S56 stored in transmission adaptors 3000S5 and 3000S6. The transmission adaptors belonging to the same group refer to the same packet transmission filter data.

In addition, FIG. 112 shows, as the reception filter data, reception filter data 3321R12 stored in reception adaptors 3000R1 and 3000R2, reception filter data 3321R34 stored in reception adaptors 3000R3 and 3000R4, and reception filter data 3321R56 stored in reception adaptors 3000R5 and 3000R6. The reception adaptors belonging to the same group refer to the same reception filter data. In addition, FIG. 112 shows router filter data 2141L for router node 2000L and router filter data 2141R for router node 2000R.

Next, the contents of each filter data will be described. Since the packet transmission filter data is same as that of FIG. 109, detailed descriptions thereof will be omitted.

In router filter data 2141R, an entry is described which indicates that access to the address ranges of 0x300-0x400 and 0x500-0x600 is inhibited for a packet having a transmission source of transmission adaptor group 3001SG3. Compared to FIG. 111, router filter data 2141R shown in FIG. 112 is not provided with column of a destination adaptor number. The column is not necessary because destination of a packet is limited to reception adaptor group 3001RG3 by path information stored in router node 2000R. In router node 2000R, filter control is performed by the path information and the filter data. As shown in FIG. 112, it is possible to omit the item of the destination adaptor number in the filter data. Path information is information that is stored in each router node and describes another node which is a node to which a packet that has been received from another node is transmitted.

In router filter data 2141L, an entry is described which indicates that access to the address range of 0x000-0x100 is inhibited for a packet having a transmission source of transmission adaptor group 3001SG1 or 3001SG2. Compared to FIG. 111, router filter data 2141L shown in FIG. 112 is not provided with the column of a destination adaptor number, due to the same reason as router filter data 2141R. In path information of router node 2000L, a destination of a packet is limited to reception adaptor groups 3001RG1 and 3001RG2.

Thereby, reception filter data 3321R12 is described with an entry indicating that an access to the address range of 0x500-0x600 from transmission adaptor 3000S3 is inhibited and an entry indicating that access to the address range of 0x700-0x800 from transmission adaptor 3000S4 is inhibited. In addition, reception filter data 3321R34 is described with an entry indicating that access to the address range of 0x500-0x600 from transmission adaptor 3000S1 is inhibited and an entry indicating that access to the address range of 0x700-0x800 from transmission adaptor 3000S2 is inhibited.

Furthermore, reception filter data 3321R56 is described with an entry indicating that access to the address range of 0x600-0x700 from transmission adaptor 3000S6 is inhibited. Comparing the control information indicated by the filter data shown in FIG. 112 with the filter data of FIG. 111, the contents thereof are same.

Next, a sequence of filter control will be described when the filter data of FIG. 112 is used. Here, it is assumed that transmission adaptor 3000S1 transmits a packet for accessing to the address range of 0x100-0x200 of a memory (not shown) connected to reception adaptor 3000R1.

After checking the destination by a header of the packet, transmission adaptor 3000S1 refers to packet transmission filter data 3111S12 and confirms that it is OK to distribute the packet to the destination of reception adaptor 3000R1. Then, the transmission adaptor transmits the packet to reception adaptor 3000R1 through router node connecting network 1100C. The filter control of the first step is performed for the packet in transmission adaptor 3000S1.

When router node connecting network 1100C receives the packet from transmission adaptor 3000S1 and recognizes that the destination is reception adaptor 3000R1, it delivers the packet to router node 2000L. When router node 2000L receives the packet, it checks the destination thereof, refers to the path information and router filter data 2141L and confirms that it is OK to distribute the packet to the destination of reception adaptor 3000R1. Then, the router node transmits the packet to the destination of reception adaptor 3000R1 through router node connecting network 1100A. The filter control of a second step is performed for the packet in router node 2000L.

After reception adaptor 3000R1 receives the packet through router node connecting network 1100A, it refers to reception filter data 3321R12 and confirms that access to the address range of 0x100-0x200 is permitted. Then, the reception adaptor transmits the packet to the memory connected to reception adaptor 3000R1. The filter control of the third step is performed for the packet in reception adaptor 3000R1.

Filter control information of the first step is set by filter data of the transmission side, filter control information of the first step is set by filter data of the router relaying the packet and filter control information of the third step is set by filter data of the reception side. Also in the case of FIG. 112, the filter control information is hierarchically set in the three steps.

As shown in FIG. 112, when the filter control information is hierarchically set, the number of all entries for filter control is reduced to 22 (which is a sum of 9 in each of the transmission side and the reception side and 4 of the router) from 24 of the case shown in FIG. 111. Thereby, it is possible to further reduce the entire hardware size of the semiconductor integrated circuit.

Meanwhile, also in the eighth exemplary embodiment, it may be possible to designate an adaptor unity without using the identifier of an adaptor in the filter data, like the sixth exemplary embodiment.

In addition, although the adaptors are grouped in each of the transmission side and the reception side in the seventh and eighth exemplary embodiments, they may be grouped in any one side only.

By applying the update method of the filter data described in each of the first to fifth exemplary embodiments to the hierarchical setting of filter control information in the sixth to eighth exemplary embodiments, it is possible to make a consistent and synchronous setting. In this case, in similar one embodiment from among the first to fifth exemplary embodiments, the filter data may include at least one of the “permission bit” information and the “temporary stop bit” information.

According to the invention, the interconnecting network to transmit and receive a signal between the cores is provided and the delivery information for filter control provided in each of the transmission side and the reception side is hierarchically set in at least the transmission side and the reception side. By hierarchically setting the delivery information, the delivery information is dispersed in the transmission side and the reception side. Due to this, the number of entries described in the delivery information is dispersed, so that it is possible to avoid a concentration of the entries and to reduce the number of the entries. When performing filter control, the time to refer to the delivery information can be reduced, so that processing of filter control is executed at high speed.

When the plurality of CPUs is classified into groups and the programs of the basic process and the further process are executed for each group in accordance with the reliabilities thereof, the smaller the number of entries described in the delivery information for transmitting and receiving a signal between the groups having the equivalent reliability, the shorter is the time needed to refer to the delivery information, so that the processing to execute each program is performed at high speed.

When the delivery information is concentrated in a part of the adaptors or routers, it is not possible to know in which adaptor or router the delivery information is concentrated. Thus, it was necessary to provide a memory to all the adaptors and routers corresponding to the delivery information which needs the highest storage capacity. However, according to the invention, the number of entries of the delivery information is dispersed, so that it is possible to prevent the delivery information from concentrating in the part of the adaptor or routers. Due to this, it may be possible to provide all the adaptor and routers with a memory having a storage capacity necessary for averaging the delivery information and to prevent the hardware size from being increased.

Meantime, in the sixth to eighth exemplary embodiments, based on the specific data structure, the range of the data is hierarchically set, so that the number of entries is made uniform and reduced together with dispersing of the entries. However, the invention is not limited to the specific data structure used in the exemplary embodiments. In other words, even with another data structure, by making the hierarchical structure capable of making a group based on the dispersion and reliability of the entries, the same effects can be obtained.

Additionally, in the sixth to eighth exemplary embodiments, it has been exemplified the hierarchical type filter control apparatus and method of the interconnecting network in the semiconductor integrated circuit having the cores. However, the invention is not limited to such hierarchical type filter control apparatus and method. In other words, the invention can be applied to any hierarchical type filter control apparatus and method.

Further, in the sixth to eighth exemplary embodiments, the filter control information of the transmission side is set by the packet transmission filter data. However, the transmission filter data may also be possible.

In addition, in the first to eighth exemplary embodiments, the filter control apparatus and method capable of updating the setting of the interconnecting network in the semiconductor integrated circuit having the cores has been exemplified. However, the invention is not limited to such a filter control apparatus and method. In other words, the invention can be applied to any filter control apparatus and method.

According to an exemplary effect of the invention, the delivery information for filter control is hierarchically set, so that the delivery information is dispersed to the transmission and reception sides of a signal. Thus, the number of entries described in the delivery information is dispersed, so that it is possible to avoid a concentration of the entries and to suppress the number of entries. In addition, when performing filter control, the time needed to refer to the delivery information can be reduced, so that the processing of the filter control is performed at high speed.

While the invention has been shown and described with reference to the exemplary embodiments and examples, it will be understood by those skilled in the art that the invention is not limited thereto and that various changes may be made thereto without departing from the spirit and scope of the invention as defined by the following claims.

This application is based upon and claims the benefit of priority from Japanese Patent Application No. 2007-152795 filed on Jun. 8, 2007, the content of which is incorporated by reference.

The invention claimed is:

1. A semiconductor integrated circuit comprising:

a plurality of cores; and an interconnecting network including adaptors connected to each of said cores and a plurality of routers connecting said adaptors to communicate therebetween;

wherein said adaptors include:

a transmission side adaptor connected to a first core of said plurality of cores, storing first delivery information in which information of a reception side adaptor, which permits said transmission side adaptor to transfer a request signal from said first core, is registered, and transferring said request signal to be received from said first core to said reception side adaptor, which is registered in said first delivery information, through said interconnecting network in accordance with said first delivery information; and the reception side adaptor connected to a second core of said plurality of cores, storing second delivery information in which information of the transmission side adaptor, which is permitted to transfer said request signal to said reception side adaptor, and information of address range in said second core, that an access is permitted, is registered, and said reception side adaptor determining whether or not to receive said request signal to be received through said interconnecting network and whether or not to access to said second core, in accordance with said second delivery information, and wherein information for filter control with respect to address range in said second core that said first core is permitted to access, is divided into said first delivery information and said second delivery information hierarchically set up in accordance with said first delivery information, information of the reception side adaptor, which permits said transmission side adaptor to transfer said request signal from said first core, is registered in said first delivery, and information of the transmission side adaptor, which is permitted to transfer said request signal to said reception side adaptor, and information of address range in said second core, that the access is permitted, is registered in said second delivery information.

2. The semiconductor integrated circuit according to claim 1, wherein each of said routers stores third delivery information that indicates a delivery condition of said request signal to be distributed to said reception side adaptor from said transmission side adaptor, and controls delivery of said request signal to be received from said transmission side adaptor to said reception side adaptor in accordance with said third delivery information, and wherein said first delivery information, said second delivery information and said third delivery information are hierarchically set.

3. The semiconductor integrated circuit according to claim 1, wherein a plurality of said transmission side adaptors and a plurality of said reception side adaptors are provided, wherein said transmission side adaptors are classified into a plurality of groups or said reception side adaptors are classified into a plurality of groups, and wherein said groups, instead of said transmission adaptors or reception side adaptors, are designated in said first or second delivery information.

4. The semiconductor integrated circuit according to claim 2, wherein a plurality of said transmission side adaptors and a plurality of said reception side adaptors are provided, wherein said transmission side adaptors are classified into a plurality of groups or said reception side adaptors are classified into a plurality of groups, and wherein said groups, instead of said transmission adaptors or reception side adaptors, are designated in at least one of said first, second and third delivery information.

5. The semiconductor integrated circuit according to claim 1, wherein said first delivery information and said second delivery information are in accordance with each reliability level of said cores.

6. The semiconductor integrated circuit according to claim 2, wherein said first delivery information, said second delivery information and said third delivery information are in accordance with each reliability level of said cores.

7. The semiconductor integrated circuit according to claim 1, wherein said transmission side adaptor comprises storage unit that stores said first delivery information, which indicates a delivery condition of said request signal to be received from said first core to said second core, and filter data indicating whether or not to temporarily stop a processing of said request signal; and transmission filter unit that when said request signal is received from said first core, refers to said filter data to control delivery of said request signal, that when an instruction to temporarily stop processing of said request signal is received from a third core different from said first core, stops processing of said request signal, and that when new data to update said filter data and an instruction to cancel a temporary stopping of said processing of said request signal are received from said third core, updates said filter data into new data and restarts said processing of said request signal.

8. The semiconductor integrated circuit according to claim 1, wherein said transmission side adaptor comprises storage unit that stores said first delivery information, which indicates a delivery condition of a packet, which is converted from said request signal received from said first core, to said second core, and filter data indicating whether or not to temporarily stop processing of said packet; and packet transmission filter unit that when said request signal is received from said first core, converts said request signal to a packet and refers to said filter data to control delivery of said packet, that when an instruction to temporarily stop processing of said request signal is received from a third core different from said first core, stops processing of said packet, and that when new data to update said filter data and an instruction to cancel a temporary stopping of said processing of said request signal are received from said third core, updates said filter data into new data and restarts said processing of said packet.

9. The semiconductor integrated circuit according to claim 7, wherein said reception side adaptor comprises storage unit that stores said second delivery information, which indicates a delivery condition of said request signal to be received through said interconnecting network from said first core to said second core, and filter data indicating whether or not to temporarily stop processing of said request signal; and reception filter unit that when said request signal is received from said first core, refers to said filter data to control delivery of said request signal, that when an instruction to temporarily stop processing of said request signal is received from a third core different from said second core, stops processing of said request signal, and when new data to update said filter data and an instruction to cancel a temporary stopping of said processing of said request signal are received from said third core, updates said filter data into new data and restarts said processing of said request signal.

10. The semiconductor integrated circuit according to claim 2, wherein each of said routers comprises storage unit that stores said third delivery information, which indicates a delivery condition of a packet after conversion of said request signal by one of said cores, and filter data indicating whether or not to temporarily stop processing of said request signal; and routing unit that when a packet after conversion of said request signal is received from another router, controls delivery of said packet in accordance with said filter data, that when an instruction to temporarily stop processing of said request signal is received from a predetermined core of said cores, stops a processing of said packet, and when new data to update said filter data and an instruction to cancel a temporary stopping of said processing of said request signal are received from a predetermined core, updates said filter data into new data and restarts said processing of said packet.

11. The semiconductor integrated circuit according to claim 9, wherein said first core or second core belongs to a first group including a core to execute processing having predetermined reliability, wherein said third core belongs to a second group consisting of a core to execute processing having reliability higher than that of said first group, and wherein said third core generates said new data to update said filter data, transmits an instruction to temporarily stop said processing of said request signal to said transmission side adaptor and said reception side adaptor and then transmits said new data and an instruction to cancel a temporary stop of said processing of said request signal to said plurality of said transmission side adaptors and said plurality of said reception side adaptors.

12. The semiconductor integrated circuit according to claim 10, wherein said first core or second core belongs to a first group including a core to execute processing having predetermined reliability, wherein said third core belongs to a second group consisting of a core to execute processing having reliability higher than that of said first group, and wherein said third core generates said new data to update said filter data, transmits an instruction to temporarily stop said processing of said request signal to said plurality of said routers and then transmits said new data and an instruction to cancel a temporary stopping of said processing of said request signal to said plurality of said routers.

13. A filter control method of a semiconductor integrated circuit having a plurality of cores; and an interconnecting network including adaptors connected to each of said cores and a plurality of routers connecting said adaptors to communicate therebetween;

a transmission side adaptor being one of said adaptors and being connected to a first core of said plurality of cores, stores first delivery information in which information of a reception side adaptor of said adaptors, that permits said transmission side adaptor to transfer a request signal from said first core, is registered, the reception side adaptor being one of said adaptors and being connected to a second core of said plurality of cores, stores second delivery information in which information of the transmission side adaptor, which is permitted to transfer said request signal to said reception side adaptor, and information of address range in said second core, that an access is permitted, is registered;

when said transmission side adaptor receives said request signal from said first core, said transmission side adaptor transfers said request signal to be received from said first core to said reception side adaptor, which is registered in said first delivery information, through said interconnecting network in accordance with said first delivery information, and when said reception side adaptor receives said request signal from said reception side adaptor through said interconnecting network, said reception side adaptor determines whether or not to receive said request signal and whether or not to access to said second core, in accordance with said second delivery information, wherein information for filter control with respect to address range in said second core that said first core is permitted to access, is divided into said first delivery information and said second delivery information hierarchically set up in accordance with said first delivery information, information of the reception side adaptor, which permits said transmission side adaptor to transfer said request signal from said first core, is registered in said first delivery, and information of the transmission side adaptor, which is permitted to transfer said request signal to said reception side adaptor, and information of address range in said second core, that the access is permitted, is registered in said second delivery information.

14. The filter control method according to claim 13, wherein each of said routers stores third delivery information that indicates a delivery condition of said request signal to be distributed to said reception side adaptor from said transmission side adaptor and is hierarchically set with said first delivery information and said second delivery information, and wherein each of said routers receives said request signal from said transmission side adaptor, and each of said routers controls delivery of said request signal to said reception side adaptor in accordance with said third delivery information.

15. The filter control method according to claim 13, wherein a plurality of said transmission side adaptors and a plurality of said reception side adaptors are provided, wherein said transmission side adaptors are classified into a plurality of groups or said reception side adaptors are classified into a plurality of groups, and wherein said groups, instead of said transmission adaptors or reception side adaptors, are designated in said first or second delivery information.

16. The filter control method according to claim 14, wherein a plurality of said transmission side adaptors and a plurality of said reception side adaptors are provided, wherein said transmission side adaptors are classified into a plurality of groups or said reception side adaptors are classified into a plurality of groups, and wherein said groups, instead of said transmission adaptors or reception side adaptors, are designated in at least one of said first, second and third delivery information.

17. The filter control method according to claim 13, wherein said first delivery information and said second delivery information are set in accordance with each reliability level of said cores.

18. The filter control method according to claim 14, wherein said first delivery information, said second delivery information and said third delivery information are set in accordance with each reliability level of said cores.

* * * * *

UNITED STATES PATENT AND TRADEMARK OFFICE
CERTIFICATE OF CORRECTION

PATENT NO. : 8,531,963 B2
APPLICATION NO. : 12/663474
DATED : September 10, 2013
INVENTOR(S) : Inoue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this
Fifteenth Day of September, 2015

Michelle K. Lee
*Director of the United States Patent and Trademark Office*